US012342102B2

(12) United States Patent
Chang et al.

(10) Patent No.: US 12,342,102 B2
(45) Date of Patent: Jun. 24, 2025

(54) SYSTEMS AND METHODS FOR MANAGING CAPTIONS

(71) Applicant: Apple Inc., Cupertino, CA (US)

(72) Inventors: Jae Woo Chang, Cupertino, CA (US); Elizabeth C. Cranfill, San Francisco, CA (US); Pani Page, Las Vegas, NV (US); Christoper J. Romney, San Jose, CA (US); Marcel Van Os, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 322 days.

(21) Appl. No.: 17/988,571

(22) Filed: Nov. 16, 2022

(65) Prior Publication Data

US 2023/0164296 A1    May 25, 2023

Related U.S. Application Data

(60) Provisional application No. 63/343,075, filed on May 17, 2022, provisional application No. 63/281,373, filed on Nov. 19, 2021.

(51) Int. Cl.
| H04N 7/15 | (2006.01) |
| G06F 3/0485 | (2022.01) |
| G06F 3/0486 | (2013.01) |
| G06F 3/0488 | (2022.01) |
| G06V 20/62 | (2022.01) |
| G10L 15/26 | (2006.01) |
| H04N 7/088 | (2006.01) |
| H04N 7/14 | (2006.01) |

(52) U.S. Cl.
CPC .......... *H04N 7/152* (2013.01); *G06F 3/0485* (2013.01); *G06F 3/0486* (2013.01); *G06F 3/0488* (2013.01); *G06V 20/635* (2022.01); *G10L 15/26* (2013.01); *H04N 7/0885* (2013.01); *H04N 7/147* (2013.01)

(58) Field of Classification Search
CPC ...... H04N 7/152; H04N 7/0885; H04N 7/147; G06V 20/635; G06F 3/0485; G06F 3/0486; G06F 3/0488; G10L 15/26
See application file for complete search history.

(56) References Cited

U.S. PATENT DOCUMENTS

| 7,920,158 B1 * | 4/2011 | Beck | H04N 23/611 709/204 |
| 8,782,721 B1 * | 7/2014 | Kellicker | H04N 21/234336 725/91 |
| 10,284,812 B1 * | 5/2019 | Van Os | H04L 51/046 |
| 10,818,295 B1 * | 10/2020 | Lalor | G10L 15/22 |
| 11,069,359 B2 * | 7/2021 | Chhabra | G06Q 10/1095 |

(Continued)

FOREIGN PATENT DOCUMENTS

WO    WO-2018169735 A1 *  9/2018  ......... H04L 65/4038

OTHER PUBLICATIONS

Applicant-Initiated Interview Summary received for U.S. Appl. No. 17/889,110, mailed on Jul. 3, 2024, 2 pages.

(Continued)

*Primary Examiner* — Duc Nguyen
*Assistant Examiner* — Carissa A Jones
(74) *Attorney, Agent, or Firm* — DLA Piper LLP (US)

(57) ABSTRACT

The present disclosure generally relates to embodiments for a live communication interface for managing captions.

54 Claims, 53 Drawing Sheets

(56) References Cited

U.S. PATENT DOCUMENTS

| | | |
|---|---|---|
| 11,394,569 B1* | 7/2022 | Roedel ................ G06F 3/04812 |
| 11,455,078 B1* | 9/2022 | Goodrich ............ G06F 3/04847 |
| 2005/0175167 A1 | 8/2005 | Yacoub et al. |
| 2007/0143103 A1* | 6/2007 | Asthana ................ H04M 3/567 |
| | | 704/200 |
| 2008/0094467 A1* | 4/2008 | An .......................... H04N 7/142 |
| | | 348/14.02 |
| 2010/0268534 A1 | 10/2010 | Kishan et al. |
| 2012/0182381 A1* | 7/2012 | Abate ................. H04L 12/1822 |
| | | 348/E7.083 |
| 2014/0028781 A1* | 1/2014 | MacDonald ........... G06Q 10/10 |
| | | 348/E7.083 |
| 2014/0267543 A1 | 9/2014 | Kerger et al. |
| 2015/0063785 A1* | 3/2015 | Lee ...................... G11B 27/031 |
| | | 386/280 |
| 2015/0244981 A1* | 8/2015 | Johnson ........... H04N 21/42203 |
| | | 348/14.07 |
| 2015/0350771 A1 | 12/2015 | Konchitsky |
| 2017/0280098 A1* | 9/2017 | Sethuraman ........ H04L 12/1827 |
| 2017/0336960 A1* | 11/2017 | Chaudhri ................ H04L 51/18 |
| 2018/0184045 A1 | 6/2018 | Chiang |
| 2019/0121522 A1* | 4/2019 | Davis ...................... G06V 40/28 |
| 2019/0341050 A1* | 11/2019 | Diamant .............. G06V 40/172 |
| 2021/0074298 A1 | 3/2021 | Coeytaux |
| 2021/0400142 A1* | 12/2021 | Jorasch ............... H04L 65/1069 |
| 2022/0115020 A1 | 4/2022 | Bradley et al. |
| 2022/0342524 A1* | 10/2022 | Rongrong ............. G06F 3/0486 |
| 2022/0374585 A1* | 11/2022 | Wang ................... G11B 27/031 |
| 2023/0141096 A1* | 5/2023 | Bleak ...................... G10L 15/26 |
| | | 704/270 |
| 2023/0419967 A1 | 12/2023 | Hornberger et al. |

OTHER PUBLICATIONS

Notice of Allowance received for U.S. Appl. No. 17/889,110, mailed on Sep. 26, 2024, 16 pages.

International Preliminary Report on Patentability received for PCT Patent Application No. PCT/US2022/050343, mailed on May 30, 2024, 21 pages.

International Search Report and Written Opinion received for PCT Patent Application No. PCT/US2022/050343, mailed on Apr. 19, 2023, 27 pages.

International Search Report and Written Opinion received for PCT Patent Application No. PCT/US2023/021515, mailed on Sep. 8, 2023, 18 pages.

Invitation to Pay Additional Fees and Partial International Search Report received for PCT Patent Application No. PCT/US2022/050343, mailed on Feb. 23, 2023, 18 pages.

Invitation to Pay Additional Fees and Partial International Search Report received for PCT Patent Application No. PCT/US2023/021515, mailed on Jul. 19, 2023, 11 pages.

Non-Final Office Action received for U.S. Appl. No. 17/889,110, mailed on May 31, 2024, 16 pages.

Apple, "Apple previews innovative accessibility features combining the power of hardware, software, and machine learning", Available online at: https://www.apple.com/newsroom/2022/05/apple-previews-innovative-accessibility-features/, May 17, 2022, 10 pages.

Notice of Allowance received for U.S. Appl. No. 17/889,110, mailed on Feb. 5, 2025, 16 pages.

Corrected Notice of Allowance received for U.S. Appl. No. 17/889,110, mailed on Dec. 27, 2024, 3 pages.

International Preliminary Report on Patentability received for PCT Patent Application No. PCT/US2023/021515, mailed on Nov. 28, 2024, 13 pages.

* cited by examiner

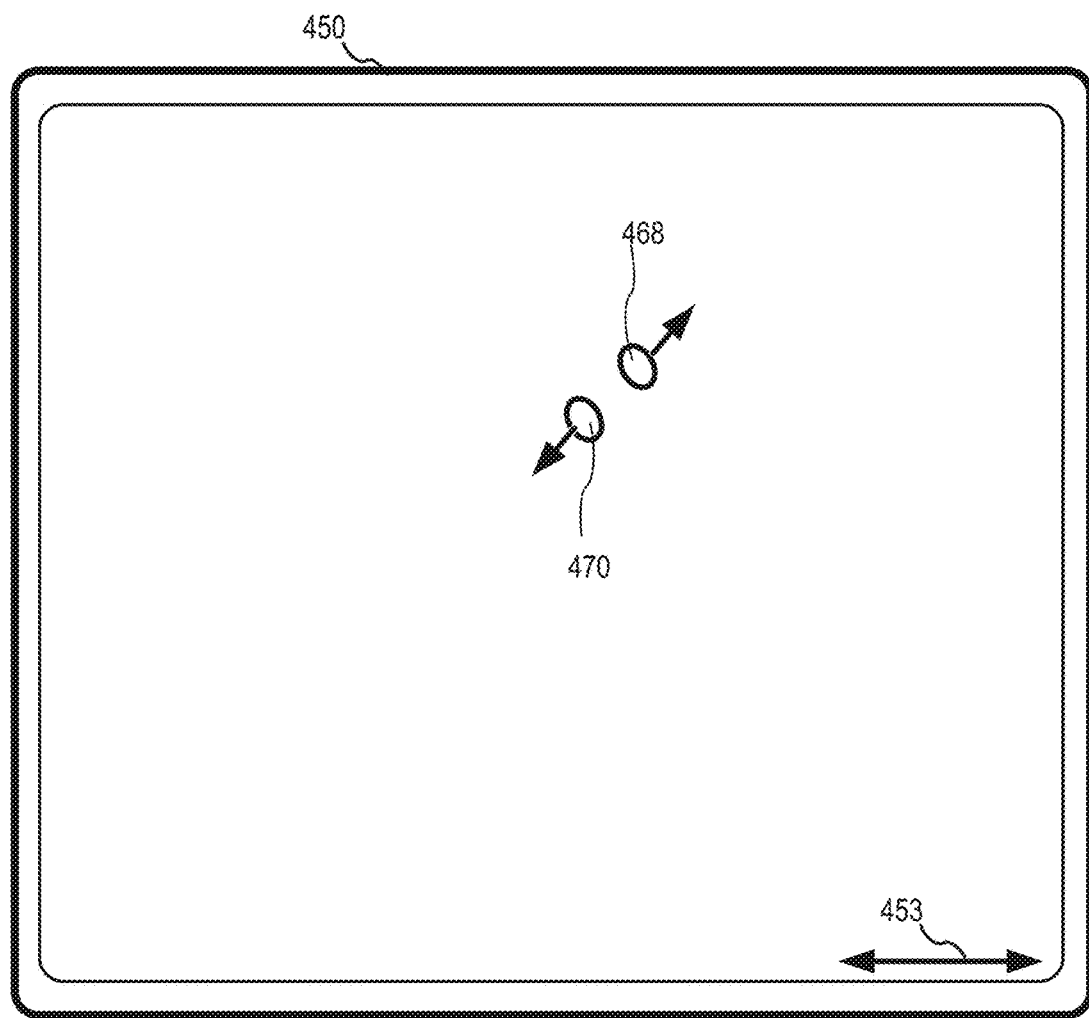
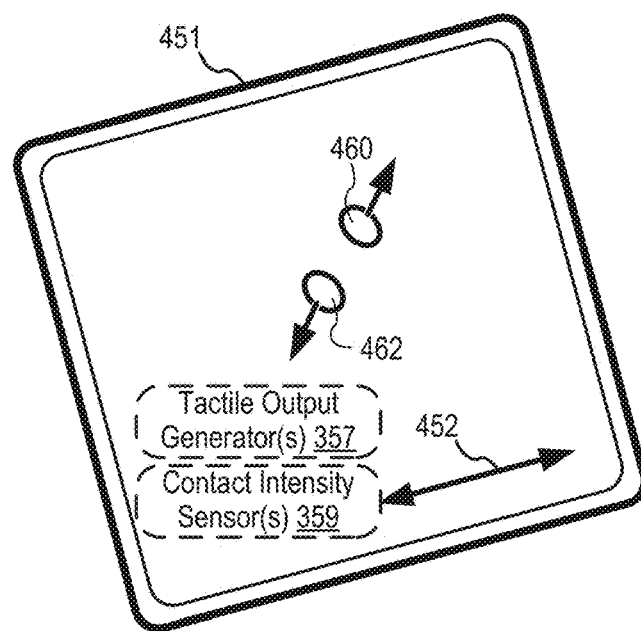
*FIG. 4B*

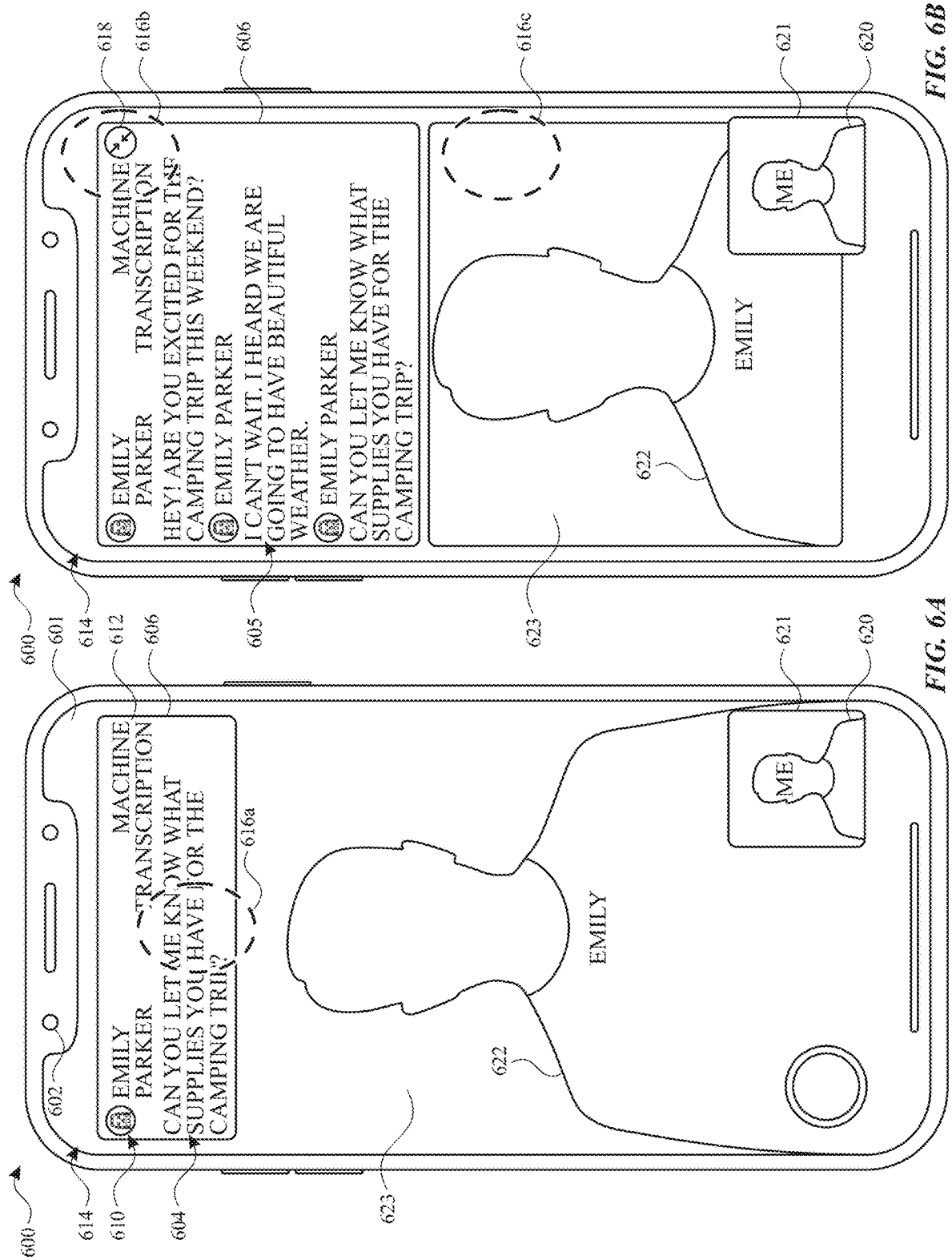

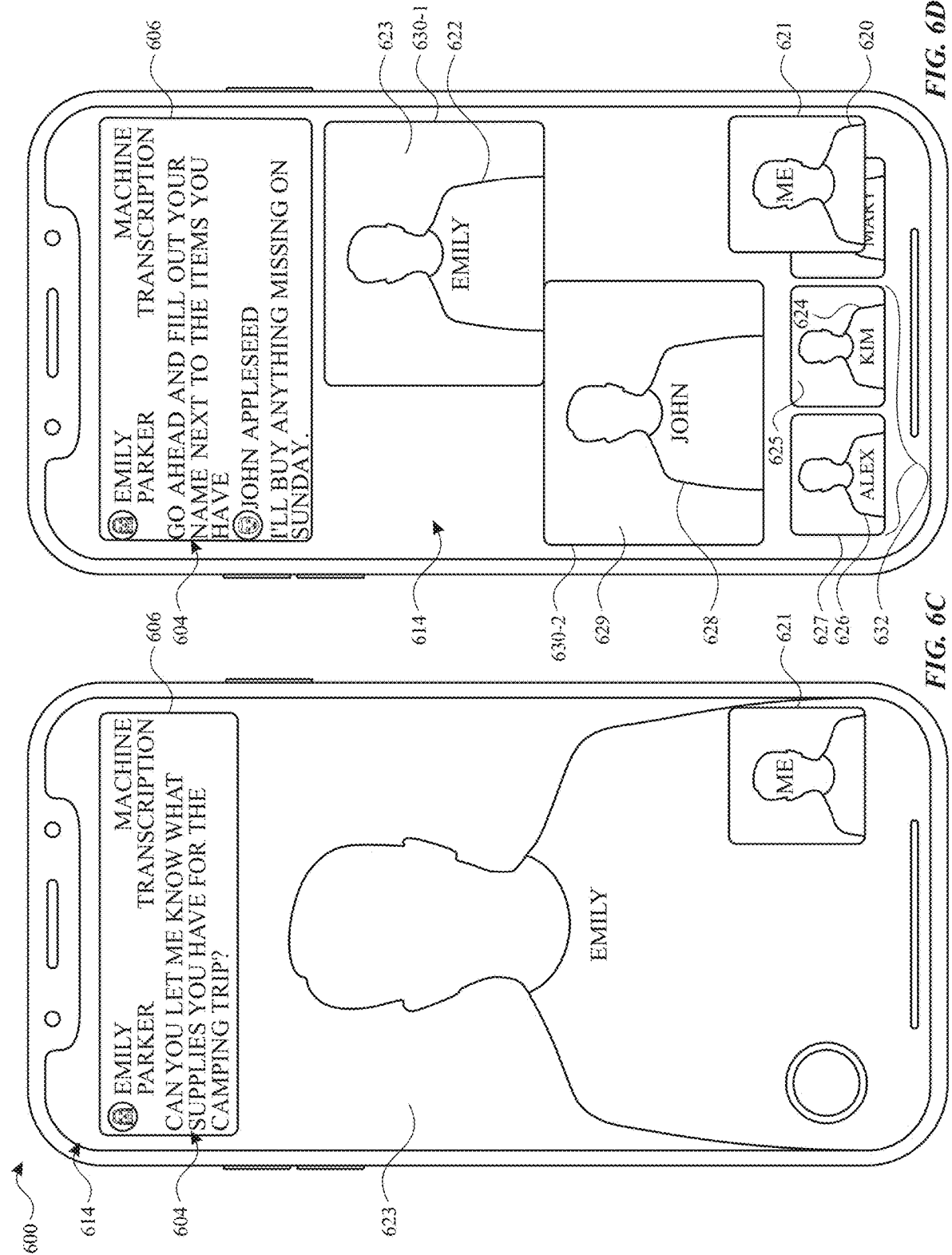

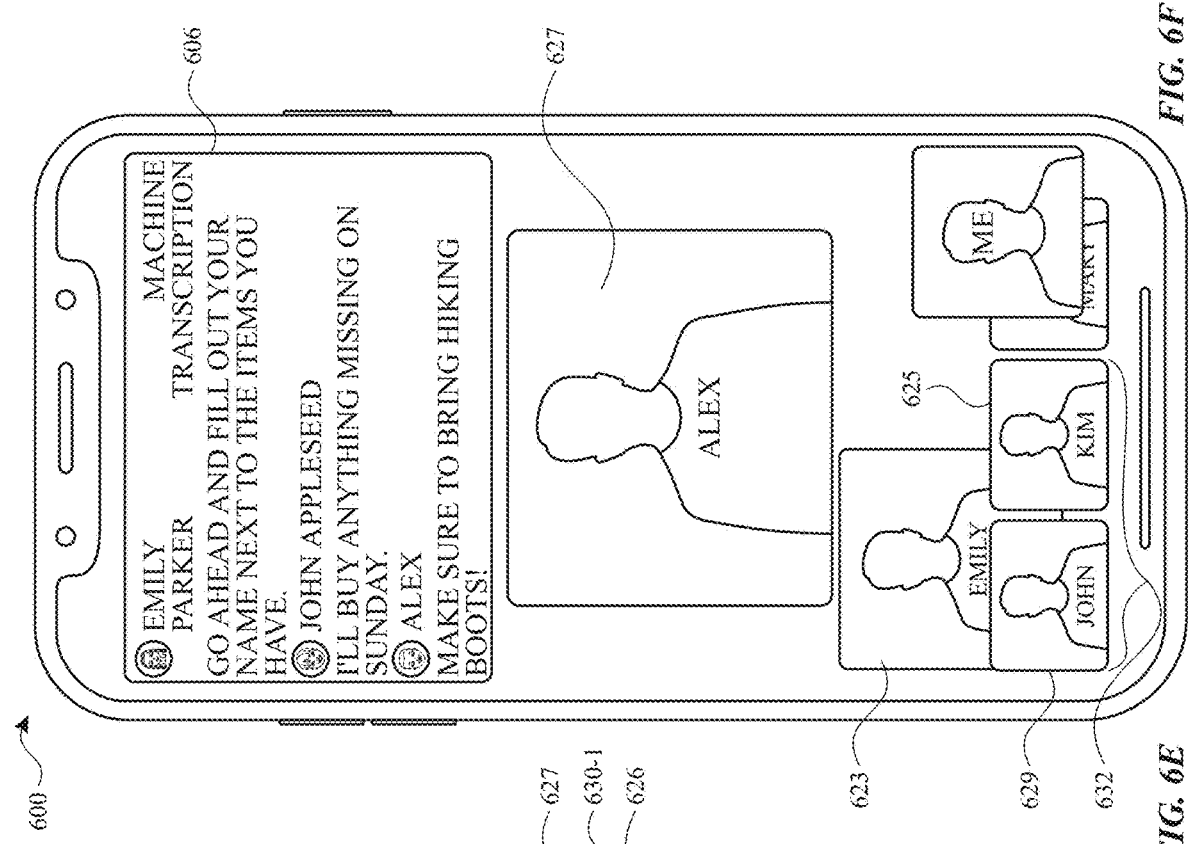
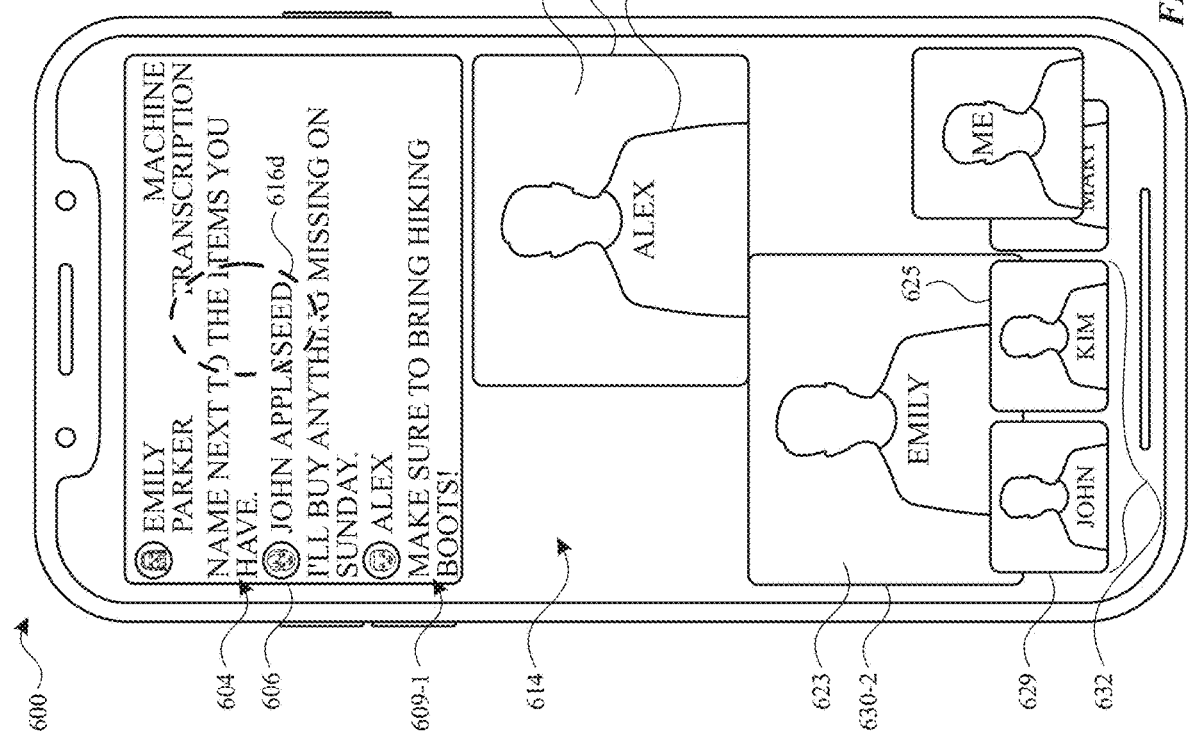
FIG. 6E
FIG. 6F

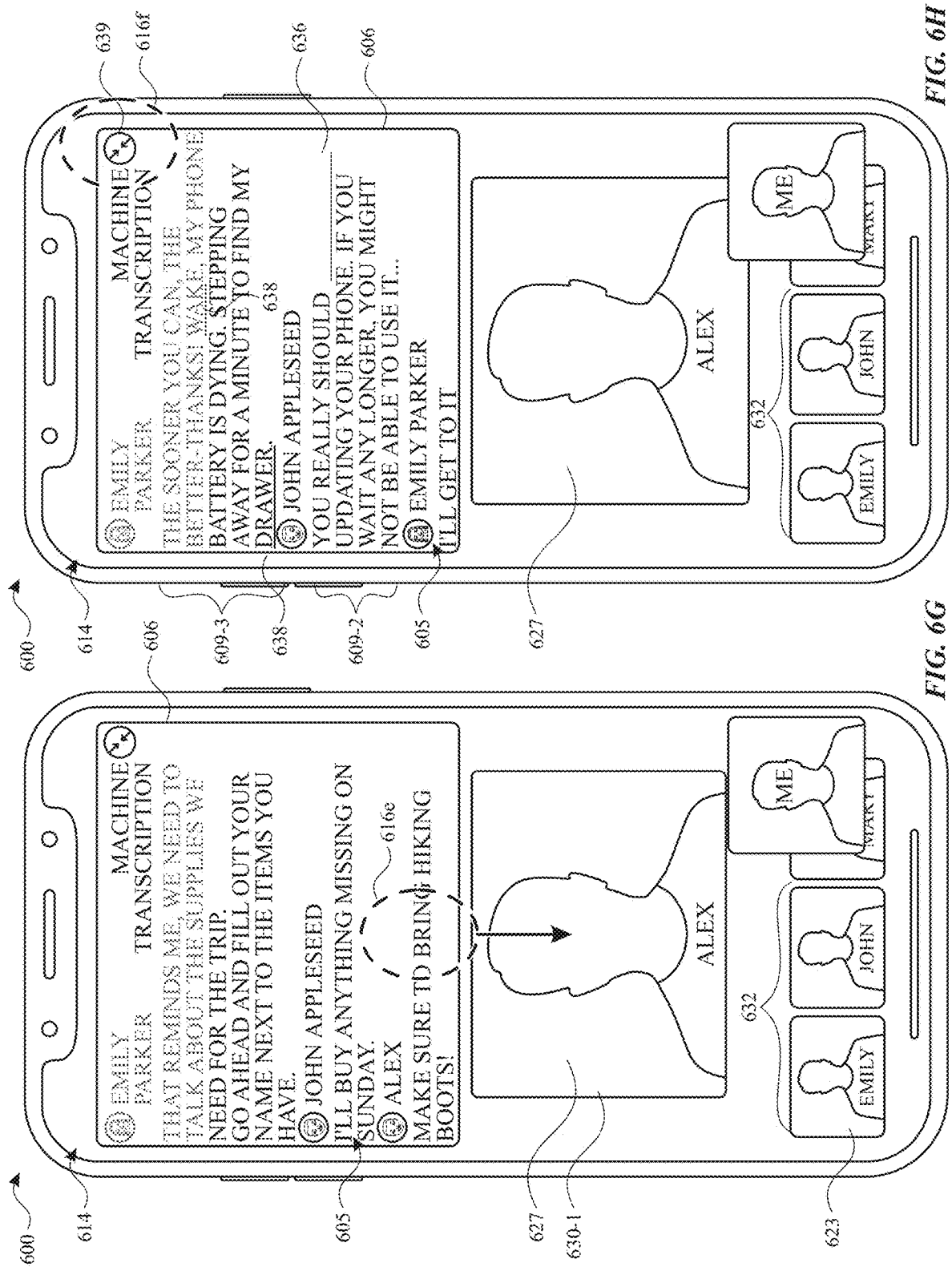

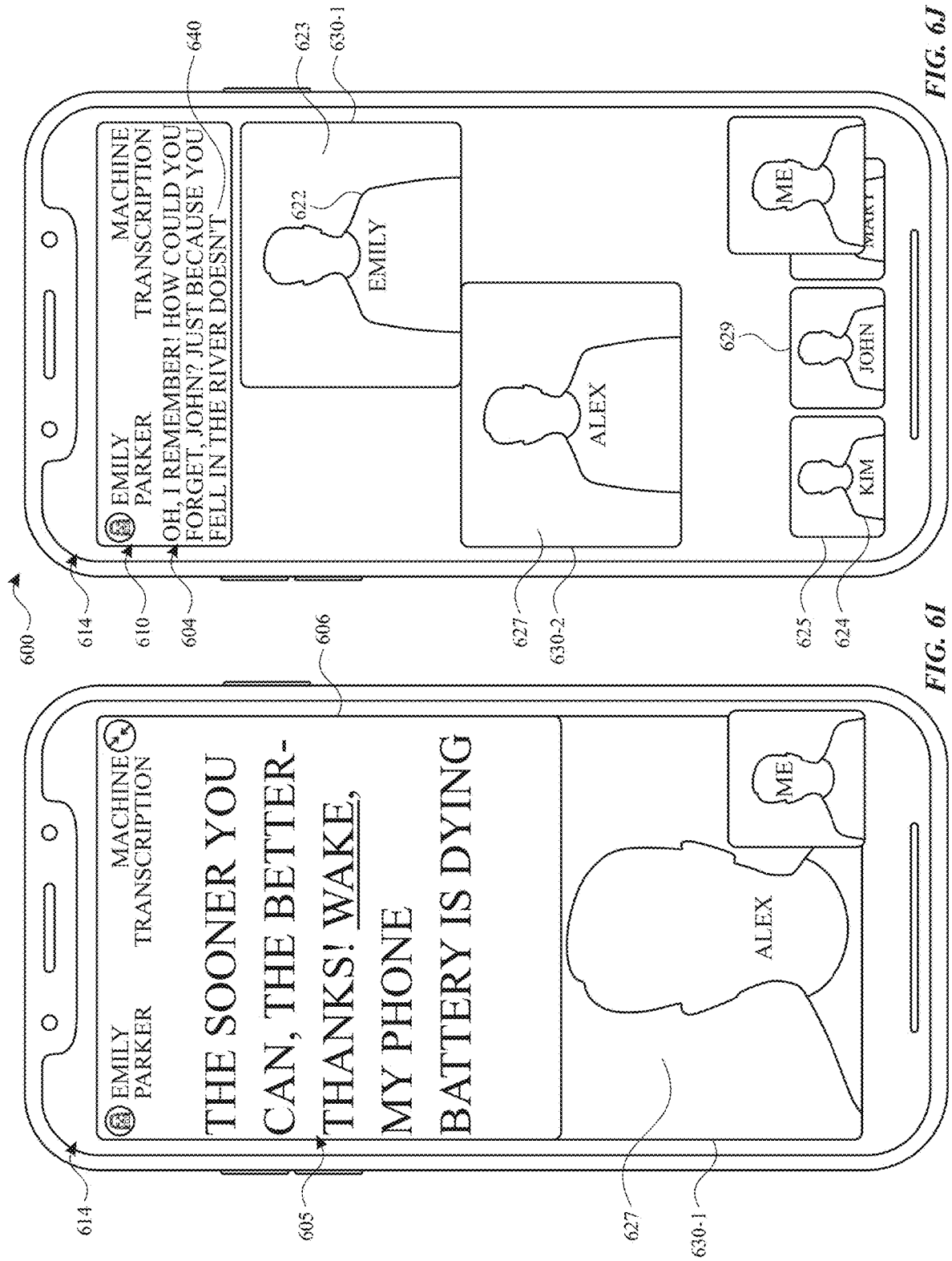

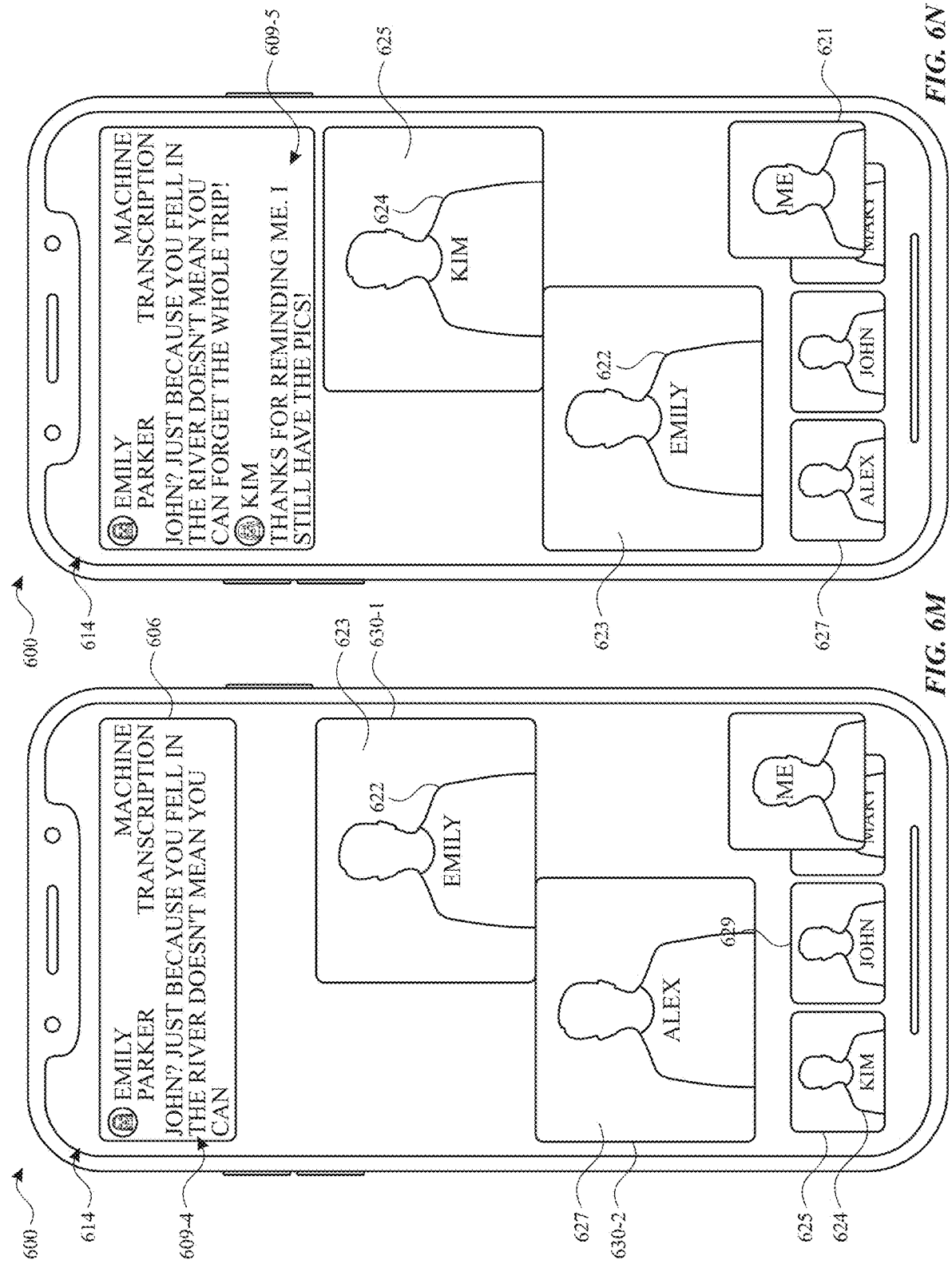

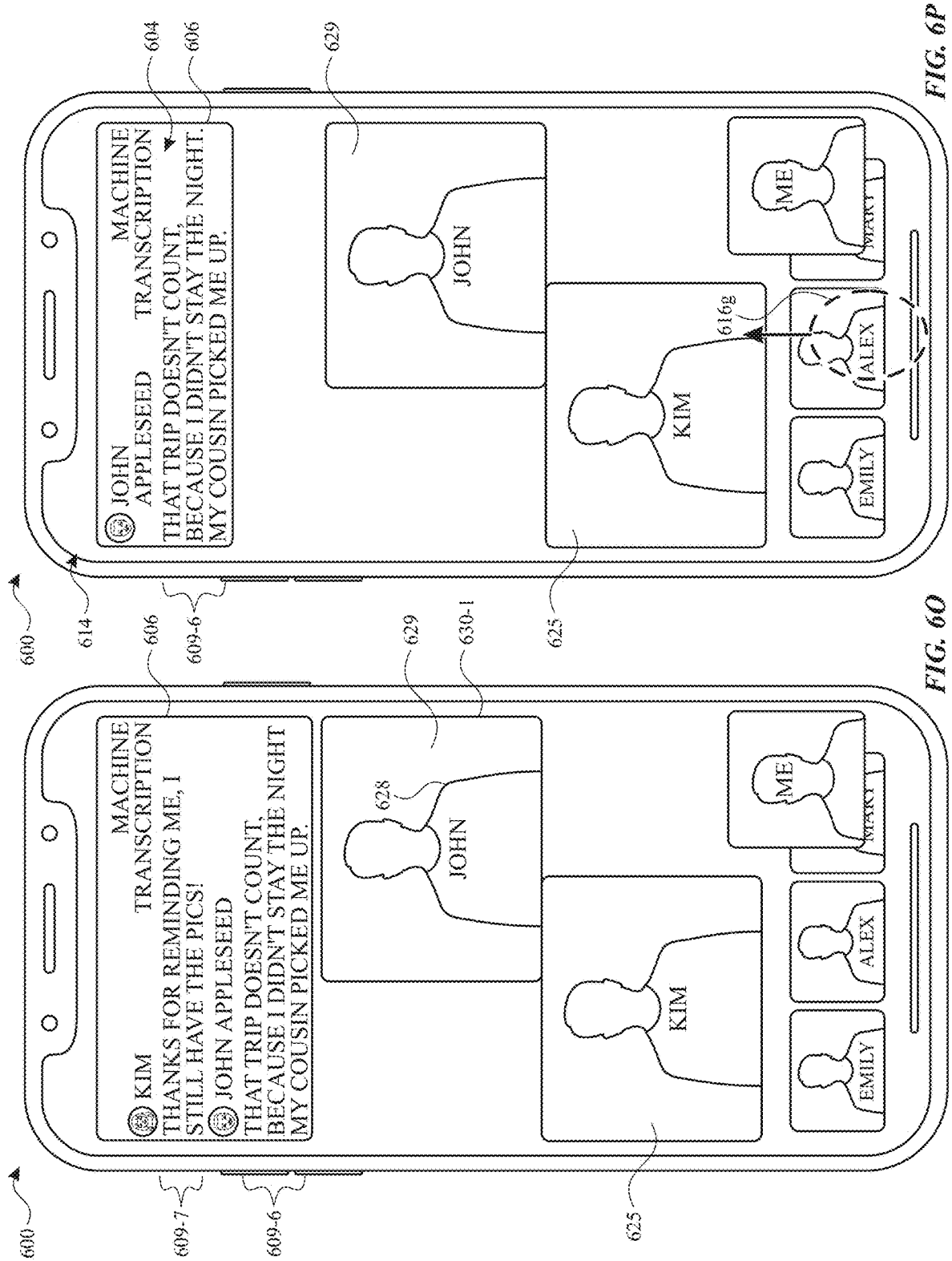

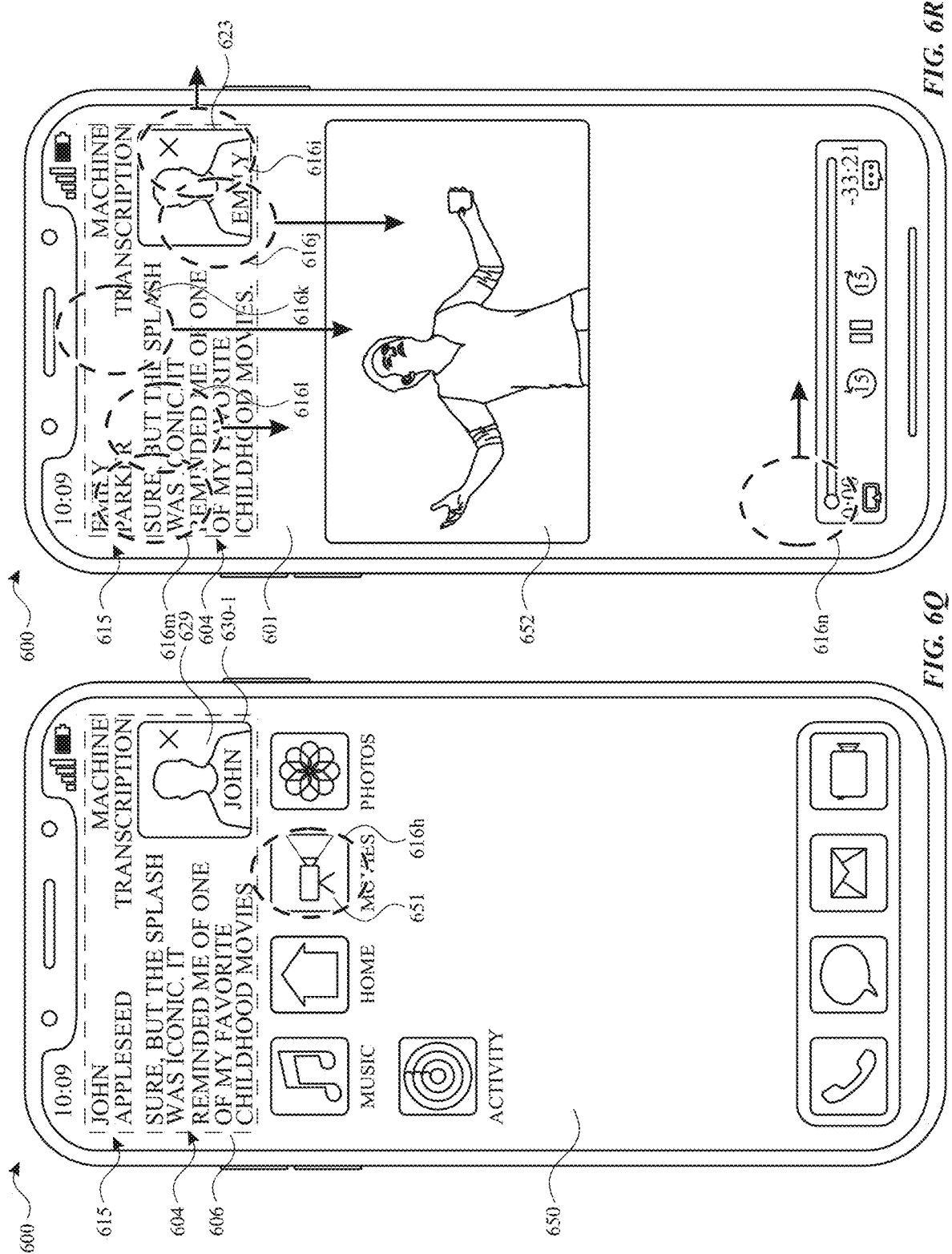

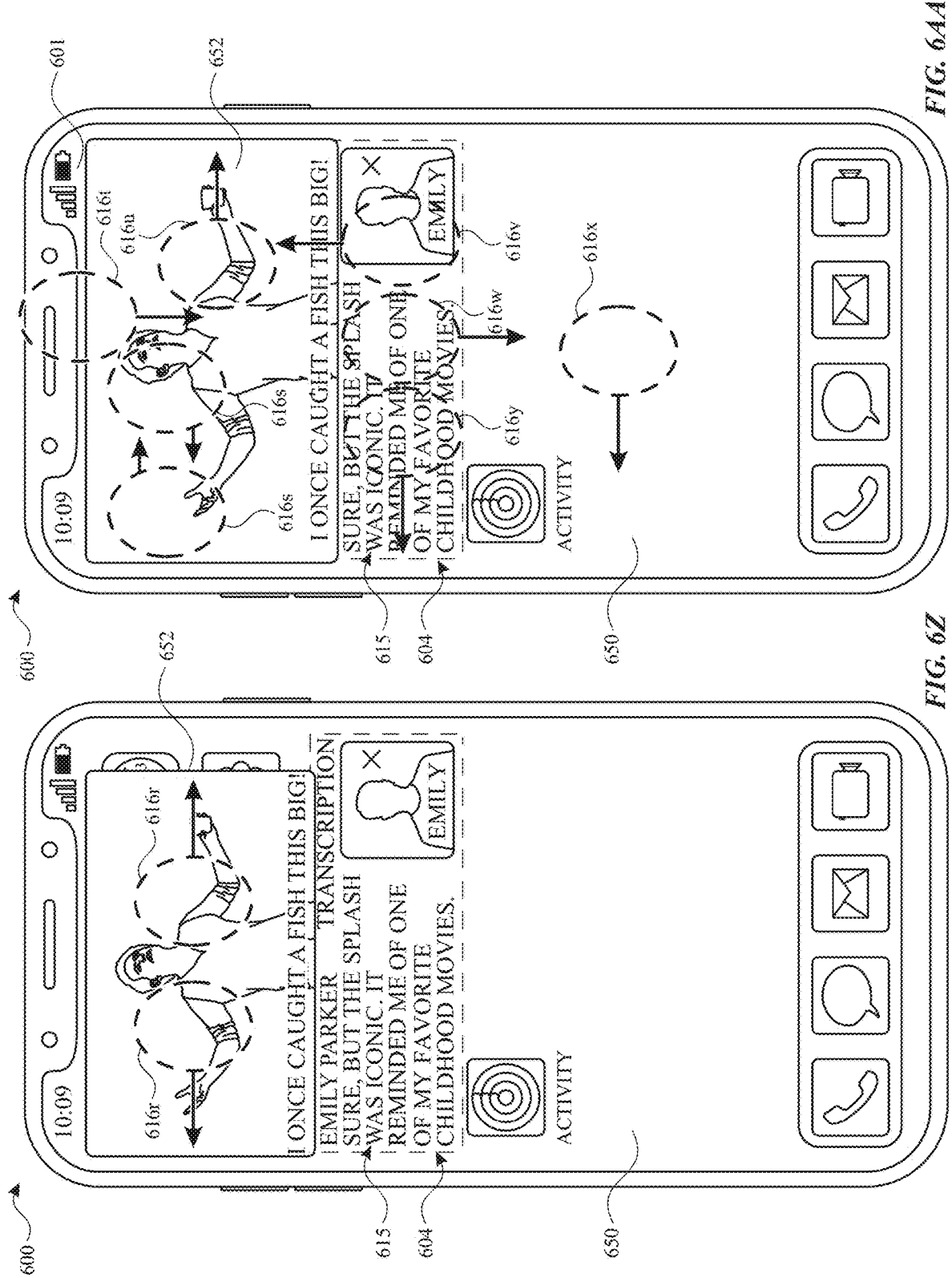

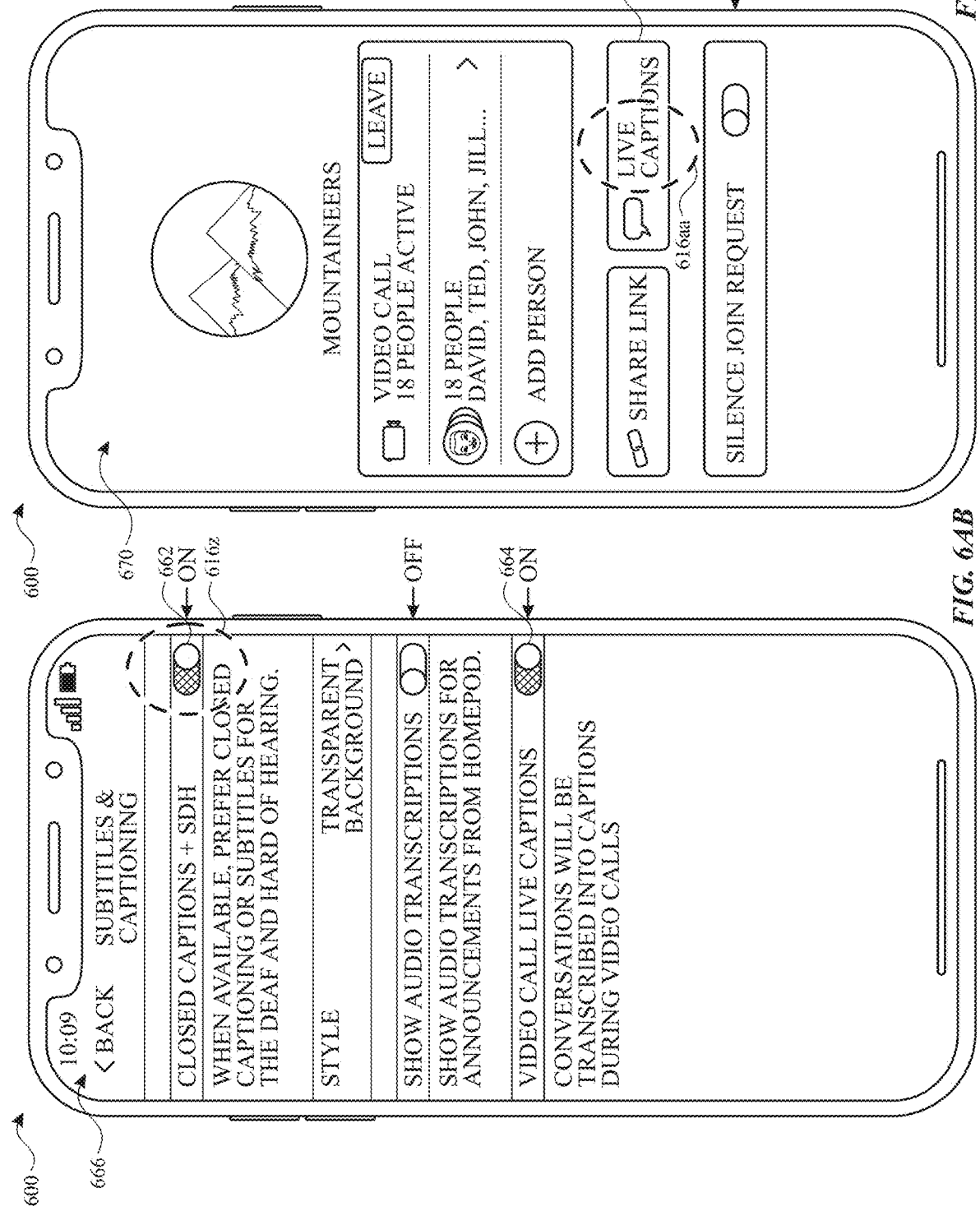

700

702
Display, via the display generation component, a live communication user interface, the live communication user interface corresponding to a live communication session, the live communication user interface including:

704
One or more representations of one or more participants of the live communication session, wherein a first representation of the one or more representations of the one or more participants is displayed at a location and at a size in the live communication user interface.

706
A first caption in a first area of the live communication user interface, the first caption corresponding to a first portion of audio data of the live communication session.

708
While displaying the live communication user interface with the first caption in the first area of the live communication user interface, detect an input that corresponds to a request to display expanded caption information.

710
In response to detecting the input that corresponds to a request to display expanded caption information:

712
Display, via the display generation component, a second caption corresponding to a second portion of audio data of the live communication session, different from the first portion of audio data of the live communication session, the second caption displayed at a second area of the live communication user interface.

714
Modify, via the display generation component, the location of the first representation and/or size of the first representation in the live communication user interface.

802
Display, via the display generation component, a user interface of a live communication application corresponding to a live communication session, the user interface of the live communication application concurrently including:

804
A representation of a first participant of the live communication session displayed in the live communication application.

806
A first caption for audio data of the first participant displayed in the live communication application.

808
While the user interface of the live communication application is displayed, receive a sequence of one or more inputs that corresponds to a request to switch to displaying a respective user interface that is different from the live communication application.

810
In response to receiving the sequence of one or more inputs that corresponds to the request to switch to displaying the respective user interface:

812
Replace at least a portion of the live communication application with the respective user interface that is different from the live communication application.

814
Display a reduced scale representation of the first participant of the live communication session overlaid on at least a portion of the respective user interface.

816
Display a second caption for audio data of the first participant, wherein the second caption for audio data is displayed separately from the reduced scale representation of the first participant of the live communication session and is overlaid on at least a portion of the respective user interface.

*FIG. 8*

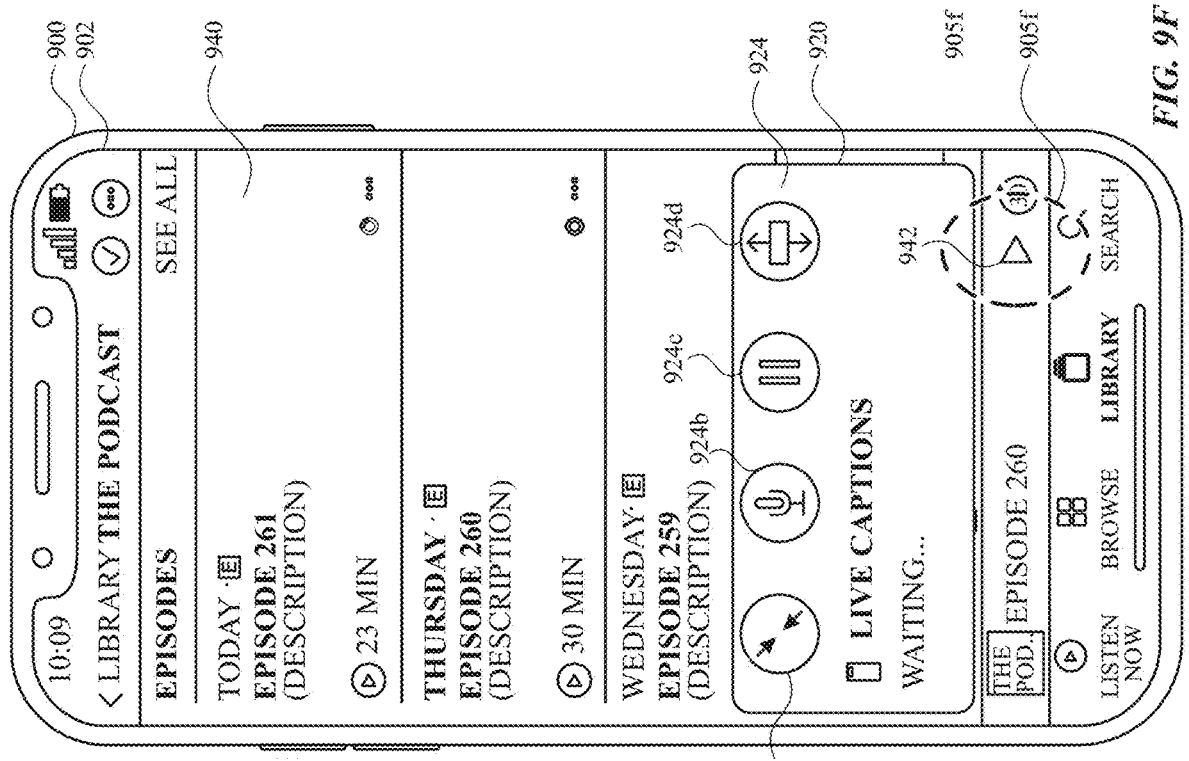
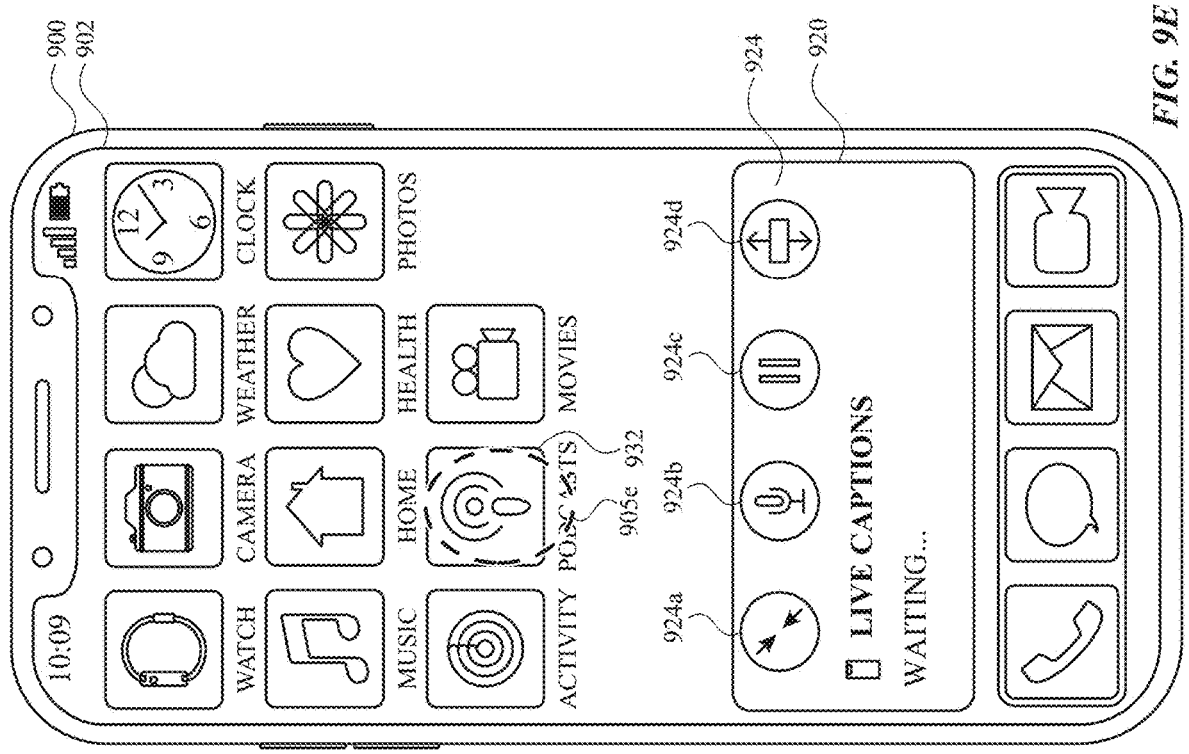

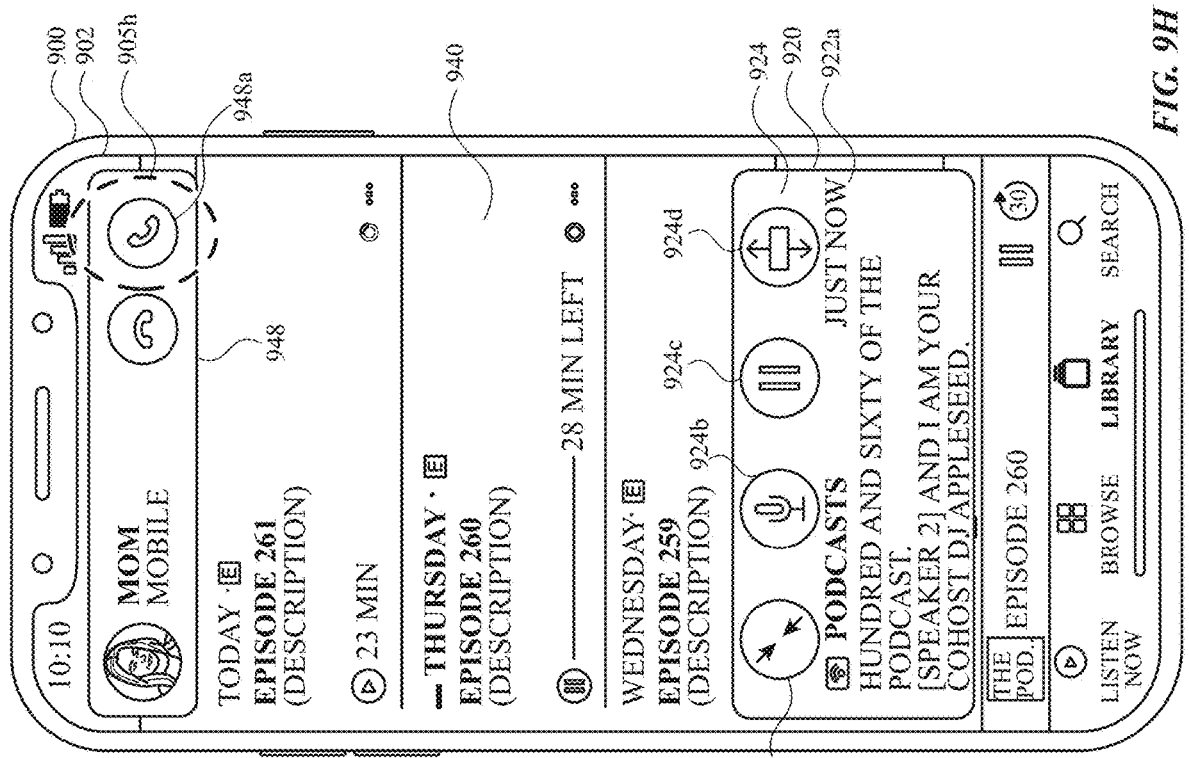
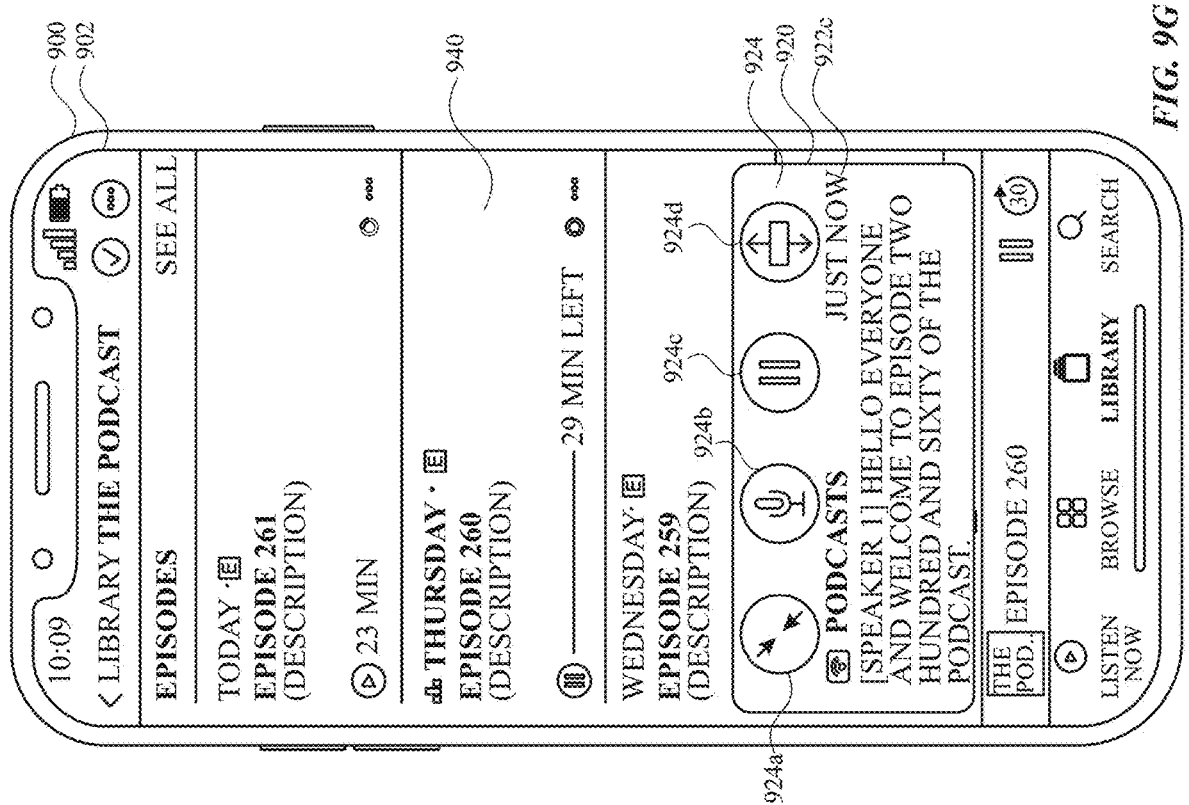

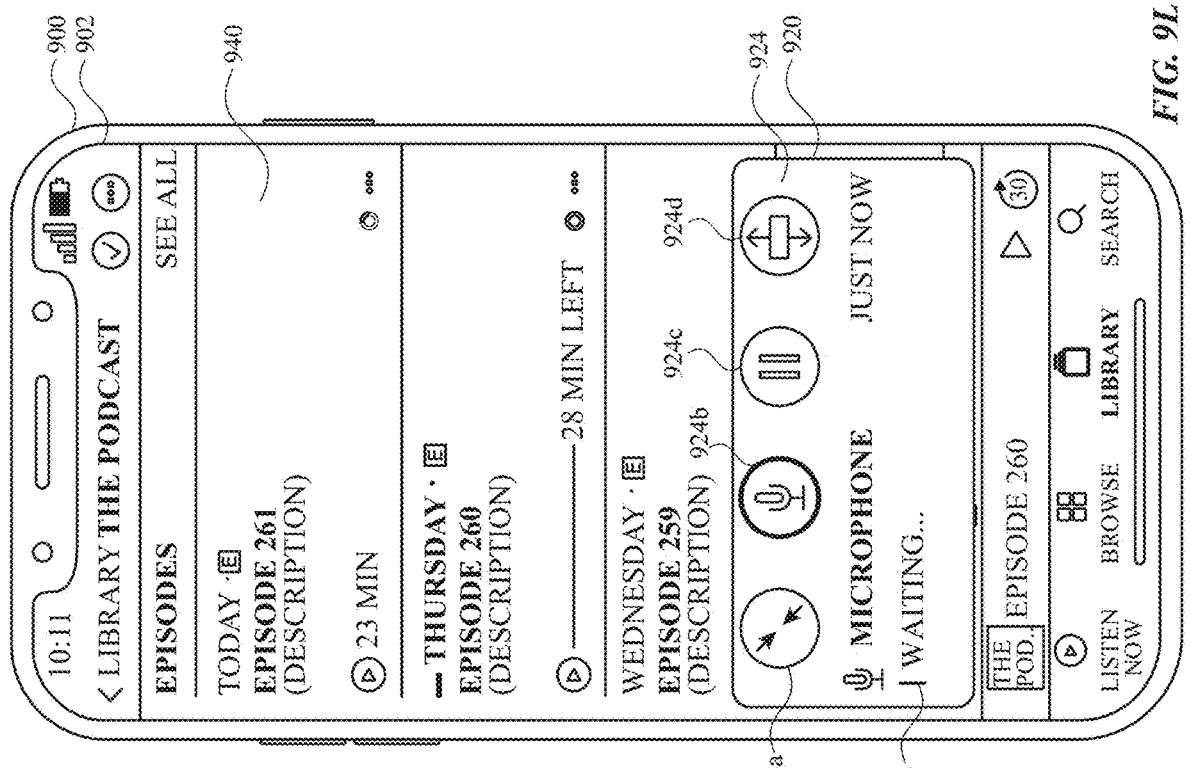
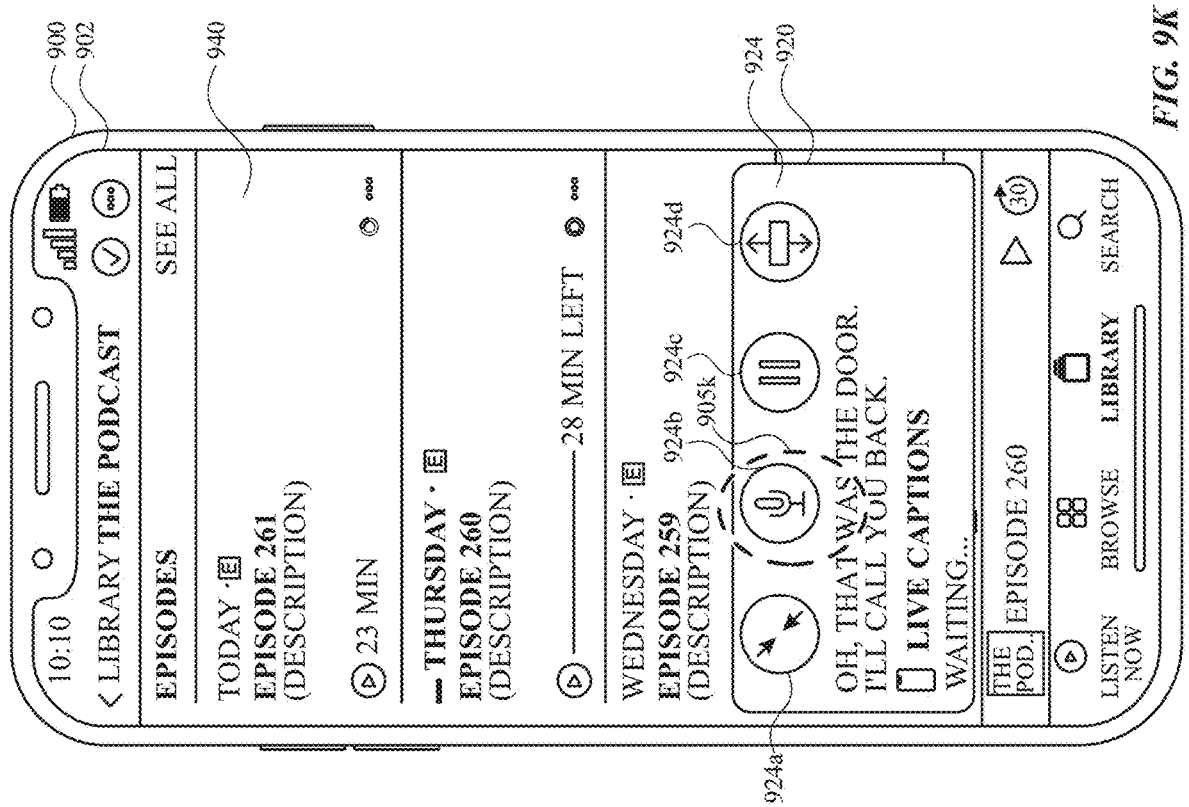

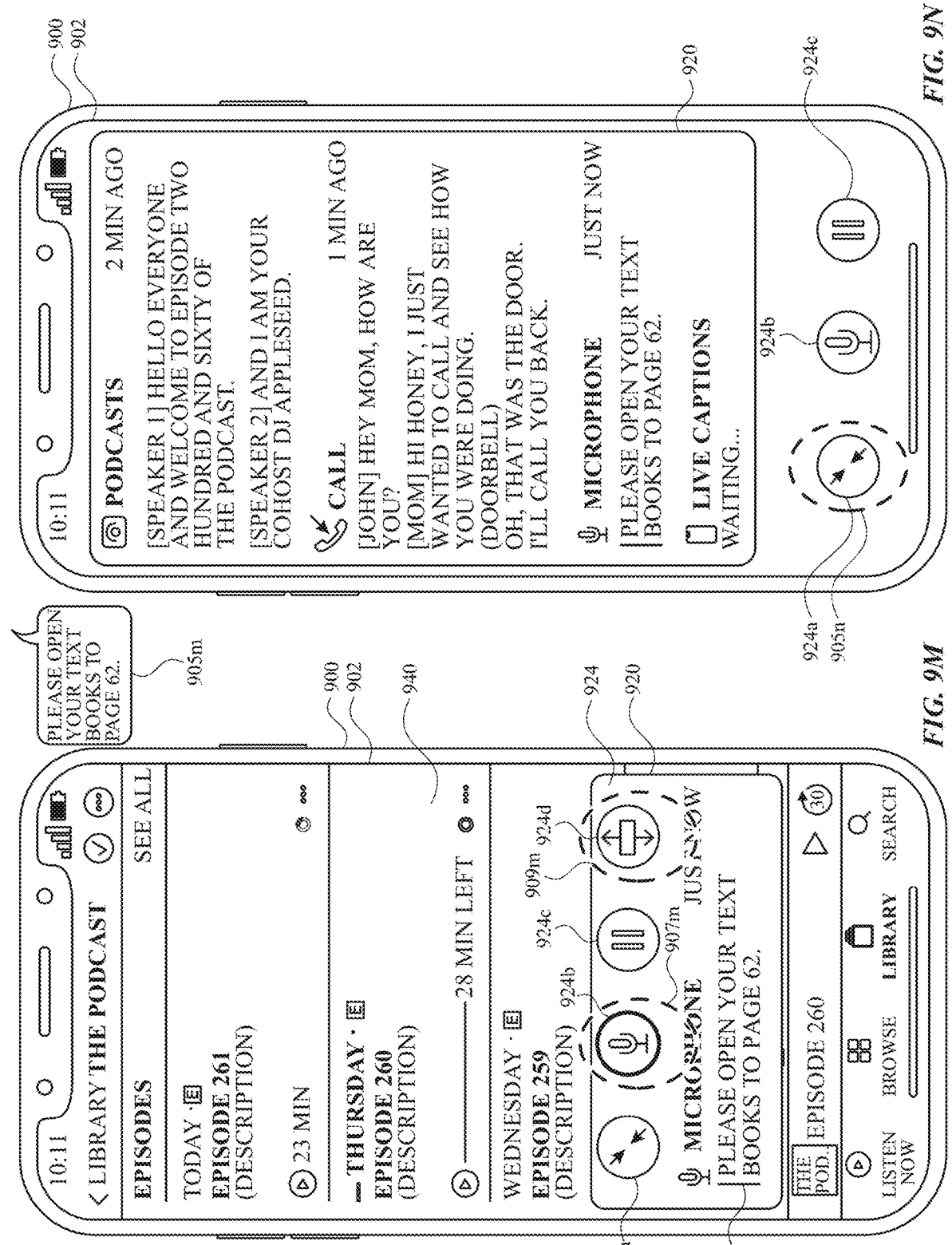

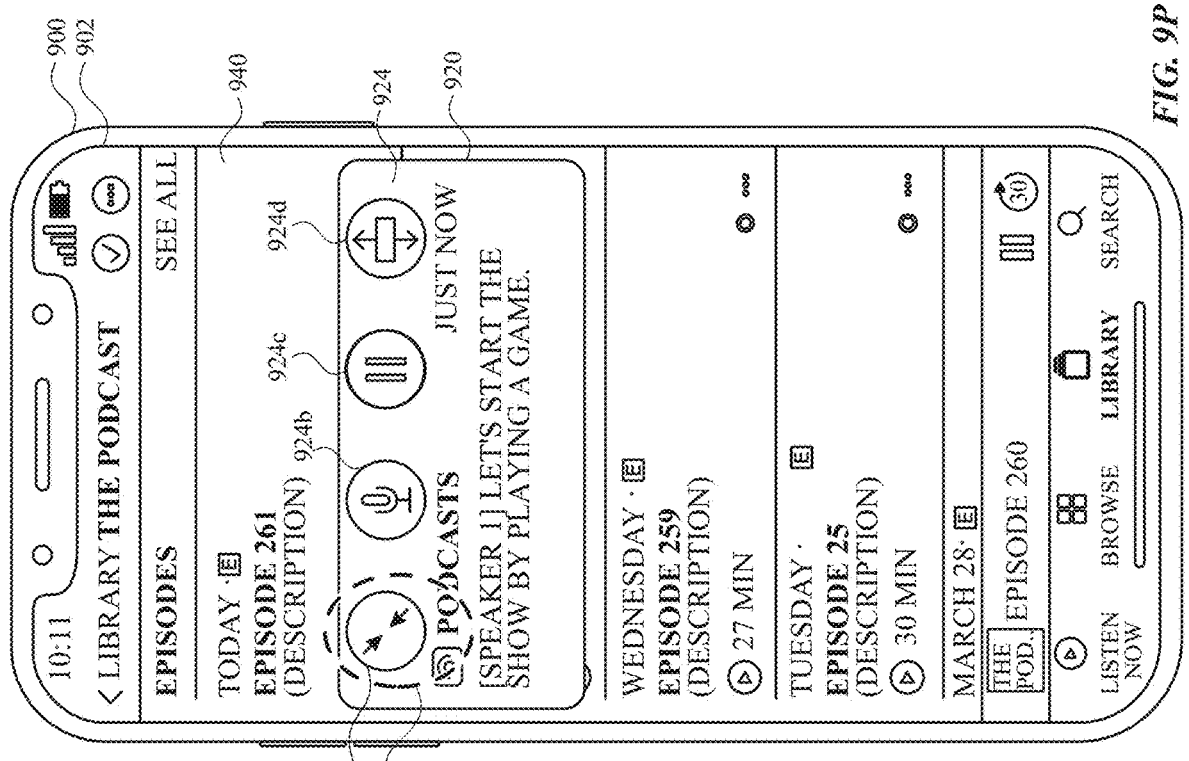
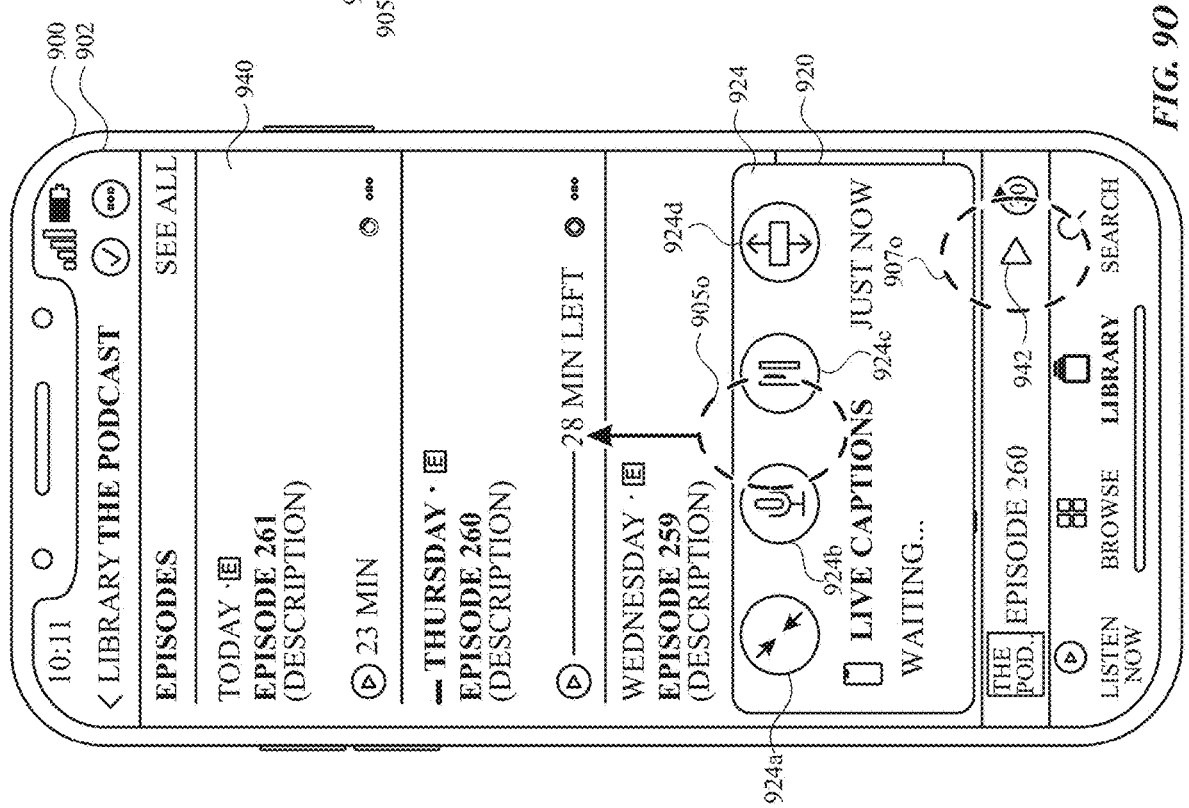

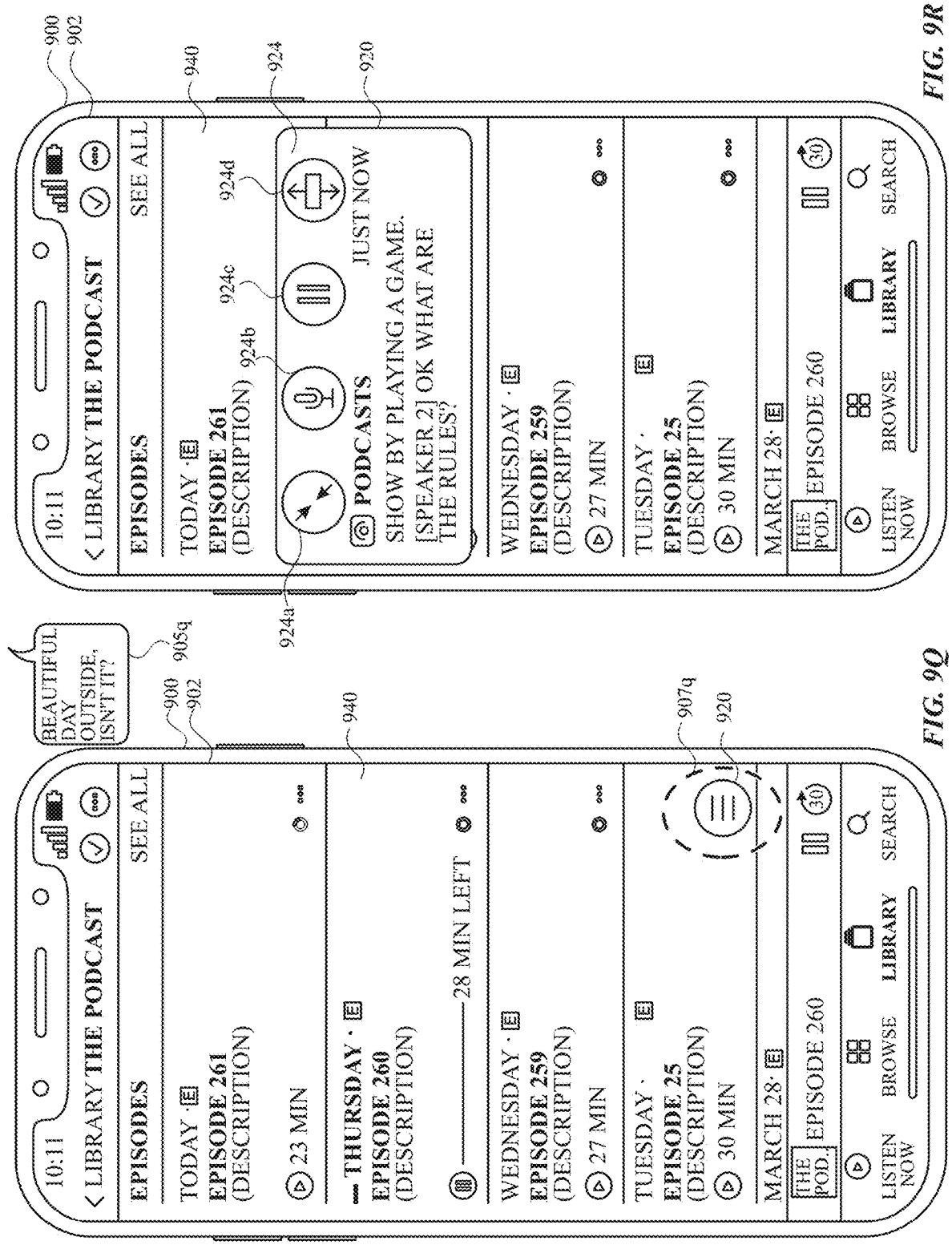

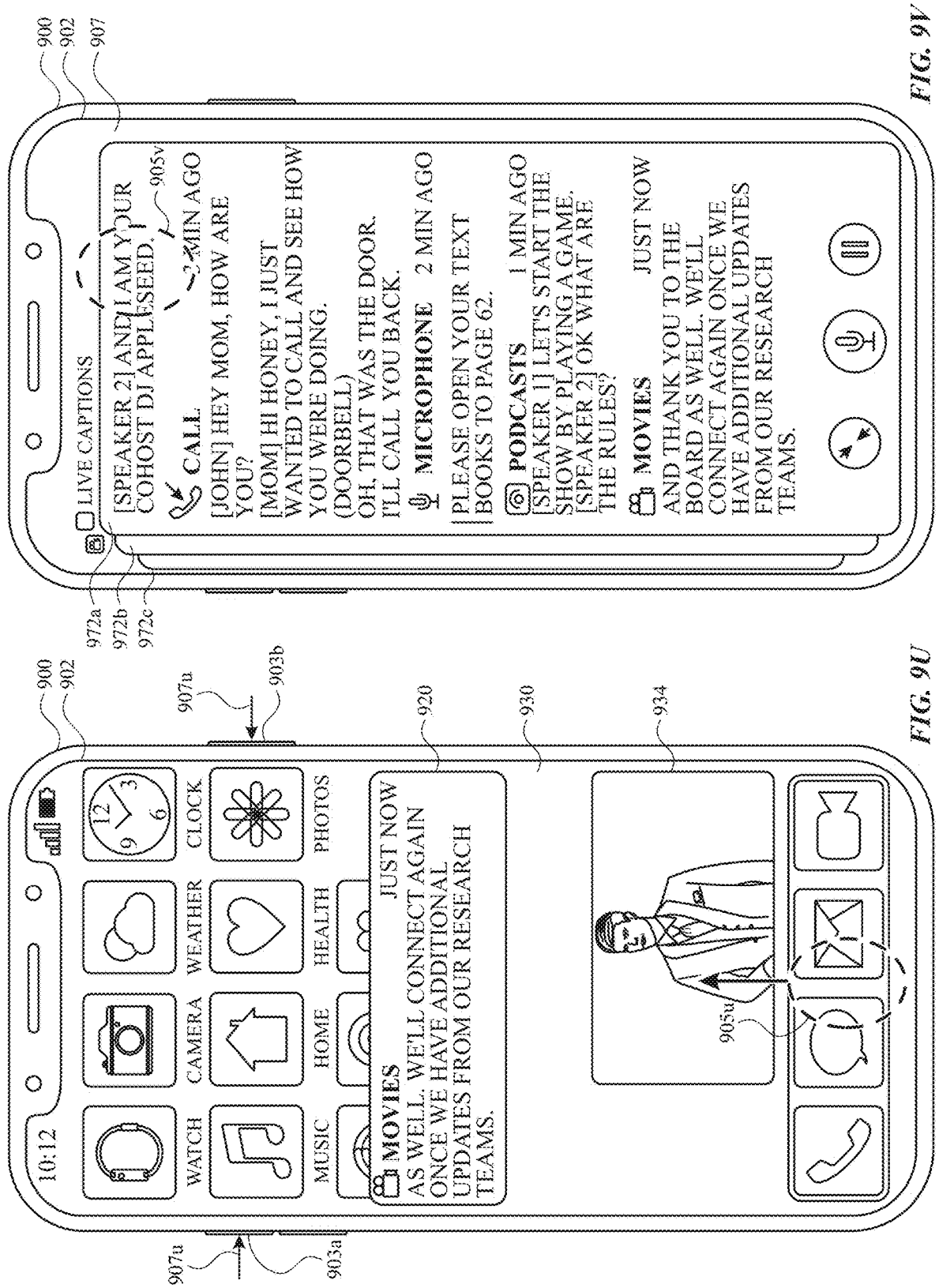

SYSTEMS AND METHODS FOR MANAGING CAPTIONS

CROSS-REFERENCE TO RELATED APPLICATIONS

This application claims the benefit of U.S. Provisional Application No. 63/343,075, filed May 17, 2022, entitled "SYSTEMS AND METHODS FOR MANAGING CAPTIONS," and U.S. Provisional Application No. 63/281,373, filed Nov. 19, 2021, and entitled "CAPTIONS FOR A COMMUNICATION SESSION," the entire contents of which are hereby incorporated by reference.

FIELD

The present disclosure relates generally to computer user interfaces, and more specifically to techniques for managing captions on an electronic device.

BACKGROUND

Computer systems can include hardware and/or software for displaying captions in various user interfaces. Captions (sometimes called subtitles) provide visual content that corresponds to audio content or metadata related to audio content.

BRIEF SUMMARY

Captions can include a text version of the speech and non-speech audio information and help a user understand the audio information. The display of captions is optionally synchronized (in time) with the audio of the communication session.

Some techniques for managing captions using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing captions. Such methods and interfaces optionally complement or replace other methods for managing captions. Such methods and interfaces reduce the cognitive burden on a user and produce a more efficient human-machine interface. For battery-operated computing devices, such methods and interfaces conserve power and increase the time between battery charges. Such methods and interfaces reduce the cognitive burden on a user that relies on machine-generated transcriptions and produce a more efficient human-machine interface.

In accordance with some embodiments, a method performed at a computer system that is in communication with a display generation component and one or more input devices is described. The method comprises: displaying, via the display generation component, a live communication user interface, the live communication user interface corresponding to a live communication session, the live communication user interface including: one or more representations of one or more participants of the live communication session, wherein a first representation of the one or more representations of the one or more participants is displayed at a location and at a size in the live communication user interface; and a first caption in a first area of the live communication user interface, the first caption corresponding to a first portion of audio data of the live communication session; while displaying the live communication user interface with the first caption in the first area of the live communication user interface, detecting, via the one or more input devices, an input that corresponds to a request to display expanded caption information; and in response to detecting the input that corresponds to a request to display expanded caption information: displaying, via the display generation component, a second caption corresponding to a second portion of audio data of the live communication session, different from the first portion of audio data of the live communication session, the second caption displayed at a second area of the live communication user interface; and modifying, via the display generation component, the location of the first representation and/or size of the first representation in the live communication user interface.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, a live communication user interface, the live communication user interface corresponding to a live communication session, the live communication user interface including: one or more representations of one or more participants of the live communication session, wherein a first representation of the one or more representations of the one or more participants is displayed at a location and at a size in the live communication user interface; and a first caption in a first area of the live communication user interface, the first caption corresponding to a first portion of audio data of the live communication session; while displaying the live communication user interface with the first caption in the first area of the live communication user interface, detecting, via the one or more input devices, an input that corresponds to a request to display expanded caption information; and in response to detecting the input that corresponds to a request to display expanded caption information: displaying, via the display generation component, a second caption corresponding to a second portion of audio data of the live communication session, different from the first portion of audio data of the live communication session, the second caption displayed at a second area of the live communication user interface; and modifying, via the display generation component, the location of the first representation and/or size of the first representation in the live communication user interface.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: displaying, via the display generation component, a live communication user interface, the live communication user interface corresponding to a live communication session, the live communication user interface including: one or more representations of one or more participants of the live communication session, wherein a first representation of the one or more representations of the one or more participants is displayed at a location and at a size in the live communication user interface; and a first caption in a first area of the live communication user interface, the first caption corresponding to a first portion of audio data of the live communication session; while displaying the live communication user interface with the first caption in the first area of the live communication user interface, detecting, via the one or more input devices, an input that corresponds to a request to display expanded caption information; and in response to detecting the input that corresponds to a request to display expanded caption information: displaying, via the display generation component, a second caption corresponding to a second portion of audio data of the live communication session, different from the first portion of audio data of the live communication session, the second caption displayed at a second area of the live communication user interface; and modifying, via the display generation component, the location of the first representation and/or size of the first representation in the live communication user interface.

In accordance with some embodiments, a computer system that is configured to communicate with a display generation component and one or more input devices is described. The computer system comprises: one or more processors; and memory storing one or more programs configured to be executed by the one or more processors, the one or more programs including instructions for: displaying, via the display generation component, a live communication user interface, the live communication user interface corresponding to a live communication session, the live communication user interface including: one or more representations of one or more participants of the live communication session, wherein a first representation of the one or more representations of the one or more participants is displayed at a location and at a size in the live communication user interface; and a first caption in a first area of the live communication user interface, the first caption corresponding to a first portion of audio data of the live communication session; while displaying the live communication user interface with the first caption in the first area of the live communication user interface, detecting, via the one or more input devices, an input that corresponds to a request to display expanded caption information; and in response to detecting the input that corresponds to a request to display expanded caption information: displaying, via the display generation component, a second caption corresponding to a second portion of audio data of the live communication session, different from the first portion of audio data of the live communication session, the second caption displayed at a second area of the live communication user interface; and modifying, via the display generation component, the location of the first representation and/or size of the first representation in the live communication user interface.

In accordance with some embodiments, a computer system that is configured to communicate with a display generation component and one or more input devices is described. The computer system comprises: means for displaying, via the display generation component, a live communication user interface, the live communication user interface corresponding to a live communication session, the live communication user interface including: one or more representations of one or more participants of the live communication session, wherein a first representation of the one or more representations of the one or more participants is displayed at a location and at a size in the live communication user interface; and a first caption in a first area of the live communication user interface, the first caption corresponding to a first portion of audio data of the live communication session; means, while displaying the live communication user interface with the first caption in the first area of the live communication user interface, for detecting, via the one or more input devices, an input that corresponds to a request to display expanded caption information; and means, responsive to detecting the input that corresponds to a request to display expanded caption information, for: displaying, via the display generation component, a second caption corresponding to a second portion of audio data of the live communication session, different from the first portion of audio data of the live communication session, the second caption displayed at a second area of the live communication user interface; and modifying, via the display generation component, the location of the first representation and/or size of the first representation in the live communication user interface.

In accordance with some embodiments, a computer program product is described. The computer program product comprises one or more programs configured to be executed by one or more processors of a computer system that is in communication with a display generation component and one or more input devices. The one or more programs include instructions for: displaying, via the display generation component, a live communication user interface, the live communication user interface corresponding to a live communication session, the live communication user interface including: one or more representations of one or more participants of the live communication session, wherein a first representation of the one or more representations of the one or more participants is displayed at a location and at a size in the live communication user interface; and a first caption in a first area of the live communication user interface, the first caption corresponding to a first portion of audio data of the live communication session; while displaying the live communication user interface with the first caption in the first area of the live communication user interface, detecting, via the one or more input devices, an input that corresponds to a request to display expanded caption information; and in response to detecting the input that corresponds to a request to display expanded caption information: displaying, via the display generation component, a second caption corresponding to a second portion of audio data of the live communication session, different from the first portion of audio data of the live communication session, the second caption displayed at a second area of the live communication user interface; and modifying, via the display generation component, the location of the first representation and/or size of the first representation in the live communication user interface.

In accordance with some embodiments, a method performed at a computer system that is in communication with a display generation component and one or more input devices is described. The method comprises: displaying, via the display generation component, a user interface of a live communication application corresponding to a live communication session, the user interface of the live communication application concurrently including: a representation of a first participant of the live communication session displayed in the live communication application; and a first caption for audio data of the first participant displayed in the live communication application; while the user interface of the live communication application is displayed, receiving a sequence of one or more inputs that corresponds to a request to switch to displaying a respective user interface that is different from the live communication application; and in response to receiving the sequence of one or more inputs that corresponds to the request to switch to displaying the respective user interface: replacing at least a portion of the live communication application with the respective user interface that is different from the live communication application; displaying a reduced scale representation of the first participant of the live communication session overlaid on at least a portion of the respective user interface; and displaying a second caption for audio data of the first participant, wherein the second caption for audio data is displayed separately from the reduced scale representation of the first participant of the live communication session and is overlaid on at least a portion of the respective user interface.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, a user interface of a live communication application corresponding to a live communication session, the user interface of the live communication application concurrently including: a representation of a first participant of the live communication session displayed in the live communication application; and a first caption for audio data of the first participant displayed in the live communication application; while the user interface of the live communication application is displayed, receiving a sequence of one or more inputs that corresponds to a request to switch to displaying a respective user interface that is different from the live communication application; and in response to receiving the sequence of one or more inputs that corresponds to the request to switch to displaying the respective user interface: replacing at least a portion of the live communication application with the respective user interface that is different from the live communication application; displaying a reduced scale representation of the first participant of the live communication session overlaid on at least a portion of the respective user interface; and displaying a second caption for audio data of the first participant, wherein the second caption for audio data is displayed separately from the reduced scale representation of the first participant of the live communication session and is overlaid on at least a portion of the respective user interface.

In accordance with some embodiments, a transitory computer-readable storage medium is described. The transitory computer-readable storage medium stores one or more programs configured to be executed by one or more processors of a computer system that is configured to communicate with a display generation component and one or more input devices, the one or more programs including instructions for: displaying, via the display generation component, a user interface of a live communication application corresponding to a live communication session, the user interface of the live communication application concurrently including: a representation of a first participant of the live communication session displayed in the live communication application; and a first caption for audio data of the first participant displayed in the live communication application; while the user interface of the live communication application is displayed, receiving a sequence of one or more inputs that corresponds to a request to switch to displaying a respective user interface that is different from the live communication application; and in response to receiving the sequence of one or more inputs that corresponds to the request to switch to displaying the respective user interface: replacing at least a portion of the live communication application with the respective user interface that is different from the live communication application; displaying a reduced scale representation of the first participant of the live communication session overlaid on at least a portion of the respective user interface; and displaying a second caption for audio data of the first participant, wherein the second caption for audio data is displayed separately from the reduced scale representation of the first participant of the live communication session and is overlaid on at least a portion of the respective user interface.

In accordance with some embodiments, a computer system that is configured to communicate with a display generation component and one or more input devices is described. The computer system comprises: one or more processors; and memory storing one or more programs configured to be executed by the one or more processors, the one or more programs including instructions for: displaying, via the display generation component, a user interface of a live communication application corresponding to a live communication session, the user interface of the live communication application concurrently including: a representation of a first participant of the live communication session displayed in the live communication application; and a first caption for audio data of the first participant displayed in the live communication application; while the user interface of the live communication application is displayed, receiving a sequence of one or more inputs that corresponds to a request to switch to displaying a respective user interface that is different from the live communication application; and in response to receiving the sequence of one or more inputs that corresponds to the request to switch to displaying the respective user interface: replacing at least a portion of the live communication application with the respective user interface that is different from the live communication application; displaying a reduced scale representation of the first participant of the live communication session overlaid on at least a portion of the respective user interface; and displaying a second caption for audio data of the first participant, wherein the second caption for audio data is displayed separately from the reduced scale representation of the first participant of the live communication session and is overlaid on at least a portion of the respective user interface.

In accordance with some embodiments, a computer system that is configured to communicate with a display generation component and one or more input devices is described. The computer system comprises: means for displaying, via the display generation component, a user interface of a live communication application corresponding to a live communication session, the user interface of the live communication application concurrently including: a representation of a first participant of the live communication session displayed in the live communication application; and a first caption for audio data of the first participant displayed in the live communication application; means, while the user interface of the live communication application is displayed, for receiving a sequence of one or more inputs that corresponds to a request to switch to displaying a respective user interface that is different from the live communication application; and means, responsive to receiving the sequence of one or more inputs that corresponds to the request to switch to displaying the respective user interface, for: replacing at least a portion of the live communication application with the respective user interface that is different from the live communication application; displaying a reduced scale representation of the first participant of the live communication session overlaid on at least a portion of the respective user interface; and displaying a second caption for audio data of the first participant, wherein the second caption for audio data is displayed separately from the reduced scale representation of the first participant of the live communication session and is overlaid on at least a portion of the respective user interface.

In accordance with some embodiments, a computer program product is described. The computer program product comprises one or more programs configured to be executed by one or more processors of a computer system that is in communication with a display generation component and one or more input devices. The one or more programs include instructions for: displaying, via the display generation component, a user interface of a live communication application corresponding to a live communication session, the user interface of the live communication application concurrently including: a representation of a first participant of the live communication session displayed in the live communication application; and a first caption for audio data of the first participant displayed in the live communication application; while the user interface of the live communication application is displayed, receiving a sequence of one or more inputs that corresponds to a request to switch to displaying a respective user interface that is different from the live communication application; and in response to receiving the sequence of one or more inputs that corresponds to the request to switch to displaying the respective user interface: replacing at least a portion of the live communication application with the respective user interface that is different from the live communication application; displaying a reduced scale representation of the first participant of the live communication session overlaid on at least a portion of the respective user interface; and displaying a second caption for audio data of the first participant, wherein the second caption for audio data is displayed separately from the reduced scale representation of the first participant of the live communication session and is overlaid on at least a portion of the respective user interface.

In accordance with some embodiments, a method performed at a computer system that is in communication with a display generation component is described. The method comprises: receiving second information corresponding to second audio in a second application that is different from the first application; and displaying, via the display generation component, a system audio transcript, wherein displaying the system audio transcript includes displaying: a first transcript portion of the system audio transcript that includes a first caption based on the first audio; and caption, different from the first caption, based on the second audio.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: receiving first information corresponding to first audio in a first application; receiving second information corresponding to second audio in a second application that is different from the first application; and displaying, via the display generation component, a system audio transcript, wherein displaying the system audio transcript includes displaying: a first transcript portion of the system audio transcript that includes a first caption based on the first audio; and a second transcript portion of the system audio transcript that includes a second caption, different from the first caption, based on the second audio.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: receiving first information corresponding to first audio in a first application; receiving second information corresponding to second audio in a second application that is different from the first application; and displaying, via the display generation component, a system audio transcript, wherein displaying the system audio transcript includes displaying: a first transcript portion of the system audio transcript that includes a first caption based on the first audio; and a second transcript portion of the system audio transcript that includes a second caption, different from the first caption, based on the second audio.

In accordance with some embodiments, a computer system that is configured to communicate with a display generation component is described. The computer system comprises: one or more processors; and memory storing one or more programs configured to be executed by the one or more processors, the one or more programs including instructions for: receiving first information corresponding to first audio in a first application; receiving second information corresponding to second audio in a second application that is different from the first application; and displaying, via the display generation component, a system audio transcript, wherein displaying the system audio transcript includes displaying: a first transcript portion of the system audio transcript that includes a first caption based on the first audio; and a second transcript portion of the system audio transcript that includes a second caption, different from the first caption, based on the second audio.

In accordance with some embodiments, a computer system that is configured to communicate with a display generation component is described. The computer system comprises: means for receiving first information corresponding to first audio in a first application; means for receiving second information corresponding to second audio in a second application that is different from the first application; and means for displaying, via the display generation component, a system audio transcript, wherein displaying the system audio transcript includes displaying: means for a first transcript portion of the system audio transcript that includes a first caption based on the first audio; and means for a second transcript portion of the system audio transcript that includes a second caption, different from the first caption, based on the second audio.

In accordance with some embodiments, a computer program product is described. The computer program product comprises one or more programs configured to be executed by one or more processors of a computer system that is in communication with a display generation component. The one or more programs include instructions for: receiving first information corresponding to first audio in a first application; receiving second information corresponding to second audio in a second application that is different from the first application; and displaying, via the display generation component, a system audio transcript, wherein displaying the system audio transcript includes displaying: a first transcript portion of the system audio transcript that includes a first caption based on the first audio; and a second transcript portion of the system audio transcript that includes a second caption, different from the first caption, based on the second audio.

In accordance with some embodiments, a method performed at a computer system that is in communication with a display generation component is described. The method comprises: displaying, via the display generation component, a set of captions in a first user interface region; while displaying the set of captions, detecting typed user input to add a typed caption to the set of captions corresponding to a respective activity at the computer system; and in response to detecting the typed user input to add the typed caption to the set of captions, displaying, via the display generation component, the typed caption in the first user interface region, wherein simulated speech based on the typed caption is provided as audio output for the respective activity.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: displaying, via the display generation component, a set of captions in a first user interface region; while displaying the set of captions, detecting typed user input to add a typed caption to the set of captions corresponding to a respective activity at the computer system; and in response to detecting the typed user input to add the typed caption to the set of captions, displaying, via the display generation component, the typed caption in the first user interface region, wherein simulated speech based on the typed caption is provided as audio output for the respective activity.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: displaying, via the display generation component, a set of captions in a first user interface region; while displaying the set of captions, detecting typed user input to add a typed caption to the set of captions corresponding to a respective activity at the computer system; and in response to detecting the typed user input to add the typed caption to the set of captions, displaying, via the display generation component, the typed caption in the first user interface region, wherein simulated speech based on the typed caption is provided as audio output for the respective activity.

In accordance with some embodiments, a computer system that is configured to communicate with a display generation component is described. The computer system comprises: one or more processors; and memory storing one or more programs configured to be executed by the one or more processors, the one or more programs including instructions for: displaying, via the display generation component, a set of captions in a first user interface region; while displaying the set of captions, detecting typed user input to add a typed caption to the set of captions corresponding to a respective activity at the computer system; and in response to detecting the typed user input to add the typed caption to the set of captions, displaying, via the display generation component, the typed caption in the first user interface region, wherein simulated speech based on the typed caption is provided as audio output for the respective activity.

In accordance with some embodiments, a computer system that is configured to communicate with a display generation component is described. The computer system comprises: means for displaying, via the display generation component, a set of captions in a first user interface region; means for, while displaying the set of captions, detecting typed user input to add a typed caption to the set of captions corresponding to a respective activity at the computer system; and means for, in response to detecting the typed user input to add the typed caption to the set of captions, displaying, via the display generation component, the typed caption in the first user interface region, wherein simulated speech based on the typed caption is provided as audio output for the respective activity.

In accordance with some embodiments, a computer program product is described. The computer program product comprises one or more programs configured to be executed by one or more processors of a computer system that is in communication with a display generation component. The one or more programs include instructions for: displaying, via the display generation component, a set of captions in a first user interface region; while displaying the set of captions, detecting typed user input to add a typed caption to the set of captions corresponding to a respective activity at the computer system; and in response to detecting the typed user input to add the typed caption to the set of captions, displaying, via the display generation component, the typed caption in the first user interface region, wherein simulated speech based on the typed caption is provided as audio output for the respective activity.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing captions of a live communication session, thereby increasing the effectiveness, efficiency, and user satisfaction with such devices. Such methods and interfaces may complement or replace other methods for managing captions of a live communication session.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 depicts a flow diagram illustrating a method for displaying expanded caption information in a live communication session, in accordance with some embodiments.

FIG. 8 depicts a flow diagram illustrating a method for switching user interfaces during a live communication session, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing captions for a live communication session. For example, a technique may enable a user to expand captions for a live communication session. For another example, a technique may enable a user to switch user interfaces during the live communication session. Such techniques can reduce the cognitive burden on a user who managing captions for a live communication session, thereby enhancing productivity. Further, such techniques can reduce processor and battery power otherwise wasted on redundant user inputs.

Figure 9B:
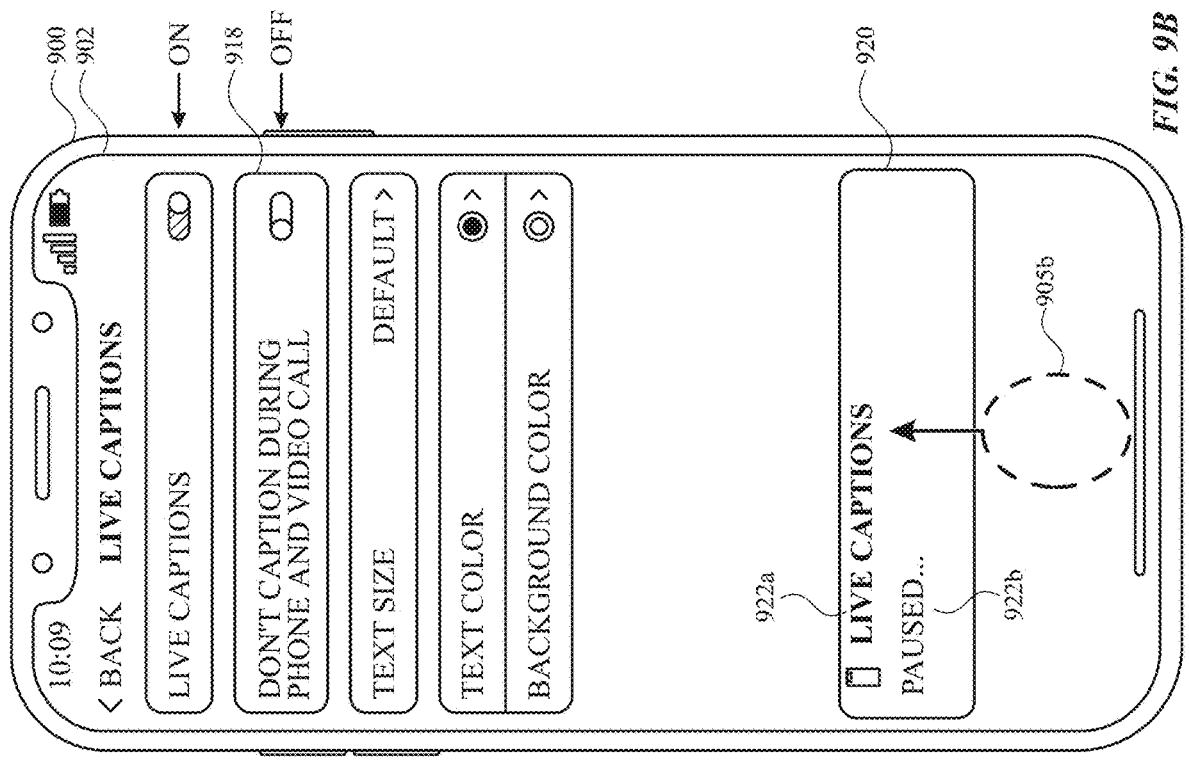
FIGS. 9A-9AI illustrate exemplary user interfaces for providing captions in accordance with some embodiments.
Figure 9A:
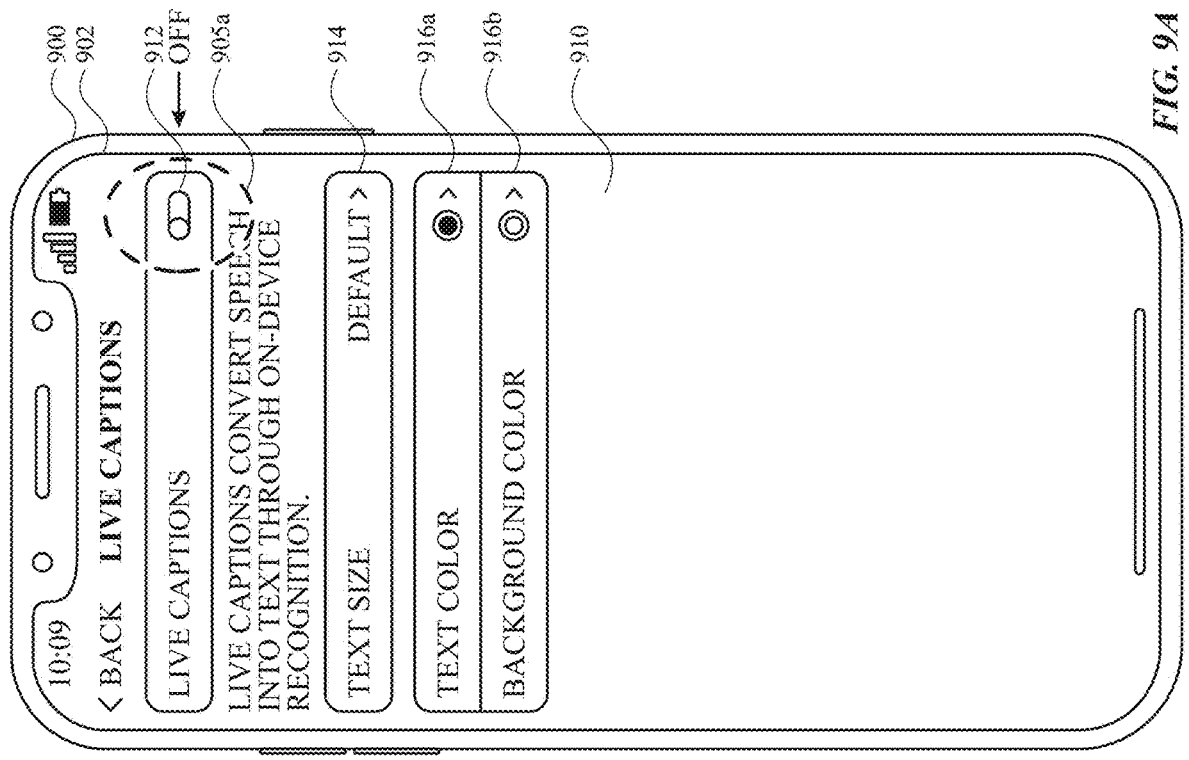
Figure 10:
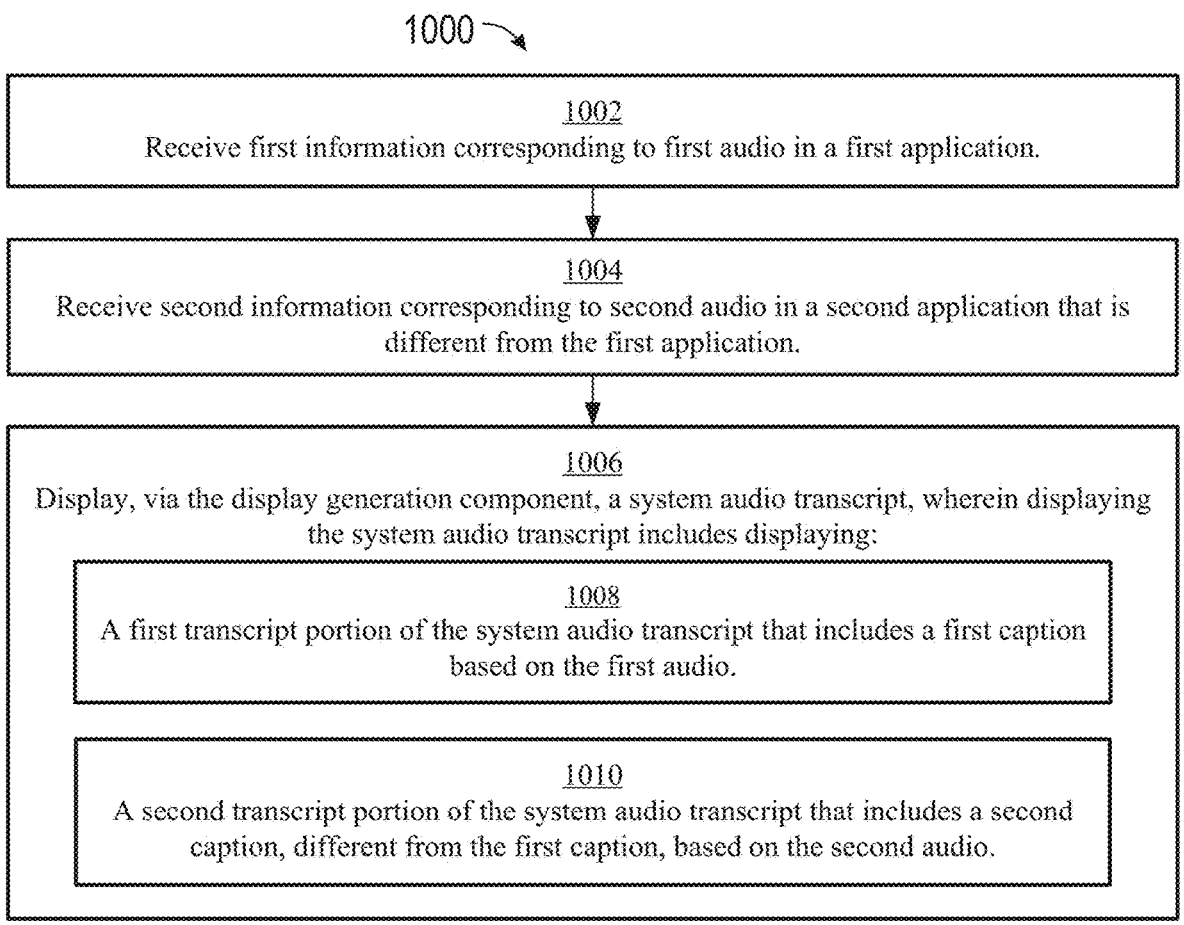
FIG. 10 depicts a flow diagram illustrating a method for providing captions in accordance with some embodiments.
Figure 11:
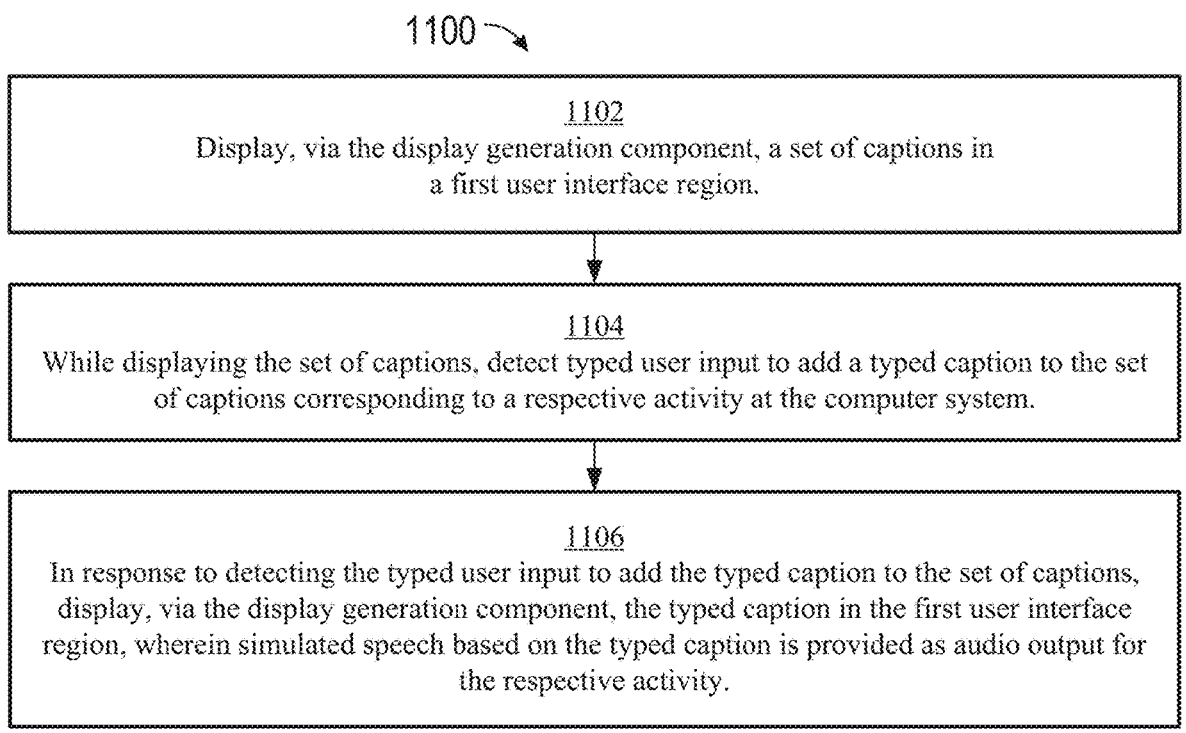
FIG. 11 depicts a flow diagram illustrating a method for providing captions in accordance with some embodiments.

Below, FIGS. 1A-1B, 2, 3, 4A-4B, and 5A-5C provide a description of exemplary devices for performing the techniques for managing captions, for instance for a live communication session, in accordance with some embodiments. FIGS. 6A-6AE illustrate exemplary user interfaces for managing captions for a live communication session, including displaying expanded caption information in a live communication session and switching user interfaces during a live communication session, in accordance with some embodiments. FIG. 7 is a flow diagram illustrating methods of displaying expanded caption information in a live communication session, in accordance with some embodiments. FIG. 8 is a flow diagram illustrating methods of switching user interfaces during a live communication session, in accordance with some embodiments. FIGS. 9A-9AI illustrate exemplary user interfaces for providing captions, in accordance with some embodiments. FIG. 10 is a flow diagram illustrating methods of providing captions, in accordance with some embodiments. FIG. 11 is a flow diagram illustrating methods of providing captions, in accordance with some embodiments.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, increasing security, managing machine-generated transcriptions, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used.

It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
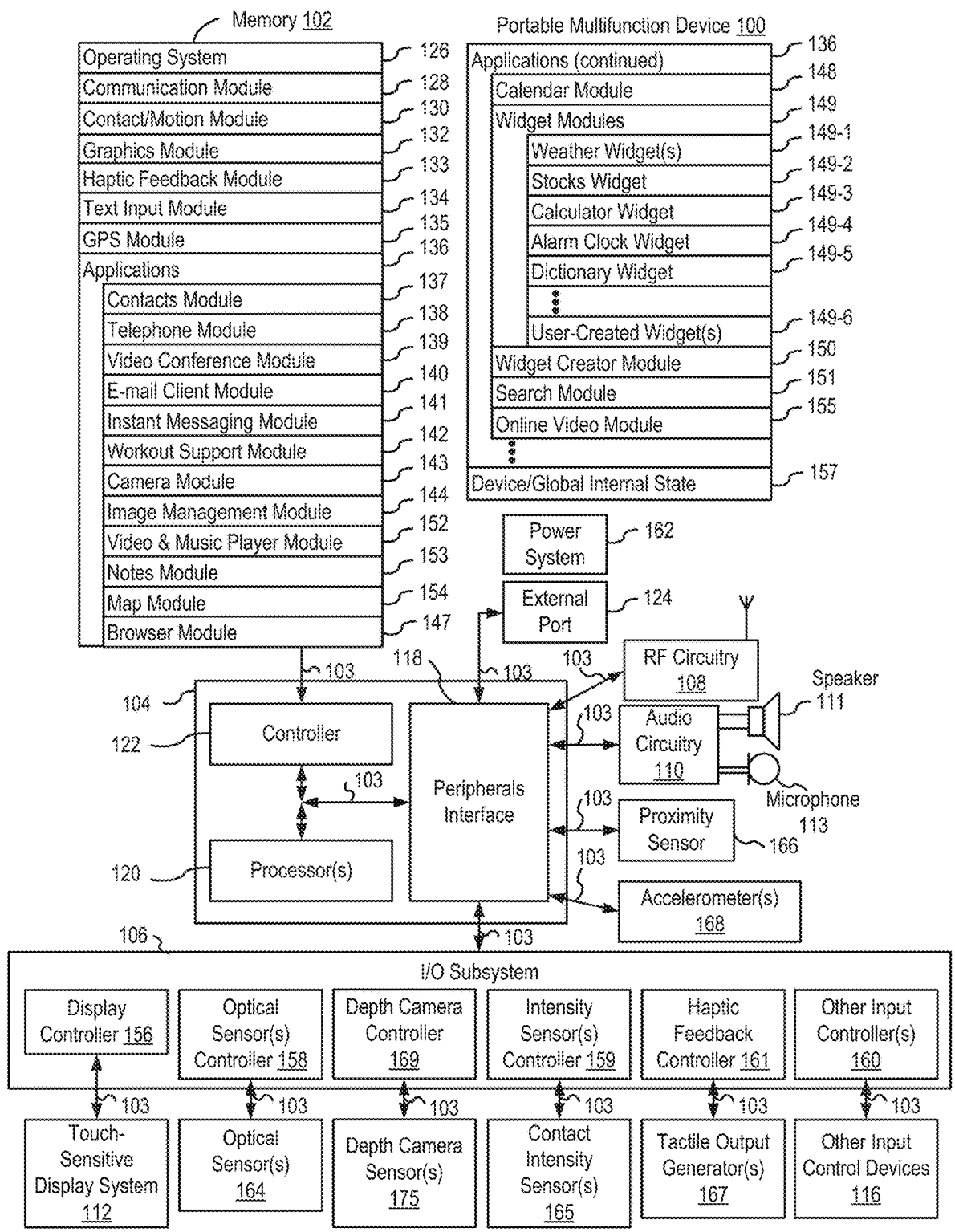
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
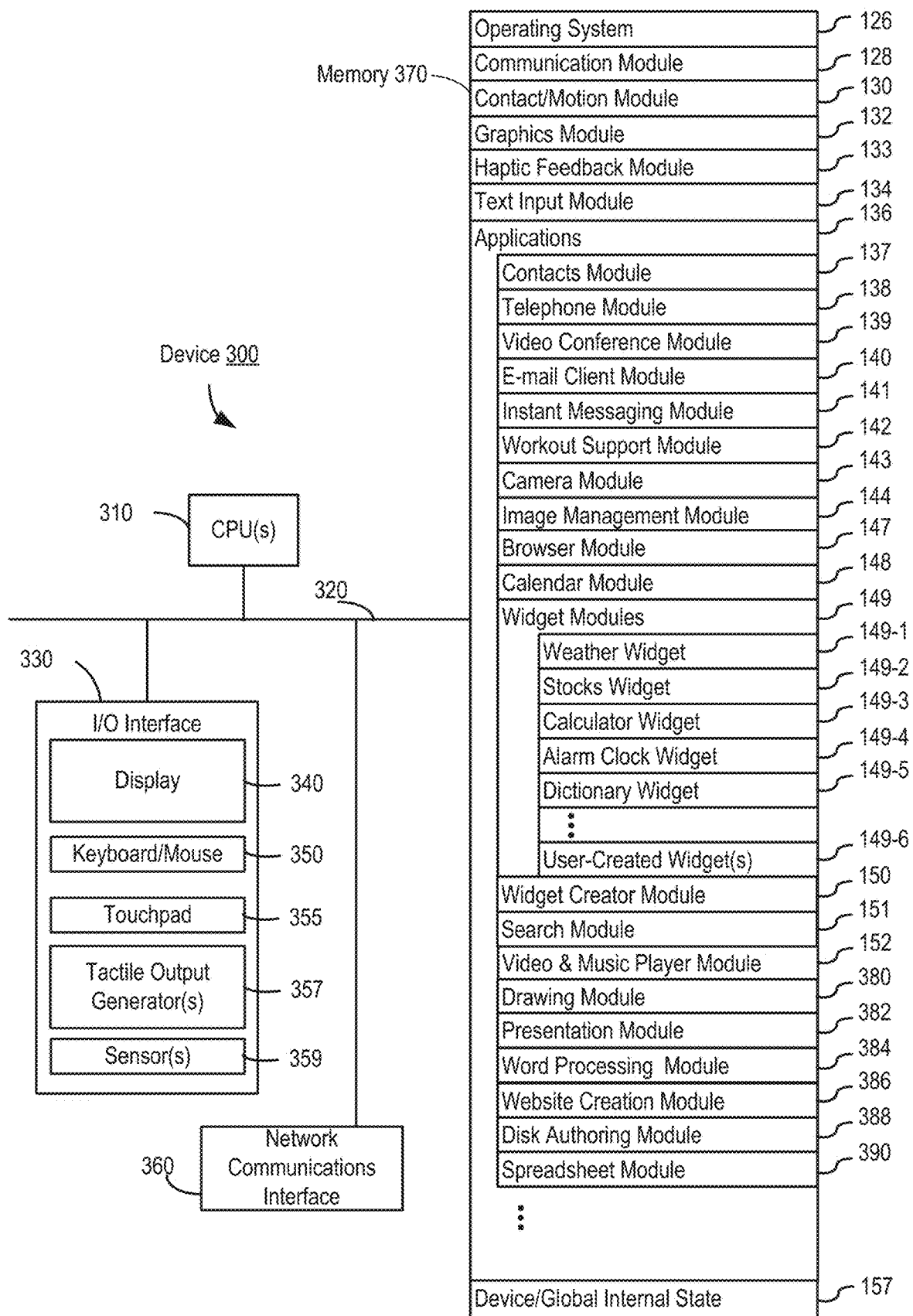
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
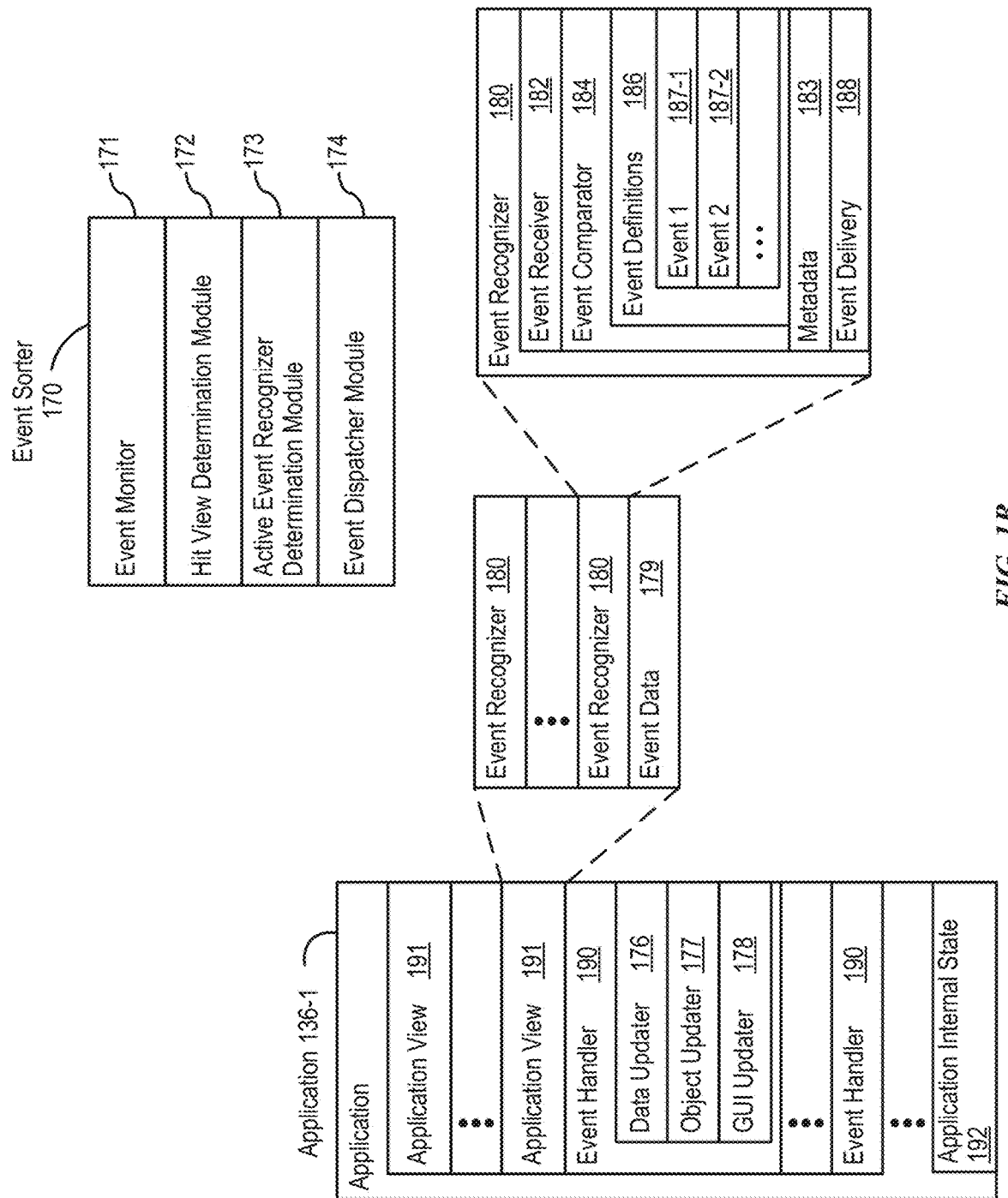
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
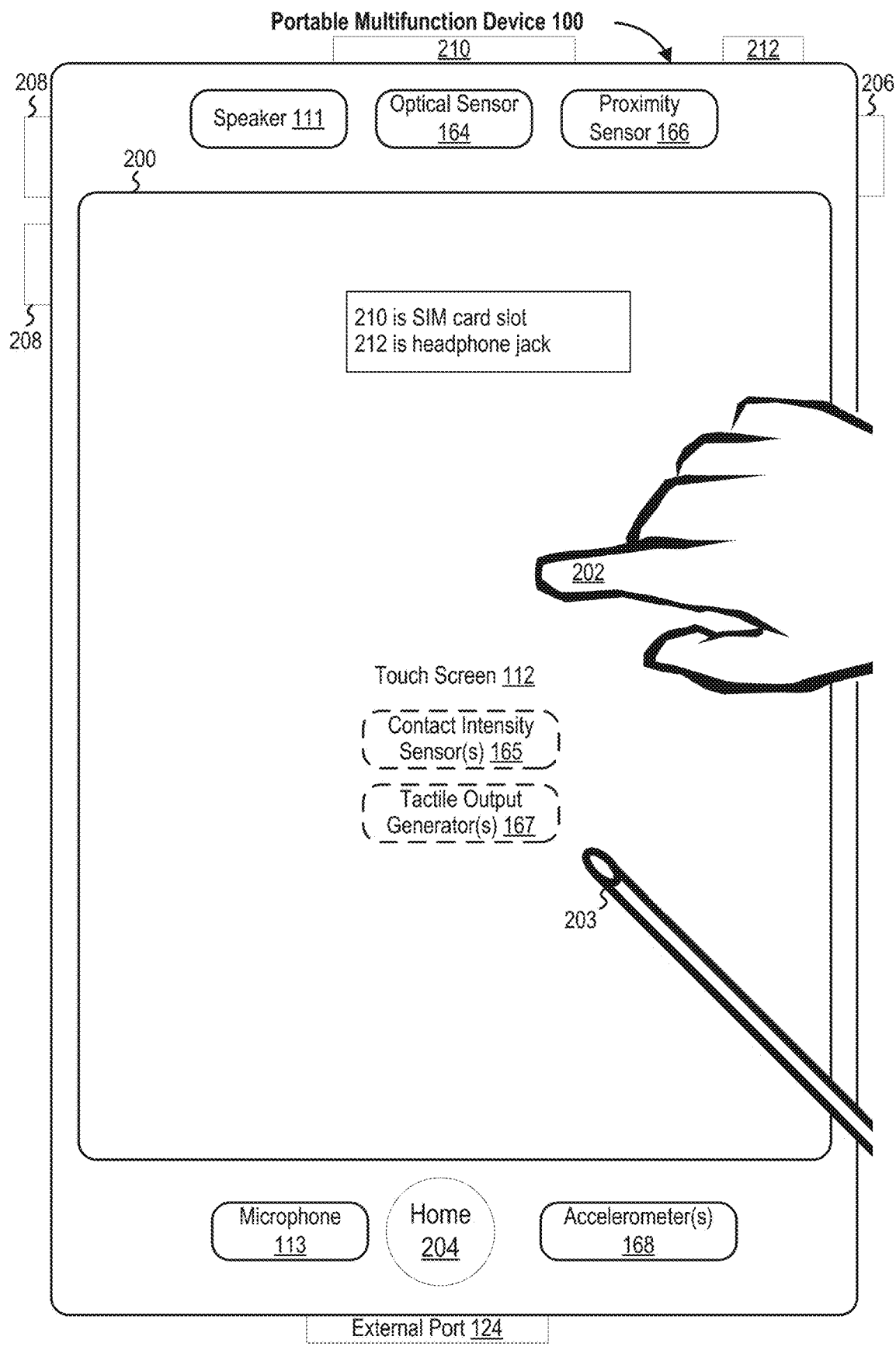
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
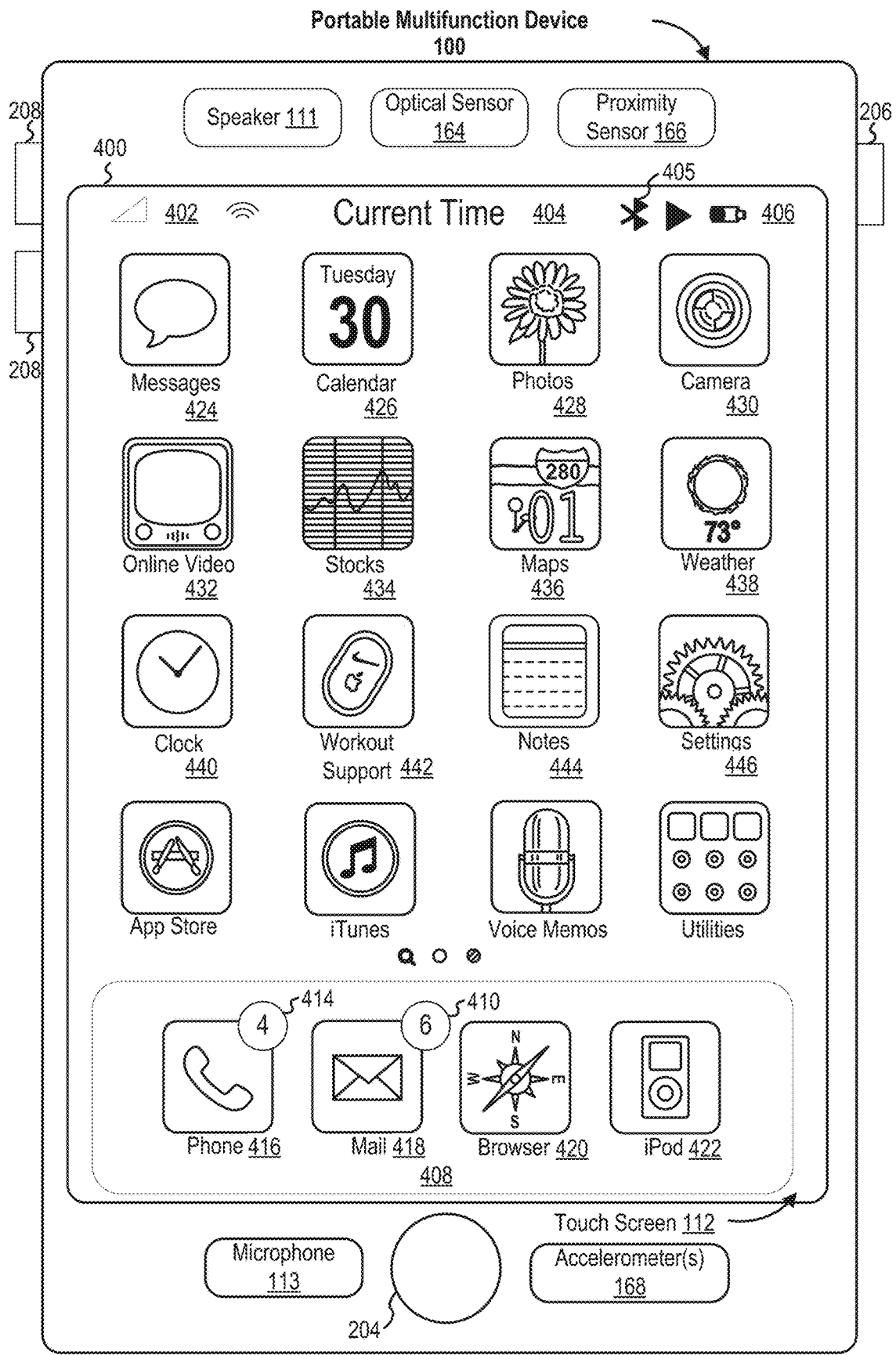
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
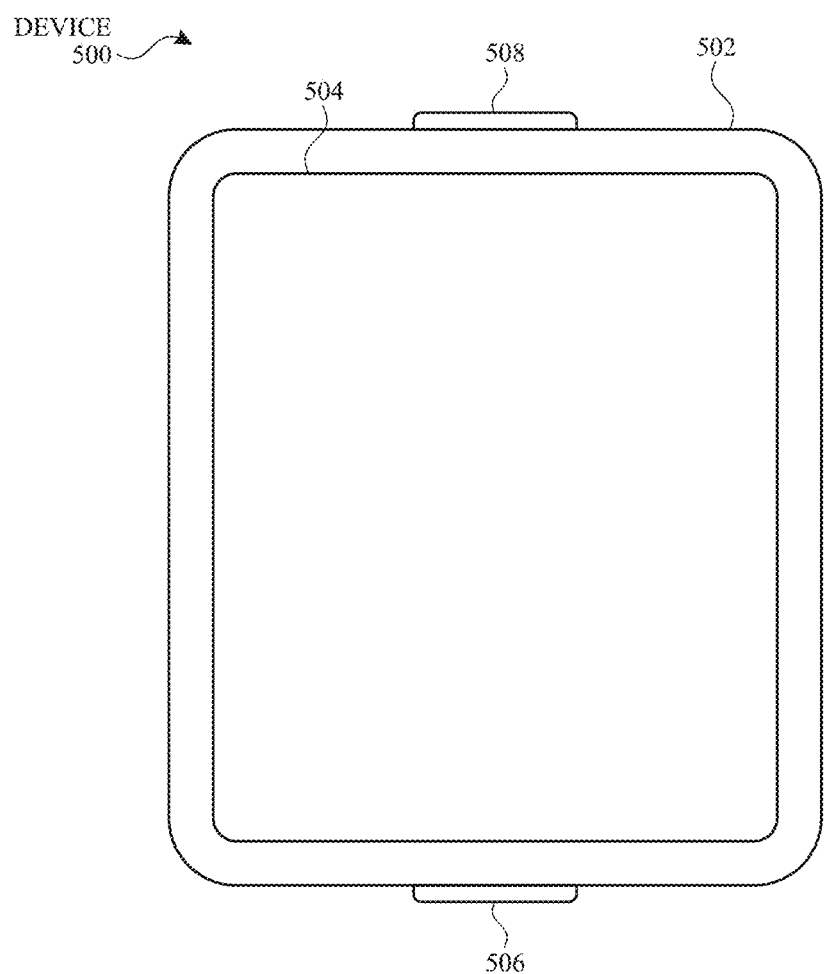
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Ser No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Ser. No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
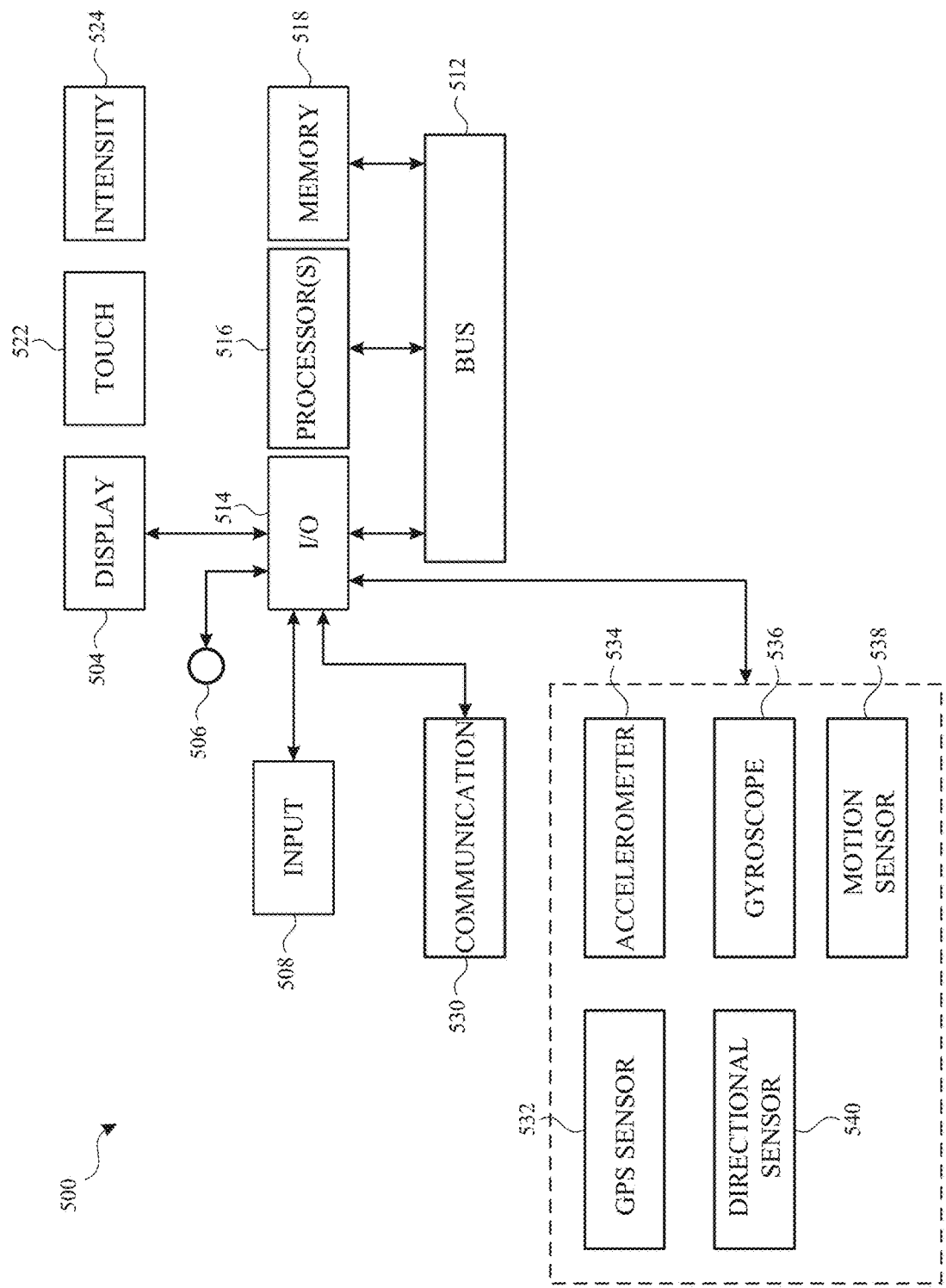
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 800, 1000, and 1100 (FIGS. 7, 8, 10, 11). A computer-readable storage medium can be any medium that can tangibly contain or store computer-executable instructions for use by or in connection with the instruction execution system, apparatus, or device. In some examples, the storage medium is a transitory computer-readable storage medium.

In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5C). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
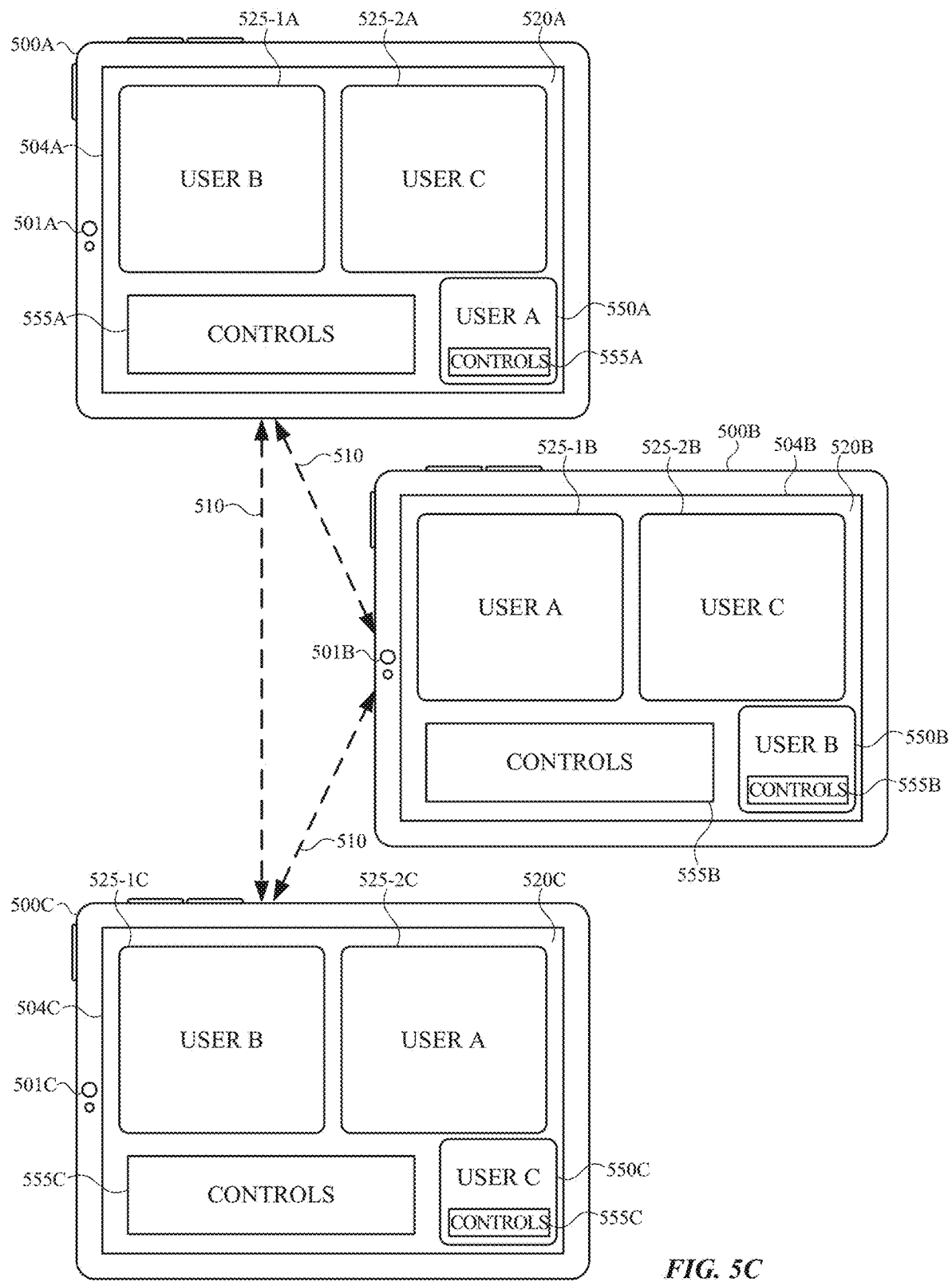
FIG. 5C illustrates an exemplary diagram of a communication session between electronic devices in accordance with some embodiments.

FIG. 5C depicts an exemplary diagram of a communication session between electronic devices 500A, 500B, and 500C. Devices 500A, 500B, and 500C are similar to electronic device 500, and each share with each other one or more data connections 510 such as an Internet connection, Wi-Fi connection, cellular connection, short-range communication connection, and/or any other such data connection or network so as to facilitate real time communication of audio and/or video data between the respective devices for a duration of time. In some embodiments, an exemplary communication session can include a shared-data session whereby data is communicated from one or more of the electronic devices to the other electronic devices to enable concurrent output of respective content at the electronic devices. In some embodiments, an exemplary communication session can include a video conference session whereby audio and/or video data is communicated between devices 500A, 500B, and 500C such that users of the respective devices can engage in real time communication using the electronic devices.

In FIG. 5C, device 500A represents an electronic device associated with User A. Device 500A is in communication (via data connections 510) with devices 500B and 500C, which are associated with User B and User C, respectively. Device 500A includes camera 501A, which is used to capture video data for the communication session, and display 504A (e.g., a touchscreen), which is used to display content associated with the communication session. Device 500A also includes other components, such as a microphone (e.g., 113) for recording audio for the communication session and a speaker (e.g., 111) for outputting audio for the communication session.

Device 500A displays, via display 504A, communication UI 520A, which is a user interface for facilitating a communication session (e.g., a video conference session) between device 500B and device 500C. Communication UI 520A includes video feed 525-1A and video feed 525-2A. Video feed 525-1A is a representation of video data captured at device 500B (e.g., using camera 501B) and communicated from device 500B to devices 500A and 500C during the communication session. Video feed 525-2A is a representation of video data captured at device 500C (e.g., using camera 501C) and communicated from device 500C to devices 500A and 500B during the communication session.

Communication UI 520A includes camera preview 550A, which is a representation of video data captured at device 500A via camera 501A. Camera preview 550A represents to User A the prospective video feed of User A that is displayed at respective devices 500B and 500C.

Communication UI 520A includes one or more controls 555A for controlling one or more aspects of the communication session. For example, controls 555A can include controls for muting audio for the communication session, changing a camera view for the communication session (e.g., changing which camera is used for capturing video for the communication session, adjusting a zoom value), terminating the communication session, applying visual effects to the camera view for the communication session, activating one or more modes associated with the communication session. In some embodiments, one or more controls 555A are optionally displayed in communication UI 520A. In some embodiments, one or more controls 555A are displayed separate from camera preview 550A. In some embodiments, one or more controls 555A are displayed overlaying at least a portion of camera preview 550A.

In FIG. 5C, device 500B represents an electronic device associated with User B, which is in communication (via data connections 510) with devices 500A and 500C. Device 500B includes camera 501B, which is used to capture video data for the communication session, and display 504B (e.g., a touchscreen), which is used to display content associated with the communication session. Device 500B also includes other components, such as a microphone (e.g., 113) for recording audio for the communication session and a speaker (e.g., 111) for outputting audio for the communication session.

Device 500B displays, via touchscreen 504B, communication UI 520B, which is similar to communication UI 520A of device 500A. Communication UI 520B includes video feed 525-1B and video feed 525-2B. Video feed 525-1B is a representation of video data captured at device 500A (e.g., using camera 501A) and communicated from device 500A to devices 500B and 500C during the communication session. Video feed 525-2B is a representation of video data captured at device 500C (e.g., using camera 501C) and communicated from device 500C to devices 500A and 500B during the communication session. Communication UI 520B also includes camera preview 550B, which is a representation of video data captured at device 500B via camera 501B, and one or more controls 555B for controlling one or more aspects of the communication session, similar to controls 555A. Camera preview 550B represents to User B the prospective video feed of User B that is displayed at respective devices 500A and 500C.

In FIG. 5C, device 500C represents an electronic device associated with User C, which is in communication (via data connections 510) with devices 500A and 500B. Device 500C includes camera 501C, which is used to capture video data for the communication session, and display 504C (e.g., a touchscreen), which is used to display content associated with the communication session. Device 500C also includes other components, such as a microphone (e.g., 113) for recording audio for the communication session and a speaker (e.g., 111) for outputting audio for the communication session.

Device 500C displays, via touchscreen 504C, communication UI 520C, which is similar to communication UI 520A of device 500A and communication UI 520B of device 500B. Communication UI 520C includes video feed 525-1C and video feed 525-2C. Video feed 525-1C is a representation of video data captured at device 500B (e.g., using camera 501B) and communicated from device 500B to devices 500A and 500C during the communication session. Video feed 525-2C is a representation of video data captured at device 500A (e.g., using camera 501A) and communicated from device 500A to devices 500B and 500C during the communication session. Communication UI 520C also includes camera preview 550C, which is a representation of video data captured at device 500C via camera 501C, and one or more controls 555C for controlling one or more aspects of the communication session, similar to controls 555A and 555B. Camera preview 550C represents to User C the prospective video feed of User C that is displayed at respective devices 500A and 500B.

While the diagram depicted in FIG. 5C represents a communication session between three electronic devices, the communication session can be established between two or more electronic devices, and the number of devices participating in the communication session can change as electronic devices join or leave the communication session. For example, if one of the electronic devices leaves the communication session, audio and video data from the device that stopped participating in the communication session is no longer represented on the participating devices. For example, if device 500B stops participating in the communication session, there is no data connection 510 between devices 500A and 500C, and no data connection 510 between devices 500C and 500B. Additionally, device 500A does not include video feed 525-1A and device 500C does not include video feed 525-1C. Similarly, if a device joins the communication session, a connection is established between the joining device and the existing devices, and the video and audio data is shared among all devices such that each device is capable of outputting data communicated from the other devices.

FIG. 5C represents a diagram of a communication session between multiple electronic devices, including the example communication sessions depicted in FIGS. 6A-6AE. In some embodiments, the communication session depicted in FIGS. 6A-6AE includes two or more electronic devices, even if the other electronic devices participating in the communication session are not depicted in the figures.

Attention is now directed towards embodiments of user interfaces ("UI") and associated processes that are implemented on an electronic device, such as portable multifunction device 100, device 300, or device 500.

FIGS. 6A-6AE illustrate exemplary user interfaces for managing captions of a live communication session, in accordance with some embodiments. The user interfaces in these figures are used to illustrate the processes described below, including the processes in FIGS. 7-8.

At a high level, FIGS. 6A-6AE illustrate device 600 that corresponds to (e.g., is being used by and/or is logged into a user account of) local user 620, who is a participant of a live communication session (e.g., audio communication session and/or a video communication session) with one or more participants using a communication application. Device 600 includes a display (e.g., touch-sensitive display) 601 and a camera 602 (e.g., front-facing camera) having a field of view, for example, of local user 620. Device 600 displays graphical user interfaces that optionally include local user representation 621 of local user 620 and/or one or more remote user representations of the one or more participants. A representation can include a shape, text, avatar, image, and/or a video (e.g., a live video feed) of a participant.

As will be described in further detail below, device 600 optionally displays one or more captions in addition to the one or more representations. The one or more captions includes a machine-generated transcription for audio data of the communication session. In some examples, the size and/or location of the one or more captions and/or the one or more representations can be modified during the live communication session to provide an improved communication session experience (e.g., when a participant is relying on a machine-generated transcript of audio data).

FIGS. 6A-6B illustrate exemplary graphical user interfaces for a communication session between two participants. Referring to FIG. 6A, device 600 displays interface 614 for a live communication session between local user 620 ("Me") and remote user 622 ("Emily"). Device 600 displays remote user representation 623 of remote user 622 and local user representation 621 of local user 620. Remote user representation 623 has a first size (e.g., full screen) and a first location. Local user representation 621 has a smaller size and a different location as compared to remote user representation 623.

At FIG. 6A, interface 614 further includes captions 604. Captions 604 are displayed in caption area 606. Captions 604 include a transcription of utterances made by remote user 622. In some embodiments, captions 604 can include a transcription of other sounds, such as background noise (e.g., "dog barking," "music playing," and/or "applause"). As depicted, device 600 displays captions 604 on a background (e.g., an image, a solid color, and/or a graphical object). Additionally or alternatively, captions 604 are overlaid on a portion of representation 623. In some embodiments, captions 604 are displayed with a graphical indication that provides a context of an utterance (e.g., a length of pause between utterances and/or ambient sounds).

At FIG. 6A, captions 604 occupy a predetermined number of lines. As illustrated, interface 614 includes no more than three lines of captions. During a communication session, if a caption cannot fit on an existing line, the caption is displayed on a new line. To accommodate the new line of captions, device 600 will cease to display a line of existing captions, shift existing lines of captions (e.g., up or down), and add a new line of captions.

At FIG. 6A, device 600 displays one or more indications (e.g., 610) to indicate that a caption corresponds to a respective participant. As illustrated, indication 610 (e.g., a name and/or image of remote user 622) indicates that captions 604 correspond to remote user 622. Indication 610 can be any representation of the respective participant (e.g., name, initials, avatar, and/or image). Additionally, as depicted, device 600 displays indication 612 (e.g., in captions area 606) that captions 604 are machine generated. Indication 612 can distinguish captions 604 from other text, such as text composed by a participant (e.g., text message and/or chat messages as part of the live communication session).

In some embodiments, captions are not displayed at device 600 for utterances by local user 620 of device 600. Additionally or alternatively, a caption is not displayed for local user 620 when there are more than two participants. Not generating and/or displaying a caption for user 620 conserves processing power and declutters the interface by decreasing the amount of captions that are displayed and/or processed.

At FIG. 6A, while displaying interface 614, device 600 detects input 616a (e.g., a tap gesture, a drag gesture, and/or pinch gesture). In some embodiments, the location of input 616a corresponds to captions 604. In response to detecting input 616a, device 600 displays interface 614, as depicted in FIG. 6B.

At FIG. 6B, interface 614 includes expanded captions. For example, device 600 displays expanded captions 605. Expanded captions 605 includes, optionally, a transcription of a different portion (e.g., an earlier portion) of a conversation and/or the same portion of the conversation as captions 604. Expanded captions 605 are displayed in caption area 606 that is different from (e.g., larger than) caption area 606 of FIG. 6A.

At FIG. 6B, interface 614 includes remote user representation 623 and local user representation 621. Remote user representation 623 is a different size (e.g., smaller) than remote user representation 623 of FIG. 6A. This is achieved, for example, by scaling and/or cropping at least a portion of remote user representation 623 as compared to FIG. 6A. In some embodiments, expanded captions 605 are displayed in a portion of the display that was previously occupied by remote user representation 623. Additionally or alternatively, expanded captions 605 are not overlaid on remote user representation 623. Additionally or alternatively, remote user representation 623 at FIG. 6B has changed locations as compared to FIG. 6A. For example, a center of remote user representation 623 of FIG. 6B is offset (e.g., below) from a center of remote user representation 623 of FIG. 6A. Local user representation 621 at FIG. 6B is depicted as having a similar size and/or location as local user representation 621 of FIG. 6A. In some embodiments, local user representation 621 of FIG. 6B has a different size and/or location as compared to local user representation 621 of FIG. 6A. In some embodiments, interface 614 of FIG. 6B does not include local user representation 621.

At FIG. 6B, while displaying interface 614, device 600 detects input 616b (e.g., a tap gesture, drag gesture, and/or pinch gesture). For example, input 616b is a tap gesture on a unexpanded caption affordance 618. In response to receiving input 616b, device 600 displays interface 614 of FIG. 6C. Additionally or alternatively, while displaying interface 614 at FIG. 6B, device 600 detects input 616c that corresponds to a location outside of (e.g., not corresponding to) expanded captions 605 (e.g., a location outside of caption area 606). For example, as depicted in FIG. 6B, input 616c corresponds to a location of remote user representation 623. In response to receiving input 616c, device 600 displays interface 614 of FIG. 6C.

As depicted in FIG. 6C, device 600 ceases to display expanded captions 605 and displays captions 604. Additionally, as depicted, device 600 displays representation 623 at a full-screen size.

At FIG. 6D, an exemplary graphical user interface is illustrated after additional participants join the live communication session. As depicted, remote user 624 ("Kim"), remote user 626 ("Alex"), remote user 628 ("John") have joined the live communication session between local user 620 and remote user 622. Remote user 628 is represented by representation 629. Remote user 626 is represented by remote user representation 627. Remote user 624 is represented by remote user representation 625. As depicted, interface 614 of FIG. 6D includes captions 604 that are displayed in caption area 606. As depicted, captions 604 are not overlaid on a representation.

At FIG. 6D, interface 614 includes one or more dynamic representation areas for a more active participant and a roster for a less active participant. Dynamic representation area 630-1 and dynamic representation area 630-2 are updated with a representation of a remote user that is more active (e.g., moving more, talking more, talking louder, and/or talking faster) than another remote user (e.g., a remote user whose representation is displayed in roster 632). As shown, dynamic representation area 630-1 is occupied by remote user representation 623 and dynamic representation area 630-2 is occupied by remote user representation 629 as remote user 628 and remote user 622 have recently spoken. Roster 632 includes remote user representation 627 and remote user representation 625 as remote user 626 and remote user 624 have not recently spoken.

At FIG. 6E, device 600 updates dynamic representation area 630-1 from including remote user representation 623 to including remote user representation 627 in response to a recent utterance ("Make sure to bring hiking boots!") by remote user 626. As depicted, device 600 updates dynamic representation area 630-2 from including remote user representation 629 to including remote user representation 623. Additionally or alternatively, in response to the recent utterance by remote user 626, device 600 displays captions 609-1. In some examples, device 600 can display captions 609-1 synchronously (e.g., at substantially the same time) or asynchronously (e.g., after or before) with the update of the representation in dynamic representation area 630-1 and/or dynamic representation area 630-2. As further depicted, device 600 updates roster 632 in response to the recent utterance by remote user 626. For example, remote user representation 629 is moved from dynamic representation area 630-2 to roster 632.

At FIG. 6E, while displaying interface 614, device 600 detects input 616*d* (e.g., a tap gesture, a drag gesture, and/or pinch gesture). In some embodiments, the location of input 616*d* corresponds to captions 604 (e.g., caption area 606). In response to detecting input 616*d*, device 600 displays an animation of the captions expanding, as shown in FIGS. 6F-6G.

FIG. 6F illustrates an exemplary animation during an animation state of displaying expanded captions. For example, in response to input 616*d*, device 600 displays an animation that includes increasing the size of caption area 606. As shown, device 600 also displays an animation of modifying the size and/or location of remote user representation 623 and remote user representation 627. In some embodiments, the animation is a smooth transition between the user interfaces of FIGS. 6E and 6G.

At FIG. 6G, device 600 displays interface 614 that includes expanded captions 605 in caption area 606. Expanded captions 605 include a transcription of an earlier conversation that occurred during the communication session. As depicted, interface 614 includes dynamic representation area 630-1 that includes remote user representation 627.

At FIG. 6G, device 600 displays an indication that a caption area is scrollable. As depicted, a portion of expanded captions 605 (e.g., a portion, such as a top portion, of captions 605) are visually differentiated from the other portion of the captions (e.g., greyed out, dimmed, and/or have increased transparency) to indicate that expanded captions 605 are scrollable. While displaying interface 614 at FIG. 6G, device 600 detects input 616*e* (e.g., a swipe gesture and/or a swipe gesture starting on expanded captions 605 (e.g., caption area 606) and moving in the direction of remote user representation 627 and/or roster 632). In some embodiments, the location of input 616*e* is directed to expanded captions 605 (e.g., caption area 606). In response to detecting input 616*e*, device 600 displays captions 609-2 and captions 609-3, as depicted in FIG. 6H. Captions 609-2 and captions 609-3 are captions for an earlier conversation during the same live communication session. In some examples, expanded captions 605 (e.g., caption area 606) is scrollable for a particular user up until a point in which the particular user joined the communication session (e.g., the user cannot access transcripts for portions of the communication session for which the user was not part of the live communication session).

FIG. 6H illustrates an example in which device 600 displays an indication of a confidence level of a caption. As shown, device 600 displays a blank space and underscore 636 (e.g., without text) to indicate that a caption for an utterance has a low confidence level and, as such, was not displayed. In some examples, the length of blank space and underscore 636 corresponds to the length of the utterance that has the low confidence level (and/or how long (e.g., in time) the utterance lasted). Additionally or alternatively, device 600 displays caption 638 with an underline (e.g., under the text) to indicate that the caption has a medium confidence level.

Turning briefly to FIG. 6I, device 600 can display captions at an increased size. For example, in response to receiving an input corresponding to a request to increase the size of captions (e.g., via a settings interface), device 600 displays at least a portion of expanded captions 605 at a larger size, as shown in FIG. 6I, than expanded captions 605 of FIG. 6H. Additionally or alternatively, caption area 606 of FIG. 6I is larger than caption area 606 of FIG. 6H. Additionally or alternatively, one or more representations in FIG. 6I are smaller in size as compared to FIG. 6H. For example, remote user representation 627 of FIG. 6I is smaller than remote user representation 627 of FIG. 6H. Additionally or alternatively, in some embodiments, interface 614 does not include a roster. In some embodiments, these techniques optionally apply to unexpanded captions (e.g., captions 604).

Turning back to FIG. 6H, while displaying interface 614, device 600 detects input 616*f*. As shown, input 616*f* is a tap gesture directed at unexpand caption affordance 639. In response to detecting input 616*f*, device 600 displays interface 614 of FIG. 6J.

Figure 6K:
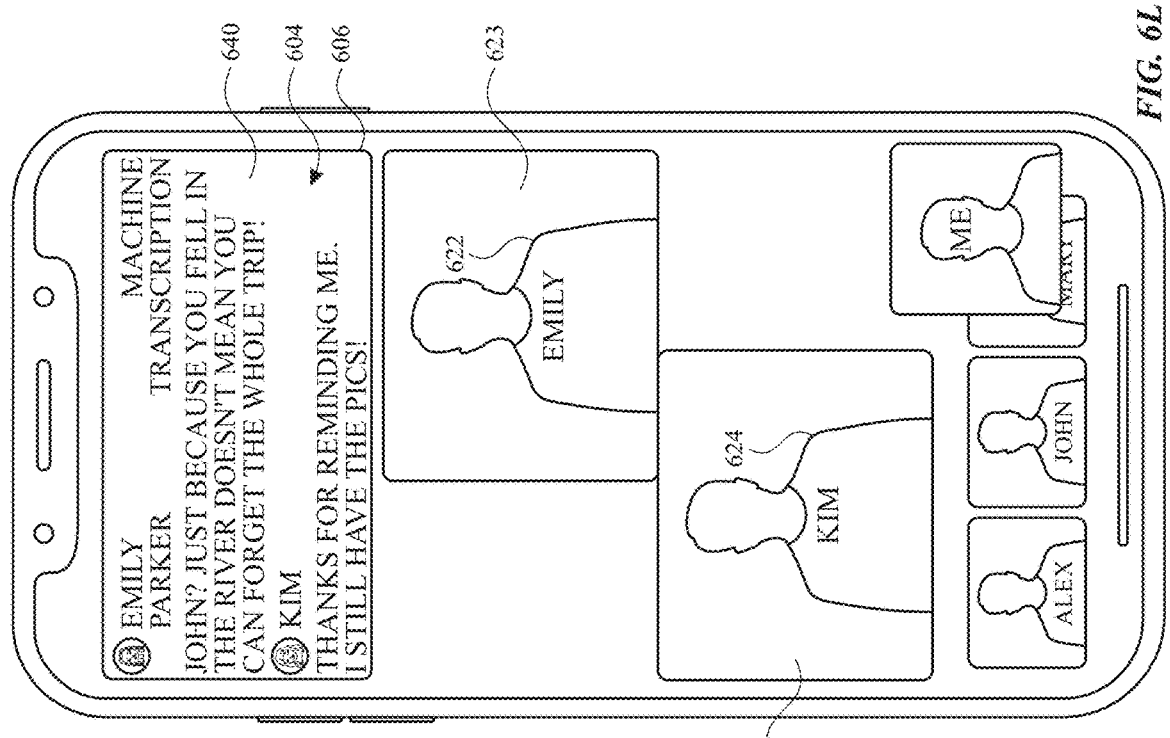
FIGS. 6A-6AE illustrate exemplary user interfaces for managing captions of a live communication session in accordance with some embodiments.
Figure 6L:
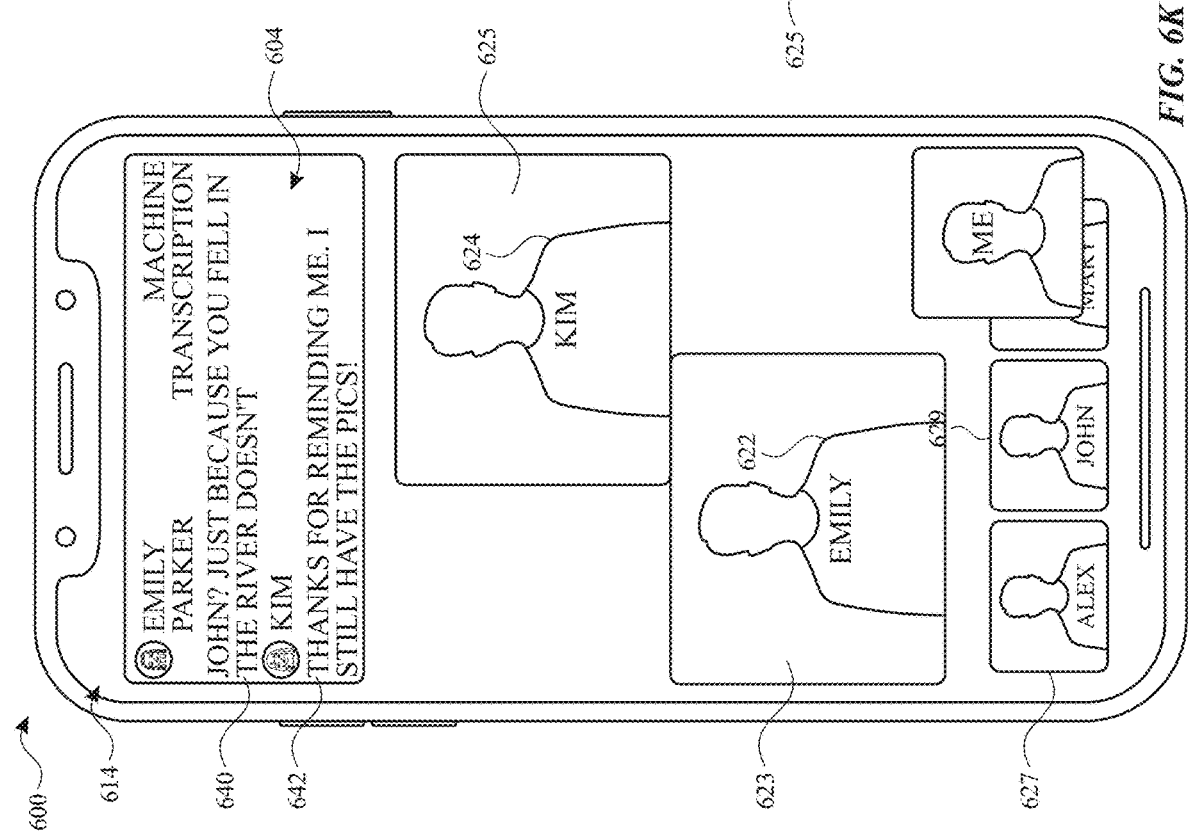

FIGS. 6J-6L illustrate an example in which a device displays captions when two participants are speaking at the same time. As depicted in FIG. 6J, captions 604 are no longer expanded and device 600 displays interface 614 that includes remote user representation 623 in dynamic representation area 630-1 and remote user representation 627 in dynamic representation area 630-2. During the communication session, remote user 622 is speaking, which is transcribed as a caption on line 640. Additionally or alternatively, the words uttered by user 622 are grouped together and associated with user 622 (e.g., grouped together and associated with indication 610 of user 622). As depicted in FIG. 6K, remote user 624 begins speaking (e.g., by interrupting or speaking over remote user 622). Accordingly, line 640 is moved up and the utterance of remote user 624 is transcribed on a new line 642. Additionally or alternatively, the words uttered by user 624 are grouped together and associated with user 624 (e.g., grouped together and associated with indication 610 of user 624). At FIG. 6L, remote user 622 continues speaking, which is transcribed as a caption on line 640 (e.g., as opposed to adding a new line under line 642). Additionally or alternatively, words for the utterances (in some embodiments, the interrupted utterances) by remote user 622 are grouped together and associated with the existing captions of remote user 622 (e.g., grouped together and associated with indication 610 of user 624). In some embodiments, words are added to transcripts corresponding to multiple participants by alternating between the multiple transcripts of the participants (e.g., without waiting for a pause in speech from a respective participant to add text corresponding to that participant's utterances). In some embodiments, captions corresponding to one user are added to an existing line (e.g., line 640) while captions for another user are concurrently added to another line (e.g., line 642).

FIGS. 6M-6N illustrate an example in which a device displays captions when two participants are speaking at the same time. As depicted in FIG. 6M, while remote user 622 and remote user 624 are speaking at the same time, device 600 adds captions 609-4 for remote user 622 to caption area 606. After adding captions 609-4 and upon determining that a predetermined threshold is met (e.g., remote user 622 is silent for at least a threshold amount of time and/or remote user 622 has completed a sentence), device 600 displays captions 609-5 for the utterance of remote user 624, as shown in FIG. 6N (e.g., even though remote user's 624 utterance has interrupted or overlapped with the utterance of remote user 622). If the predetermined threshold is not met (e.g., remote user 622 speaks within the threshold amount of time and/or remote user 622 has not completed a sentence), device 600 forgoes displaying captions 609-5 for the utterance of remote user 624 until the predetermined threshold is met.

At FIG. 6O, device 600 displays remote user representation 629 in dynamic representation area 630-1 based on a recent utterance by remote user 628. Device 600 also displays captions 609-6 corresponding to the recent utterance. In some embodiments, captions 604-6 are synchronously or asynchronously displayed with the update of dynamic representation area 630-1. In some examples, captions 609-6 are displayed at the same or substantially the same time as dynamic representation area 630-1 updates. In some examples, captions 609-6 are displayed after dynamic representation area 630-1 updates.

At FIG. 6P, device 600 displays caption area 606 as smaller than caption area 606 of FIG. 6O. In some embodiments, in response to determination that a first period of time has elapsed in which the participants do not speak (e.g., none of the participants speak and/or no text or content is added to the transcript), device 600 ceases to display one or more captions (e.g., caption 609-7 of FIG. 6O) and automatically reduces the size of captions area 606 (e.g., as compared to FIG. 6O). In some embodiments, in accordance with (and/or in response to) a determination that the first predetermined time has elapsed since initially displaying one or more captions, device 600 ceases to display the one or more captions (e.g., caption 609-7 of FIG. 6O). In some embodiments, in response to a determination that the second period of time (e.g., longer than the first period of time) has elapsed in which the participants do not speak (e.g., none of the participants speak and/or no text or content is added to the transcript) device 600 ceases to display all captions (e.g., ceases to display captions area 606). In some embodiments, in accordance with (and/or in response to) a determination that the first and/or second periods of time have elapsed in which the participants do not speak (e.g., none of the participants speak and/or no text or content is added to the transcript) device 600 optionally increases the size of representations 625 and/or 629 (e.g., in conjunction with reducing and/or ceasing to display captions area 606).

At FIG. 6P, while displaying interface 614, device 600 detects input 616g. As shown, input 616g is a swipe gesture. In response to detecting input 616g, device 600 displays interface 615 in a picture-in-picture mode, as shown in FIG. 6Q.

At FIG. 6Q, interface 615 includes remote user representation 629 that is smaller than remote user representation 629 of FIG. 6P. Remote user representation 629 occupies dynamic representation area 630-1. As shown, dynamic representation area 630-1 is smaller than dynamic representation area 630-1 of FIG. 6P. Additionally or alternatively, as depicted, device 600 ceases to display one or more representations (e.g., roster 632, local user representation 621, and/or remote user representation 625) in response to input 616g. Interface 615 also includes captions 604 in caption area 606. As shown, caption area 606 is different (e.g., smaller) than caption area of FIG. 6P. Interface 615 further includes a view of home screen 650. As shown, captions 604 and remote user representation 629 are overlaid on at least a portion of home screen 650. While displaying interface 615, device 600 detects input 616h. As shown, input 616h is a tap gesture on movie application 651. In response to detecting input 616h, device 600 displays interface 615 of FIG. 6R.

At FIG. 6Q, caption area 606 is optional, as indicated by the dashed line depicted in FIG. 6Q. In some embodiments, interface 615 does not include captions 604 and/or caption area 606. In some embodiments, interface 615 includes remote user representation 629 as depicted in FIG. 6Q but, optionally, does not include captions 604 and/or caption area 606. As such, in some embodiments, device 600 of FIG. 6Q ceases to display captions 604 and/or caption area 606 in response to input 616g. Additionally or alternatively, in some embodiments, device 600 displays (e.g., re-displays) captions 604 and/or caption area 606 in response to an input to return to interface 614 of FIG. 6P. For instance, device 600 optionally detects an input while displaying interface 615 (e.g., a tap gesture directed to remote user representation 629, an input corresponding to a request to replace the display the user interface of an application that is different from the live communication application with the user interface of the live communication applications, and/or a request to a display the user interface of the communications applications at full-screen). In response to detecting the input, device 600 displays (e.g., re-displays) captions 604 and/or caption area 606 of FIG. 6P. Additionally or alternatively, in response to detecting the input, device 600 re-displays one or more representations (e.g., roster 632, local user representation 621, and/or remote user representation 625). Additionally or alternatively, in response to detecting the input, device 600 modifies the size and/or location of one or more representations. For example, remote user representation 629 of FIG. 6P is larger and/or has a different location than remote user representation 629 of FIG. 6Q.

At FIG. 6R, interface 615 is displayed with a view of movie 652 that is being shared in the communication session (e.g., that is being concurrently played for and/or viewed by multiple participants of the communication session). One skilled in the art would appreciate that user 620 can initiate the sharing of content in the communication session in response to, for example, a share content control option in a settings menu. In some embodiments, captions 604 are overlaid on a user interface of an application that is different from the communication application. In some embodiments, captions 604 and remote user representation 629 are overlaid on at least a portion of movie 652.

Figure 6S:
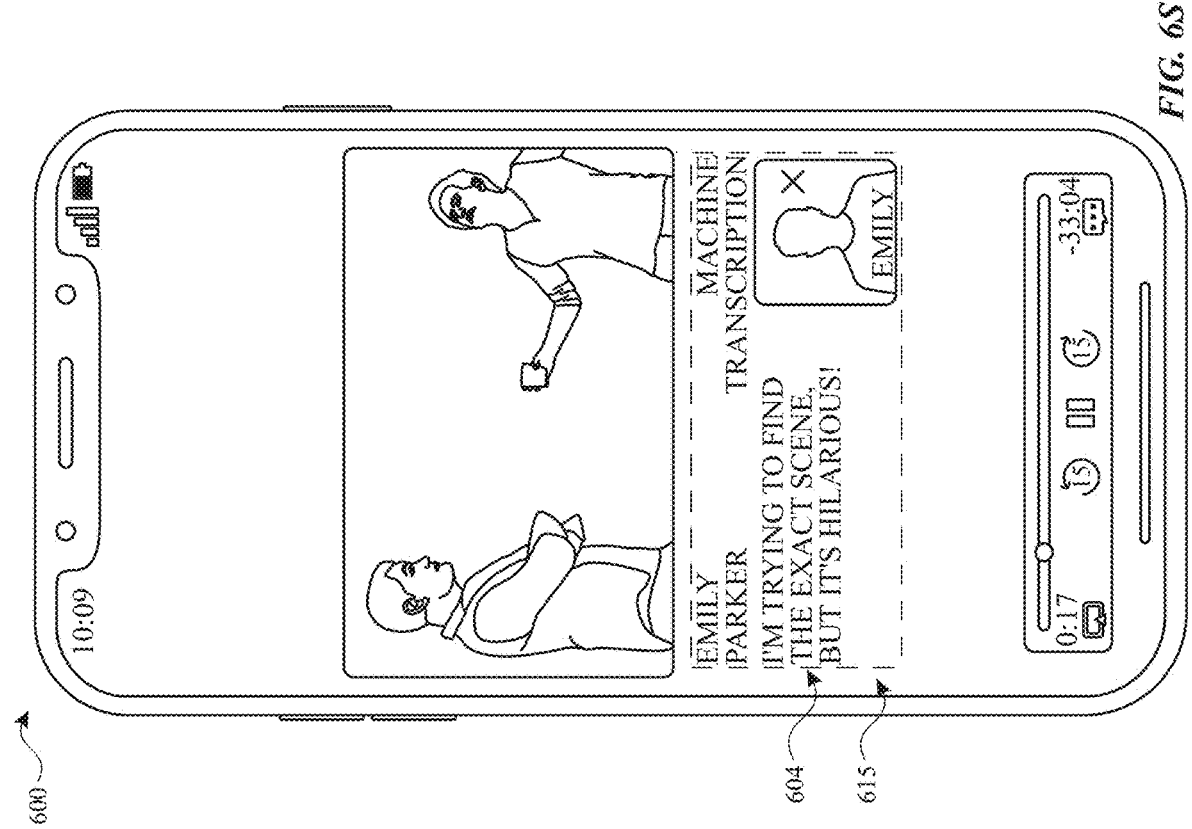
Figure 6T:
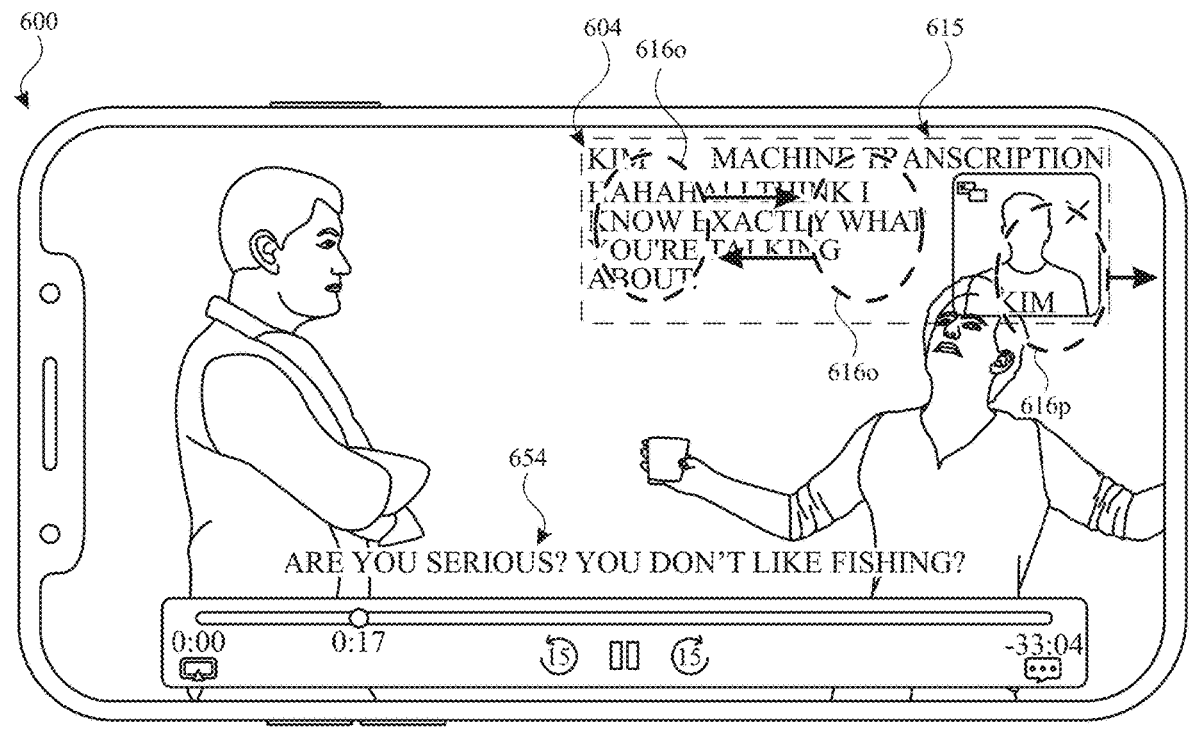
Figure 6U:
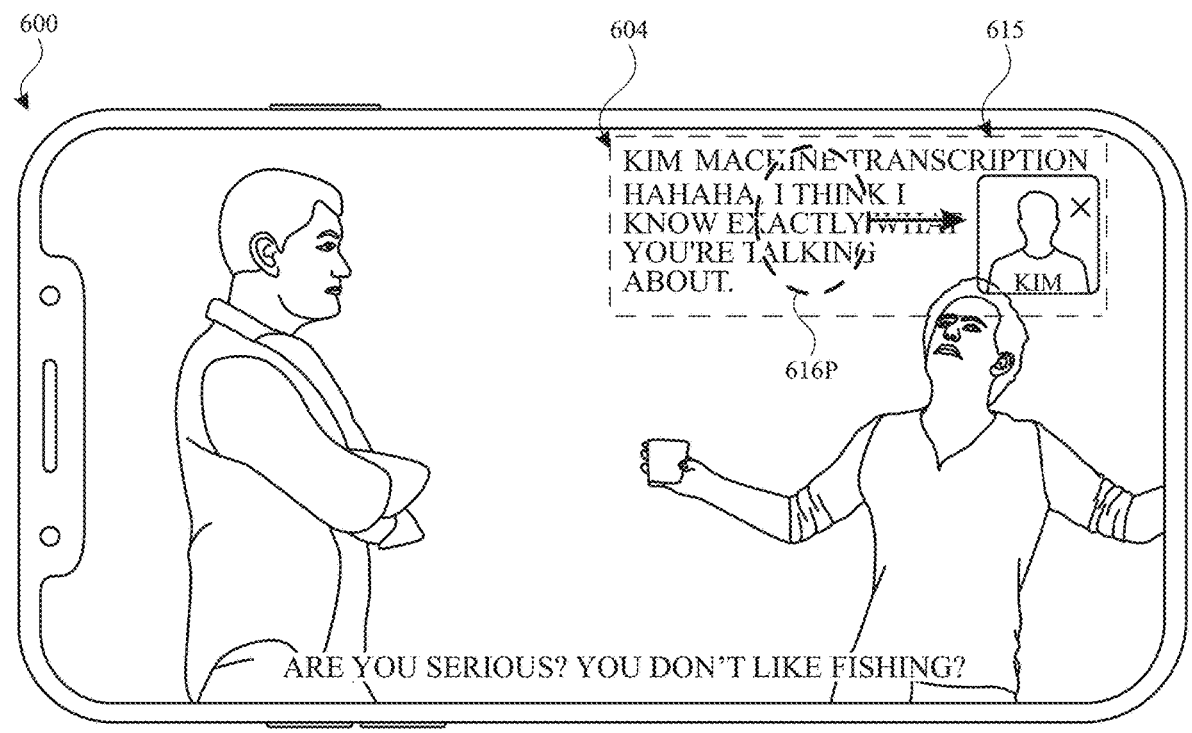
Figure 6V:
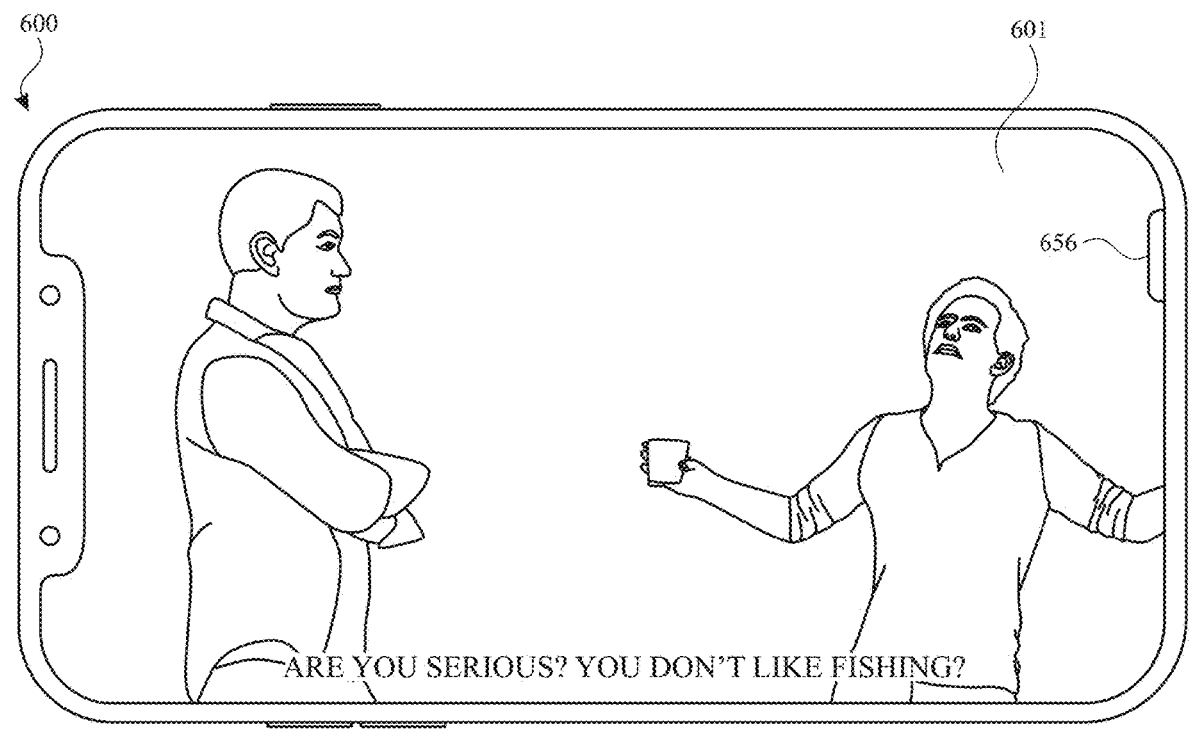

At FIG. 6R, device 600 detects one or more inputs while displaying interface 615. In some embodiments, while displaying interface 615 in the picture-in-picture mode, device 600 detects input 616*i* corresponding to a request to stash captions 604. As depicted, input 616*i* is a swipe gesture on representation 623. In response to detecting input 616*i*, device 600 stashes captions 604 (e.g., as shown in FIG. 6V). In some embodiments, while displaying interface 615 in the picture-in-picture mode, device 600 detects input 616*j* corresponding to a request to move captions 604. As depicted, input 616*j* is a tap and drag gesture. In response to detecting input 616*j*, device 600 moves captions 604-8 to a different location in user interface 615, as shown in FIG. 6S. In some embodiments, while displaying interface 615, device 600 detects input 616*k* corresponding to a request display a device settings menu. As depicted, input 616*k* is a tap and drag gesture at an edge of display 601. In response to detecting input 616*k*, device 600 displays a device settings menu. In some embodiments, the device settings menu includes one or more activatable options which, when activated, toggle (e.g., enable or disable) a wireless communication modality (e.g., cellular, WiFi, and/or Bluetooth), change a brightness of display 601, change a system volume of device 600, and provide other (e.g., system-level) functions. In some embodiments, while displaying interface 615, device 600 detects input 616*l* corresponding to a request scroll captions. As depicted, input 616*l* is a swipe gesture. In response to detecting input 616*l*, device 600 scrolls through captions 604. In some embodiments, while displaying interface 615, device 600 detects input 616*m* corresponding to a request to display an interface of the communications application at a full screen size, such as interface 614 of FIG. 6P. As depicted, input 616*m* is a tap gesture on captions 604. In response to detecting input 616*m*, device 600 displays interface 614 of FIG. 6P. In some embodiments, while displaying interface 615, device 600 detects input 616*n* corresponding to a request to fast forward through movie 652. As depicted, input 616*n* is a tap and drag gesture in the media application (e.g., on a scrubber bar of the media application). In response to detecting input 616*n*, device 600 fast forwards through movie 652. Inputs 616*i*, 616*j*, 616*k*, 616*l*, and/or 616*m* are optionally provided on interface 615 of FIG. 6Q and would cause the same (or similar) response by device 600.

At FIG. 6S, in response to detecting input 616*j*, device 600 displays captions 604 at a different location of interface 615 than captions 604 of FIG. 6R. While displaying interface 615 at FIG. 6S, device 600 detects an input (e.g., rotational movement of device 600) causing a change in an orientation of device 600. As depicted in FIG. 6T, in response to detecting the input, interface 615 transitions from a portrait mode to a landscape mode.

At FIG. 6T, device 600 displays interface 615, including captions 604. As shown, captions 604 are positioned on the display so as to prevent obscuring/overlaying/hiding particular content, such as movie captions 654. In some embodiments, while displaying interface 615, device 600 detects input 616*o* (e.g., a pinch gesture). In response to detecting input 616*o*, device 600 decreases the size of captions 604, as shown in FIG. 6U. In some embodiments, a de-pinching (e.g., spread) gesture increases the size of captions 604. At FIG. 6U, while displaying interface 615, device 600 detects input 616*p*. As depicted, input 616*p* is a swipe gesture. In response to detecting input 616*p*, device 600 stashes captions 604, as shown in FIG. 6V.

At FIG. 6V, device 600 displays stashed graphical object 656, indicating that captions 604 are stashed. As shown, stashed graphical object 656 is displayed along an edge of display 601. While caption area 606 is stashed, device 600 detects that a new caption (e.g., a caption that has not been displayed or a caption for an utterance that was made while caption area 606 was stashed) is available (e.g., because one of the participants said something that resulted in a new caption). In response to detecting a new caption is available, device 600 displays an indication of the new caption. In some examples, the indication of a new caption includes modifying an appearance of stashed graphical object 656 (e.g., modifies a color, shape, location, and/or size).

Figure 6W:
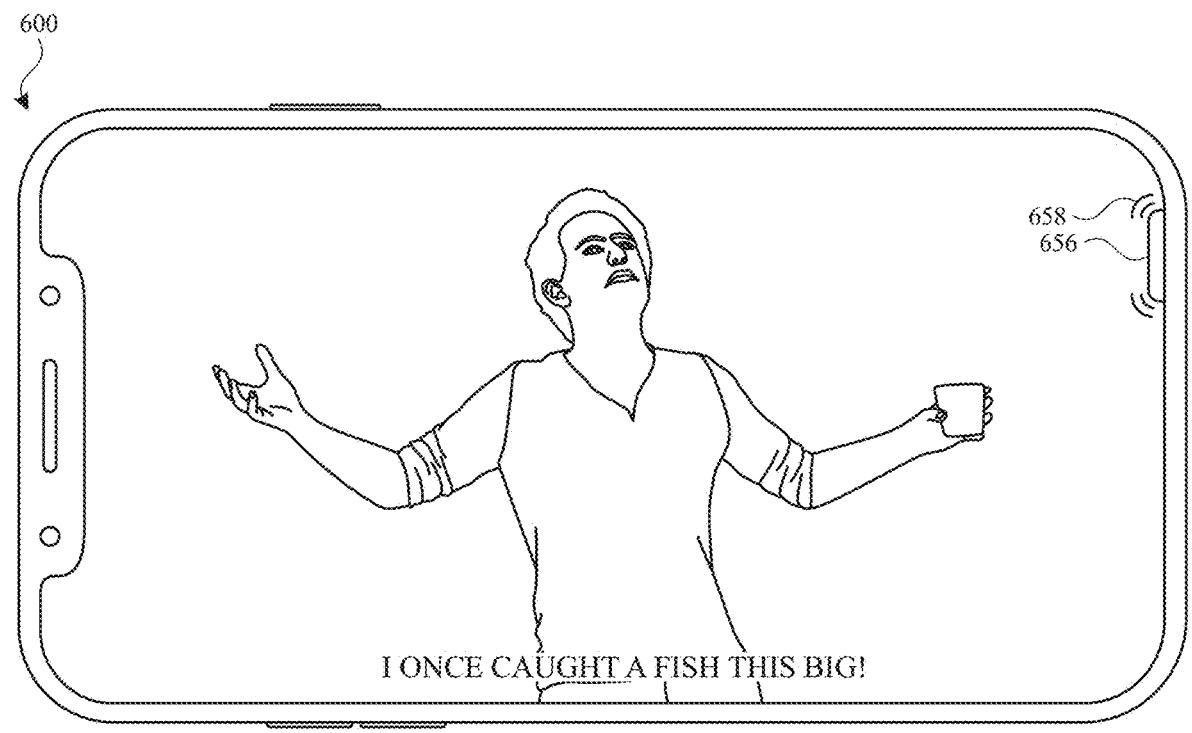

At FIG. 6W, device 600 displays animation 658 to indicate a new caption is available. As shown, animation 658 includes a movement of stashed graphical object 656. In some examples, animation 658 includes changing an appearance of stashed graphical object 656, displaying an additional graphical object, and/or displaying a glow around stashed graphical object 656.

Figure 6X:
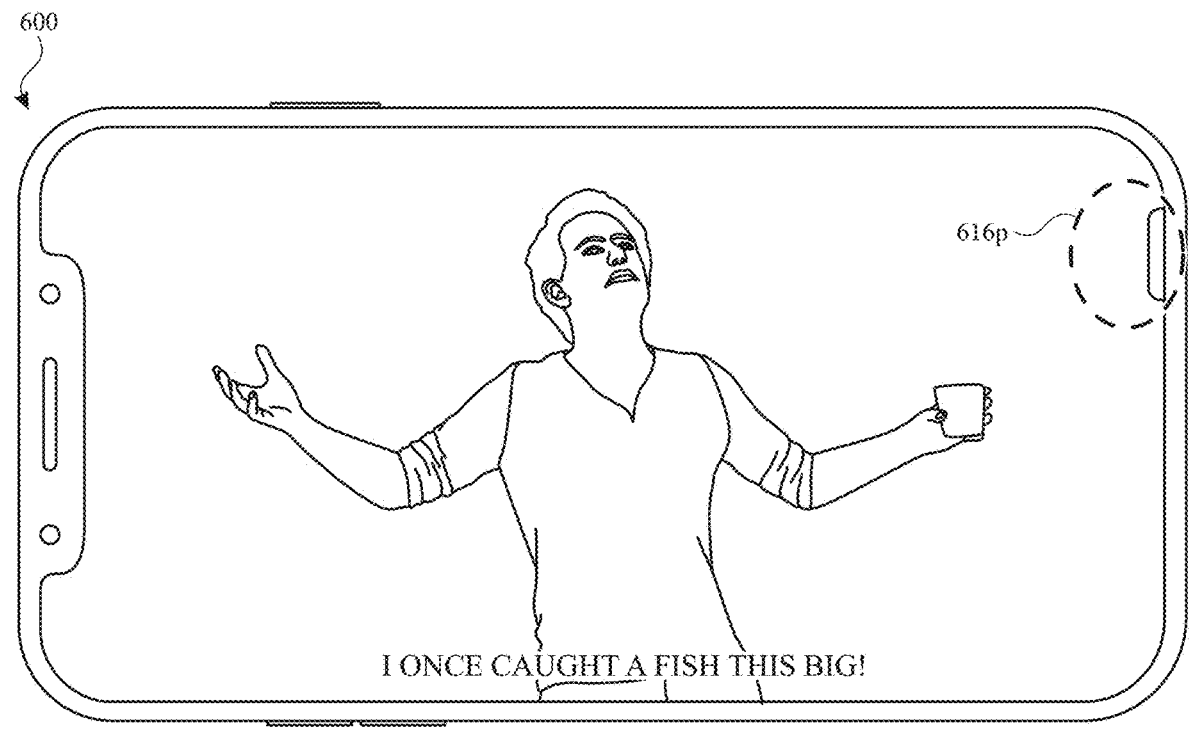

At FIG. 6X, while displaying stashed graphical object 656, device 600 detects input 616*p*. As depicted, input 616*p* is a tap gesture directed at stashed graphical object 656. In response to detecting input 616*p*, device 600 re-displays captions 604, which includes new captions 609-8, as shown in FIG. 6Y.

Figure 6Y:
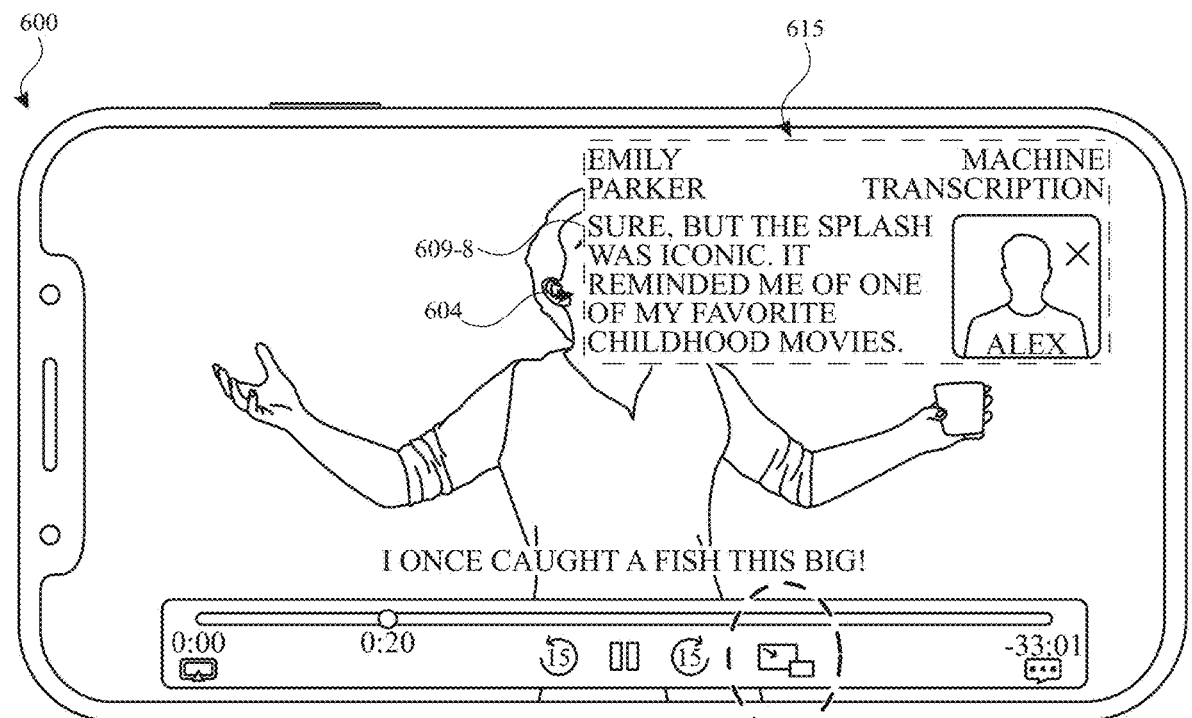
Figure 6A:
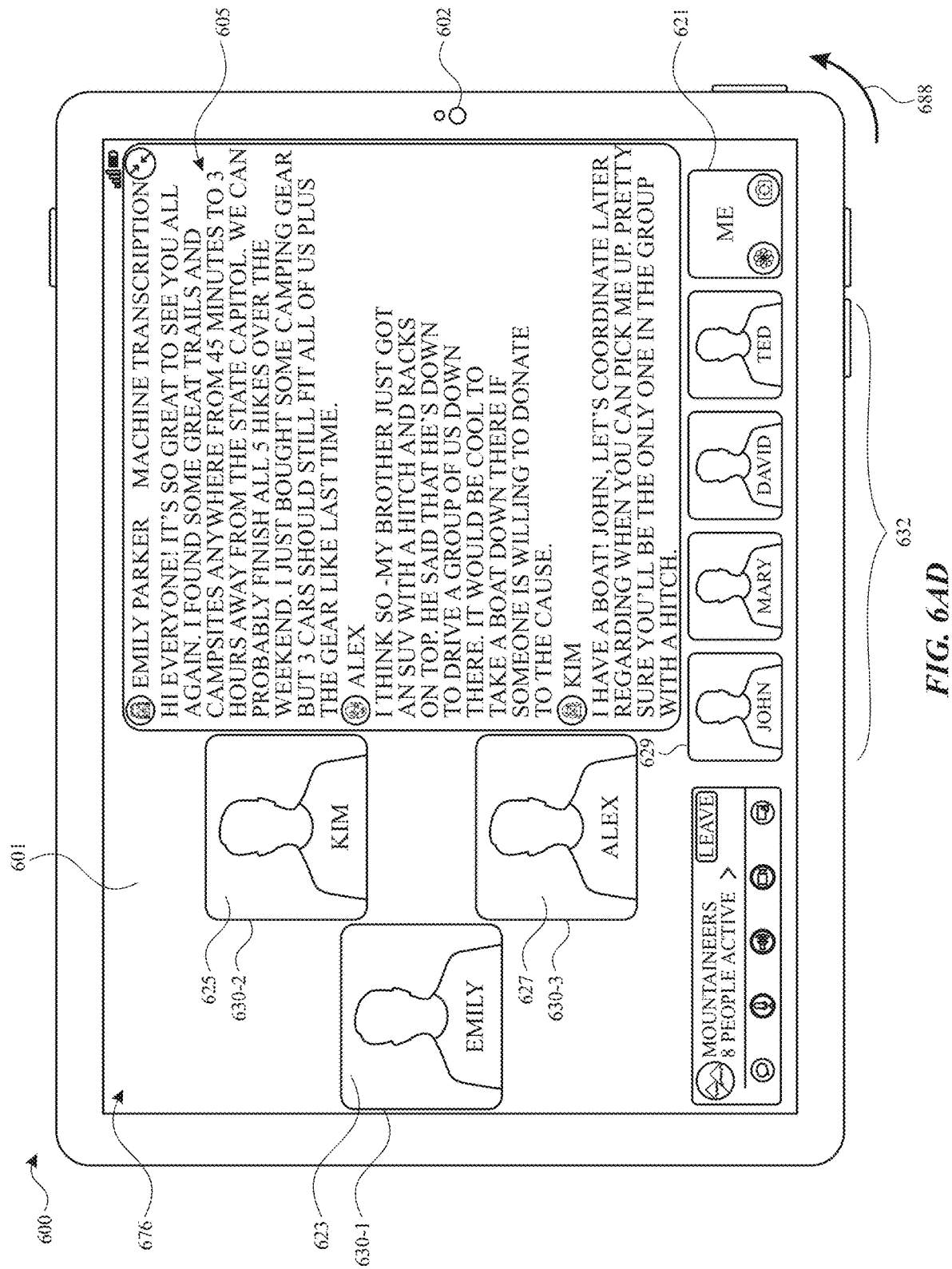
Figure 6A:
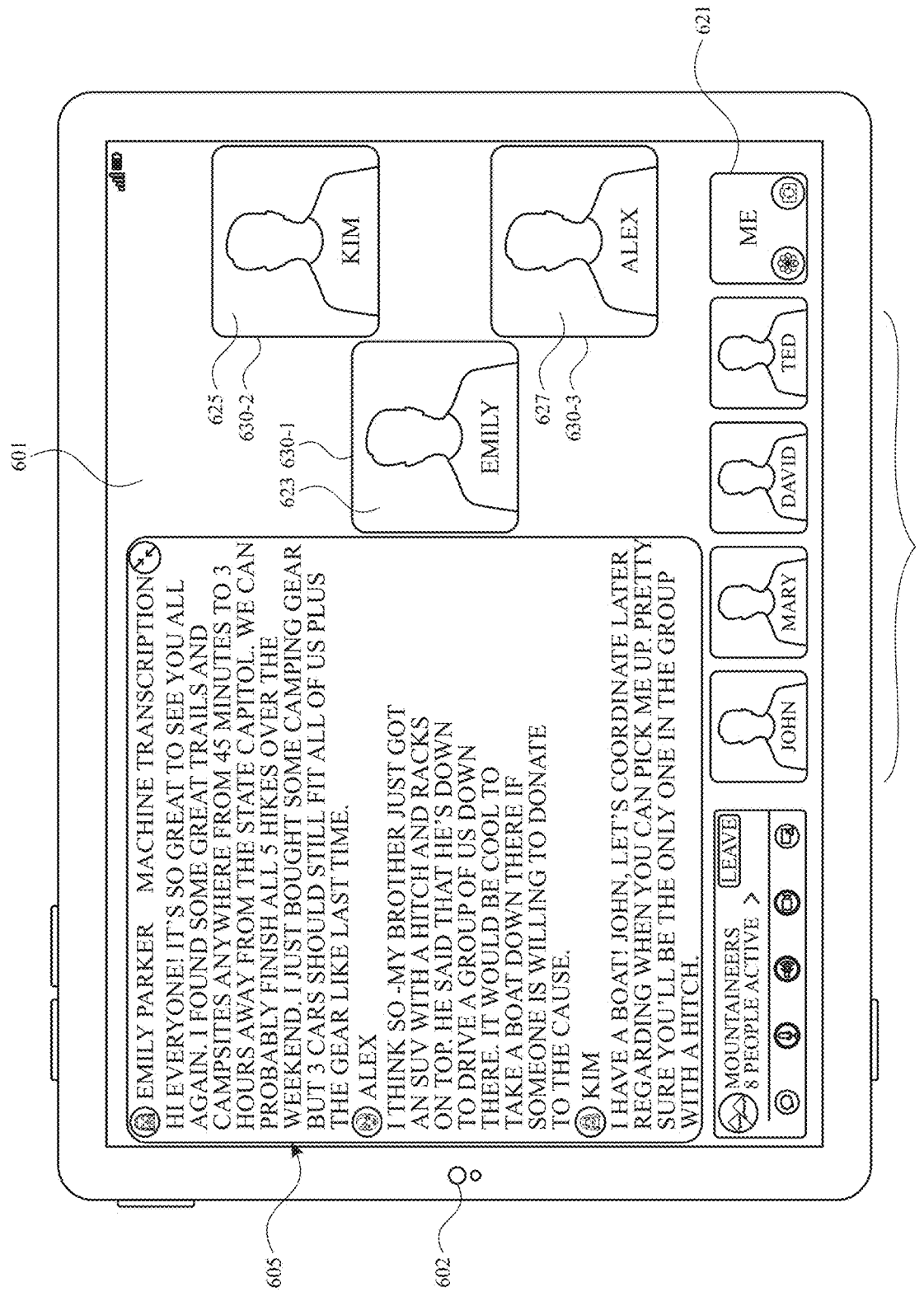

At FIG. 6Y, while displaying interface 615, device 600 detects a movement (e.g., a rotation) of device 600. In response, device 600 displays movie application 651 in a portrait mode. Additionally, while displaying interface 615, device 600 detects input 616*q*. As depicted, input 616*q* is a tap gesture directed at exit full-screen view affordance 660 of movie application 651. In response, device 600 displays interface 615 of FIG. 6Z.

At FIG. 6Z, interface 615 includes captions 604 that are not overlaid on movie 652 and/or a user interface for movie application 651. As depicted, captions 604 are displayed adjacent to movie 652 and/or the user interface for movie application 651. As depicted, interface 615 is displayed with a view of home screen 650 and the user interface for movie application 651 (which currently includes a view of movie 652). While displaying interface 615, device 600 detects input 616*r*. As shown, input 616*r* is a de-pinch gesture. As shown in FIG. 6AA, in response to detecting input 616*r*, device 600 displays movie 652 and/or a user interface for movie application 651 at an enlarged size as compared the size of movie 652 of FIG. 6Z. Additionally, as shown in FIG. 6AA, in response to input 616*r*, device 600 moves captions 604 so as to not obscure a portion (e.g., any portion) of the enlarged size of movie 652 and/or a user interface for movie application 651.

At FIG. 6AA, device 600 detects one or more inputs while displaying interface 615. In some embodiments, while displaying interface 615, device 600 detects input 616*s* corresponding to a request to decrease the size of movie 652 and/or a user interface for movie application 651. As depicted, input 616*s* is a pinch gesture on movie 652 and/or a user interface for movie application 651. In response to detecting input 616*s*, device 600 decreases the size of movie 652 and/or a user interface for movie application 651. In some embodiments, while displaying interface 615, device 600 detects input 616*t* corresponding to a request display a device settings menu. As depicted, input 616*t* is a tap and drag gesture at the edge of display 601. In response to detecting input 616*t*, device 600 displays a settings menu. In some embodiments, the device settings menu includes one or more activatable options which, when activated, toggle (e.g., enable or disable) a wireless communication modality (e.g., cellular, WiFi, and/or Bluetooth), change a brightness of display 601, change a system volume of device 600, and provide other (e.g., system-level) functions. In some embodiments, while displaying interface 615, device 600 detects input 616u corresponding to a request to stash movie 652. As depicted, input 616u is a swipe gesture on movie 652. In response to detecting input 616u, device 600 stashes movie 652. In some embodiments, while displaying interface 615, device 600 detects input 616v corresponding to a request to move captions 604. As depicted, input 616v is a tap and drag gesture. In response to detecting input 616v, device 600 moves captions 604 to a different location (e.g., with respect to a location of movie 652 and/or a user interface for movie application 651). In some embodiments, while displaying interface 615, device 600 detects input 616w corresponding to a request scroll captions. As depicted, input 616w is a swipe gesture. In response to detecting input 616w, device 600 scrolls through captions 604. In some embodiments, while displaying interface 615, device 600 detects input 616x corresponding to a request display a new page of the home screen. As depicted, input 616x is a swipe gesture on the home screen. In response to detecting input 616x, device 600 displays a new page of home screen 650 (e.g., replace display of application icons with different application icons). In some embodiments, while displaying interface 615, device 600 detects input 616y corresponding to a request to stash captions 604. As depicted, input 616y is a swipe gesture on captions 604. In response to detecting input 616y, device 600 stashes captions 604 (e.g., on the left side of the display based on the direction of input 616y).

At FIG. 6AB, an exemplary settings menu is illustrated. As depicted, device 600 displays settings menu 666 for controlling the display of captions. Settings menu 666 includes universal caption option 662 and communication application caption option 664. Universal caption option 662 is a system-wide setting that turns captions on or off for a plurality of applications, for example, including movie application 651 and the communication application. Communication application caption option 664 controls captions for the communication application. As shown, universal caption option 662 and communication application caption option 664 are currently on. In some embodiments, in accordance with a determination that a universal caption option 662 and communication application caption option 664 are on, device 600 displays captions for the communication application (e.g., captions 604 and/or expanded captions 605) and/or movie application 651 (e.g., movie captions 654), as shown in FIGS. 6A-6U and 6Y-6AA. While displaying settings menu 666, device 600 detects input 616z. As depicted, input 616z is a tap gesture directed at universal captions option 662. In response, device 600 turns universal captions option 662 off. In some embodiments, in response to detecting input 616z, device 600 automatically turns communication application caption option 664 off. In some embodiments, in response to detecting universal caption option 662 and communication application caption option 664 are off, device 600 forgoes displaying captions for the communication application (e.g., captions 604 and/or expanded captions 605) and/or forgoes displaying captions for movie application 651 (e.g., movie captions 654). For example, device 600 would forgo displaying captions (e.g., movie captions 654, captions 604, and/or expanded captions 605) in FIGS. 6A-6U and 6Y-6AA. In some embodiments, device 600 subsequently detects an input directed at communication application caption option 664 and, in response, device 600 turns captions back on for the communication application (e.g., without turning captions back on for other applications). In some embodiments, in accordance with a determination that universal caption option 662 is off and communication application caption option 664 is on, device 600 forgoes displaying captions for movie application 651 (e.g., movie captions 654) while displaying captions for the communication application (e.g., captions 604 and/or expanded captions 605). For example, device 600 would forgo displaying movie captions 654 in FIGS. 6T-6AA while continuing to display captions 604 and/or expanded captions 605 in FIGS. 6A-6U and 6Y-6AA.

At FIG. 6AC, an exemplary settings menu is illustrated. As depicted, device 600 displays settings menu 670 including communication session caption option 668. Communication session caption option 668 turns captions on or off for a particular communication session. While displaying settings menu 670, device 600 detects input 616aa. As depicted, input 616aa is a tap gesture directed at communication session caption option 668. In response, device 600 turns communication session caption options 668 off. As such, captions are no longer displayed for a particular communication session.

At FIGS. 6AD-6AE, an exemplary interface is modified based on a location of a camera. At FIG. 6AD, device 600 displays interface 676. Interface 676 includes remote user representations 623, 625, and 627. Representations 623, 625, and 627 occupy dynamic representation areas 630-1, 630-2, and 630-3, respectively. Interface 676 further includes roster 632 and local user representation 621. As depicted, device 600 is in a landscape orientation, with camera 602 located to a right of display 601 (e.g., from the user's perspective). As illustrated, device 600 displays expanded captions 605 adjacent to camera 602. While FIGS. 6AD-6AE illustrated captions as being expanded, the techniques optionally equally apply to unexpanded captions.

While displaying interface 676, device 600 detects movement 688 (e.g., rotational movement) that changes device 600 and/or interface 676 from one landscape orientation, as shown in FIG. 6AD, to another landscape orientation, as shown in FIG. 6AE. As depicted in FIG. 6AE, device 600 and/or interface 676 is in a landscape orientation in which camera 602 is located to the left of display 601 (e.g., from the user's perspective). In response to detecting movement 688, device 600 displays expanded captions 605 adjacent to the location of camera 602. In some embodiments, the location of remote user representations 623, 625, and 647 changes in response to detecting movement 688. In some embodiments, the location and/or size of roster 686 does not change in response to detecting movement 688.

FIG. 7 is a flow diagram illustrating a method for displaying expanded caption information in a live communication session using a computer system in accordance with some embodiments. Method 700 is performed at a computer system (e.g., 100, 300, 500, 600) (e.g., a smartphone, a tablet, a laptop computer, and/or a desktop computer) that is in communication with a display generation component (e.g., 601) (e.g., a display controller, a touch-sensitive display system, and/or a monitor) and one or more input devices (e.g., 601) (e.g., a touch-sensitive surface, a keyboard, a controller, and/or a mouse). Some operations in method 700 are, optionally, combined, the orders of some operations are, optionally, changed, and some operations are, optionally, omitted.

As described below, method 700 provides an intuitive way for displaying expanded caption information. The method reduces the cognitive burden on a user for managing captions of a live communication session, thereby creating a more efficient human-machine interface. For battery-operated computing devices, enabling a user to manage expanded caption information faster and more efficiently conserves power and increases the time between battery charges.

The computer system displays (702), via the display generation component, a live communication user interface (e.g., 614) (e.g., an interface for an incoming and/or outgoing live audio/video communication session), the live communication user interface (e.g., of a live communication application) corresponding to a live communication session (e.g., the live communication session depicted in FIGS. 6A-6AA) (In some embodiments, the live communication session is between a first user of the computer system (e.g., a first computer system) and a second user of a second computer system). The live communication user interface includes (704) one or more representations (e.g., 621, 623, 625, 627, and/or 629) (e.g., avatar, still image and/or video (e.g., live video feed)) of one or more participants (e.g., 620, 622, 624, 626, and/or 628) (e.g., the first user and/or the second user) of the live communication session, wherein a first representation (e.g., 621, 623, 625, 627, and/or 629) of the one or more representations of the one or more participants is displayed at a location and at a size in the live communication user interface. In some embodiments, the first representation has a centroid (e.g., a center of the displayed representation). The live communication user interface includes (706) a first caption (e.g., 604) (e.g., caption information for one or more utterances and/or transcription of one or more utterances) in a first area (e.g., 606 in FIGS. 6A and/or 606 in FIG. 6D) of the live communication user interface, the first caption corresponding to (e.g., transcribing and/or describing) a first portion of audio data of (e.g., received, processed, and/or transmitted as part of) the live communication session (e.g., one or more utterances and/or background sounds as described in reference to FIG. 6A). In some embodiments, the first caption is a transcript of words (or sounds) spoken or uttered by the one or more participants that are displayed in the live communication session. In some embodiments, the live communication user interface does not display a caption for at least one of the one or more participants (e.g., the first user of first computer system) that is displayed in the live communication user interface. In some embodiments, the first caption overlaps (e.g., obscures and/or hides) a portion (e.g., some but not all) of the one or more representations of the one or more participants.

While displaying the live communication user interface with the first caption in the first area of the live communication user interface, the computer system detects (708), via the one or more input devices, an input (e.g., 616a and/or 616d) that corresponds to a request to display expanded caption information.

In response to (710) detecting the input that corresponds to a request to display expanded caption information, the computer system displays (712), via the display generation component, a second caption (e.g., 605) corresponding to a second portion of audio data of (e.g., received, processed, and/or transmitted as part of) the live communication session (e.g., as depicted in FIG. 6B and/or as depicted in FIG. 6G), different from the first portion of audio data (e.g., at a different and/or non-overlapping time) of the live communication session, the second caption displayed at a second area (e.g., 606 in FIG. 6B and/or 606 in FIG. 6D) of the live communication user interface. In some embodiments, the second caption displayed in the second area does not overlap (e.g., obscure and/or hide) the one or more representations (including the first representation) of the one or more participants. In some embodiments, the second area of the second caption is larger than the first area of the first caption. In some embodiments, the first area is different from the second area. In response to (710) detecting the input that corresponds to a request to display expanded caption information, the computer system modifies (714), via the display generation component, the location of the first representation and/or size of the first representation in the live communication user interface (e.g., as described in reference to FIGS. 6A-6B and/or FIGS. 6E-6G). In some embodiments, modifying the location of the first representation includes moving a centroid (e.g., the center of the representation) of the first representation. In some embodiments, modifying the size of the first representation includes changing the size of the first representation from a first size to a modified size that is different (e.g., larger or smaller) from the first size. In some embodiments, modifying the location and/or size of the first representation includes cropping a first portion (e.g., and not a second portion) of the first representation. In some embodiments, the second area of the live communication user interface (e.g., the area in which the second caption is displayed) is an area of the display that was occupied by the first representation before it is modified (e.g., the second caption occupies an area of the display that was previously occupied by a portion of the first representation). Automatically modifying a location and/or size of a representation in response to a request to display additional caption information enhances the communication session experience by allowing a user to maintain a view of at least one participant while also viewing an additional transcript of the conversation (e.g., transcript of an earlier point in the conversation) without requiring further input from the user, thereby reducing the number of inputs needed to perform the operations.

In some embodiments, modifying the location of the first representation and/or the size of the first representation includes modifying (e.g., reducing or increasing) the size of the first representation (e.g., as described in reference to FIGS. 6A-6B and/or FIGS. 6E-6G) in the live communication user interface. In some embodiments, while displaying the live communication user interface with the first caption in the first area of the live communication user interface, the computer system displays a second representation (e.g., 623 in FIGS. 6A-6B, 623 in FIGS. 6E-6G, 627 in FIGS. 6E-6G, and/or 621 optionally changes sizes in FIGS. 6A-6B, 6E-6G) of the one or more participants, wherein the first representation corresponds to a first participant (e.g., 620, 622, 624, 626, and/or 628) and the second representation corresponds to a second participant (e.g., 620, 622, 624, 626, and/or 628). In response to detecting the input that corresponds to a request to display expanded caption information, the computer system modifies, via the display generation component, a size of the second representation in the live communication user interface (e.g., 621, 623, 625, 627, and/or 629). In some embodiments, modifying the size of the second representation includes increasing or decreasing the size of the second representation. Automatically modifying a size of the first representation and the second representation in response to a request to display additional caption information enhances the communication session experience by allowing a user to maintain a view of at least two participants while also viewing an additional transcript of the conversation without requiring further input from the user, thereby reducing the number of inputs needed to perform the operations.

In some embodiments, the first representation is a representation of a user (e.g., 620) (e.g., first participant) of the computer system (e.g., the first representation includes an image/avatar of the user of the computer system and/or the first representation is based on a live video captured by a camera of the computer system). Modifying the size of the representation of the user of the computer system provides the user with visual feedback that additional caption information is being displayed, thereby providing improved feedback. Automatically modifying a size of a representation of the user of the computer system in response to a request to display additional caption information enhances the communication session experience by changing the size of the representation of the user while also displaying additional transcript of the conversation without requiring further input from the user, which reduces the number of inputs needed to perform an operation.

In some embodiments, modifying the size of the first representation includes decreasing the size of the first representation (e.g., 623 depicted in FIGS. 6A-6B and/or 623 depicted in FIGS. 6E-6G) (e.g., decreasing the size of a representation of a user of the computer system). Additionally or alternatively, modifying the size of the second representation includes increasing the size of the second representation (e.g., 627 depicted in FIGS. 6E-6G). Automatically increasing a size of a representation of one participant while decreasing the size of a representation of another participant in response to a request to display additional caption information enhances the communication session experience by providing a larger view one participant while decreasing a view of another participant without requiring further input from the user and by providing visual feedback that additional caption information is being displayed, which provides improved visual feedback and reduces the number of inputs needed to perform an operation.

In some embodiments, modifying the location of the first representation and/or size of the first representation includes moving the first representation from a first location to a second location in the live communication user interface (e.g., as depicted by 623 in FIGS. 6A-6B, as depicted by 623 in FIGS. 6E-6G, and/or as depicted by 627 in FIGS. 6E-6G). In some embodiments, while displaying the live communication user interface with the first caption in the first area of the live communication user interface, the computer system displays a second representation (e.g., 621, 623, 625, 627, and/or 629) of the one or more participants, wherein the first representation corresponds to a first participant (e.g., 620, 622, 624, 626, and/or 628) and the second representation corresponds to a second participant (e.g., 620, 622, 624, 626, and/or 628). In response to detecting the input that corresponds to a request to display expanded caption information, the computer system moves, via the display generation component, the second representation from a third location to a fourth location in the live communication user interface (e.g., as depicted by 623 in FIGS. 6A-6B, as depicted by 623 in FIGS. 6E-6G, and/or as depicted by 627 in FIGS. 6E-6G). Automatically modifying a location of the first representation and the second representation in response to a request to display additional caption information provides the user with visual feedback that additional caption information is being displayed and enhances the communication session experience by moving the first representation and second representation so as to accommodate the display of the additional transcript of the conversation without requiring further input from the user, which provides improved visual feedback and reduces the number of inputs needed to perform an operation.

In some embodiments, the computer system changes a number of the one or more representations that are displayed in the live communication user interface (e.g., as depicted by changing a number of representations in FIGS. 6E-6G and/or device 600 ceases to display roster 632 and/or local user representation 621) (e.g., adding a representation to increase the number of the one or more representations that are displayed or ceasing display of a representation so as to decrease the number of the one or more representations that are displayed). In some embodiments, the computer system changes the number of the one or more representations that are displayed in the live communication user interface in response to detecting the input that corresponds to the request to display expanded caption information. Automatically modifying a quantity of the one or more representations provides the user with visual feedback that additional caption information is being displayed and enhances the communication session experience by accommodating the display of other content of the communication session (e.g., additional caption information or an active participant) without requiring further input from the user, which provides improved visual feedback and reduces the number of inputs needed to perform an operation.

In some embodiments, changing the number of the one or more representations includes ceasing to display at least one representation (e.g., as depicted by changing a number of representations in FIGS. 6E-6G and/or device 600 ceases to display roster 632 and/or local user representation 621) (e.g., a roster of the one or more participants, a grid of the one or more participants, or a representation of an active or recently active participant) of the one or more representations of the one or more participants. In some embodiments, the computer system ceases to display the at least one representation of the one or more participants in response to the input corresponding to the request display expanded caption information. In some embodiments, the computer system ceases to display the at least one representation of the one or more participants in response to a participant not talking (e.g., not speaking or being silent). In some embodiments, changing the number of the one or more representations includes increasing the number of the one or more representations. Automatically ceasing to display of at least one representation of the one or more participants provides the user with visual feedback that additional caption information is being displayed and enhances the communication session experience by accommodating the display of additional content (e.g., additional caption information or an active participant) without requiring further input from the user, which provides improved visual feedback and reduces the number of inputs needed to perform an operation.

In some embodiments, in response to detecting the input that corresponds to a request to display expanded caption information, the computer system displays a dynamic representation of participants (e.g., 623 and/or 629 in FIG. 6D and/or 623, 625, and 627 depicted in FIG. 6AD) in the live communication session that changes from being a representation of one participant (e.g., 623 depicted in FIG. 6D) to being a representation of a different participant (e.g., 627 depicted in FIG. 6E) based on changes in activity levels of one or more of the participants (e.g., as described in reference to FIG. 6D) (e.g., the participant currently speaking and/or the participant currently speaking the loudest) in the live communication session. In some embodiments, the first representation changes from representing a single participant to representing various participants (e.g., a participant that satisfies a predetermined condition of activity (e.g., audio activity or visual activity)). Changing a representation based on the activity level of a participant provides the user with visual feedback that additional caption information is being displayed and enhances the communication session experience by decluttering the user interface to allow the user to focus on the most active participant without requiring further input from the user, which provides improved visual feedback and reduces the number of inputs needed to perform an operation.

In some embodiments, the computer system concurrently displays, with the second caption and the first representation, a second representation of the one or more representations of the one or more participants (e.g., 621 and 623 depicted in FIG. 6B and/or 621, 623, 625, 627, and/or 629 depicted in FIG. 6D), wherein the first representation corresponds to a first participant and the second representation corresponds to a second participant. Concurrently displaying a caption with the first representation and the second representation (e.g., when the system receives a request to display expanded caption information) enhances the communication session experience by allowing a user to view a transcript of the communication session along with images corresponding to at least two participants who are participating in the communication session without requiring further input from the user, which reduces the number of inputs needed to perform an operation.

In some embodiments, the one or more participants includes a first participant (e.g., 622 depicted in FIG. 6D) and a second participant (e.g., 628 depicted in FIG. 6D). In some embodiments, in accordance with a determination that a respective caption (e.g., 604 depicted in FIG. 6D) for a respective portion of audio data (e.g., the first portion of audio data or the second portion of audio data) corresponds to the first participant, the computer system displays an indication (e.g., as described in reference to 610 in FIG. 6A) (e.g., a graphical and/or textual object and/or displayed adjacent to the respective caption) indicating that the respective caption corresponds to the first participant. In accordance a determination that the respective caption for the respective portion of audio data corresponds to the second participant, the computer system displays an indication (e.g., a graphical and/or textual object and/or displayed adjacent to the respective caption) indicating that the respective caption corresponds to the second participant (e.g., as depicted in FIG. 6D, "Emily" is displayed above captions associated with Emily and "John Appleseed" is displayed above captions associated with John Appleseed). Displaying an indication indicating that the caption corresponds to a particular participant enhances the communication session experience by providing a context for the caption when different participants speak and provided the user with feedback about which speaker the caption corresponds to, which provides improved visual feedback.

In some embodiments, detecting the input that corresponds to a request to display expanded caption information includes detecting a drag gesture directed at the first caption (e.g., as described with reference to FIG. 6A) (e.g., a drag down gesture, a drag up gesture, a pinch gesture, and/or an de-pinch gesture). Displaying additional caption information in response to detecting a drag gesture directed at the caption provides the user with feedback that the drag gesture was detected and helps to prevent the user from unintentionally displaying additional caption information, thereby providing improved feedback and enhancing the user-machine interface.

In some embodiments, detecting the input that corresponds to a request to display expanded caption information includes detecting a tap gesture directed at the first caption (e.g., 616a depicted in FIG. 6A) (e.g., the tap gesture may be on an expand affordance associated with the first caption). Displaying additional caption information in response to detecting a tap gesture directed at the caption provides the user with feedback that the tap gesture was detected and enables the user to quickly cause display of additional caption information, thereby providing improved feedback and enhancing the user-machine interface.

In some embodiments, while displaying the live communication user interface with the first caption in the first area of the live communication user interface, the computer system displays a roster of participants (e.g., 632 depicted in FIG. 6D). In response to detecting the input that corresponds to a request to display expanded caption information and in accordance with a determination that the computer system is not displaying shared (e.g., video and/or text) content (In some embodiments, in accordance with a determination that the live communication session does not include streaming (for viewing by multiple participants) of a non-live video source and/or does not include streaming of a video source (for viewing by multiple participants) not originating from a camera of one of the participants' devices (e.g., a movie application, TV streaming application, and/or or a video from social media website)), the computer system maintains display, via the display generation component, of the roster of participants (e.g., 632 depicted in FIG. 6G) (e.g., some or all of the participants of the live communication session; without changing the participants shown in the roster or with changing the participants shown in the roster). In some embodiments, the roster of participants includes a plurality of representations of the one or more participants participating in the live communication session. Maintaining display of the roster of participants when the computer system is not displaying shared content provides the user with visual feedback about the state of the live communication session and, in particular, which individuals are still participants.

In some embodiments, while displaying the live communication user interface with the first caption in the first area of the live communication user interface, the computer system displays a roster of participants (e.g., 632 depicted in FIG. 6D) that includes a plurality of representations of different participants (e.g., 627 and 625 depicted in FIG. 6D) that are smaller than other representations (e.g., 621, 623, 629 depicted in FIG. 6D) (e.g., the first representation and/or the second representation) of participants in the live communication user interface. In response to detecting the input that corresponds to a request to display expanded caption information and in accordance with a determination that the computer system is displaying shared (e.g., video and/or text) content (In some embodiments, in accordance with a determination that the live communication session includes streaming (for viewing by multiple participants) of a non-live video source and/or includes streaming of a video source (for viewing by multiple participants) not originating from a camera of one of the participants' devices (e.g., a movie application, TV streaming application, and/or or a video from social media website)), the computer system ceases to display, via the display generation component, the roster of participants (e.g., device 600 ceases to display roster 632 depicted in FIG. 6G). In some embodiments, the currently-displayed portion of the roster updates less frequently than a dynamic representation area that includes a representation of a participant (e.g., an active (or most active) participant). In some embodiments, representations of participants are moved between the roster and the dynamic representation area based on the activity levels of the participants (e.g., most active participant is moved from the roster to the dynamic representation area). In some embodiments, the roster is scrollable (e.g., a user can scroll through the roster which includes ceasing to display a plurality of representations of a first subset of the one or more participants in the live communication session and displaying a plurality of representations of a second subset of the one or more participants in the live communication session that is different from the first subset of the one or more participants and is displayed at a location that was previously occupied by the plurality of representations of the first subset of the one or more participants in the live communication session, for example by shifting the plurality of representations of the first subset of the one or more participants in the live communication session out of the display region in a first direction and shifting the plurality of representations of the second subset of the one or more participants in the live communication session into the display region in the first direction). In some embodiments, the roster includes one or more less active participants (e.g., as compared to one or more participants whose representations are displayed in the dynamic representation area). Ceasing to display the roster of participants when shared content is being displayed enables the computer system to display more of the shared content and/or to display the shared content using a larger size, thereby improving the man-machine interface.

In some embodiments, while displaying, via the display generation component, the second caption, the computer system detects a scroll input (e.g., 616e depicted in FIG. 6G) corresponding to a request to scroll the second caption. In response to detecting the scroll input, the computer system scrolls a portion of second caption, including displaying a first portion (e.g., 609-2 and/or 609-3 as depicted in FIG. 6H) of one or more captions (e.g., that were not previously displayed); and ceasing to display a second portion of one or more captions (e.g., device 600 ceases to display captions 605 depicted in FIG. 6G). In some embodiments, in response to detecting the scroll input corresponding to a request to scroll the second caption, the computing system scrolls through captions for the communication session. In some embodiments, in response to detecting the scroll input corresponding to a request to scroll the second caption, the computing system ceases to display one or more captions for a most recent utterance of the communication session and displays one or more captions for an utterance for an earlier portion of the communication session (e.g., the computer system can scroll through historic captions for the current communication session). In some embodiments, scrolling through the captions of the communication session allows a user to review content the user missed during the communication session. Scrolling the captions enables the computer system to display additional caption information of the live communication session if, for example, the user missed a portion of the conversation (e.g., by taking her eyes off her device), which provides the user with feedback about the content that was transmitted as part of the live communication session, thereby improving visual feedback.

In some embodiments, in accordance with a determination that the second caption (and/or first caption) is scrollable, text of the second caption (and/or first caption) is displayed with a first visual property (e.g., a top portion of captions 605 are gray as depicted in FIG. 6G) (e.g., to indicate the text is scrollable or to indicate that there is an additional transcript available) (e.g., a portion (e.g., top portion and/or bottom portion) of the text is dimmed, faded, and/or is partially transparent). In accordance with a determination that the second caption (and/or first caption) is not scrollable, text of the second caption (and/or first caption) is not displayed with the first visual property (e.g., a bottom portion of captions 605 are not gray as depicted in FIG. 6G) (e.g., the text is not dimmed, not faded, and/or is not partially transparent). Modifying a visual property of text of the caption when the caption is scrollable (as compared to when it is not scrollable) provides the user with visual feedback that the caption is scrollable, thereby providing improved feedback.

In some embodiments, an availability to navigate through the captions is limited based on a point in time at which the computer system joined the live communication session (e.g., as described with reference to FIG. 6G). In some embodiments, the computer system can receive inputs to navigate through the transcript to view transcriptions of utterances of the participants between the time that the computer system joined the live communication session until the current time, but transcripts of utterances of the participants from before the time that the computer system joined the live communication system are unavailable and cannot be navigated to. Providing caption of the communication session only from the point in time at which the user/computer system joined the communication session enhances the communication session experience because it maintains the privacy of a conversation between participants that occurred prior to the user joining the communication session, which provides privacy and improves security of content.

In some embodiments, the computer system displays, via the display generation component, a settings user interface (e.g., 666 depicted in FIG. 6AB) (e.g., in response to a request to display the settings user interface). While displaying the settings user interface, the computer system detects an input corresponding to a request to modify a caption setting (e.g., 616z and/or an input directed at communication application caption option 664 depicted in FIG. 6AB). In response to detecting the input corresponding to a request to modify the caption setting, the computer system modifies the caption setting (e.g., as depicted in FIG. 6AB). Subsequent to modifying the caption setting, the computer system receives a request to join a second live communication session (e.g., a live communication session that is different from the live communication session depicted in FIGS. 6A-6P). In response to receiving the request to join the second live communication session, the computer system joins the second live communication session. In response to receiving the request to join the second live communication session and in accordance with a determination that the caption setting indicates that captions are enabled, the computer system displays, via the display generation component, one or more captions based on audio data of one or more participants of the second live communication session (e.g., device 600 displays captions similar to captions 604 and/or expanded captions 605 depicted in FIGS. 6A-6P). In response to receiving the request to join the second live communication session and in accordance with a determination that the caption setting indicates that captions are not enabled, the computer system forgoes display, via the display generation component, of the one or more captions based on audio data of the one or more participants of the second live communication session (e.g., device 600 forgoes displaying captions similar to captions 604 and/or expanded captions 605 depicted in FIGS. 6A-6P). Providing a caption setting in a settings user interface for live communication sessions enhances the communication session experience because it allows a user to intuitively turn captions on or off for multiple communication sessions (e.g., a current and future communication sessions), thereby reducing the number of inputs needed to perform an operation.

In some embodiments, subsequent to modifying the caption setting, the computer system receives a request to stream (e.g., via the second live communication session) shared (e.g., video) content (e.g., content similar to movie 652) (In some embodiments, in accordance with a determination that the live communication session does not include streaming (for viewing by multiple participants) of a non-live video source and/or does not include streaming of a video source (for viewing by multiple participants) not originating from a camera of one of the participants' devices). In response to receiving the request to stream shared content (e.g., the second live communication session), the computer system streams the shared content (e.g., via the second live communication session). In response to receiving the request to stream shared content (e.g., the second live communication session) and in accordance with a determination that the caption setting indicates that captions are enabled (e.g., universal captions option 662 of FIG. 6AB is on), the computer system displays, via the display generation component, one or more captions of the shared content (e.g., captions similar to movie captions 654). In response to receiving the request to stream shared content (e.g., the second live communication session) and in accordance with a determination that the caption setting indicates that captions are not enabled (e.g., universal captions option 662 of FIG. 6AB is off), the computer system forgoes display, via the display generation component, of the one or more captions of the shared content. Controlling captions for both a streaming content (e.g., a movie, a show) and for audio of participants of the live communication session enables the computer system to enable or disable captions for both types of media with a single user input, thereby reducing the number of inputs needed to perform the operations.

In some embodiments, during the live communication session, the computer system displays, via the display generation component, a second settings user interface (e.g., 670 depicted in FIG. 6AC) (e.g., in response to a request to display the settings user interface). While displaying the second settings user interface, the computer system detects an input (e.g., 616aa depicted in FIG. 6AC) corresponding to a request to modify a second caption setting (e.g., communication session caption option 668 depicted in FIG. 6AC). In response to detecting the input corresponding to a request to modify the second caption setting, the computer system modifies the second caption setting. In accordance with a determination that the second caption setting indicates that captions are enabled (e.g., communication session caption option 668 depicted in FIG. 6AC is on), the computer system displays, via the display generation component, one or more captions (e.g., captions similar to captions 604 and/or expanded captions 605 depicted in FIGS. 6A-6P) based on audio data of participants of the live communication session (e.g., transitioning from not displaying captions to displaying captions). In accordance with a determination that the second caption setting indicates that captions are not enabled (e.g., communication session caption option 668 depicted in FIG. 6AC is off), the computer system ceases display, via the display generation component, of the one or more captions based on audio data of participants of the live communication session (e.g., transitioning from displaying captions to not displaying captions). In some embodiments, the second caption is specific to the current/active live communication session, and the setting is not maintained for future live communication sessions. Controlling captions for a particular live communication session enhances the communication session experience because it enables the computer system to temporarily activate or deactivate captions for a current live communication session while not changing caption settings for all future communication sessions.

In some embodiments, concurrently, a first participant in the live communication session utters a plurality of words (e.g., words corresponding to captions 604 for remote user 622 depicted in FIG. 6J) and a second participant in the live communication session utters a plurality of words (e.g., words corresponding to captions 604 for remote user 624 depicted in FIG. 6K). In some embodiments, the computer system displays, via the display generation component (e.g., on a first line), captions for the plurality of words uttered by the first participant grouped together and associated with a representation of the first participant (e.g., captions 604 for remote user 622 are displayed in association with Emily's name and image as depicted in FIG. 6J and/or FIG. 6L). The computer system displays, via the display generation component (e.g., on a second line), captions for the plurality of words uttered by the second participant grouped together and associated with a representation of the second participant (e.g., captions 604 for remote user 624 are displayed in association with Kim's name and image as depicted in FIG. 6K). In some embodiments, the plurality of words uttered by the first participant are displayed on a first line and the words uttered by the second participant are displayed on a second line. Subsequent words In some embodiments, when two participants are speaking at the same time, captions for the words the first participant speaks are grouped together and displayed together before captions for the words spoken by the second participant are displayed. In some embodiments, words for a respective participant are grouped together based on detecting a pause in speech (e.g., of 0.5 seconds or 1 second) (e.g., when the participant has finished his or her sentence or when the participant has remained silent for a predetermined period of time). In some embodiments, the computer system displays the captions for the plurality of words uttered by the second participant grouped together and associated with the representation of the second participant subsequent to displaying the captions for the plurality of words uttered by the first participant grouped together and associated with the representation of the first participant. Displaying captions for an utterance for a respective participant as a group of spoken words once the utterance by the respective participant is finished provides the user with visual feedback about the timing of when participants have spoken, thereby providing enhanced visual feedback.

In some embodiments, concurrently, a first participant (e.g., remote user 622 depicted in FIG. 6J) of the live communication session utters a plurality of words (e.g., words corresponding to captions 604 for remote user 622 depicted in FIG. 6J) and a second participant (e.g., remote user 624 depicted in FIG. 6K) of the live communication session utters a plurality of words (e.g., words corresponding to captions 604 for remote user 624 depicted in FIG. 6K). In some embodiments, the computer system displays, via the display generation component (e.g., on a first line), a caption for a first word of the plurality of words uttered by the first participant (e.g., device 600 displays "doesn't"

depicted in FIG. 6J). Subsequent to displaying the caption for the first word of the plurality of words of the first participant, the computer system displays, via the display generation component (e.g., on a second line), a caption for a first word of the plurality of words uttered by the second participant (e.g., device 600 displays "Thanks" depicted in FIG. 6K). Subsequent to displaying the caption for the first word of the plurality of words of the second participant, the computer system displays, via the display generation component (e.g., on the first line), a caption for a second word of the plurality of words uttered by the first participant (e.g., device 600 displays "mean" depicted in FIG. 6L). In some embodiments, the computer system displays the caption for the first word uttered by the first participant and the caption for the second word uttered by the first participant grouped together and associated with the representation of the first participant. In some embodiments, subsequent to displaying the caption for the first word of the plurality of words uttered by the second participant, the computer system displays a caption for a second word of the plurality of words of the second participant grouped together with the caption for the first word uttered by the second participant and associated with the representation of the second participant. In some embodiments, subsequent to displaying the caption for the second word of the plurality of words of the first participant, the computer system displays, via the display generation component (e.g., on the second line), a caption for a second word of the plurality of words uttered by the second participant. In some embodiments, in accordance with a determination that utterances by at least two participants overlap, the computer system displays one or more captions for a first participant on a first row. While displaying the one or more captions for the first participant on the first row, the computer system displays one or more captions for a second participant on a second row. While displaying the one or more captions for the second participant on the second row and displaying the one or more captions for a first participant on a first row, the computer system displays one or more new captions for the first participant on the first row. Displaying captions for words uttered by participants without grouping words together provides visual feedback about the timing at which the individual words are uttered and which user uttered the words, thereby providing improved visual feedback.

In some embodiments, the caption for the first word of the plurality of words uttered by the first participant is displayed on a first line (e.g., 640 as depicted in FIG. 6J), the caption for the first word of the plurality of words uttered by the second participant is displayed on a second line (e.g., 642 as depicted in FIG. 6K) (e.g., below the first line), and the caption for the second word of the plurality of words uttered by the first participant is displayed on a third line (e.g., device 600 displays "mean" on a new line under line 642) (e.g., below the second line). In some embodiments, earlier displayed lines of captions scroll up as a new line of caption is displayed. In some embodiments, the computer system displays a plurality of words (e.g., in the first caption or in the second caption) one word at a time on a first line and, after displaying the plurality of words on the first line, the computer system moves the plurality of words from the first row to a second row (e.g., to make room for displaying an additional line for additional captions). Displaying a plurality of words one word at a time and moving the plurality of words from the first row to the second row enhances the communication session experience because it allows a user better follow a conversation as it keeps the most recent transcript on the first line, which provides improved visual feedback and reduces the number of inputs needed to perform an operation (e.g., scrolling back through a transcript).

In some embodiments, the first caption and the second caption are displayed in a respective user interface region (e.g., 606 as depicted in FIG. 6L). In some embodiments, the computer system detects that a predetermined threshold time of inactivity (e.g., the one or more participants have stopped talking, not displaying new captions, and/or not receiving new captions to display) has been satisfied. In response to detecting that the predetermined threshold time of inactivity has been satisfied, the computer system minimizes (e.g., decreasing a size of or removing) the respective user interface region in which the first caption and the second caption were displayed (e.g., as described with reference to FIGS. 6O-6P, caption area 606 of 6P is smaller than caption area 606 of FIG. 6O) (e.g., decrease a size of a window for the first caption or second caption). In some embodiments, the computer system ceases to display one or more captions after a second predetermined threshold time (e.g., longer than the predetermined threshold of time) of inactivity has been satisfied. Minimizing a caption window when a predetermined threshold time of inactivity has been satisfied enhances the communication session experience because it declutters the user interface when no one is talking, which provides improved visual feedback by providing additional display space for other content.

In some embodiments, in accordance with a determination that the live communication session is between no more than two participants (e.g., as depicted in FIGS. 6A-6C), the computer system overlays one or more captions (e.g., 604 as depicted in FIGS. 6D-6O) (e.g., the first caption and/or the second caption) on the one or more representations (e.g., as depicted in FIG. 6C). In some embodiments, in accordance with a determination that the live communication session is between more than two participants, forgoing overlaying one or more captions (e.g., the first caption and/or the second caption) on the one or more representations. In some embodiments, the computer system determines that the live communication has changed from no more than two participants to at least three participants (e.g., additional participants have joined the live communication session). In response to determining that the live communication session has changed to at least three participants, the computer system ceases to overlay the one or more captions on the one or more representations. In some embodiments, the computer system determines that the live communication has changed from at least three participants to no more than two participants (e.g., one or more participants have left the live communication session). In response to determining that the live communication session has changed to at least three participants, the computer system overlays the one or more captions on the one or more representations. Overlaying captions on the one or more representations when the communication session only involves two participants enhances the communication session experience by enabling a larger view of one of the participants while still displaying captions, which provides improved visual feedback to the user of the expressions of the participant.

In some embodiments, in accordance with a determination that the live communication session is between at least three participants (e.g., as depicted in FIGS. 6D-6O), the computer system displays one or more captions (e.g., 604 and/or 605 as depicted in FIGS. 6D-6O) (e.g., the first caption or the second caption) adjacent to (e.g., next to and/or not overlapping with) the one or more representations (e.g., as depicted in FIGS. 6D-6O). In some embodiments, the computer system determines that the live communication has changed from no more than two participants to at least three participants (e.g., additional participants have joined the live communication session). In response to determining that the live communication session has changed to at least three participants, the computer system displays the one or more captions adjacent to the one or more representations. In some embodiments, the computer system determines that the live communication has changed from at least three participants to no more than two participants (e.g., one or more participants have left the live communication session). In response to determining that the live communication session has changed to at least three participants, the computer system ceases to display the one or more captions adjacent to the one or more representations. Displaying captions adjacent to the one or more representations when the communication session involves at least three participants enhances the communication session experience by not obstructing the view of one of the participants while still displaying a transcript of the conversation, which provides improved visual feedback.

In some embodiments, the computer system detects an input that corresponds to a request to enlarge text for one or more captions (e.g., as described in reference to FIG. 6I). In response to detecting the input that corresponds to a request to enlarge the text for the one or more captions, the computer system enlarges the text (e.g., increasing the size at which the text is displayed) for the one or more captions (e.g., as depicted in FIG. 6I). Additionally or alternatively, in response to detecting the input that corresponds to a request to enlarge the text for the one or more captions, the computer system expands a region (e.g., increasing the area in which captions are displayed) for the one or more captions (e.g., 606 in FIG. 6I is larger than 606 in FIG. 6H) (e.g., the first caption and/or the second caption). Automatically expanding a caption region when the text for the one or more captions are enlarged enhances the communication session experience because it provides a user the ability to view a magnified view of the text while also expanding a region for that text so that lesser amount (if any) text is excluded from view, which provides improved visual feedback.

In some embodiments, in accordance with a determination that a caption for an utterance (e.g., for one or more spoken words) has a confidence level less than a first threshold amount (e.g., as described in reference to FIG. 6H) (e.g., within a first range of confidence levels (e.g., a range for a low confidence level and/or a range of 0-50% or 0-25% confidence level)), the computer system displays a graphical object (e.g., 636) (which optionally does not include alphabetical characters) (e.g., blanking out the word, underscore without the word, empty space between words) indicating that the utterance has a confidence level that is less than the first threshold amount. In some embodiments, a size (e.g., length and/or width) of the graphical object is based on a duration of the utterance (e.g., as described in reference to FIG. 6H) (e.g., in accordance with a determination that the utterance has a first duration, the graphical object has a first length, and in accordance with a determination that the utterance has a second duration that is longer than the first duration, the graphical object has a second length that is longer than the first length) (e.g., a quantity of words and/or a length of time for the utterance) (e.g., a shorter distance between words indicates a smaller number of words with low confidence and/or a larger length of distance between words indicates a larger number of words with low confidence). Displaying a graphical object indicating that a machine transcription/caption of the utterance (and the duration/length of the utterance) is at a particular confidence level (e.g., a low confidence) enhances the communication session experience because it provides a reader of the machine transcription with feedback about the confidence the system has that the caption is accurate, which provides improved visual feedback.

In some embodiments, in accordance with a determination that a caption for an utterance has a confidence level within a range of confidence levels (e.g., as described in reference to FIG. 6H) (e.g., a range for a medium confidence level and/or a range of 51-75% or 51-90% confidence level), the computer system displays text (which optionally includes alphabetical characters) for the caption corresponding to the utterance with a predetermined visual appearance (e.g., 638) (e.g., the text greyed out, dotted line under the text, and/or underlined text). In some embodiments, the text for the one or more captions is displayed with one or more graphical objects to indicate the confidence level for the utterance is within second range of confidence levels. Displaying text for one or more captions with a predetermined visual appearance when an utterance is at a particular confidence level (e.g., a medium confidence) enhances the communication session experience because it provides the user with feedback about the confidence the system has in the transcribed words and facilitates better communication between users that are relying on machine transcription to communicate.

In some embodiments, the computer system displays a graphical object (e.g., 612) indicating one or more captions are machine-generated. Displaying a graphical object indicating captions are machine-generated enhances the communication session experience because a user can quickly identify whether or not it is text being typed by another user, which provides improved visual feedback and facilitates better communication between users that are relying on a machine transcription to communicate.

In some embodiments, while displaying one or more captions, the computer system detects an input (e.g., 616i as depicted in FIG. 6R and/or 616y as depicted in FIG. 6AA) (e.g., a tap input or a non-tap input) corresponding to a request to cease to display the one or more captions (e.g., the first caption or the second caption). In response to detecting the input corresponding to the request to cease to display the one or more captions, the computer system ceases to display the one or more captions and ceases to display a representation of one or more participants (e.g., as depicted in FIG. 6V). In some embodiments, the representation of the one or more participants overlaps onto shared content. In some embodiments, the computer system in a landscape mode. Automatically ceasing display of a representation of one or more participants and the one or more captions in response to a request to cease to display a caption enhances the communication session experience because a user can view content that is being shared in the communication session, which provides improved visual feedback and reduces the number of inputs needed to perform an operation.

In some embodiments, the computer system detects that the computer system is at a respective position (e.g., orientation, such as a landscape orientation). In response to detecting that the computer system is at a respective position and in accordance with a determination that the live communication user interface is in a first spatial orientation relative to a camera (e.g., 602) of the computer system (e.g., as depicted in FIG. 6AD) (e.g., a first landscape orientation, where a camera is located to the right of the display generation component), the computer system displays one or more captions (e.g., 605 of FIG. 6AD) (e.g., of the first caption or the second caption) at a first location in the user interface that is adjacent to a camera of the computer system (e.g., as depicted in FIG. 6AD). In response to detecting that the computer system is at a respective position and in accordance with a determination that the live communication user interface is in a second spatial orientation relative to the camera of the computer system (e.g., a second landscape orientation, where the camera is located to the left of the display generation component) different from the first spatial orientation (e.g., as depicted in FIG. 6AE), the computer system displays one or more captions (e.g., 605 of FIG. 6AE) (e.g., of the first caption or the second caption) at a second location in the live communication user interface, different from the first location in the live communication user interface, that is adjacent to the camera (e.g., as depicted in FIG. 6AE). In some embodiments, the computer system displays the one or more captions proximate to the position of the camera so that it will appear (to other participants of the live communication session) like the user is looking at the camera while the user is reading the caption. Placing captions at locations in the user interface that is based on an orientation of the computer system and closer to a location of camera enhances the communication session experience because a user can read a transcription while it appears that the user is looking at the camera, which provides improved visual feedback and reduces the number of inputs needed to perform an operation (e.g., moving the one or more captions).

In some embodiments, while the live communication session includes more than two participants, the computer system displays a representation (e.g., 621, 623, and/or 629 of FIG. 6D) of a first participant (e.g., 620, 622, and/or 628 of FIG. 6D) (and/or second participant) of the live communication session at a first size (e.g., a first width and/or a first length) in the live communication user interface. The computer system detects that the live communication session includes no more than two participants (e.g., device 600 detects the communication session is between local user 620 and remote user 622 of FIGS. 6A-6C). In response to detecting that the live communication session includes no more than two participants, the computer system increases an amount (e.g., a number of lines or words) of caption information displayed in the live communication user interface (e.g., device 600 can increase the caption area 606 and/or display more text for captions 604). Increasing the size of the captions in the live communication interface enhances the communication session experience by enabling a larger display of the captions and providing the user with feedback that there are only two participants remaining in the live communication session, which provides improved visual feedback.

In some embodiments, the first caption and the second caption are displayed in a respective user interface region. In some embodiments, the computer system displays one or more captions (e.g., of the first caption or the second caption). In accordance with a determination that a predetermined threshold of time has passed since an utterance has occurred (e.g., as described with reference to FIG. 6P) (e.g., the one or more participants have not spoken or no utterances have been detected), the computer system ceases to display the respective user interface region (e.g., captions 604 and/or caption area 606 of FIG. 6P). In some embodiments the one or more captions are overlaid on a graphical object (e.g., a platter, a tray, a shape, and/or a background). In some embodiments, ceasing to display the respective user interface region includes ceasing to display the first caption and the second caption. Ceasing to display the one or more captions enhances the communication session experience by decluttering the user interface when no one is speaking without requiring further input from the user, which provides improved visual feedback and reduces the number of inputs needed to perform an operation.

In some embodiments, the computer system displays (e.g., in response to detecting a pause and/or ambient sounds) a graphical indication of a context of an utterance (e.g., as described in reference to FIG. 6A) (e.g., a length of pause between utterances or ambient sounds) within ((e.g., inline or embedded within) text of) one or more captions (e.g., 604 and/or 605). In some embodiments, the computer system displays content based on audio (and/or lack of audio) in the captions that do not correspond to utterances. For example, the captions may include a graphical indication of a dog barking in the background of a participant, an alarm sounding in the background of a participant, and/or music (e.g., a piano) playing in the background of a participant. Displaying an indication of a context of an utterance enhances the communication session experience by providing an indication of background noise and/or pauses in the middle of a transcript, which provides improved visual feedback and facilitates better communication between users that are relying on a machine transcription to communicate.

Note that details of the processes described above with respect to method 700 (e.g., FIG. 7) are also applicable in an analogous manner to the methods described below For example, method 800 optionally includes one or more of the characteristics of the various methods described above with reference to method 700. For example, method 800 can include characteristics of method 700 to manage a live video communication session. For brevity, these details are not repeated below.

FIG. 8 is a flow diagram illustrating a method for switching user interfaces during a live communication session using a computer system in accordance with some embodiments. Method 800 is performed at a computer system (e.g., 100, 300, 500, and/or 600) (e.g., a smartphone, a tablet, a laptop computer, and/or a desktop computer) that is in communication with a display generation component (e.g., 601) (e.g., a display controller, a touch-sensitive display system, and/or a monitor) and one or more input devices (e.g., 601) (e.g., a touch-sensitive surface, a keyboard, a controller, and/or a mouse). Some operations in method 800 are, optionally, combined, the orders of some operations are, optionally, changed, and some operations are, optionally, omitted.

As described below, method 800 provides an intuitive way for switching user interfaces during a live communication session. The method reduces the cognitive burden on a user for managing captions of a live communication session, thereby creating a more efficient human-machine interface. For battery-operated computing devices, enabling a user to manage captions of a live communication session faster and more efficiently conserves power and increases the time between battery charges.

In some embodiments, the computer system displays (802), via the display generation component, a user interface (e.g., 614 and/or 615) of a live communication application corresponding to a live communication session (e.g., the live communication session depicted in FIGS. 6A-6AA). The user interface of the live communication application concurrently includes (804) a representation (e.g., 621, 623, 625, 627, and/or 629) (e.g., avatar, still image, and/or video (e.g., live video feed)) of a first participant (e.g., 620, 622, 624, 626, and/or 628) of the live communication session displayed in the live communication application. The user interface of the live communication application concurrently includes (806) a first caption (e.g., 604 and/or 605) (e.g., including text) for audio data of the first participant (e.g., audio data received, processed, and/or transmitted by the live communication application for the participant) displayed in the live communication application.

In some embodiments, while the user interface of the live communication application is displayed, the computer system receives (808) a sequence of one or more inputs (e.g., 616g and/or 616h) that corresponds to a request to switch to displaying a respective user interface (e.g., user interface of a home screen as depicted in FIG. 6Q and/or user interface of movie application 651) that is different from the live communication application.

In response to (810) receiving the sequence of one or more inputs that corresponds to the request to switch to displaying the respective user interface, the computer system replaces (812) at least a portion of the live communication application with the respective user interface that is different from the live communication application (e.g., a different application or a system user interface such as a home screen). In response to (810) receiving the sequence of one or more inputs that corresponds to the request to switch to displaying the respective user interface, the computer system displays (812) a reduced scale representation (e.g., 629 of FIG. 6Q) of the first participant of the live communication session overlaid on at least a portion of the respective user interface (e.g., as depicted in FIGS. 6Q-6U, 6Y-6AA). In response to (810) receiving the sequence of one or more inputs that corresponds to the request to switch to displaying the respective user interface, the computer system displays a second caption (e.g., 604 in FIG. 6Q) (e.g., same as the first caption or different from the first caption) for audio data of the first participant, wherein the second caption for audio data is displayed separately from the reduced scale representation of the first participant of the live communication session and is overlaid on at least a portion of the respective user interface (e.g., as depicted in FIG. 6Q). In some embodiments, the second caption is a reduced scale caption (e.g., occupies a smaller portion of the display) than the first caption. In some embodiments, the user interface of the live communication application overlaps (e.g., obscures and/or hides) a first portion of the respective user interface and does not overlap a second portion of the respective user interface. In some embodiments, the user interface of the live communication application does not overlap (e.g., obscure and/or hide) the first user interface (e.g., the user interface of the live communication application is displayed adjacent to the respective user interface). Displaying a reduced scale representation and a caption over a user interface for an application different from the live communication application enhances the communication session experience by allowing a user to view a transcript of the communication session while navigating through an application or home screen, which provides improved visual feedback and facilitates better communication while users navigate away from the live communication application.

In some embodiments, the reduced scale representation of the first participant and the second caption for audio data of the participant are automatically positioned in a location that does not hide (e.g., obscure from view and/or overlap) predetermined content (e.g., 654 in FIG. 6T) (e.g., particular user interface objects (e.g., virtual keyboard, buttons, and/or an application dock), shared media. captions of shared media) of the respective user interface. In some embodiments, the computer system detects that the predetermined content has moved. In response to detecting that the predetermined content has moved, the computer system moves the reduced scale representation of the first participant and the second caption for audio data of the participant (e.g., to avoid hiding the predetermined content). In some embodiments, the computer system detects an input (e.g., a drag gesture) corresponding to a request to move the reduced scale representation of the first participant and the second caption for audio data of the participant to a location occupied by the predetermined content. While continuing to detect the input (e.g., the initial contact is maintained), moving the reduced scale representation of the first participant and the second caption for audio data of the participant to a location occupied by the predetermined content (in some embodiments, the reduced scale representation of the first participant and the second caption for audio data of the participant hide the predetermined content). While the reduced scale representation of the first participant and the second caption for audio data of the participant are in the location occupied by the predetermined content, the computer system detects an end of the input (e.g., a finger lift off event and/or an end of the contact). In response to detecting then end of the input and in accordance with a determination that the reduced scale representation of the first participant and the second caption for audio data of the participant is in the location occupied by the predetermined content, the computer system are automatically positioned at a location other than the location occupied by the predetermined content (e.g., the computer system automatically moves the reduced scale representation of the first participant and the second caption for audio data of the participant so that they do not hide the predetermined content). Automatically placing the reduced scale representation of the first participant and the second caption for audio data of the participant to avoid certain content enhances the communication session experience by allowing a user to view a transcript of the communication session without obscuring important content, which provides improved visual feedback.

In some embodiments, while displaying the respective user interface, the computer system detects an input (e.g., 616n and/or 616x) corresponding to a request to update (e.g., scrolling through and/or navigating through) content of the respective user interface. In response to detecting the input corresponding to the request to update content of the respective user interface, the computer system updates the content of the respective user interface independently of (e.g., without updating) content of the second caption (e.g., as described in reference to FIGS. 6R-6S) (e.g., without scrolling through the second caption or navigating through the second caption). In some embodiments, the computer system receives user input to update content of the second caption (e.g., scrolling through the content) and, in response, updates the content of the second caption independently of (e.g., without) updating content of the respective application. In some embodiments, the computer system automatically updates the second caption (e.g., replacing the second caption with one or more captions that are different from the second caption) independently of detecting the request to update content of the respective user interface (e.g., in response to an utterance by one or more participants of the live communication session). Updating content of the respective user interface (when the computer system detects input directed at the respective user interface) without updating (based on the input) the content of the second caption enables the computer system to allow for independent control of the two applications and provides the user with feedback about which application is being updated, thereby providing enhanced user feedback.

In some embodiments, while displaying the respective user interface, the computer system detects an input (e.g., 616*j* and/or 616*w*) corresponding to a request to move (e.g., without scrolling and/or without changing a size of) the reduced scale representation of the participant and/or the second caption. In response to detecting the input corresponding to the request to move the reduced scale representation of the first participant and/or the second caption, the computer system moves the reduced scale representation of the first participant and/or the second caption independently of (e.g., without navigating through) content of the respective user interface (e.g., as depicted in FIG. 6S and/or described in reference to FIG. 6AA). In some embodiments, the computer system receives user input to navigate through the content of the respective user interface and, in response, navigates through the content of the respective user interface independently of (e.g., without) moving the reduced scale representation of the first participant and/or the second caption. Moving the reduced scale representation of the first participant and/or moving the second caption independently of navigating through content of the respective user interface enhances the communication session experience by allowing a user to move a transcript of the communication session so that it does not obscure content of the respective application that the user desires to view/access, which provides improved visual feedback.

In some embodiments, while displaying a reduced scale representation of a respective participant (e.g., 623 as depicted in FIG. 6R) of the live communication session overlaid on at least a portion of the respective user interface, the computer system detects information indicating that one or more captions are available for a respective utterance for the respective participant (e.g., device 600 detects captions 604 of FIG. 6S are available) (e.g., the first participant or a second participant). In response to detecting that the one or more captions are available for the respective utterance for the respective participant, the computer system displays the one or more captions for the respective utterance instead of displaying (e.g., replacing and/or updating) the second caption (e.g., captions 604 of FIG. 6S are displayed instead of captions 604 of FIG. 6R). Updating one or more captions when new captions are available enhances the communication session experience by allowing a user to view an up-to-date transcript of a recent the communication session, which provides improved visual feedback.

In some embodiments, the second caption is overlaid on shared content that is being shared with multiple participants in the live communication session (e.g., captions 604 of FIGS. 6T-6U and/or captions 604 of FIG. 6Y) (e.g., content that is viewed by at least two participants in the live communication session or content that is shared between at least two devices). In some embodiments, content of the respective application is shared among participants of the live communication session (e.g., multiple participants of the live communication session are concurrently viewing the content) and the one or more captions (e.g., the first caption and/or the second caption) are overlaid on the shared content of the respective application. Overlaying captions on shared content enhances the communication session experience by allowing a user to concurrently view a transcript of the communication session along with the shared content, which provides improved visual feedback and facilitates better communication while users view shared content. For example, the user can monitor a single location to view both the shared content and updates to the captions.

In some embodiments, the computer system displays one or more captions (e.g., 604 of FIGS. 6Q-6U and 6Y-6Z) (e.g., the second caption for audio data of the first participant or the first caption for audio data of the first participant) (e.g., overlaid on a graphical object (e.g., a platter, a tray, a shape, and/or a background)). After displaying the one or more captions and in accordance with a determination that a predetermined threshold amount of time has passed since captions have been added to the one or more captions (e.g., as described with reference to FIG. 6P) (e.g., predetermined threshold of time has passed since an utterance has occurred (e.g., the plurality of participants have not spoken)), the computer system ceases to display the one or more captions (e.g., device 600 can cease to display captions 604 of FIGS. 6Q-6U and 6Y-6Z) (and, optionally, ceasing to display at least a portion of (e.g., all of) the graphical object). In some embodiments, in accordance with a determination that the predetermined threshold amount of time has not passed since captions have been added to the one or more captions and in accordance with a determination that a caption has been added to the one or more captions, forgoing the ceasing to display the one or more captions. In some embodiments, the computer system forgoes ceasing to display the one or more captions if a caption is added to the one or more captions before the predetermined threshold amount of time has passed (or is satisfied). Ceasing to display the one or more captions enhances the communication session experience by decluttering the user interface and allowing a user to better view shared content and/or content of the respective application without requiring further user input, which provides improved visual feedback and performs the operation when a set of conditions has been met without requiring further user input.

In some embodiments, the computer system detects an input (e.g., 616*j* and/or 616*v*) (e.g., a touch-and-drag input on the reduced scale representation) corresponding to a request to move a reduced scale representation of a respective participant (e.g., the first participant). In response to detecting the input corresponding to the request to move the reduced scale representation of the respective participant, the computer system moves, via the display generation component, a location of the reduced scale representation of the respective participant and moves (e.g., as depicted in FIG. 6S) (e.g., automatically), via the display generation component, a location of one or more captions (e.g., as depicted in FIG. 6S) (e.g., the second caption for audio data of the first participant). In some embodiments, the computer system moves the one or more captions such that the one or more captions have a same position relative to the reduced scale representation of the respective participant as the one or more captions had prior to the moving of the reduced scale representation of the respective participant. In some embodiments, the computer system moves the one or more captions such that the one or more captions have a different position relative to the reduced scale representation of the respective participant as the one or more captions had prior to the moving of the reduced scale representation of the respective participant. Automatically moving the reduced scale representation of the respective participant and the one or more captions in response to a request to move the reduced scale representation enhances the communication session experience by allowing a user better view shared content and/or content of an application, which provides improved visual feedback and reduces the number of inputs needed to perform an operation.

In some embodiments, while displaying a reduced scale representation (e.g., 629 of FIG. 6Q) of the first participant (e.g., John) of the live communication session overlaid on at least a portion of the respective user interface, the computer system detects that a respective participant (e.g., Emily) is more active in the live communication session than the first participant (e.g., as described in reference to FIG. 6D) (e.g., the respective participant begins speaking and the first participant stops speaking or the respective participant speaks louder, more recently, and/or faster than the first participant). In response to detecting that the respective participant is more active in the live communication session than the first participant, the computer system replaces the reduced scale representation of the first participant with a reduced scale representation (e.g., 623 of FIG. 6R) of the respective participant. Replacing the reduced scale representation of the first participant with a reduced scale representation of the respective participant enhances the communication session experience by allowing a user to view a representation (e.g., an image) of an active speaker, thereby indicating to the user which participants is speaking, which provides improved visual feedback.

In some embodiments, the computer system displays a settings user interface (e.g., 666 and/or an input directed to 664). While displaying the settings user interface, the computer system detects an input (e.g., 616z an input directed to 664) corresponding to a request to modify (e.g., toggle, enable, or disable) a caption setting for the user interface of the live communication application. In response to detecting the input corresponding to a request to modify the caption setting for the live communication application and in accordance with a determination that the input activates the caption setting for the live communication application, the computer system enables display of one or more captions as part of the user interface of the live communication application for live communication sessions (e.g., as described in reference to FIG. 6AB). In response to detecting the input corresponding to a request to modify the caption setting for the live communication application and in accordance with a determination that the input deactivates the caption setting for the live communication application, the computer system disables display of captions as part of user interface of the live communication application for live communication sessions (e.g., as described in reference to FIG. 6AB). In some embodiments, in accordance with a determination that the display of one or more captions are enabled, the computer system displays one or more captions (e.g., the first caption and/or the second caption) in the live communication user interface. In some embodiments, in accordance with a determination that the display of one or more captions are disabled, the computer system forgoes displaying the one or more captions (e.g., the first caption and/or the second caption) in the live communication user interface. Providing a caption setting in a settings user interface for the live communication application enhances the communication session experience because it allows a user to turn captions on or off for multiple communication sessions (e.g., a current and future communication session), which provides an intuitive interface and reduces the number of inputs needed to perform an operation (e.g., no need to change the setting for each new live communication session).

In some embodiments, while displaying a reduced scale representation (e.g., 629 of FIG. 6Q) of the first participant of the live communication session overlaid on at least a portion of the respective user interface, the computer system detects that a respective participant (e.g., Emily) is more active in the live communication session than the first participant (e.g., as described in reference to FIG. 6D) (e.g., the respective participant begins speaking and the first participant stops speaking or the respective participant speaks louder, more recently, and/or faster than the first participant). In response to in response to detecting that the respective participant is more active in the live communication than the first participant, the computer system replaces (e.g., swaps or switches), via the display generation component, the reduced scale representation of the first participant with a reduced scale representation (e.g., 623 of FIG. 6R) of the respective participant. In response to detecting that the respective participant is more active in the live communication than the first participant, the computer system replaces (e.g., swaps or switches), via the display generation component, the second caption for audio data of the first participant with a caption for audio data of the respective participant (e.g., captions 604 of FIG. 6Q are replaced by captions 604 of FIG. 6R). Replacing both the reduced scale representation and the second caption of a person when a different person is active enhances the communication session experience because it allows a user to view both a transcript and a representation (e.g., an image) of an active speaker, which provides feedback to the user about the active participant and their corresponding captions.

In some embodiments, while displaying a reduced scale representation (e.g., 623 of FIG. 6R and/or representation of Kim depicted in FIG. 6U) of a respective participant (e.g., Emily and or Kim) (e.g., the first participant) and a second caption for audio data of the respective participant (e.g., 604 of FIG. 6R and/or 604 of FIG. 6U) (e.g., the first participant), the computer system detects an input (e.g., 616i and/or 616p) directed to the reduced scale representation of the respective participant (e.g., a minimization input such as a single gesture and/or corresponding to a request to minimize (e.g., cease to display or move to an applications dock) the reduced scale representation of the respective participant). In response to detecting the input directed to the reduced scale representation of the respective participant (e.g., a minimization input such as the single gesture, corresponding to the request to minimize the reduced scale representation of the respective participant, and/or without receiving additional user input), the computer system reduces a prominence (e.g., a visual prominence) of (e.g., minimizing, reducing in size, blurring, dimming, and/or ceasing to display) the reduced scale representation of the respective participant (e.g., as depicted in FIG. 6V). In some embodiments, in response to detecting the input directed to the reduced scale representation of the respective participant, the computer system reduces a prominence of (e.g., minimizing or reducing in size and/or ceasing to display) the second caption for audio data of the respective participant (e.g., as depicted in FIG. 6V). Automatically reducing a prominence of both the reduced scale representation and the caption of a respective participant in response to detecting the input enhances the communication session experience because it declutters the user interface and reduces the number of inputs required to minimize both the reduced scale representation of the respective participant and the caption for audio data of the respective participant, which reduces the number of inputs needed to perform an operation.

In some embodiments, reducing the prominence of the reduced scale representation of the respective participant and the second caption for audio data of the respective participant includes ceasing to display the reduced scale representation of the respective participant and the second caption for audio data of the respective participant (e.g., as depicted in FIG. 6V). In some embodiments, the computer system displays an indication (e.g., 656 of FIG. 6V) (e.g., a graphical object (e.g., shape, highlight, or symbol) and/or a visual change in a graphical object) indicating that one or more participants (e.g., a first participant or a second participant) are speaking (optionally, and/or have spoken since captions were last displayed) without displaying the reduced scale (and, optionally, any scale) representation of the respective participant and the caption for audio data of the respective participant. Displaying a visual cue that a participant is speaking enhances the communication session experience because it provides the user with visual feedback that a participant is speaking, which provides improved visual feedback.

In some embodiments, displaying the indication indicating that one or more participants are speaking includes animating (e.g., 658) a graphical user interface object (e.g., 656 of FIG. 6W) at a location in the respective user interface that is associated with the reduced scale representation of the respective participant (e.g., via a bouncing arrow and/or via a changes in color). In some embodiments, the computer system detects an input (e.g., a tap gesture, a swipe gesture, and/or a drag gesture) corresponding to the location in the respective user interface that is associated with the representation of the respective participant. In some embodiments, in response to detecting the input, the computer system increases the prominence of the reduced scale representation of the respective participant and the caption for audio data of the respective participant. Animating the graphical user interface object provides a visual cue that a participant is speaking enhances the communication session experience because provides the user with visual feedback that a participant is speaking, which provides improved visual feedback.

In some embodiments, the computer system displays shared content concurrently with the reduced scale representation of the first participant (e.g., as depicted in FIG. 6U) (and, optionally, the second caption for audio data of the first participant). In some embodiments, while displaying the shared content concurrently with the reduced scale representation of the first participant (and, optionally, the second caption for audio data of the first participant), the computer system detects an input (e.g., 616p) corresponding to a request to reduce a prominence of (e.g., cease to display or minimize) the reduced scale representation of the first participant. In some embodiments, in response to detecting the input corresponding to the request to reduce the prominence of (e.g., cease to display or minimize) the reduced scale representation of the first participant, the computer system reduces a prominence of (e.g., ceasing to display or minimizing) the reduced scale representation of the first participant (and, optionally, ceasing to display or maintaining display of the second caption for audio data of the first participant) and/or maintains display of shared content (e.g., as depicted in FIG. 6U). In some embodiments, the computer system further ceases to display the second caption for audio data of the first participant in response to detecting the input corresponding to the request to reduce the prominence of the reduced scale representation of the first participant. Ceasing to display the reduced scale representation while maintaining display of shared content enhances the communication session experience because it maximizes display of (and, therefore, a user's view of) shared content, which provides improved visual feedback.

In some embodiments, the computer system displays one or more captions for shared content (e.g., movie captions of FIG. 6AA) (e.g., closed captioning for a movie that is being shared via the live communication session) overlaid on shared content (e.g., movie 652 of FIG. 6AA) (e.g., the movie that is being shared). In some embodiments, one or more captions (e.g., 604 of FIG. 6AA) (e.g., the second caption) for audio data of a respective participant, that is displayed concurrently with the one or more captions for the shared content, is displayed adjacent to (e.g., not overlapping with or not obscuring view of) the shared content (e.g., as depicted in FIG. 6AA). In some embodiments, the computer system updates the one or more captions for shared content over time. In some embodiments, the computer system updates the one or more captions for shared content independently of (e.g., without updating and/or without adding captions to) the one or more captions for audio data of the respective participant. In some embodiments, the computer system updates the one or more captions for audio data of the respective participant over time. In some embodiments, the computer system updates the one or more captions for shared content independently of the caption for audio data of the respective participant. In some embodiments, the computer system updates the one or more captions for audio data of the respective participant independently of (e.g., without updating and/or without adding captions to) the one or more captions for shared content. Displaying a caption for audio data of a respective participant adjacent to the shared content and captions for the shared content overlaid on the shared content provides the user with visual feedback about which caption corresponds to which item (other participant or the shared content), which provides improved visual feedback.

Note that details of the processes described above with respect to method 800 (e.g., FIG. 8) are also applicable in an analogous manner to the methods described above. For example, method 700 optionally includes one or more of the characteristics of the various methods described above with reference to method 800. For example, method 700 can include characteristics of method 800 to manage a live video communication session. For brevity, these details are not repeated below.

FIGS. 9A-9AI illustrate exemplary user interfaces for providing captions in accordance with some embodiments. The user interfaces in these figures are used to illustrate the processes described below, including the processes in FIG. 10.

FIG. 9A illustrates electronic device 900. In FIG. 9A, electronic device 900 is a portable multifunction device and has one or more components described above in relation to one or more of devices 100, 300, 500, and 600.

In FIG. 9A, device 900 displays, on display 902, a captions settings interface 910 for managing various aspects of captions (e.g., provided on device 900). Captions settings interface 910 includes enable option 912, text option 914, and color options 916a, 916b. Enable option 912, when selected, activates (or deactivates) a captions feature on device 900. In some embodiments, enabling the captions feature allows device 900 to provide captions (e.g., transcriptions) in a captions interface based on audio (or audio metadata) provided and/or received by device 900. In some embodiments, various visual characteristics of captions provided in this manner may be modified. As an example, text size may be modified using text option 914, text color may be modified using color option 916a, and a background color of the captions interface may be modified using color option 916b.

In an example operation, device 900 detects selection of enable option 912 while displaying captions interface 910. The selection is a tap gesture 905a on enable option 912. As shown in FIG. 9B, in response to detecting tap gesture 905a, device 900 displays captions interface 920 and toggles a state of enable option 912 from "off" to "on", indicating that the captions feature has been enabled on device 900. In some embodiments, captions interface 920 is overlaid on captions settings interface 910.

In some embodiments, captions interface 920 includes indicator 922*a* and text portion 922*b*. Indicator 922*a* indicates that captions interface 920 is an interface for providing captions of audio received by device 900 (e.g., "Live Captions"). Optionally, and as described in further detail below, in some embodiments, indicator 922*a* indicates a current source of audio when captions are provided by device 900. Text portion 922*b* indicates a state of the captions provided by device 900 (e.g., paused and/or waiting). In some embodiments, captions provided by device 900 are displayed in text portion 922*b*.

In some embodiments, further in response to selection of enable option 912, device 900 displays, in captions settings interface 910, caption option 918. When enabled, caption option 918 prevents captioning during live communication sessions, such as phone calls, video calls, conference calls, and the like.

Figure 9D:
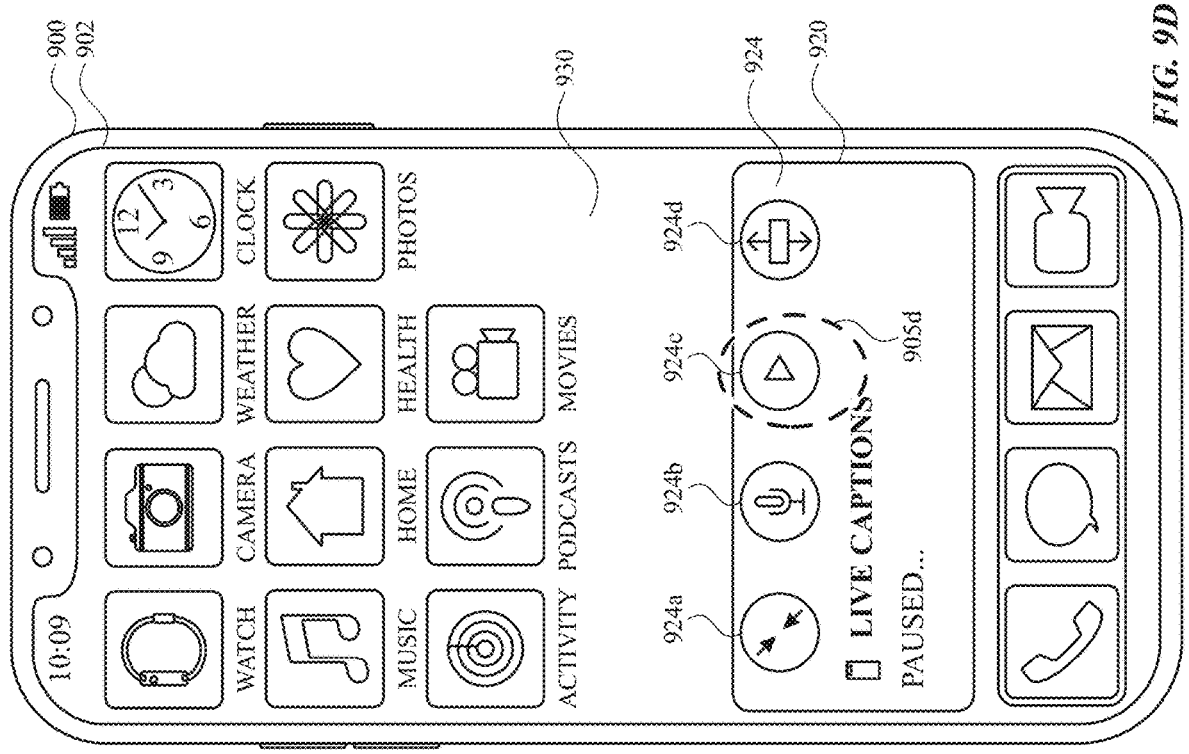
Figure 9C:
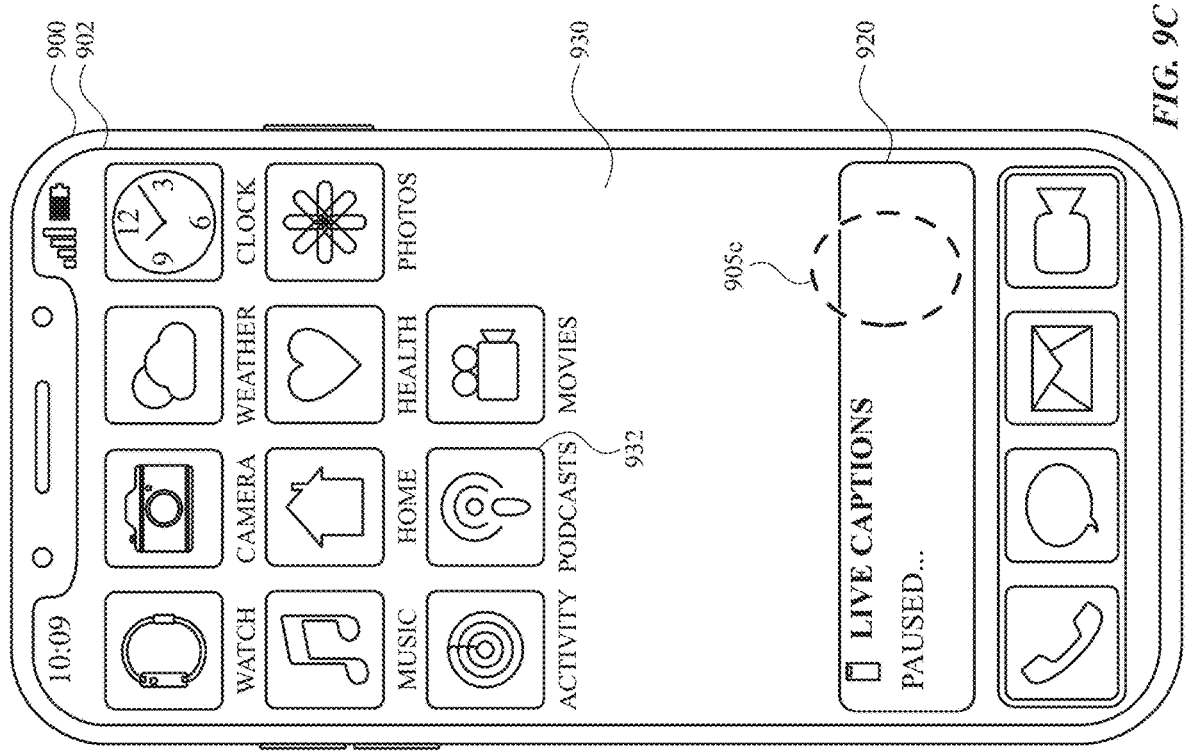

While displaying captions interface 920 (e.g., which is, optionally, overlaid on captions settings interface 910 or not overlaid on captions settings interface 910), device 900 detects a request to display a home screen interface. In some embodiments, the request is an upward swipe gesture 905*b* located at or near the bottom of display 902. As shown in FIG. 9C, in response to detecting swipe gesture 905*b*, device 900 displays home interface 930 including application affordance 932 corresponding to a podcast application. In some embodiments, display of captions interface 920 is maintained until the captions feature is disabled on device 900. Accordingly, device 900 maintains display of captions interface 920 such that captions interface 920 is overlaid on home interface 930.

While displaying home interface 930, device 900 detects an input corresponding to a location of captions interface 920. The input is a tap gesture 905*c*. As shown in FIG. 9D, in response to detecting tap gesture 905*c*, device 900 modifies display of (e.g., expands or contracts) captions interface 920 to display controls 924.

Controls 924 include minimize affordance 924*a*, microphone affordance 924*b*, enable affordance 924*c*, and maximize affordance 924*d*. Minimize affordance 924*a*, when selected, causes a size of captions interface 920 to be reduced. In some embodiments, reducing a size of captions interface 920 in this manner includes ceasing display of one or more of indicator 922*a*, text portion 922*b*, and controls 924*a*-*d*. Maximize affordance 924*d*, when selected, causes a size of captions interface 920 to be increased. Microphone affordance 924*b*, when selected, activates microphone captioning such that device 900 provides captions based on user inputs (e.g., speech inputs and/or audio inputs) and/or other auditory inputs (e.g., non-verbal sounds, speech inputs from speakers other than a user of device 900) received (e.g., detected) by device 900.

Enable affordance 924*c*, when selected, enables captioning on device 900 such that device 900 provides captions in captions interface 920, for instance, based on audio (or audio metadata) received by device 900. For example, while displaying controls 924, device 900 detects selection of enable affordance 924*c*. The selection is a tap gesture 905*d* on enable affordance 924*c*. As shown in FIG. 9E, in response to detecting tap gesture 905*d*, device 900 modifies display of enable affordance 924*c* (e.g., from a "play" indicator to a "pause" indicator) to indicate captioning has been activated on device 900. In some embodiments, display of text portion 922*b* is modified, indicating that device 900 is waiting for an audio source from which to provide captions (e.g., "waiting").

Thereafter, device 900 detects selection of an application affordance 932 (e.g., tap gesture 905*e*). As shown in FIG. 9F, in response to detecting selection of the application affordance 932, device 900 opens (e.g., executes) a podcast application and displays podcast interface 940 including a play affordance 942, which when selected, initiates playback of a podcast episode (e.g., podcast episode 260). While displaying the podcast interface 940, device 900 detects selection of play affordance 942 (e.g., tap gesture 905*f*), and in response initiates playback of the podcast episode.

FIGS. 9G-9H illustrate an example operation in which captioning is enabled during playback of the podcast episode. As shown in FIG. 9G, during playback, indicator 922*a* of captions interface 920 indicates a source of audio (e.g., "Podcasts") and text portion 922*b* of captions interface 920 includes captions derived from audio of the podcast episode (e.g., "Hello everyone . . ."). In some embodiments, device 900 indicates a time at which captions are provided. Captions interface 920 may include, for instance, time indicator 922*c* indicating a time at which captions for the podcast have been provided.

In some embodiments, device 900 may be configured to identify one or more individuals speaking (also referred to as speakers) in an audio source. For example, as shown in FIGS. 9G, captions are attributed to "Speaker 1" and, as shown in FIG. 9H, subsequent captions are attributed to "Speaker 2". In some embodiments, individuals speaking may be identified using one or more machine learning techniques and/or voice recognition models.

In some embodiments, only a portion of captions provided by device 900 may be displayed in captions interface 920 at a given time. Accordingly, in some embodiments, device 900 may scroll captions in captions interface 920 such that older captions are no longer displayed as new captions are provided. By way of example, FIG. 9G illustrates playback at time 10:09 at which playback of the podcast episode has commenced, and FIG. 9H illustrates time 10:10 at which playback of the podcast episode has progressed. As shown, a portion of the captions attributed to "Speaker 1" displayed at time 10:09 (FIG. 9G) are no longer displayed at time 10:10 (FIG. 9H) after additional captions attributed to "Speaker 2" have been provided.

In some embodiments, captions may be provided during live communication sessions. For example, while displaying podcast interface 940, device 900 displays call notification 948 indicating that device 900 is currently receiving an incoming phone call (e.g., from contact "Mom"). While displaying call notification 948, device 900 detects selection of acceptance affordance 948*a* of call notification 948 to accept the incoming call. The selection is a tap gesture 905*h* on acceptance affordance 948*a*. As shown in FIG. 9I, in response to detecting tap gesture 905*h*, device 600 displays phone interface 950 of a phone application and initiates a phone call session. As described, in some embodiments, display of captions interface 920 is maintained until the captions feature is disabled. Accordingly, device 900 maintains display of captions interface 920 such that captions interface 920 is overlaid on phone interface 950.

In some embodiments, captions interface 920 is displayed at a predetermined location and/or in a predetermined state. For example, in some embodiments, captions interface 920 may be displayed at a particular location (e.g., a user-specified location or system-specified location) when displayed concurrently with a particular application. As another example, captions interface 920 may be displayed as having a particular size when displayed concurrently with a particular application. As another example, captions interface 920 may be displayed such that captions interface 920 does not obscure one or more elements of an underlying interface (e.g., an interface on which captions interface 920 is overlaid). For instance, with reference to FIG. 9I, captions interface 920 is overlaid on phone interface 950 at a location such that various controls of phone interface 950 (e.g., mute, keypad, speaker, add call, video call, and/or contacts) are visible and accessible to a user of device 900.

During the phone call, device 900 provides captions corresponding to various speakers. For example, captions may be provided based on input received from a user of device 900. During the phone call, device 900 receives a speech input 905*i* (e.g., "Hey Mom, how are you?") from a user ("John") of device 900 (e.g., via a microphone of device 900) and provides a caption for speech input 905*i* in captions interface 920. As shown, captions from the user of device 900 may be attributed to the user. As another example, captions may be provided from other participants of the phone call (e.g., contact "Mom"). During the phone call session, device 900 receives audio from the phone application corresponding to the contact "Mom" and provides a corresponding caption ("Hi honey, I just wanted . . . "). As shown, captions from other participants may be attributed to the participants.

In some embodiments, captions may identify non-verbal sounds. With reference to FIG. 9J, for example, device 900 provides a caption 954 during the phone call session indicating that a sound determined to be a doorbell was detected by device 900 (e.g., "doorbell"). Non-verbal sounds may be identified from any audio source including but not limited to audio detected by a microphone of device 900 and audio provided by one or more applications of device 900. In some embodiments, device 900 may provide captions for any number and/or type of non-verbal sounds, such as ringtones, knocking sounds, alarms (e.g., appliance alarm), sirens, and non-verbal speech sounds (e.g., crying baby and/or person yelling).

In some embodiments, captions provided in captions interface 920 are displayed sequentially. For example, when switching from a first application to a second application, device 900 may cease to display captions corresponding to the first application. In some embodiments, captions provided in captions interface 920 are displayed concurrently (e.g., captions persist after device 900 switches between applications). For example, as shown in FIG. 9K, after the phone call session between a user of device 900 and contact "Mom" has ended, device 900 resumes (e.g., automatically resumes) display of the podcast application. As shown in captions interface 920, captions provided during the phone call are displayed in text portion 922*b* and attributed to the phone application (as indicated by indicator 922*a*). Further, device 900 displays captions interface 920 in a previous visual state (e.g., device 900 returns display of captions interface 920 to the location of captions interface 920 prior to switching to the phone application).

As described, in some embodiments, captions are provided based on audio received by a microphone of device 900. In some embodiments, captions are provided based on audio when microphone captioning is enabled. For example, while displaying captions interface 920, device 900 detects selection of microphone affordance 924*b*. The selection is a tap gesture 905*k* on microphone affordance 924*b*. As shown in FIG. 9L, in response to detecting tap gesture 905*k*, device 900 enables microphone captioning and visually emphasizes (e.g., highlights and/or underlines) microphone affordance 924*b* indicating that microphone captioning has been enabled. Further in response to selection of microphone affordance 924*b*, indicator 922*a* is updated to attribute captions to audio captured by the microphone. In some embodiments, device 900 displays indicator 956 (in captions interface 920) to identify captions provided using microphone captioning.

As shown in FIG. 9M, while microphone captioning is enabled, device 900 receives a speech input 905*m* ("Please open your text books to page 62.") and provides caption 958 corresponding to speech input 905*m*. Thereafter, while displaying captions interface 920, device 900 detects selection of microphone affordance 924*b*. The selection is a tap gesture 907*m* on microphone affordance 924*b*. In response to detecting tap gesture 907*m*, device 900 deactivates microphone captioning and removes the visual emphasis on microphone affordance 924*b*, indicating that the microphone captions are no longer enabled.

While displaying captions interface 920, device 900 further detects selection of maximize affordance 924*d*. The selection is a tap gesture 909*m* on maximize affordance 924*d*. As shown in FIG. 9N, in response to detecting tap gesture 909*m*, device 900 increases a size of captions interface 920. In some embodiments, increasing a size of captions interface 920 includes increasing a size of captions interface 920 such that all or nearly all of display 902 is used to display captions interface 920.

In some embodiments, increasing a size of captions interface 920 allows for display of a greater number of captions. As shown, previously displayed captions for various applications (e.g., podcast application, phone application, and/or microphone) are displayed concurrently. In some embodiments captions are displayed in a chronological order. In some embodiments, despite an increased size of captions interface 920, only a portion of captions provided by device 900 may be displayed in captions interface 920 at a given time. Accordingly, in some embodiments, captions interface 920 is scrollable (e.g., using swipe gestures and/or non-swipe gestures) such that other captions may be displayed in captions interface 920.

While displaying captions interface 920 (e.g., at an increased size or at an intermediate size), device 900 detects selection of minimize affordance 924*a*. The selection is a tap gesture 905*n* on minimize affordance 924*a*. As shown in FIG. 9O, in response to selection of minimize affordance 924*a*, device 900 reduces the size of captions interface 920 (e.g., to a previous size and/or to a predetermined size). As shown, reducing the size of captions interface 920 can, optionally, cause device 900 to resume display of podcast interface 940.

In some embodiments, captions interface 920 may be repositioned and/or resized on display 902, for instance, independent of an underlying displayed application. For example, while displaying captions interface 920 (FIG. 9O), device 900 detects input 905*o* (e.g., a swipe gesture starting at a location corresponding to captions interface 920). In response, device moves captions interface 920 according to input 905*o*. As shown in FIG. 9P, in response to detecting input 905*o*, device 900 moves captions interface 920, for instance, according to a direction and magnitude of input 905*o*.

With reference to FIGS. 9O-R, in some embodiments, captions are provided when captions interface 920 is in a fully minimized state. For example, in FIG. 9O, device 900 detects selection of play affordance 942. The selection is a tap gesture 907o on play affordance 942. As shown in FIG. 9P, in response to detecting tap gesture 907o, device 900 resumes playback of the podcast episode and captions for the podcast episode are provided as playback progresses.

After initiating playback, device 900 detects selection of minimize affordance 924a. The selection is a tap gesture 905p on minimize affordance 924a. As shown in FIG. 9Q, in response to detecting tap gesture 905p, device 900 reduces the size of captions interface 920. In some embodiments, reducing the size of captions interface 920 includes ceasing display of indicator 922a, text portion 922b, and/or controls 924a-d.

In some embodiments, captions are provided when captions interface 920 is in a minimized state. For example, with reference to FIG. 9Q, after minimizing captions interface 920, playback of the podcast episode continues and device 900 receives speech input 905q (FIG. 9Q). Thereafter, device 900 detects an input at a location corresponding to captions interface 920 (e.g., while captions interface is in a minimized state). The input is a tap gesture 907q. As shown in FIG. 9R, in response to detecting tap gesture 907q, device 900 increases a size of captions interface 920, and optionally, resumes display one or more of indicator 922a, text portion 922b, and controls 924a-d in captions interface 920.

As illustrated, when increasing the size of captions interface 920, captions are provided for audio of the podcast played back while the captions interface 920 was in a minimized state. However, because microphone captioning was not enabled while captions interface 920 was in a minimized state (e.g., in response to selection of microphone affordance 924b), captions corresponding to the speech input 905q are not provided. In some embodiments, device 900 visually emphasizes (e.g., bolds and/or highlights) captions interface 920 when captions interface 920 is in a minimized state and captioning is activated on device 900.

Figure 9T:
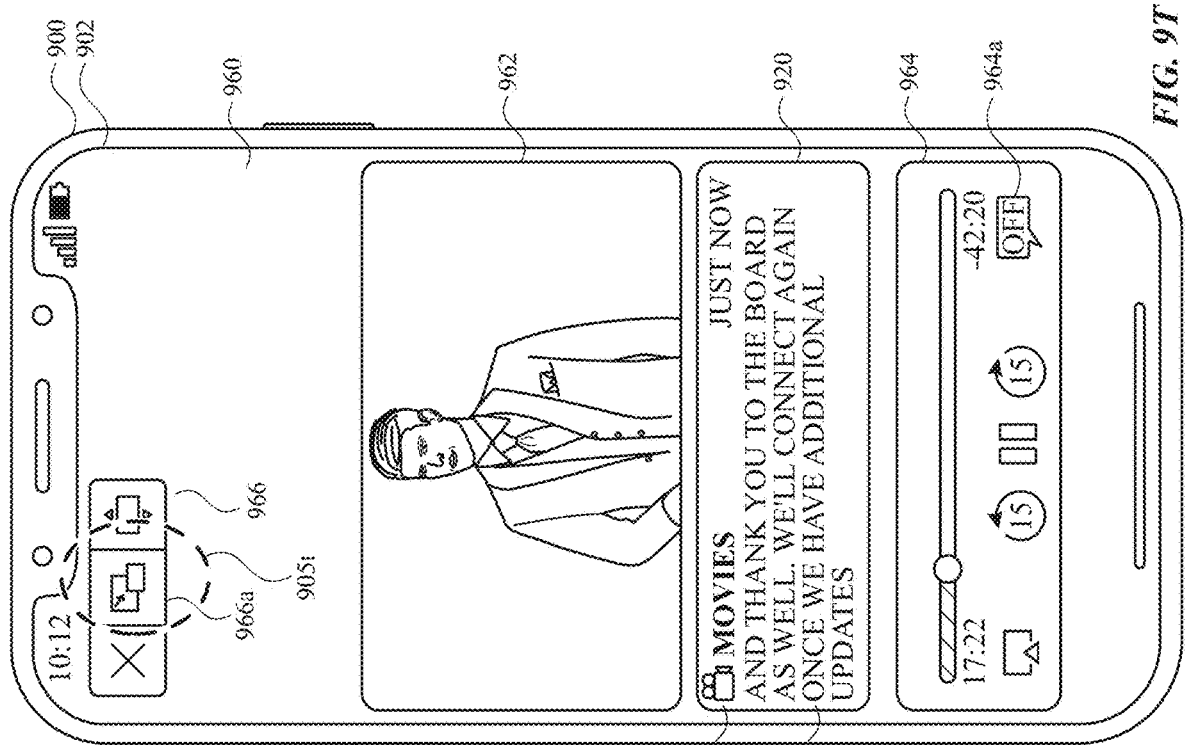
Figure 9S:
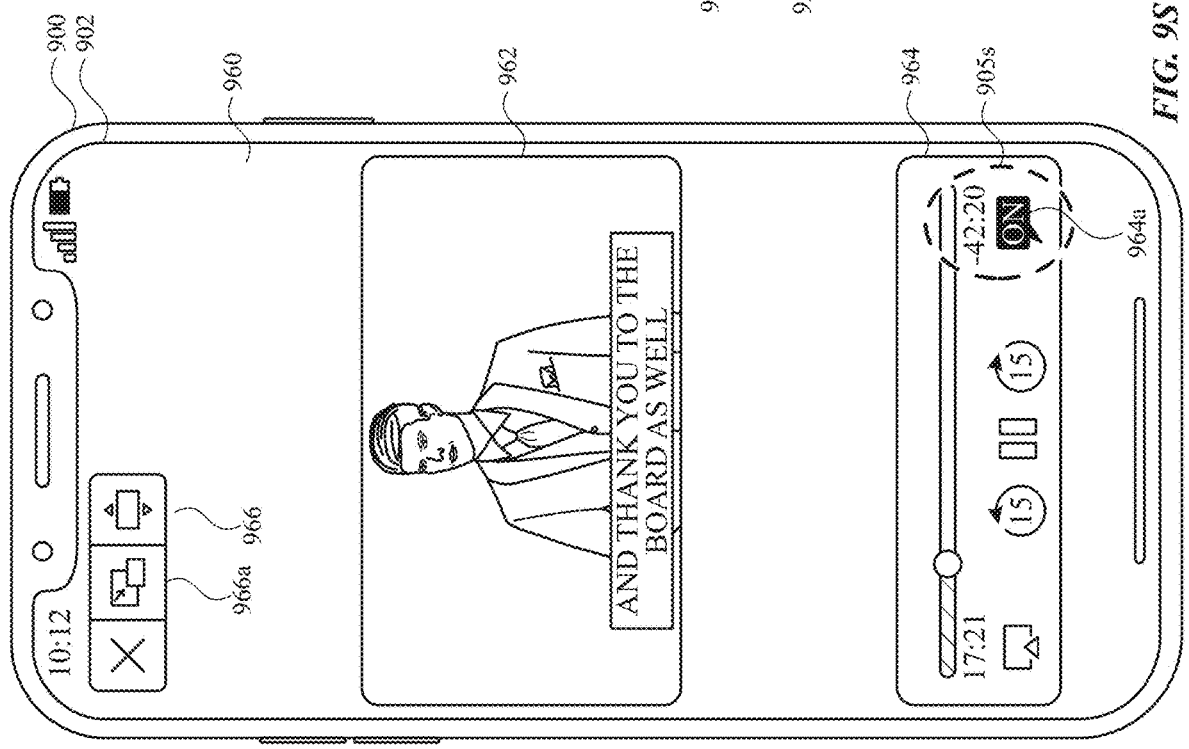

In FIGS. 9S, while captioning is activated on device 900, device 900 displays a video interface 960 for performing video playback. Video interface 960 corresponds to a "movies" application in some embodiments. Video interface 960 includes video region 962 for displaying video playback, video controls 964, and application controls 966. Video controls 964 includes subtitles option 964a, which when enabled, causes device 900 to display subtitles in video region 962 during video playback. As shown, subtitles option 964a is visually emphasized (e.g., bolded and/or highlighted) indicating that subtitle option 964a is enabled and, as a result, subtitles are displayed in video region 962.

In some embodiments, during playback of a video, device 900 determines whether a subtitles option is enabled. If the subtitles option is enabled, device 900 does not display captions interface 920 even if captioning is activated on device 900. If the subtitles option is not enabled, device 900 displays captions interface 920 and provides captions for the video playback. For example, while displaying video interface 960, device 900 detects selection of subtitles option 964a. The selection is a tap gesture 905s on subtitles option 964a. As shown in FIG. 9T, in response to detecting tap gesture 905s, device 900 removes visual emphasis on option 964a (and, optionally, modifies subtitles option 964a to indicate "off"), displays captions interface 920, and begins to provide captions during playback.

While description has been made herein with respect to device 900 providing captions based on audio provided by an application executing on device 900, it will be appreciated that captions may be provided based on other types of information in some embodiments. As an example, device 900 provides captions based on metadata provided by an application executing on device 900. Captions provided during playback of a video, for instance, may be based on a subtitles file such that device 900 need not analyze audio to provide captions for the video. As another example, device 900 provides captions based on information received from one or more external devices. An external device, such as a device sharing a local network with device 900, provides caption data to device 900. In turn, device 900 provides captions based on the caption data.

In some embodiments, captions are provided when an application, such as the video application, is displayed in a full screen mode. In some embodiments, when an application is displayed in this manner, one or more elements of captions interface 920, such as indicator 922a or indicator 922c, is not displayed.

In some embodiments, captions are provided while a video is played in a particular mode, such as a picture-in-picture (PiP) mode. For example, application controls 966 include picture-in-picture (PiP) affordance 966a, which when selected causes a video to be played back in a picture-in-picture mode on device 900. While displaying video interface 960, device 900 detects selection of PiP affordance 966a. The selection is a tap gesture 905t on PiP affordance 966a. As shown in FIG. 9U, in response to detecting tap gesture 905t, device 900 displays (e.g., replaces display of video interface 960 with) home interface 930 and continues playback of the video, in a PiP mode. Additionally, device 900 maintains display of captions interface 920 to provide captions during playback of the video. As shown, captions interface 920 may be overlaid on home interface 930 at a location that does not obscure PiP window 934.

While displaying home interface 930, device 900 detects an input corresponding to a request to switch applications. In some embodiments, the input is a swipe gesture 905u on home interface 930 starting at a location near the bottom of home interface 930 and moving in an upward direction. As shown in FIG. 9V, in response to detecting swipe gesture 905u, device 900 displays application switch interface 970.

Figures 9W, 9X:
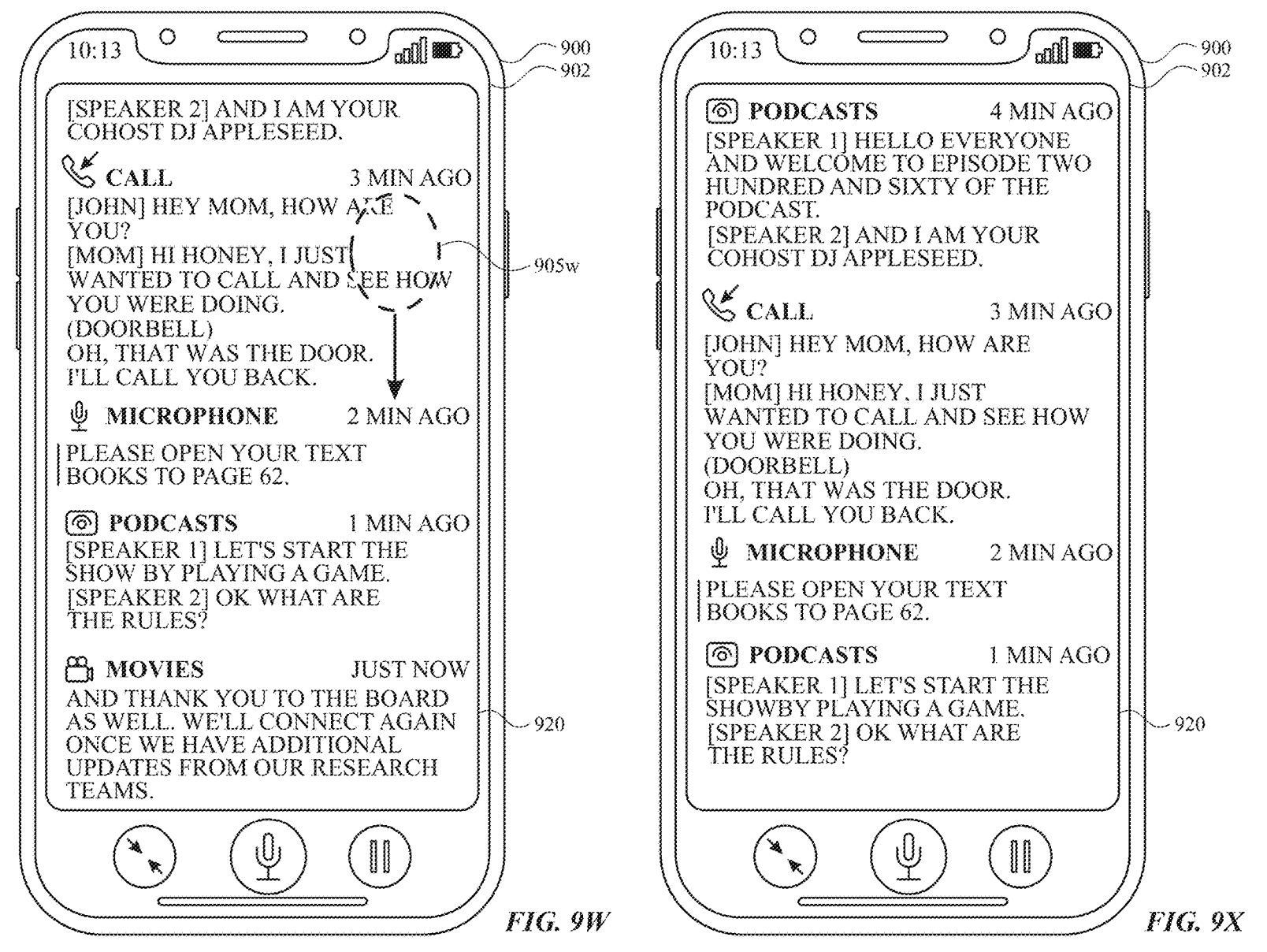

Application switch interface 970 includes application previews 972 including application preview 972a corresponding to the captions feature of device 900. While displaying application switch interface 970, device 900 detects selection of application preview 972a. The selection is a tap gesture 905v on application preview 972a. As shown in FIG. 9W, in response to detecting tap gesture 905v, device 900 displays captions interface 920.

In some embodiments, displaying captions interface 920 in response to selection to application preview 972a causes captions interface 920 to be displayed in an expanded state. Accordingly, as shown in FIG. 9W, captions interface 920 includes captions for multiple applications provided during operation of device 900.

As described, in some instances, only a portion of captions provided by device 900 are displayed in captions interface 920 at a given time, and other portions may be displayed by scrolling captions in captions interface 920. For example, while displaying captions interface 920, device 900 detects an input corresponding to a request to scroll captions in captions interface 920. In some embodiments, the input 905w is a swipe gesture in a downward direction on captions interface 920. As shown in FIG. 9X, in response to detecting input 905w, captions of captions interface 920 are scrolled in a direction corresponding to input 905w (e.g., a downward direction) to display additional captions. In some embodiments, captions of captions interface 920 are scrolled in a direction that is opposite to the direction of input 905w.

Figure 9Y:
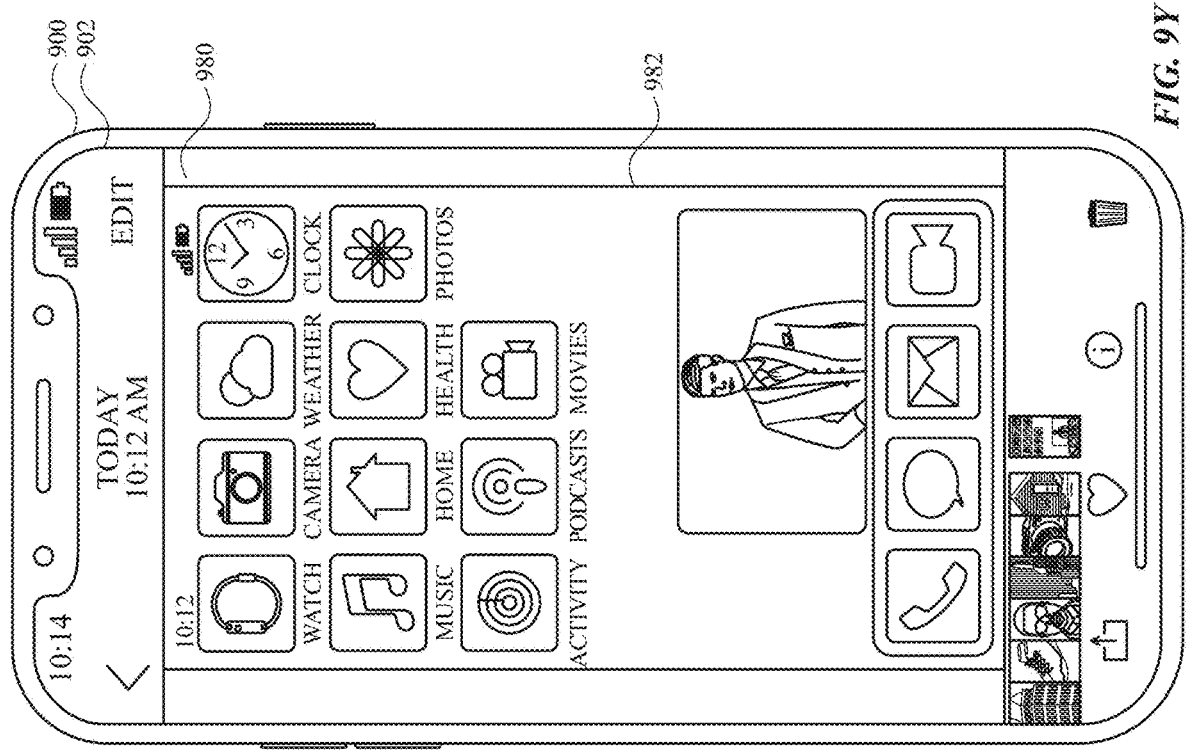

In some embodiments, captions provided by device 900 are displayed in a screenshot (e.g., an image of one or more interfaces displayed on display 902 at a given time) captured by device 900. In some embodiments captions provided by device 900 are not displayed in screenshots captured by device 900. For example, with reference to FIG. 9U, while displaying home screen interface 930, device 900 receives input 907u corresponding to a request for device 900 to capture a screenshot. In some embodiments, input 907u is a simultaneous press of buttons 903a, 903b. In FIG. 9Y, device 900 displays photos interface 980 including photo preview 982 corresponding to an image of a screenshot generated in response to input 907u. As shown, photo preview 982 does not include captions interface 920 (which was displayed at the time input 907u was detected).

In the examples described in FIGS. 9Z-9AI, a device 901 (e.g., a device having one or more features of device 100, 300, 500, 600, and/or 900) causes display, on display 903, of the user interfaces described below. In some embodiments, display 903 is an integrated part of device 901. In some embodiments, device 901 is a separate device (e.g., a desktop computer or a laptop computer) that is in communication (e.g., wireless, wired) with display 903. In some embodiments, device 901 is in communication with one or more input devices, such as a keyboard or a mouse.

Figure 9Z:
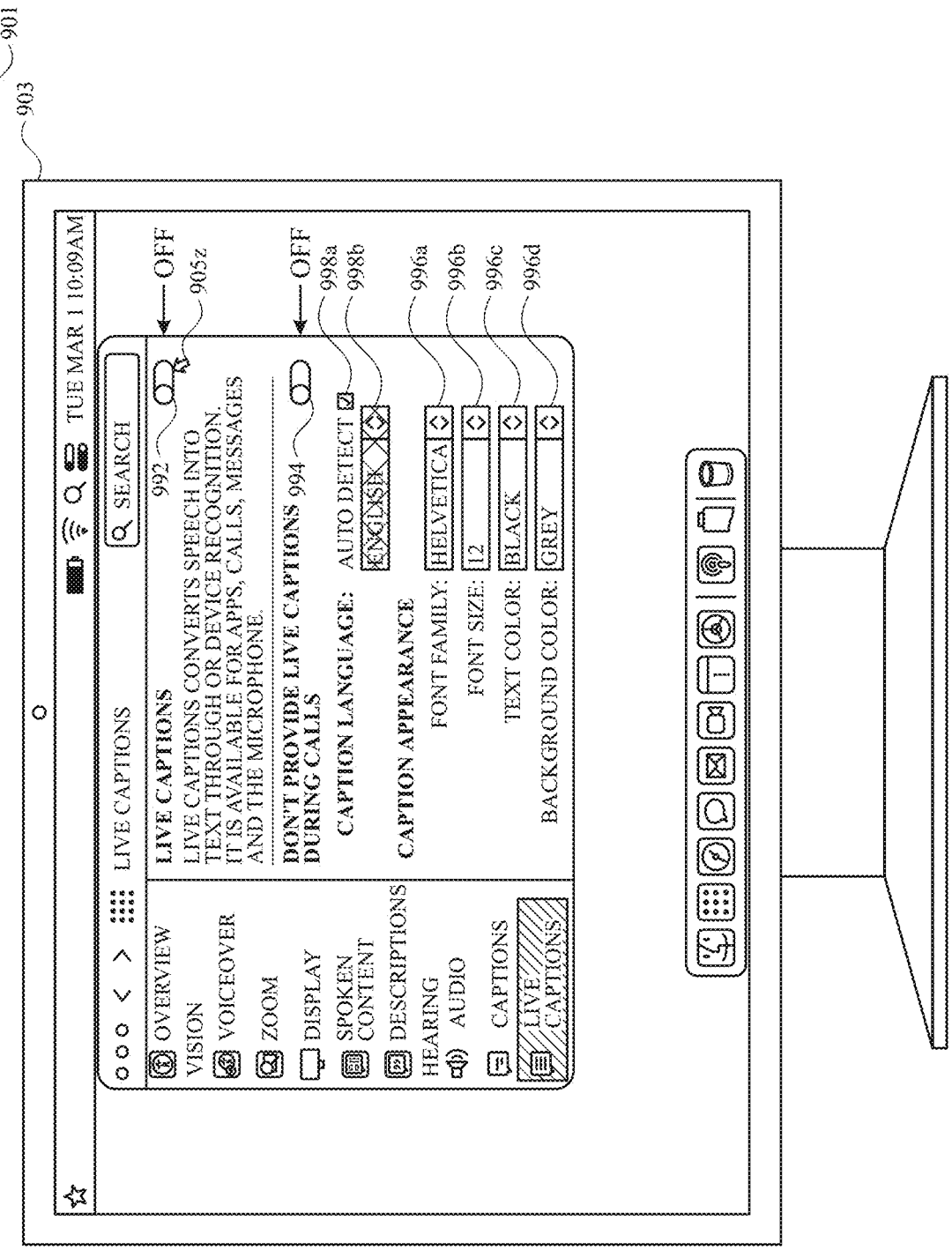
Figure 9A:
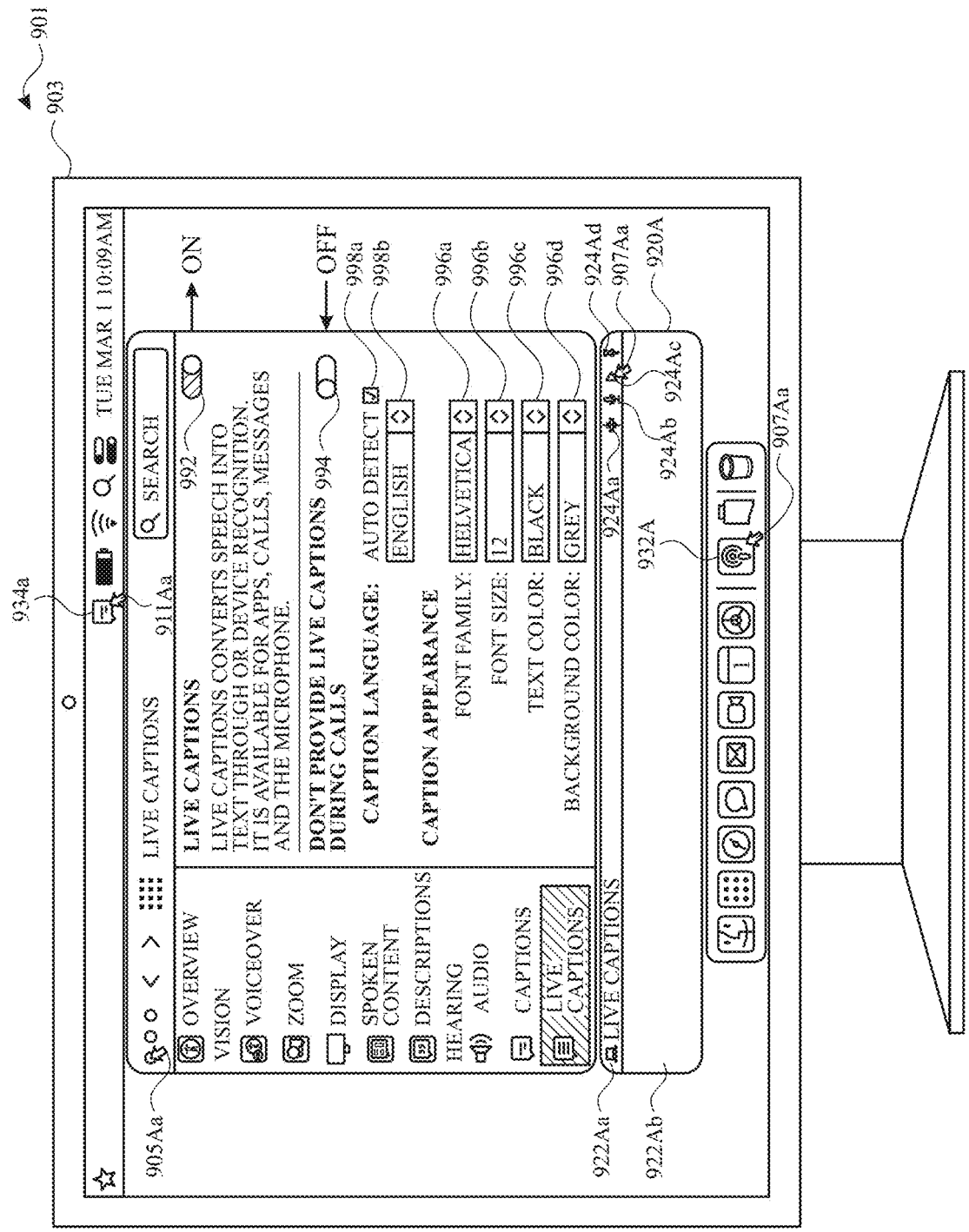
Figure 9A:
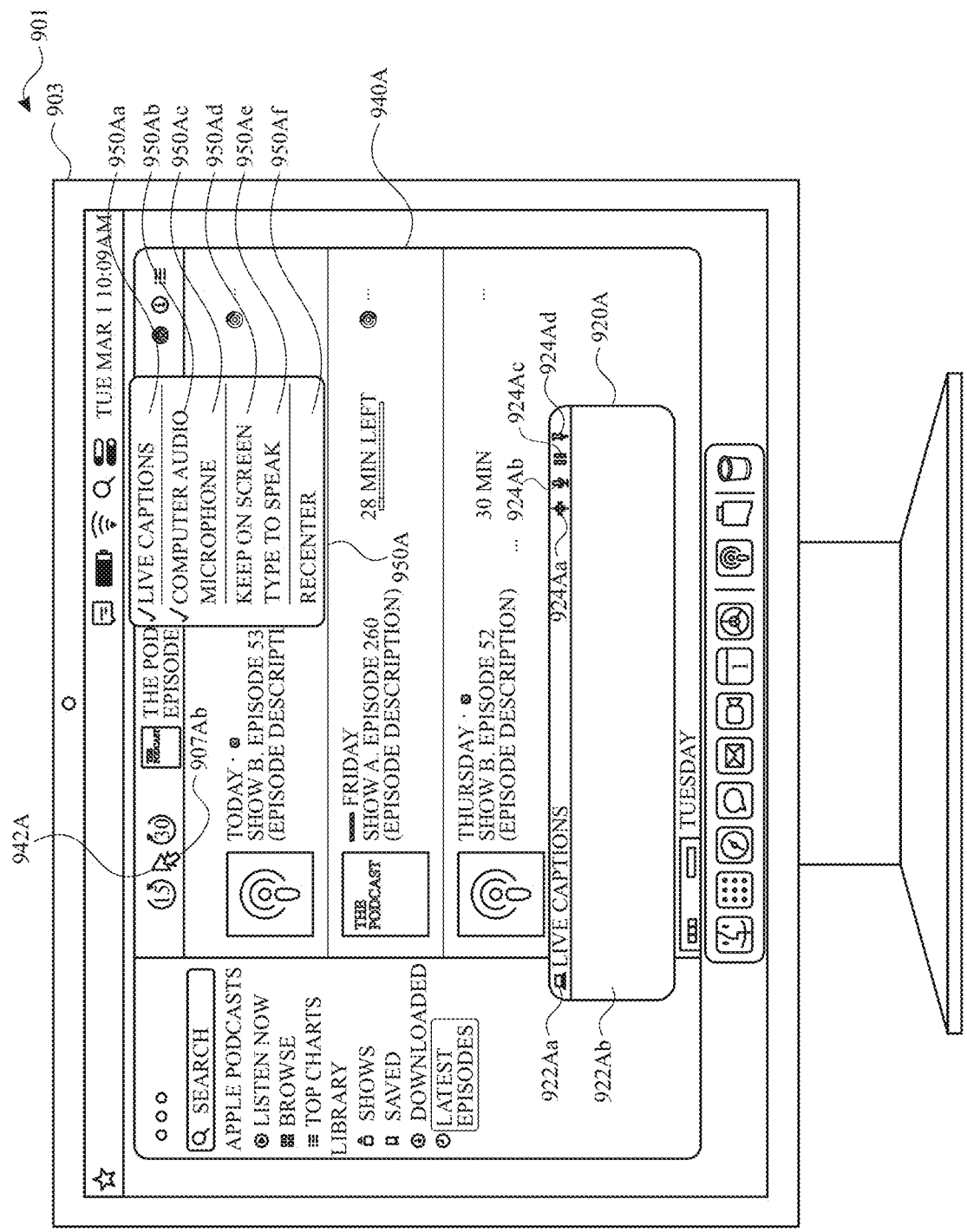
Figure 9A:
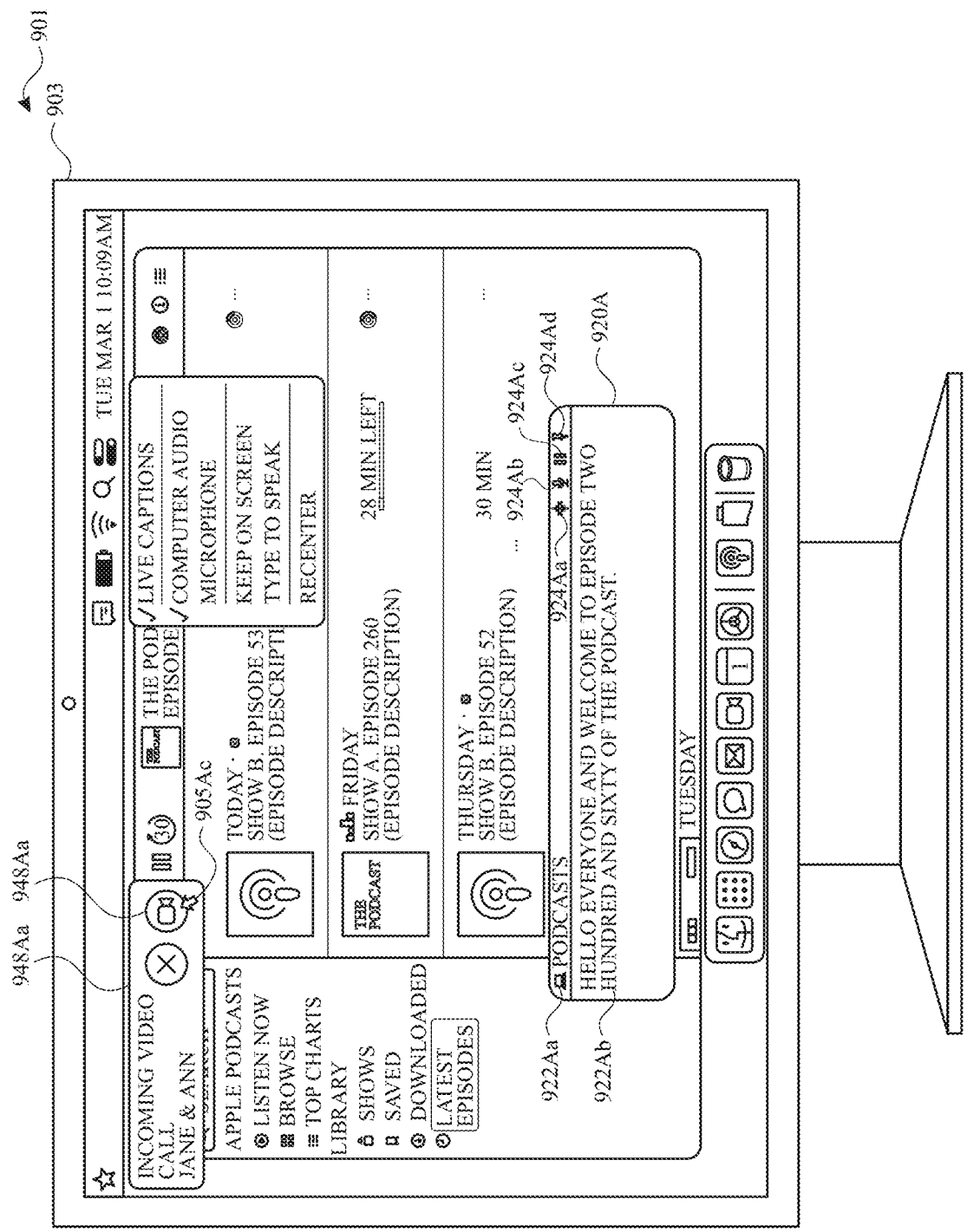
Figure 9A:
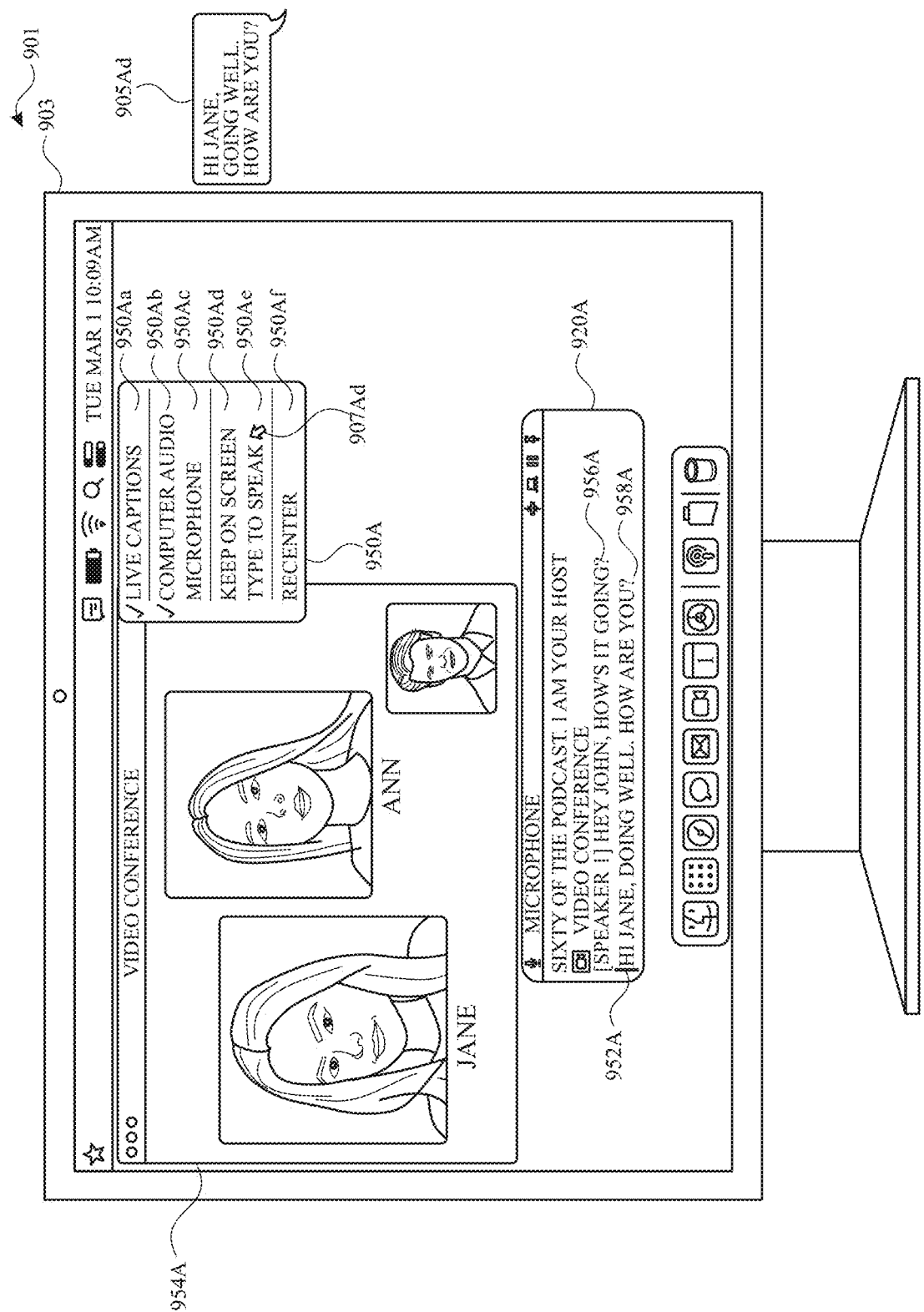
Figure 9A:
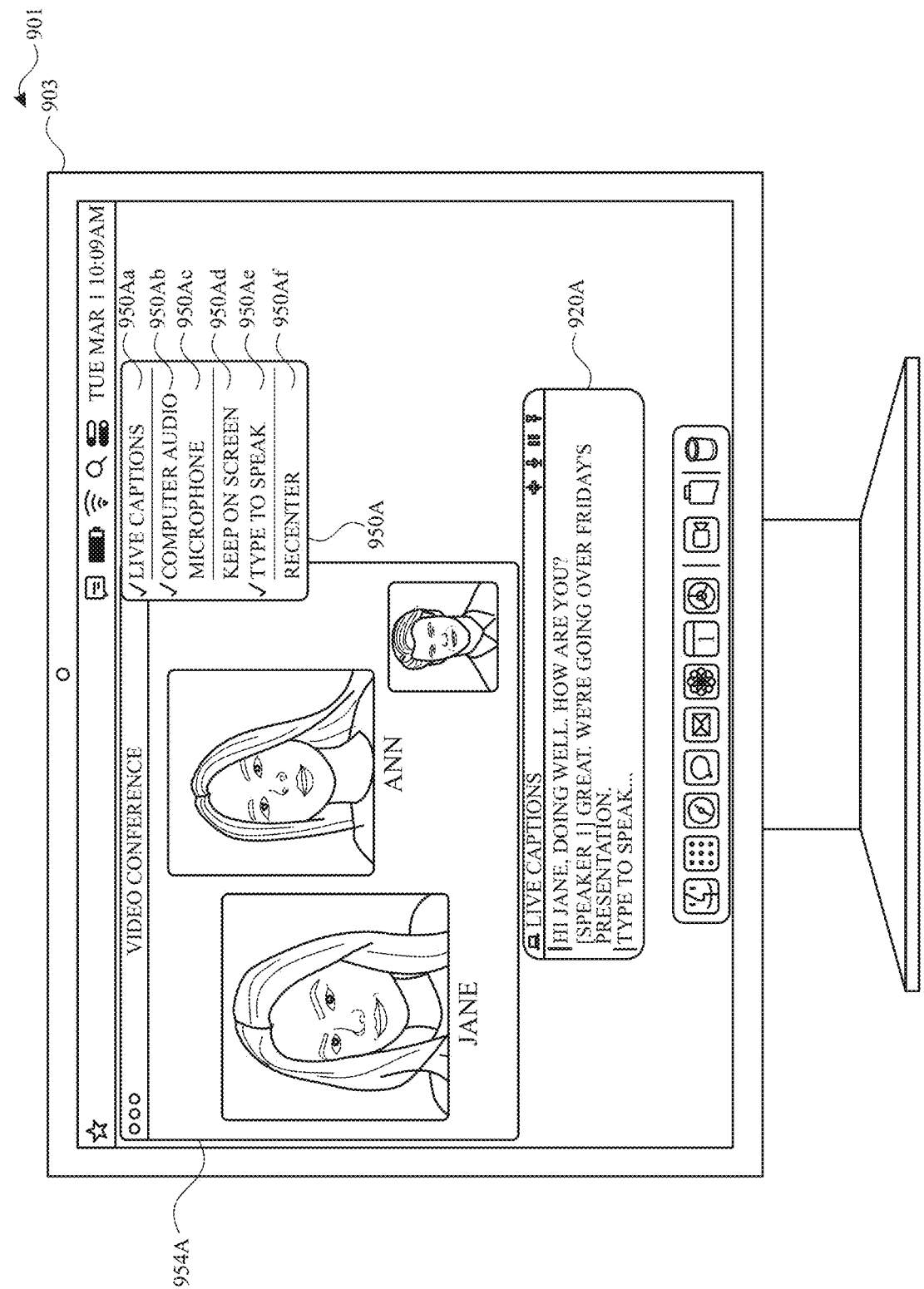
Figure 9A:
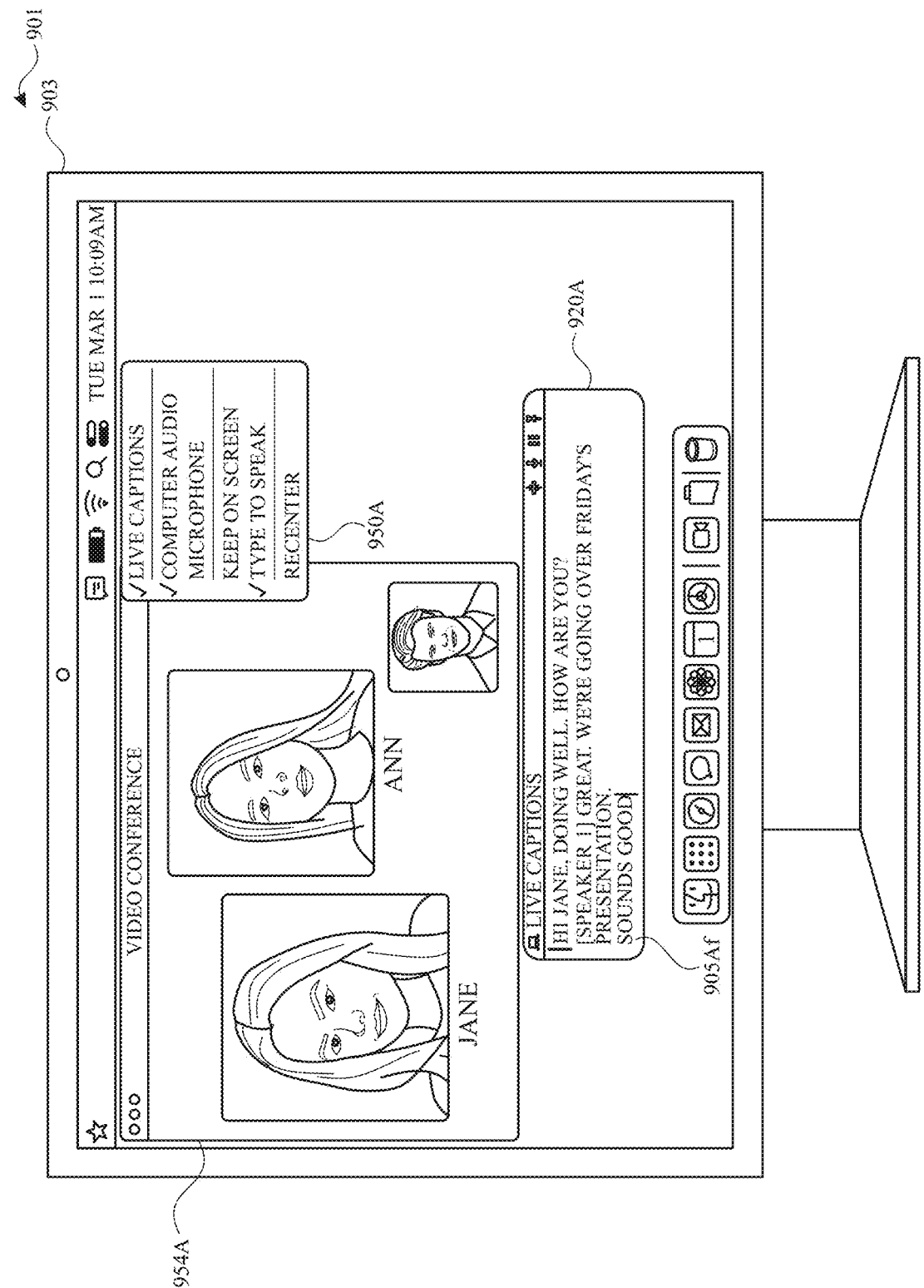
Figure 9A:
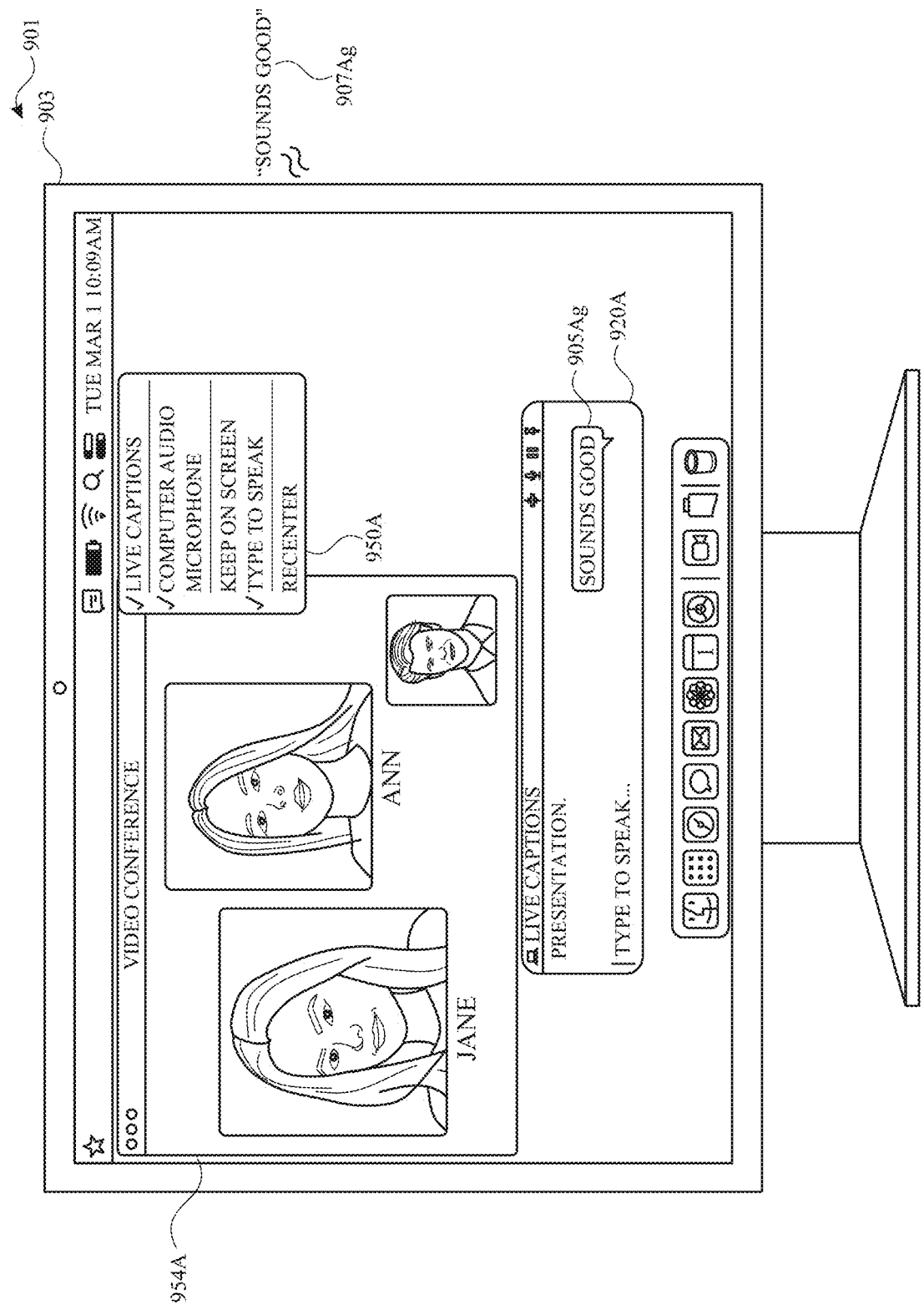
Figure 9A:
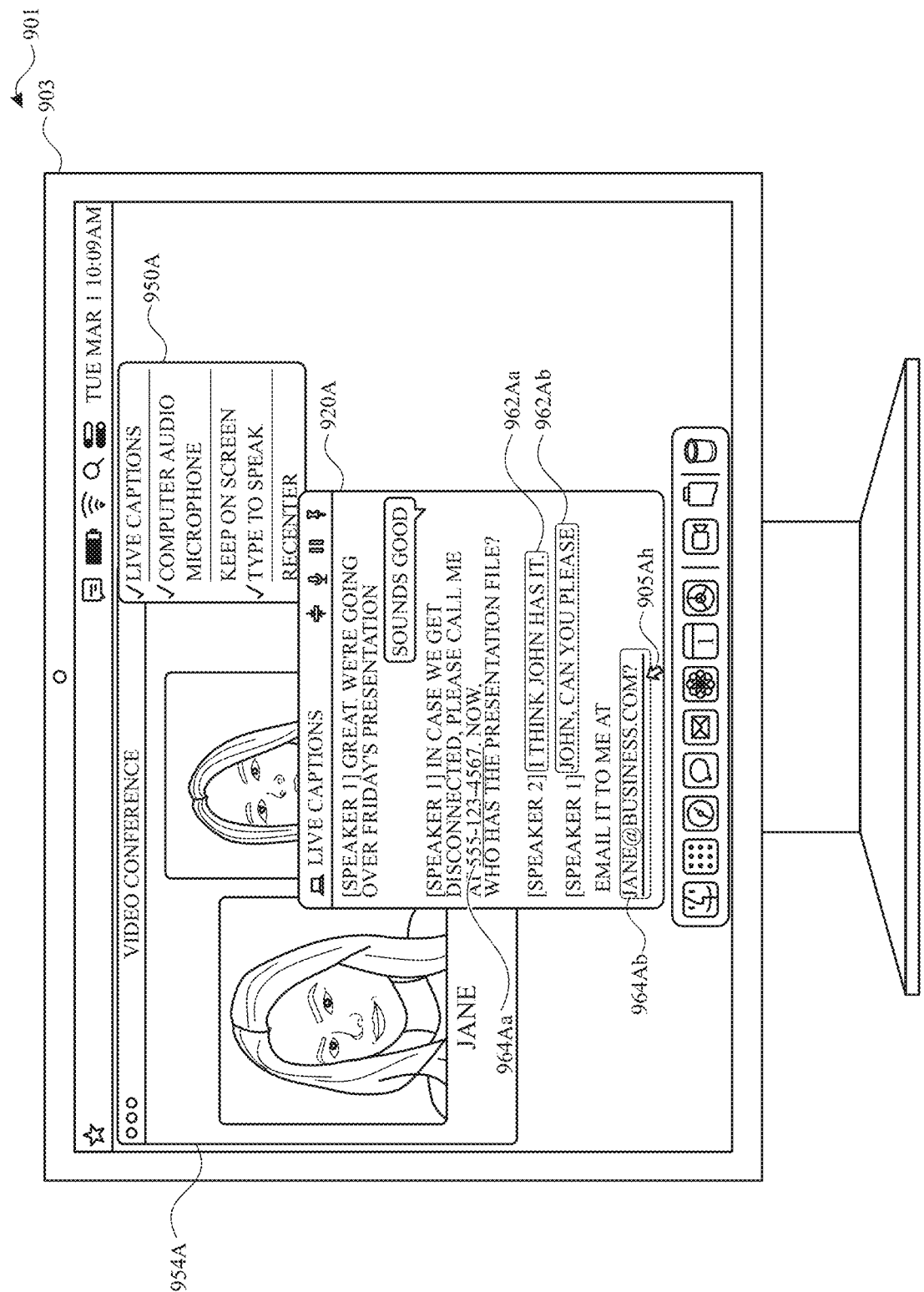
Figure 9A:
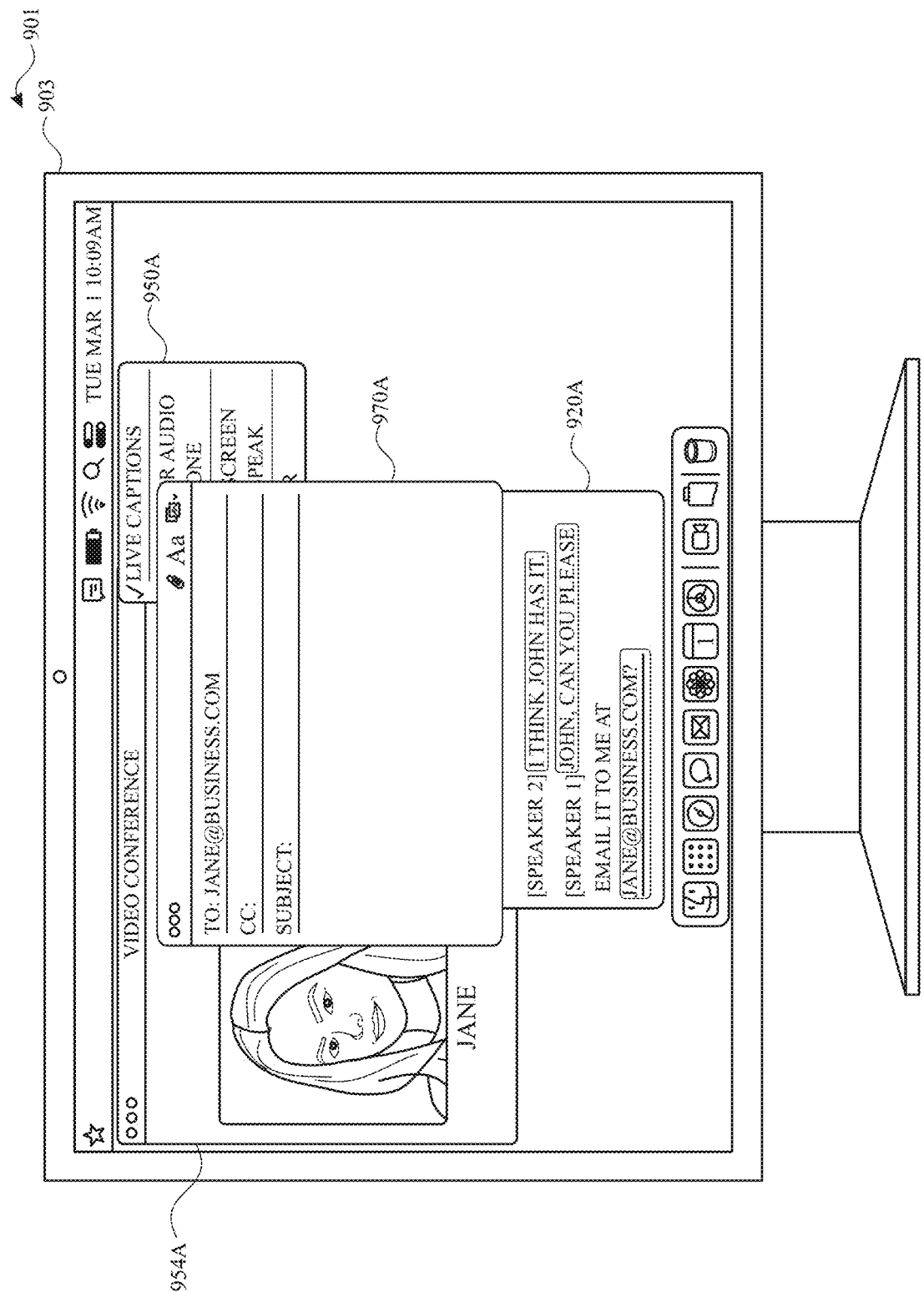

In FIG. 9Z, device 901 displays, on display 903, a captions settings interface 990 for managing various aspects of captions (e.g., provided on device 901). Captions settings interface 990 includes enable option 992, caption option 994, text options 996a, 996b, color options 996c, 996d, and language options 998a, 998b.

Enable option 992, when enabled, enables a captions feature on device 901. In some embodiments, enabling the captions feature causes device 901 to display a captions interface that provides captions (e.g., transcriptions) based on audio provided and/or received by device 901. Caption option 994, when enabled, prevents captioning during live communication sessions, such as phone calls, video calls, conference calls, and the like. In some embodiments, caption option 994 is displayed only when a captions feature is enabled on device 901.

In some embodiments, various visual characteristics of captions provided in this manner may be modified. As an example, text font may be modified using text option 996a. As another example, text size may be modified using text option 996b. As yet another example, text color may be modified using color option 996c. As yet another example, a background color of the captions interface may be modified using color option 996d.

In some embodiments, captions provided by device 901 may be provided in various languages. By way of example, language option 998a may be enabled to cause device 901 to detect a language of an audio source and provide captions in the detected language. In another example, if language option 998a is not enabled, language option 998b (e.g., a drop down menu or other selection mechanism) may be used to manually select a language for captions.

In an example operation, device 901 detects selection of enable option 992 while displaying captions interface 990. The selection is a user input 905z (e.g., a mouse click and/or touch gesture) on enable option 992. As shown in FIG. 9AA, in response to detecting input 905z, device 900 displays captions interface 920A and toggles a state of enable option 992 from "off" to "on", indicating that the captions feature has been enabled on device 901. In some embodiments, captions interface 920A is overlaid on captions settings interface 990. In some embodiments captions interface 920A is displayed adjacent to captions settings interface 990.

In some embodiments, captions interface 920A includes indicator 922Aa and text portion 922Ab. Indicator 922Aa indicates that captions interface 920A is an interface for providing captions of audio received by device 901 (e.g., "Live Captions"). Optionally, in some embodiments, indicator 922Aa indicates a current source of audio for captions provided by device 901. Text portion 922Ab, optionally, indicates a state of the captions feature (e.g., paused and/or waiting) and/or includes captions provided by device 901.

In some embodiments, captions interface 920A further includes controls 924A. Controls 924A include minimize affordance 924Aa, microphone affordance 924Bb, enable affordance 924Ac, and overlay affordance 924Ad. Minimize affordance 924Aa, when selected, causes a size of captions interface 920A to be reduced. In some embodiments, reducing a size of captions interface 920A in this manner includes ceasing display of one or more of indicators 922Aa, text portion 922Ab, and controls 924Aa-d. Microphone affordance 924Ab, when selected, activates microphone captions such that device 901 provides captions based on user inputs (e.g., speech and/or audio inputs) and/or other auditory inputs detected by device 901 (e.g., non-verbal sounds, speech inputs from speakers other than a user of device 901). Enable affordance 924Ac, when selected, activates captions on device 901 such that device 901 provides captions in captions interface 920A, for instance, based on audio received by device 901. Overlay affordance 924Ad, when selected, causes device 901 to overlay captions interface 920A over any other displayed interfaces.

While displaying captions interface 920A (and captions settings interface 990), device 901 detects a request to cease display of captions settings interface 990. The request is a user input 905Aa (e.g., mouse click and/or touch gesture) on a close affordance of captions settings interface 990. Further while displaying captions interface 920A, device 901 detects selection of enable affordance 924Ac. The selection is a user input 907Aa (e.g., mouse click and/or touch gesture) on enable affordance 924Ac. As shown in FIG. 9AB, in response to detecting user input 907Aa, device 901 modifies display of enable affordance 924Ac (e.g., from a "play" indicator to a "pause" indicator) to indicate captioning has been activated on device 901.

With reference once again to FIG. 9AA, device 901 further detects selection of application affordance 932A corresponding to a podcast application (e.g., located in an application dock displayed on display 903) and selection of captions option affordance 934A (e.g., located in a menu bar). Selection of application affordance 932A is a user input 909Aa (e.g., mouse click and/or touch gesture), and selection of captions option affordance 934A is a user input 911Aa (e.g., mouse click and/or touch gesture).

As shown in FIG. 9AB, in response to detecting user input 907Aa, device 901 opens (e.g., executes and/or displays) the podcast application and displays podcast interface 940A including a play affordance 942A.

In response to detecting user input 909Aa (FIG. 9AA), device 901 displays captions menu 950A. Captions menu 950A includes enable option 950Aa which when enabled, activates captioning on device 901. As shown, enable option 950Aa is displayed as being enabled (e.g., as indicated by a checkmark adjacent to enable option 950Aa) (recall that a captioning was activated in response to selection of enable affordance 924Ac). Captions menu 950A further includes audio source options 950Ab and 950Ac. Audio source option 950Ab, when enabled, causes device 901 to provide captions based on audio received from one or more applications executing on device 901. Audio source option 950Ac, when enabled, activates microphone captioning on device 901. In some embodiments, only one of audio source options 950Ab and 950Ac may be enabled at a given time. In other embodiments, audio source options 950Ab and 950Ac may be enabled simultaneously. Captions menu 950A further includes overlay option 950Ad, which when enabled, causes device 901 overlay captions interface 920A over other displayed interfaces. Captions menu 950A further includes text-to-speech option 950Ae, which when enabled, causes device 901 to provide audio outputs (e.g., synthetic speech) based on textual input provided by a user in captions interface 920A. In some embodiments, a user of device 901 may select a synthetic voice for audio outputs provided in this manner. Captions menu 950A further includes recenter option 950Af, which when selected, causes device 901 to reposition (e.g., center) display captions interface 920A horizontally and/or vertically on display 903.

While displaying podcast interface 940A, device 901 detects selection of play affordance 942A. The selection is a user input 907Ab (e.g., mouse click and/or touch gesture) on enable affordance 924Ac. As shown in FIG. 9AC, in response to detecting user input 907Aa, initiates playback of a podcast episode. During playback of the podcast, indicator 922Aa of captions interface 920 indicates a source of audio (e.g., "Podcasts") and text portion 922Ab of captions interface 920 includes captions derived from audio of the podcast episode (e.g., "Hello everyone . . . "). Optionally, device 901 indicates a time at which captions are provided.

While displaying captions interface 920A (e.g., overlaid on podcast interface 940A), device 901 displays video notification 948Aa indicating that device 901 is currently receiving an invitation to join a live communication session (e.g., video call and/or conference call). While displaying video notification 948Aa, device 901 detects selection of acceptance affordance 948Aa of call notification 948A to accept the invitation to join the live communication session. The selection is a user input 905Ac (e.g., mouse click and/or touch gesture) on acceptance affordance 948Aa. As shown in FIG. 9AD, in response to detecting user input 905Ac, device 901 displays communication interface 954A of a video communication application and initiates a live communication session with contacts "Jane" and "Anne".

During the live communication session, device 901 provides captions corresponding to various participants (e.g., individuals speaking). For example, captions may be provided based on input provided by contacts with which the user of device 901 is communicating. During the live communication session, for instance, device 901 receives audio from the video communication application corresponding to a contact identified as "Speaker 1" (e.g., Jane) and provides corresponding caption 956A ("Hey John, how's it going?"). As another example, captions may be provided based on input provided by a user of device 901. During the live communication session, device 901 receives a speech input 905Ad (e.g., "Hi Jane. Doing well. How are you?") from a user of device 901 (e.g., via a microphone integrated in and/or in communication with device 901) and provides corresponding caption 958A. In some embodiments, during live communication sessions, one or more inputs provided by a user are not captioned if microphone captioning is not activated.

In some embodiments, device 901 identifies captions in captions interface 920A corresponding to inputs provided by a user. For example, device 901 may display an indicator, such as indicator 952A, to identify captions corresponding to user inputs (and, optionally, other inputs detected by a microphone of device 901). In some embodiments, device 901 highlights all user inputs in this manner (e.g., both speech and text inputs).

During the live communication session, device 901 detects selection of text-to-speech option 950Ae. The selection is a user input 907Ad (e.g., mouse click and/or touch gesture) on text-to-speech option 950Ae. As shown in FIG. 9AE, in response to detecting user input 907Ad, device 901 indicates text-to-speech has been activated for user inputs in captions interface 920A (e.g., by displaying a checkmark next to text-to-speech option 950Ae) and indicates in text portion 922Ab, that device 901 will provide synthetic speech based on text input provided by a user (e.g., "Type to speak").

For example, as shown in FIG. 9AF, device 901 receives text input 905Af (e.g., "sounds good"). As shown in FIG. 9AG, in response to a request to submit the text input 905Af (e.g., a press of an enter key and/or providing a particular touch gesture), device 901 displays input 905Af in captions interface 920A as a speech bubble 905Ag and provides a synthetic speech output 907Ag corresponding to input 905Af. In some embodiments, text input 905Af and/or speech output 907Ag may also be provided to devices corresponding to other participants of the live communication session (e.g., Jane and Ann), which may in turn provide synthetic speech outputs corresponding to text input 905Af and/or speech output 907Ag. In this manner, a user of device 901 may verbally communicate to other participants of the live communication session using textual inputs.

In some embodiments, device 901 visually emphasizes (e.g., highlights, bolds, and/or underlines) captions of interest. As an example, in some embodiments, device 901 highlights captions referencing a user of device 901. FIG. 9AH, for instance, depicts the live communication session at a time after captions 962Aa, 962Ab referencing a user ("John") of device 901 have been provided. As shown, each of the captions 962Aa and 962Ab are highlighted such a user of device 901 can easily identify instances in which the user was referenced during the live communications session.

In some embodiments, device 901 highlights at least a portion of captions including one or more predetermined data types (e.g., email address, phone number, address, time and/or place). As shown in FIG. 9AH, for instance, a phone number of caption 964Aa is highlighted, and an email address of caption 964Ab is highlighted. In some embodiments, portions of captions highlighted in this manner are interactive objects. For example, while displaying caption 964Ab, device 901 detects selection of the email address of caption 964Ab. The selection is a user input 905Ah (e.g., mouse click and/or touch gesture) on the email address of caption 964Ab. As shown in FIG. 9AI, in response to detecting user input 905Ah, device 901 displays draft communications interface 970A, corresponding to an email application, and populates a "To" field of the email with the email address of caption 964Ab.

In some embodiments, transcripts may be stored on device 901. For example, a transcript for a meeting (e.g., a meeting held using a live communication session) may be saved in and/or otherwise associated with a calendar event in a scheduling application. In this manner, a user of device 901 may review the transcript of the meeting to review captions of the meeting, for instance, to recall what was discussed during the meeting. In some embodiments, transcripts saved in this manner may be searchable using the scheduling application and/or an operating system search function of device 901.

FIG. 10 is a flow diagram illustrating a method for providing captions in accordance with some embodiments. Method 1000 is performed at a computer system (e.g., 100, 300, 500, 600, 900, and/or 901) (e.g., a smartphone, a smartwatch, a head mounted device (e.g., a head mounted augmented reality and/or extended reality device), and/or a personal computer) that is in communication with a display generation component (e.g., 902) (e.g., a display, a display controller, a head mounted display system, and/or a touch-sensitive display). Some operations in method 1000 are, optionally, combined, the orders of some operations are, optionally, changed, and some operations are, optionally, omitted.

As described below, method 1000 provides an intuitive way for providing captions. The method reduces the cognitive burden on a user for providing captions, thereby creating a more efficient human-machine interface. For battery-operated computing devices, enabling a user to provide faster and more efficiently conserves power and increases the time between battery charges.

The computer system receives (1002) first information (e.g., captions of display interface 920 in FIG. 9G) (e.g., caption metadata and/or audio) corresponding to first audio (e.g., audio from podcast episode 260 of FIG. 9G) in (e.g., directed to and/or from) a first application (e.g., podcast application in FIG. 9G) (e.g., a voice communication application, a video communication application, a video player application, a music application, or a game application);

The computer system receives (1004) second information (captions of display interface 920 in FIG. 9I) (e.g., caption metadata and/or audio) corresponding to second audio (e.g., audio from phone call in FIG. 9I) in (e.g., directed to and/or from) a second application (e.g., phone application in FIG. 9I) (e.g., a voice communication application, a video communication application, a video player application, a music application, or a game application) that is different from the first application; and The computer system displays (1006), via the display generation component, a system audio transcript (e.g., captions in captions interface 920) (e.g., in a captions window and/or in a bottom portion of a display). In some embodiments, displaying the system audio transcript includes displaying a first transcript portion (1008) of the system audio transcript that includes a first caption (e.g., caption "Hello everyone" as illustrated in FIG. 9N) based on (e.g., determined using the caption metadata and/or transcribed or otherwise determined using the audio) the first audio (e.g., the first caption is based on the first audio when caption metadata (used to produce the first caption) corresponds to the first audio and/or the first caption is based on the first audio when the first caption is a transcription of the first audio). In some embodiments, the first caption is generated using the first information. In some embodiments, displaying the system audio transcript includes displaying a second transcript portion (1010) of the system audio transcript that includes a second caption (e.g., "I'll call you back" as illustrated in FIG. 9N, different from the first caption, based on (e.g., determined using the caption metadata and/or transcribed or otherwise determined using the audio) the second audio (e.g., the second caption is based on the second audio when caption metadata (used to produce the second caption) corresponds to the second audio and/or the second caption is based on the second audio when the second caption is a transcription of the second audio). In some embodiments, the second caption is generated using the second information. Displaying captions based on audio of two different applications in a system audio transcript enables the computer system to combine display of the captions into a single transcript area, thereby providing the user with improved visual feedback about the audio of the applications.

In some embodiments, the first caption and the second caption (and/or the first transcript portion and the second transcript portion) are displayed sequentially (e.g., captions interface 920 in FIG. 9G and captions interface 920 in FIG. 9K) (e.g., in a same window or display region). In some embodiments, the second transcript portion replaces display of the first transcript portion. Displaying the first caption and the second caption sequentially enables the computer system to provide the user with feedback about which caption is based on the most recent audio, thereby providing the user with improved visual feedback about the audio of the applications.

In some embodiments, the first caption and the second caption (and/or the first transcript portion and the second transcript portion) are displayed concurrently (e.g., captions interface 920 in FIG. 9N)(e.g., in a same window or display region). In some embodiments, the second transcript portion is displayed adjacent to (e.g., next to and/or below) the first transcript portion. Displaying the first caption and the second caption concurrently enables the computer system to provide the user with feedback about both captions at the same, giving the user more time to review the captions and thus providing the user with improved visual feedback about the audio of the applications.

In some embodiments, displaying the first transcript portion and the second transcript portion comprises, in accordance with a determination that the system audio transcript (e.g., a caption window and/or a first user interface region (e.g., in a captions window and/or in a bottom portion of a display)) is at a reduced size, the first caption and the second caption (and/or the first transcript portion and the second transcript portion) are displayed sequentially (e.g., one after the other and/or the second transcript replaces display of the first transcript) in the system audio transcript (e.g., in a same window or display region). In some embodiments, displaying the first transcript portion and the second transcript portion comprises, in accordance with a determination that the system audio transcript (e.g., a caption window and/or a first user interface region (e.g., in a captions window and/or in a bottom portion of a display)) is not at the reduced size (e.g., is at a moderate size or is at an enlarged size), the first caption and the second caption (and/or the first transcript portion and the second transcript portion) are displayed concurrently in the system audio transcript (e.g., in a same window or display region). Displaying the first and second captions sequentially when the system audio transcript is at a reduced size and displaying the first and second captions concurrently when the system audio transcript is not at the reduced size (e.g., is larger) enables the computer system to optimize use of the area of the system audio transcript, thereby providing the user with improved visual feedback about the audio of the applications.

In some embodiments, the computer system is in communication with one or more input devices (e.g., a touch-sensitive surface (e.g., a touchscreen), a mouse, and/or a keyboard). In some embodiments, the computer system receives, via the one or more input devices, a scroll input (e.g., 905w) (e.g., a swipe gesture, an air gesture, and/or a gesture directed to the system audio transcript). In some embodiments, in response to receiving the scroll input, the computer system scrolls, via the display generation component, contents of the system audio transcript. In some embodiments, scrolling the system audio transcript includes ceasing to display the second caption and newly displaying a third caption that was not displayed prior to receiving the scroll input. In some embodiments, a direction of the scrolling (e.g., up, down, right, and/or left) of contents of the system audio transcript is based on a direction of the scroll input (e.g., up, down, right, and/or left). In some embodiments, an upward scroll input causes an upward scroll of contents of the system audio transcript and a downward scroll input cases a downward scroll of contents of the system audio transcript. In some embodiments, a magnitude of the scrolling (e.g., speed and/or amount of scrolling) of contents of the system audio transcript is based on a magnitude (e.g., speed, duration, and/or amount) of the scroll input. Scrolling the system audio transcript enables the computer system to display, based on user input, captions from earlier portions of audio, allowing the user to review speech and/or sounds that occurred earlier in the audio, thereby providing the user with improved visual feedback about the audio of the applications.

In some embodiments, in accordance with a determination that a set of indicator conditions is met for the first transcript portion, the computer system displays (e.g., adjacent to or in the first transcript portion, or not adjacent to and not in the first transcript portion), via the display generation component, an indication (e.g., 922a, "Podcasts", "Call", "Microphone") (e.g., an application name and/or application icon) of the first application (e.g., a voice communication application, a video communication application, a video player application, a music application, or a game application). In some embodiments, in accordance with a determination that the set of indicator conditions is met for the second transcript portion, the computer system displays (e.g., adjacent to or in the second transcript portion or not adjacent to and not in the second transcript portion), via the display generation component, an indication of the second application (e.g., 922a, "Podcasts", "Call", "Microphone" (e.g., a voice communication application, a video communication application, a video player application, a music application, or a game application). Displaying indications of the respective applications corresponding to the respective transcripts provides the user with feedback about which transcripts correspond to which applications and provides the user with feedback about the contents of the audio of the applications, thereby providing the user with improved visual feedback about the audio of the applications.

In some embodiments, the set of indicator conditions is met for a respective transcript portion when the respective application (e.g., "Movies" application, displayed in PiP mode in FIG. 9U) corresponding to the respective transcript portion is not displayed prominently (e.g., does not take up more than a predefined amount (e.g., 50% or 80%) of the display space and/or is not displayed in a full screen mode). In some embodiments, while an indication of the first application is displayed in conjunction with the first transcript portion, the computer system begins to prominently display a window of the first application and, in response, ceases to display the indication of the first application in conjunction with the first transcript portion. In some embodiments, while an indication of the second application is displayed in conjunction with the second transcript portion, the computer system begins to prominently display a window of the second application and, in response, ceases to display the indication of the second application in conjunction with the second transcript portion. Not including the indication of the respective application for a respective transcript portion when the corresponding respective application is displayed prominently enables the computer system to conserve display space and avoid cluttering the user interface while still providing the user with information about which application the audio/transcript relates to, thereby providing the user with improved visual feedback about the audio of the applications.

In some embodiments, the computer system displays, via the display generation component, an indication of a time (e.g., 922c) (e.g., 3:04 pm and/or 5 minutes ago) (and, optionally, a date) when audio corresponding to a respective caption was received (e.g., the audio is a person speaking during a real-time communication session and the time indicates when the person spoke). In some embodiments, the indication of the time is displayed adjacent to the respective caption. In some embodiments, the indication of the time is displayed in response to user input requesting to display the time information. Displaying an indication of time of when audio corresponding to a respective caption was received provides the user with visual feedback about the recency of the display captions, thereby providing the user with improved visual feedback about the audio of the applications.

In some embodiments, the computer system is in communication with one or more input devices (e.g., a touch-sensitive surface (e.g., a touchscreen), a mouse, and/or a keyboard). In some embodiments, the computer system receives, via the one or more input devices, input (e.g., 909m, 905p, 905o, 907q) adjusting the system audio transcript (e.g., a caption window and/or a first user interface region (e.g., in a captions window and/or in a bottom portion of a display)) in which the first caption and the second caption are displayed. In some embodiments, in response to receiving the input adjusting the system audio transcript, in accordance with a determination that the input (e.g., 909m, 905p, 907q) adjusting the system audio transcript is a resizing input, the computer system resizes the system audio transcript in accordance with the resizing input (e.g., independent from the first application and second application). In some embodiments, in response to receiving the input adjusting the system audio transcript, in accordance with a determination that the input adjusting the system audio transcript is a repositioning input (e.g., 905o), the computer system moves the system audio transcript in accordance with the repositioning input (e.g., without resizing the system audio transcript and/or independent from the first application and second application). In some embodiments, the system audio transcript is overlaid on a user interface of the first application and/or second application. Moving and/or resizing the system audio transcript enables the computer system to display the system audio transcript with a user's preferred size (which optionally affects the amount of captions the system audio transcript displays) and at a preferred location (which helps avoid overlaying the content on other user interface elements that the user prefers to view). Moving/resizing the system audio transcript also enables the computer system to display the content while the user views other content on the same display, thereby providing the user with improved visual feedback about the audio of the applications.

In some embodiments, while displaying, at a first location via the display generation component, the system audio transcript (e.g., a caption window and/or a first user interface region (e.g., in a captions window and/or in a bottom portion of a display)) in which the first caption and the second caption are displayed, the computer system receives user input (e.g., 905h and an input terminating the phone call of FIGS. 9I-9J) adjusting display of the first application and/or the second application (e.g., "Podcasts" and/or "Phone"). In some embodiments, in response to receiving the user input adjusting display of the first application and/or the second application, the computer system adjusts (e.g., moving, resizing, closing, minimizing, maximizing, and/or changing views of) display of the first application and/or the second application while continuing to display, at the first location, the system audio transcript in which the first caption and the second caption are displayed. Continuing to display the system audio transcript at the same location while the display of other applications are adjusted enables the computer system to provide the user with a consistent experience where there user can continuously view the captions while other displays of other applications are adjusted, thereby providing the user with improved visual feedback about the audio of the applications.

In some embodiments, the computer system is in communication with one or more input devices (e.g., a touch-sensitive surface (e.g., a touchscreen), a mouse, and/or a keyboard). In some embodiments, the computer system receives, via the one or more input devices, user input (e.g., selection of 912 to disable a captions feature, 907q). In some embodiments, in response to receiving the user input and in accordance with a determination that the user input corresponds to a request to stop displaying (and, optionally, currently displayed) captions (e.g., a button is toggled to the OFF position and/or user selects button for ceasing display of captions), the computer system stops display of further captions (e.g., until further user input is received enabling display of further captions and/or until a predefined amount of time has passed). In some embodiments, in response to receiving the user input and in accordance with a determination that the user input corresponds to a request to initiate displaying further (and, optionally, previously displayed) captions (e.g., a button is toggled to the ON position and/or user selects button for initiating display of captions), initiating display of further captions. The computer system providing the user with an option to cease displaying further captions improves the useability and security of the computer system, such as by enabling the user to cease displaying further captions when the captions are no longer needed and/or to cease displaying further captions of a confidential call when another person is able to see the display of the computer system.

In some embodiments, the computer system is in communication with one or more input devices (e.g., a touch-sensitive surface (e.g., a touchscreen), a mouse, and/or a keyboard). In some embodiments, the computer system receives, via the one or more input devices, user input (e.g., 907q) requesting to transition the system audio transcript, which includes the first caption and the second caption, to a minimized state. In some embodiments, in response to receiving the user input requesting to transition the system audio transcript to the minimized state, the computer system updates display of the system audio transcript to the minimized state (e.g., while not displaying further captions and/or while not displaying captions).

In some embodiments, while the system audio transcript is in the minimized state, the computer system generates captions corresponding to respective audio (e.g., first audio and/or second audio) received without displaying the captions corresponding to the respective audio received. Displaying the system audio transcript in a minimized state while continuing to generate captions enables the computer system to avoid using display space for the system audio transcript while still permitting the computer system to provide, at a later time, the captions generated while in the minimized state, thereby providing the user with improved visual feedback about the audio of the applications.

In some embodiments, subsequent to generating captions corresponding to received respective audio (e.g., audio that is part of the first audio or a continuation of the first audio stream and/or audio that is part of the second audio or a continuation of the second audio stream) without displaying the captions corresponding to the respective audio received, the computer system receives, via the one or more input devices, input (e.g., 909m) to enlarge the system audio transcript. In some embodiments, in response to receiving input to enlarge the system audio transcript, the computer system enlarges the system audio transcript (e.g., such that the system audio transcript is not in the minimized state; such that the system audio transcript is not at the reduced size, such that the system audio transcript is at a moderate size or is at an enlarged size). In some embodiments, in response to receiving input to enlarge the system audio transcript, the computer system displays, via the display generation component and as part of the system audio transcript, at least some of the generated captions corresponding to previously received respective audio that were not previously displayed. Displaying the previously generated captions once the system audio transcript is enlarged enables the computer system to provide the user with feedback about the audio that was detected while captions were being generated and not being displayed, thereby providing the user with improved visual feedback about the audio of the applications.

In some embodiments, while the system audio transcript is in the minimized state, the computer system displays, via the display generation component, an indication (e.g., based on a color of a user interface object (e.g., color of the indication that the system audio transcript is in the minimized state) and/or based on textual information) that further captions are being generated corresponding to respective audio (e.g., first audio and/or second audio) being received without displaying content of the captions. In some embodiments, when the system audio transcript is not in the minimized state, the computer system displays the further captions without displaying the indication that further captions are being generated corresponding to respective audio (e.g., first audio and/or second audio) being received. In some embodiments, subsequent to a duration of time during which the system audio transcript is in the minimized state, the computer system receives, via the one or more input devices, user input requesting to transition the system audio transcript to a non-minimized (e.g., enlarged and/or intermediate) state. in response to receiving the user input requesting to transition the system audio transcript to the non-minimized state, the computer system updates display of the system audio transcript to the non-minimized state by increasing the size of the system audio transcript and displays at least some captions from the duration of time during which the system audio transcript was in the minimized state. Displaying an indication that captions are being generated for received audio provides the user with feedback about the state of the computer system and particularly that captions are being generated even though the captions are not being displayed, thereby providing the user with improved visual feedback about the audio of the applications. Displaying an indication that captions are being generated for received audio even though the captions are not being displayed provides the user with feedback that the captions are being generated (and, optionally, stored), thereby improving privacy for the user (as the user can disable generating the captions, if the user prefers). Displaying an indication that captions are being generated for received audio while the system audio transcript is in the minimized state reduces visual clutter in the user interface of the computer system by reducing the amount of room on the display occupied by the system audio transcript, thereby providing the user with improved visual feedback.

In some embodiments, the system audio transcript is displayed as part of a third application (e.g., an operating system of the computer system and/or an application that is different from the first application and the second application) that is different from the first application and the second application. In some embodiments, the first information is metadata information that includes the first caption (e.g., in text form and/or in binary form). In some embodiments, the first information is received (e.g., by the third application) from the first application. In some embodiments, the metadata information does not include audio. In some embodiments, the third application does not generate the first caption based on audio. In some embodiments, the third application receives metadata information that includes the second caption from the second application before displaying the second caption. Displaying captions received from other applications as part of the system audio transcript enables the computer system to compile captions from various sources and display them in a single interface, thereby allowing the user to more easily access the captions and providing the user with improved visual feedback about the audio of the various applications in one location.

In some embodiments, the first caption (and/or second captions) is a movie caption (e.g., caption in 992b in FIG. 9T). In some embodiments, the first application is a video (e.g., show and/or movie) playback application. Providing movie captions in the system audio transcript enables the computer system to compile captions from a movie with other various sources and display them in a single interface, thereby allowing the user to more easily access the captions and providing the user with improved visual feedback about the audio of the applications in one location.

In some embodiments, the first caption (and/or second captions) is a video conference caption (e.g., wherein captions are displayed with or without speaker attribution). In some embodiments, the first application is a real-time video conferencing application. Providing video conference captions in the system audio transcript enables the computer system to compile captions from a video conference with other various sources and display them in a single interface, thereby allowing the user to more easily access the captions and providing the user with improved visual feedback about the audio of the applications in one location.

In some embodiments, the first information is received from an external device (e.g., the first application is running on the external device) different from the computer system. In some embodiments, the external device is on the same communication network (e.g., the same wireless network and/or the same local area network) as the computer system. In some embodiments, the external device and the computer system are both logged into the same service using the same account. Providing captions based on information received from an external device in the system audio transcript enables the computer system to compile captions from various sources and display them in a single interface, thereby allowing the user to more easily access the captions and providing the user with improved visual feedback about the audio in one location.

In some embodiments, in accordance with a determination that the first application has initiated displaying (e.g., is displaying or will display, via the display generation component of the computer system and/or via an external display) captions corresponding to audio in (e.g., directed to and/or from) the first application, the computer system ceases to display, as part of the system audio transcript, further captions corresponding to audio in the first application. In some embodiments, in accordance with a determination that the first application has not initiated displaying captions corresponding to audio in (e.g., directed to and/or from) the first application, the computer system continues to display, as part of the system audio transcript, further captions corresponding to audio in the first application. In some embodiments, the computer system pauses display of captions (corresponding to an application) in the system audio transcript when the computer system determines that the application is displaying captions. In some embodiments, the computer system pause display of captions for the respective application that is displaying captions as part of the respective application, and the computer system continues to display captions for other applications that are not displaying captions as part of the other applications. Pausing display of captions of a respective application in the system audio transcript when the respective application displays captions enables the computer system to not duplicate the captions, which saves display space and declutters the user interface, thereby providing the user with improved visual feedback about the audio of the applications without requiring further user input.

In some embodiments, in accordance with a determination that the first application has ceased displaying (e.g., is no longer displaying or will not display, via the display generation component of the computer system and/or via an external display) captions corresponding to audio in (e.g., directed to and/or from) the first application, the computer system displays, as part of the system audio transcript, further captions corresponding to audio in the first application. In some embodiments, the first application ceases to display captions corresponding to audio in the first application based on receiving user input to hide and/or disable display of captions by the first application while the first application continues to be displayed. In some embodiments, the first application ceases to display captions corresponding to audio in the first application based on the first application ceasing (e.g., based on user input or automatically) to be displayed (e.g., hidden and/or minimized). In some embodiments, in accordance with a determination that the first application has not ceased displaying captions corresponding to audio in (e.g., directed to and/or from) the first application, continuing to not display, as part of the system audio transcript, further captions corresponding to audio in the first application. In some embodiments, the computer system starts (or restarts) displaying captions (corresponding to an application) in the system audio transcript when the computer system determines that the application is not (or no longer) displaying captions. Displaying captions of a respective application in the system audio transcript when the respective application ceases displaying captions enables the computer system to provide the user with the captions of the audio of the respective application, thereby providing the user with improved visual feedback about the audio of the respective application without requiring further user input.

In some embodiments, the first application is a real-time video conferencing application and the real-time video conferencing application ceases to displaying captions corresponding to conferencing audio of a conference call in the real-time video conferencing application when the conference call is in a reduced-size state (e.g., in a picture-in-picture state or such that a user interface of the real-time video conferencing application is no longer displayed). In some embodiments, the picture-in-picture state is a state in which the real-time video conferencing application is displayed by being overlaid on top of a second application and the real-time video conferencing application can be repositioned in response to user input (without repositioning the second application). In some embodiments, transitioning from a non-picture-in-picture state to the picture-in-picture state is a state results in the real-time video conferencing application concurrently displaying representations of (e.g., video of and/or a name of) fewer participants of the real-time communication session being conducted using the real-time video conferencing application. In some embodiments, during a non-picture-in-picture state, the real-time video conferencing application concurrently displays representations of a plurality of the participants (e.g., 4, 5, or 6 participants) of the real-time communication session and in the picture-in-picture state the real-time video conferencing application displays a representation of one of (e.g., not 4, 5, or 6) the plurality of the participants of the real-time communication session at any one time. Displaying captions of a real-time video conferencing application in the system audio transcript when the real-time video conferencing application ceases displaying captions enables the computer system to provide the user with the captions of the audio of the real-time video conferencing application, thereby providing the user with improved visual feedback about the audio of the real-time video conferencing application without requiring further user input.

In some embodiments, the computer system automatically scrolls the system audio transcript as further captions are added to the system audio transcript. In some embodiments, the computer system determines a third caption based on third audio to include in the system audio transcript. In response, the computer system ceases to display the first caption and displays the third caption. In some embodiments, the computer system also shifts up display of the second caption. Automatically scrolling the system audio transcript as further captions are added to the system audio transcript enables the computer system to display the captions in a limited display area without requiring further user inputs reduces the number of inputs needed to view the captions.

In some embodiments, the first caption is based on pre-recorded audio (e.g., a pre-recorded video and/or pre-recorded audio guidance provided by an application) and the second caption is based on live audio (e.g., audio from a video chat, audio detected at a microphone (e.g., of the computer system of a device in communication with the computer system), and/or audio of a phone call). In some embodiments, the system audio transcript concurrently includes (displayed concurrently) the first caption based on pre-recorded audio and the second caption based on live audio. Displaying captions based on both pre-recorded and live audio enables the computer system to provide the user with a single interface for captions from various applications, thereby providing the user with improved visual feedback about the audio of the applications.

In some embodiments, while not detecting audio with content to caption (e.g., no spoken content in the audio and/or no recognized sounds in the audio (e.g., dog barking or baby crying)), the computer system displays, via the display generation component, an indication (e.g., "waiting . . . " and/or a non-textual indication) that the computer system is waiting for audio with content to caption. Displaying an indication that the computer system is waiting for audio with content to caption provides the user with feedback that the captioning system is active, even when new captions are not being displayed, thereby providing the user with improved visual feedback about the state of the computer system.

In some embodiments, displaying the system audio transcript includes, in accordance with a determination that a first type of content (e.g., controls of phone interface 950) (e.g., a dock, call answer/end buttons, media player control, notifications, /or keyboard, system content, and/or important content) is not displayed, via the display generation component, at a first location (e.g., second type of content is displayed and/or no content is displayed), displaying, via the display generation component, the system audio transcript at the first location. In some embodiments, displaying the system audio transcript includes, in accordance with a determination that the first type of content is displayed, via the display generation component, at the first location, displaying, via the display generation component, the system audio transcript at a second location that is different from the first location (e.g., the second location does not overlap the location of the display of the first type of content). In some embodiments, the system audio transcript is displayed at the first or second location when the system audio transcript is initially displayed. In some embodiments, receiving user input to increase the size of the system audio transcript, receiving user input to move the system audio transcript, and/or the first type of content being newly displayed (e.g., virtual keyboard being displayed or a system alert being displayed) and/or moved causes the computer system to automatically adjust the display location of the system audio transcript such that the system audio transcript does not overlay and/or overlap with the first type of content. Moving the system audio transcript such that the system audio transcript does not overlay and/or block specific content (e.g., important content and/or system content) enables the computer system to automatically display the specific content and also display the system audio transcript without requiring further user input, thereby reducing the number of inputs required to access the captions.

In some embodiments, the computer system is in communication with one or more input devices (e.g., a touch-sensitive surface (e.g., a touchscreen), a mouse, and/or a keyboard). In some embodiments, while displaying the system audio transcript (e.g., in a full screen mode or not in a full screen mode), the computer system detects, via the one or more input devices, input (e.g., 905*u*) to access a user interface for switching among applications. In some embodiments, in response to detecting the input to access the user interface for switching among applications, the computer system displays a representation of a full-screen version of the system audio transcript (e.g., 972*a*) (e.g., regardless of whether the system audio transcript was full-screen when the input to access the user interface for switching among applications was detected). In some embodiments, in response to detecting the input to access the user interface for switching among applications, the computer system concurrently displays, with the representation of the full-screen version of the system audio transcript, one or more representations of other currently and/or recently executing applications. In some embodiments, the full-screen version of the representation of the system audio transcript is sized to a predefined size such that the representations of the other applications among which the user can switch are also displayed at the predefined size. In some embodiments, the representation of the full-screen version of the system audio transcript allows for a portion of (e.g., less than 20% of, less than 10% of, or less than 5% of) the user interface to be occupied with other content, such as system status information (e.g., current day, current time, battery level, wireless service strength). In some embodiments, the representation of the full-screen version of the system audio transcript does not include user interface elements of non-operating system applications. Displaying the system audio transcript as a full-screen application when the computer system is displaying an application-switching user interface provides the user with visual feedback that the system audio transcript feature is active and available to be accessed and/or closed, thereby providing the user with improved visual feedback about the state and availability of the captioning system.

In some embodiments, the computer system is in communication with one or more input devices. (e.g., a touch-sensitive surface (e.g., a touchscreen), a mouse, and/or a keyboard). In some embodiments, while displaying, via the display generation component, the system audio transcript that includes the first caption and the second caption, the computer system receives, via the one or more input devices, a request to capture a display screenshot (e.g., 907u) that includes an area (e.g., a display area of the display generation component) in which the system audio transcript is displayed. In some embodiments, in response to receiving the request to capture the display screenshot, the computer system captures a display screenshot (e.g., 982) that includes the area in which the system audio transcript is displayed without including the system audio transcript in the display screenshot. In some embodiments, the system audio transcript is overlaid on other content at the area and the other content is included in the display screenshot at the area. Not including the system audio transcript in a screenshot of the computer system's display even while displaying the system audio transcript enables the computer system to provide additional non-system audio transcript information in the screenshot without requiring the user to provide inputs to minimize or cease displaying the system audio transcript, thereby reducing the number of inputs required to perform the operation. Not including the system audio transcript in a screenshot of the computer system's display even while displaying the system audio transcript improves the privacy of the user by not capturing contents of the system audio transcript (e.g., that may include captions of a private audio conversation).

In some embodiments, in response to determining that a second audio transcript is being displayed or will be displayed by a different application, the computer system ceases to display the system audio transcript. Ceasing to display one of two concurrently running caption contents enables the computer system to display additional non-caption information on the display and reduces duplication of displaying the same caption information without requiring the user to provide additional inputs, thereby reducing the number of inputs required to perform the operation.

In some embodiments, in response to determining that a second audio transcript is being displayed or will be displayed by a different application while the system audio transcript is being displayed, the computer system forgoes display of (or, optionally, suppressing display of) the second audio transcript. Ceasing to display one of two concurrently running caption contents enables the computer system to display additional non-caption information on the display and reduces duplication of displaying the same caption information without requiring the user to provide additional inputs, thereby reducing the number of inputs required to perform the operation.

In some embodiments, the computer system is in communication with one or more input devices (e.g., a touch-sensitive surface (e.g., a touchscreen), a mouse, and/or a keyboard). In some embodiments, while displaying the system audio transcript in a first visual state (e.g., with a first size and/or with a first location), the computer system receives input (e.g., 905e) to display an application. In some embodiments, in response to receiving the input to display the application, in accordance with a determination that the application is a fourth application, the computer system displays the system audio transcript in a second visual state (e.g., with a second size (e.g., a minimized state or a non-minimized (e.g., enlarged, full-screen, reduced-size, and/or intermediate) state) and/or with a second location) that is different from the first visual state. In some embodiments, in response to receiving the input to display the application, in accordance with a determination that the application is a fifth application, the computer system displays the system audio transcript in a third visual state (e.g., with a third size (e.g., a minimized state or a non-minimized (e.g., enlarged, full-screen, reduced-size, and/or intermediate) state) and/or with a third location) that is different from the second visual state. In some embodiments, the third visual state is the same as the first visual state. In some embodiments, the computer system updates display of the system audio transcript based on the application that is most prominent (e.g., is displayed on top and/or is full screen). In some embodiments, the computer system displays the system audio transcript in the second or third visual state based on the state of the system audio transcript at a prior time (e.g., the last time the system audio transcript was displayed for the corresponding application). In some embodiments, when the system audio transcript was in the second visual state when the respective application was last active (e.g., displayed or being used), the computer system automatically transitions the system audio transcript to the second visual state when the respective application becomes active. Maintaining, on a per-application basis, the state (e.g., size and/or location) of the system audio transcript enables the computer system to display the system audio transcript in a preferred manner when a particular application is displayed and/or emphasized without requiring further user input, thereby reducing the number of inputs required to perform the operation.

In some embodiments, the first information (e.g., caption metadata and/or audio) corresponding to first audio is received from an external device that is also providing the first information to one or more devices that are different from the computer system. In some embodiments, a first user is logged into the first computer system and different users are logged into the one or more devices. In some embodiments, the first information includes first caption information received from a first external device and second caption information received from a second external device that is different from the first external device. In some embodiments, the captions are derived from audio received from multiple devices (e.g., multiple user devices that are in a meeting). The computer system getting captions from a source that is also providing captions to other computers enables the computer system to get the same captions as the other computers and/or to access captions prepared from a higher-quality audio source than the computer system has access to, thereby providing the user with improved visual feedback.

In some embodiments, the computer system displays, via the display generation component, a description (e.g., 954) of a non-speech sound (e.g., a doorbell, a crying baby, a fire alarm, and/or a dog barking) as part of the system audio transcript. In some embodiments, the computer system receives audio and detects the non-speech sound, wherein display of the description of the non-speech sound is in response to detecting the non-speech sound in the received audio. Displaying descriptions of non-speech sounds in the system audio transcript provides the user with visual feedback about the content of the audio, thereby providing the user with improved visual feedback about the audio of the applications.

In some embodiments, the computer system receives third information (e.g., caption metadata and/or audio) corresponding to third audio in (e.g., directed to and/or from) a third application (e.g., a voice communication application, a video communication application, a video player application, a music application, or a game application). In some embodiments. In some embodiments, the computer system displays, via the display generation component, as part of the system audio transcript (e.g., in a captions window and/or in a bottom portion of a display) and based on the third audio: a caption of first speech of a first speaker (e.g., captions attributed to "Speaker 1" in FIG. 9G); a caption of second speech of a second speaker (e.g., captions attributed to "Speaker 2" in FIG. 9H) that is different from the first speaker; and an indication (e.g., indicator attributing captions to "Speaker 1" and "Speaker 2" in FIGS. 9G-9H) that a speaker of the caption of the first speech is different from a speaker of the caption of the second speech. In some embodiments, the computer system displays an indication of the first speaker adjacent to the caption of the first speech and/or an indication of the second speaker adjacent to the caption of the second speech. In some embodiments, the computer system uses a dictation model (e.g., a machine-learning model technique or a non-machine-learning model technique) to differentiate between the speakers of the first speech and the second speed. Displaying information differentiating among various speakers provides the user with visual information who which person is saying what content that is displayed as part of the system audio transcript, thereby providing the user with improved visual feedback about the audio of the applications.

In some embodiments, the computer system provides an option (e.g., 918) to disable captioning of real-time communication sessions. In some embodiments, the computer system detects selection of the option to disable captioning of real-time communication sessions. In some embodiments, after (e.g., in response to) detecting selection of the option to disable captioning of real-time communication sessions, the computer system forgoes captioning real-time communication sessions while continuing to caption one or more audio that is not part of a real-time communication session. In some embodiments, when a real-time communication session is captioned, the computer system provides an audio output indicating to the participants of the real-time communication session that the session is being captioned. In some embodiments, when the option to disable captioning of real-time communication sessions is selected, the computer system does not caption the session and does not provide an audio output indicating to the participants of the session that the session is being captioned. In some embodiments, the option to disable captioning of real-time communication sessions is displayed as part of a system user interface (e.g., a system settings user interface and/or a system application). In some embodiments, the option to disable captioning of real-time communication sessions is displayed as part of a user interface of a real-time communication application (e.g., an audio calling application and/or a video calling application). Enabling users to disable captioning for real-time communication sessions enables users to participate in real-time communication sessions without having to disclose that the audio is being captioned and enables users to disable captioning of private communications, thereby improving the machine-user interaction.

Note that details of the processes described above with respect to method 1000 (e.g., FIG. 10) are also applicable in an analogous manner to the methods described above. For example, methods 700-1000 may be executed on a same device, such as device 600. For brevity, these details are not repeated below.

FIG. 11 is a flow diagram illustrating a method for providing captions in accordance with some embodiments. Method 1100 is performed at a computer system (e.g., 100, 300, 500, 600, 900, and/or 901) (e.g., a smartphone, a smartwatch, a head mounted device (e.g., a head mounted augmented reality and/or extended reality device), and/or a personal computer) that is in communication with a display generation component (e.g., 903) (e.g., a display, a display controller, a head mounted display system, and/or a touch-sensitive display). Some operations in method 1200 are, optionally, combined, the orders of some operations are, optionally, changed, and some operations are, optionally, omitted.

As described below, method 1100 provides an intuitive way for providing captions. The method reduces the cognitive burden on a user for providing captions, thereby creating a more efficient human-machine interface. For battery-operated computing devices, enabling a user to provide faster and more efficiently conserves power and increases the time between battery charges.

In some embodiments, the computer system displays (1102), via the display generation component, a set of captions (e.g., captions in captions interface 920A, 956A, 958A) (e.g., that includes a transcript of an utterance and/or that includes a transcript of other sounds, such as background noise (e.g., dog barking, music playing, and/or applause)) in a first user interface region (e.g., captions interface 920A) (e.g., in a captions window and/or in a bottom portion of a display).

In some embodiments, while displaying the set of captions, the computer system detects (1104) typed user input (e.g., 905Af) to add a typed caption to the set of captions corresponding to a respective activity at the computer system.

In some embodiments, in response to detecting the typed user input to add the typed caption to the set of captions, the computer system displays (1106), via the display generation component, the typed caption in the first user interface region, wherein simulated speech (e.g., 907Ag) based on the typed caption is provided as audio output for the respective activity. Providing simulated speech based on the typed caption enables users that are not able or do not want to speak (e.g., are in a quiet area, such as a library, and/or are at a location where speaking is discouraged, such as on a plane) to participate in an audio conversation, such as a voice call or video call.

In some embodiments, the computer system outputs, via an audio output device (e.g., a speaker, headphone, and/or headset) of the computer system, the simulated speech. Outputting the simulated speech via an audio output device of the computer enables a user who is unable to speak to communicate with a nearby individual.

In some embodiments, the simulated speech is output via an audio output device (e.g., a speaker, headphone, and/or headset) of a remote computer system (e.g., a device of participant Jane or participant Ann) (e.g., a smartphone, a smartwatch, a head mounted device (e.g., a head mounted augmented reality and/or extended reality device), and/or a personal computer) that is in communication (e.g., wireless or wired) with the computer system (e.g., in a real-time communication session). In some embodiments, the computer system generates audio of the simulated speech (to be output via the audio output device) and transmits the audio of the simulated speech to the remote computer system to be output as audio. Outputting the simulated speech via a remote computer system enables the user to communicate with individuals that are not nearby.

In some embodiments, the computer system is in communication with one or more input devices (e.g., a touch-sensitive surface (e.g., a touchscreen), a mouse, and/or a keyboard). In some embodiments, prior to providing the simulated speech based on the typed caption as audio output for the respective activity (e.g., prior to displaying the set of captions and/or prior to detecting typed user input to add a typed caption to the set of captions), the computer system receives, via the one or more input devices, user input selecting (e.g., from among a plurality of simulated voices) a simulated voice. In some embodiments, the simulated speech based on the typed caption is provided as audio output for the respective activity using the selected simulated voice. In some embodiments, users optionally select a simulated voice that matches their preference (e.g., a deep voice, a high-pitched voice, a voice with a first accent, or a voice with a second accent). In some embodiments, providing simulated speech based on the typed caption as audio output for the respective activity includes: in accordance with a determination that a first simulated voice has been selected (e.g., by a user or automatically) for the simulated speech, the simulated speech uses the first simulated voice and in accordance with a determination that a second simulated voice (different from the first simulated voice) has been selected (e.g., by the user or automatically) for the simulated speech, the simulated speech uses the second simulated voice. Enabling a user to selected from among various simulated voices enables the user to, for example, select a simulated voice that more closely matches the user's actual voice (e.g., pitch, speed, and/or accent).

In some embodiments, the computer system is in communication with a microphone and one or more input devices (e.g., a touch-sensitive surface (e.g., a touchscreen), a mouse, and/or a keyboard). In some embodiments, the computer system displays, via the display generation component, an option (e.g., 950Ac) to enable displaying captions based on (e.g., of or using) audio detected via the microphone. In some embodiments, the computer system receives, via the one or more input devices, selection of the option to enable displaying captions based on audio detected via the microphone. In some embodiments, in response to receiving selection of the option to enable displaying captions based on audio detected via the microphone, the computer system displays, via the display generation component (e.g., in the first user interface region or outside the first user interface region), captions based on audio detected via the microphone. Displaying captions based on audio detected via the microphone enables the computer system to provide information about nearby audio to a user who is not able to understand and/or hear the nearby audio.

In some embodiments, the computer system displays, via the display generation component, a first caption (e.g., 958A) that is based on audio (e.g., speech audio and/or non-speech audio) detected via the microphone and a visual indication (e.g., 952A) corresponding to (e.g., displayed adjacent to and/or displayed as part of (such as via color or size)) the first caption. In some embodiments, the visual indication indicates that the first caption is based on audio detected via the microphone. In some embodiments, the computer system displays, via the display generation component, a second caption that is not based on audio detected via the microphone without displaying a visual indication corresponding to the second caption indicating that the second caption is based on audio detected via the microphone. In some embodiments, the first caption and the second caption are concurrently displayed. In some embodiments, the computer system displays a second visual indication, different from the visual indication, corresponding to the second caption indicating that the second caption corresponds to a specific application. In some embodiments, the computer system displays visual indications corresponding to respective captions indicating to what application the respective captions are attributed to. In some embodiments, the set of captions optionally includes a plurality of captions based on audio detected via the microphone and a plurality of captions that are not based on audio detected via the microphone. In some embodiments, the computer system displays one or more visual indications corresponding to (e.g., displayed adjacent to and/or displayed as part of (such as via color or size)) captions based on audio detected via the microphone to indicate that the audio was detected via the microphone. In some embodiments, the computer system does not display the same visual indications in correspondence with captions that are not based on audio detected via the microphone. In some embodiments, captions of audio of respective remote devices are displayed, via the display generation component, and include an indication of the source of the audio (e.g., an indication that a caption is based on audio from a first remote device and a different indication that another caption is based on audio from a second remote device that is different from the first remote device). In some embodiments (e.g., while the computer system is participating in a real-time communication session with a remote device), the computer system displays indications to differentiate between captions that are based on content that was typed at the remote device and captions that are based on audio generated at the remote device (e.g., visually differentiate for the user of the computer system whether a caption is produced using audio or whether a user of the remote device typed in text that is being displayed as part of the set of captions). Visually differentiating between portions of the captions that are based on audio from the microphone vs audio not from the microphone provides the user with visual feedback about the nearby audio and the non-nearby audio.

In some embodiments, the computer system is in communication with a microphone. In some embodiments, the computer system displays (e.g., in response to receiving, via the one or more input devices, user input selecting a menu option), via the display generation component, a menu (e.g., 950A) including one or more of: an option to enable and/or disable display of captions (e.g., 950Aa) (e.g., pausing display of captions (e.g., with or without pausing processing of audio for captions) upon being disabled and/or upon being disabled, maintaining already displayed captions without displaying additional captions (until the option is enabled)); an option to switch the source of audio for captions between audio for output at (e.g., audio generated by a program of the computer system and/or audio received at the computer system that is not through a microphone of the computer system) the computer and audio detected via the microphone of the computer system (e.g., 950Ab, 950Ac); an option to continuously display (e.g., prevent applications from occluding and/or prevent from going off screen), via the display generation component, the first user interface region with captions (e.g., 950Ad); an option to enable and/or disable providing simulated speech as audio output based on receiving a typed caption (e.g., 950Ae); and an option to center, via the display generation component, the first user interface region with captions (e.g., 950Af). Displaying the various menu options enables the computer system to provide a user with a personalized captioning experience, thereby improving the man-machine interface.

In some embodiments, displaying, via the display generation component, the set of captions in the first user interface region includes: in accordance with a determination that the set of captions includes a portion of text that is determined to be a respective type (e.g., a phone number, an e-mail, a website URL, and/or an address of a physical location) of text (e.g., based on one or more regular expression patterns that correspond to different types of text and/or based on analysis of the text), displaying, via the display generation component, an indication (e.g., highlight of caption 962Aa, highlight of caption 962Ab, highlight of caption 964Aa, highlight of caption 964Ab) that the respective type of text has been detected. In some embodiments, as a part of displaying the indication that the respective type of text has been detected, the computer system emphasizes (e.g., highlights, underlines, colors, and/or brackets) the portion of text. In some embodiments, the indication that the respective type of text has been detected is displayed adjacent to the portion of text that is of the respective type of text. In some embodiments, in accordance with a determination that the respective text does not include a portion of text that is of a respective type of text, the computer system does not display the indication that the respective type of text has been detected. Displaying indications of the respective types of text provides the user with visual feedback about the type of text that is displayed (e.g., that the text is an actionable/activatable), thereby providing the user with improved visual feedback.

In some embodiments, the computer system is in communication with one or more input devices (e.g., a touch-sensitive surface (e.g., a touchscreen), a mouse, and/or a keyboard). In some embodiments, the computer system receives, via the one or more input devices, selection (e.g., 905Ah) of the portion of text that is determined to be the respective type. In some embodiments, in response to receiving selection of the portion of text that is determined to be the respective type, the computer system performs an action associated with the portion of text (e.g., initiate a call using the phone number, compose a draft email using the email address, display the website, and/or display navigation directions using the address). In some embodiments, the action performed is based on the respective type. In some embodiments, the computer system receives selection of a portion of text and, in accordance with a determination that the portion of text is of the first type, the computer system performs (in response to receiving selection of the portion of text) a first operation (e.g., initiate a voice call or initiate a video call) using the portion of text; and in accordance with a determination that the portion of text is of the second type (different from the first type), the computer system performs (in response to receiving selection of the portion of text) a second operation (different from the first operation) (e.g., display a draft email or display a draft text message) using the portion of text. Performing an action associated with text that is of the respective type when the user selects the text enables the computer system to perform operations with reduced user inputs (e.g., user can tap on a phone number rather than retyping the phone number).

In some embodiments, while displaying the set of captions (e.g., that includes a transcript of an utterance and/or that includes a transcript of other sounds, such as background noise (e.g., dog barking, music playing, and/or applause)) in the first user interface region and in response to detecting audio (e.g., received as part of a real-time audio communication session, received as part of a real-time video communication session, and/or received as part of recorded audio) that includes a name of a user of the computer system, the computer system emphasizes (e.g., highlighting, brightening, and/or enlarging) the first user interface region (e.g., highlight of caption 964Aa, highlight of caption 964Ab). In some embodiments, while displaying the set of captions (e.g., that includes a transcript of an utterance and/or that includes a transcript of other sounds, such as background noise (e.g., dog barking, music playing, and/or applause)) in the first user interface region and in response to detecting audio (e.g., received as part of a real-time audio communication session, received as part of a real-time video communication session, and/or received as part of recorded audio) that includes a name of a user of the computer system, the computer system emphasizes (e.g., highlighting, brightening, and/or enlarging) a portion of text (e.g., more than or not more than) of the set of captions corresponding to the audio that includes the name of the user of the computer system (e.g., highlight of caption 962Aa, highlight of caption 962Ab). Emphasizing a first user interface region when a user's name is captioned and emphasizing the portion of text that includes the user's name provides the user with visual feedback that their name has been spoken and identifies for the user the context of the usage, thereby providing the user with improved visual feedback.

In some embodiments, the computer system stores (e.g., in memory at the computer system and/or in memory at a remote computer system) the set of captions in association with calendar information (e.g., a calendar appointment and/or a calendar invitation) corresponding to the time at which the set of captions was displayed. In some embodiments, the set of captions is stored in a format that is user-searchable such that a user can subsequently search the contents of a voice or video conversation and/or a presentation. In some embodiments, the set of captions is associated with the calendar information such that a user can access the calendar entry corresponding to the calendar information and review the set of captions (e.g., a voice or video conversation and/or a presentation) that occurred during the scheduled calendar entry. Storing the captions along with calendar information enables the computer system to provide the user with the captions in the future based on selection of a calendar entry corresponding to the calendar information, thereby providing the user with information about the audio the computer system received during the time of the calendar entry and providing the user with improved visual feedback.

In some embodiments, the computer system receives first information (e.g., caption metadata and/or audio) corresponding to first audio. In some embodiments, the computer system automatically selects, based on the first audio, a transcription language (e.g., detecting the language being spoken, detecting content that indicates the first audio includes speech of the specific language). In some embodiments, the computer system displays (e.g., in the first user interface region or not in the first user interface region), via the display generation component, captions corresponding to the first audio, wherein the captions corresponding to the first audio are based on (e.g., generated using and/or displayed using) the automatically selected transcription language. In some embodiments, in response to receiving first information: in accordance with a determination that a first language is detected in the first audio, the captions for the first audio are automatically displayed in the first language, and in accordance with a determination that a second language (different from the first language) is detected in the first audio, the captions for the first audio are automatically displayed in the second language. Automatically detecting/selecting a language for the captioning system enables the computer system to provide correct captions based on the detected/selected language without requiring the user to provide additional inputs, thereby reducing the number of inputs required to perform the operation.

In some embodiments, the computer system is in communication with one or more input devices (e.g., a touch-sensitive surface (e.g., a touchscreen), a mouse, and/or a keyboard), In some embodiments, the computer system receives (e.g., after displaying captions corresponding to the first audio), via one or more input devices, input (e.g., selection of language from 998b) to manually select a transcription language. In some embodiments, the computer system receives second information (e.g., caption metadata and/or audio) corresponding to second audio. In some embodiments, the computer system displays (e.g., in the first user interface region or not in the first user interface region), via the display generation component, captions corresponding to the second audio. In some embodiments, the captions corresponding to the second audio are based on (e.g., generated using and/or displayed using) the manually selected language. In some embodiments, in response to receiving the input manually selecting the transcription language: in accordance with a determination that the transcription language is a first language, the captions for audio are automatically displayed in the first language, and in accordance with a determination that the transcription language is a second language (different from the first language), the captions for audio are automatically displayed in the second language. In some embodiments, the language in which transcriptions are displayed is without regard to the language being spoken in the audio and/or without regard to the language automatically detected as being spoken in the audio. The computer system receiving a manual selection of a language for transcribing audio enables the computer system to provide captions that are appropriate for the language being spoken or expected to be spoken, thereby enabling the computer system to provide the user with improved captions and improved visual feedback about the audio the computer system is receiving.

Note that details of the processes described above with respect to method 1100 (e.g., FIG. 11) are also applicable in an analogous manner to the methods described above. For example, methods 700-1100 may be executed on a same device, such as device 600. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to enhance a user's live communication experience. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to customize user profiles for a live communication application and/or improve how captions are provided to the user. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of live communication user interfaces, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, general user profiles can be created for live communication applications based on non-personal information data or a bare minimum amount of personal information, such as the content being requested by the device associated with a user, other non-personal information available to the content delivery services, or publicly available information.

What is claimed is:

1. A computer system configured to communicate with a display generation component and one or more input devices, comprising:
   one or more processors; and
   memory storing one or more programs configured to be executed by the one or more processors, the one or more programs including instructions for:
      displaying, via the display generation component, a live communication user interface, the live communication user interface corresponding to a live communication session, the live communication user interface including:
         one or more representations of one or more participants of the live communication session, wherein a first representation of the one or more representations of the one or more participants is displayed at a location and at a size in the live communication user interface; and
         a first caption in a first area of the live communication user interface, the first caption corresponding to a first portion of audio data of the live communication session, wherein the first caption is displayed without displaying a second caption corresponding to a second portion of audio data of the live communication session that is different from the first portion of audio data of the live communication session;
      while displaying the live communication user interface with the first caption in the first area of the live communication user interface, detecting, from a local user of the computer system via the one or more input devices, an input that corresponds to a request to display expanded caption information; and
      in response to detecting the input that corresponds to a request to display expanded caption information:
         displaying, via the display generation component, the second caption corresponding to the second portion of audio data of the live communication session, wherein the second caption is displayed at a second area of the live communication user interface; and
         modifying, via the display generation component, the location of the first representation and/or the size of the first representation in the live communication user interface.

2. The computer system of claim 1, wherein modifying the location of the first representation and/or the size of the first representation includes modifying the size of the first representation in the live communication user interface, the one or more programs further including instructions for:
   while displaying the live communication user interface with the first caption in the first area of the live communication user interface, displaying a second representation of the one or more participants, wherein the first representation corresponds to a first participant and the second representation corresponds to a second participant; and
   in response to detecting the input that corresponds to a request to display expanded caption information:
      modifying, via the display generation component, a size of the second representation in the live communication user interface.

3. The computer system of claim 1, wherein modifying the location of the first representation and/or the size of the first representation includes moving the first representation from a first location to a second location in the live communication user interface, the one or more programs further including instructions for:
   while displaying the live communication user interface with the first caption in the first area of the live communication user interface, displaying a second representation of the one or more participants, wherein the first representation corresponds to a first participant and the second representation corresponds to a second participant; and
   in response to detecting the input that corresponds to a request to display expanded caption information, moving, via the display generation component, the second representation from a third location to a fourth location in the live communication user interface.

4. The computer system of claim 1, the one or more programs further including instructions for:
   changing a number of the one or more representations that are displayed in the live communication user interface.

5. The computer system of claim 1, wherein detecting the input that corresponds to a request to display expanded caption information includes detecting a drag gesture directed at the first caption.

6. The computer system of claim 1, wherein detecting the input that corresponds to a request to display expanded caption information includes detecting a tap gesture directed at the first caption.

7. The computer system of claim 1, the one or more programs further including instructions for:
while displaying the live communication user interface with the first caption in the first area of the live communication user interface, displaying a roster of participants; and
in response to detecting the input that corresponds to a request to display expanded caption information:
in accordance with a determination that the computer system is not displaying shared content:
maintaining display, via the display generation component, of the roster of participants.

8. The computer system of claim 1, the one or more programs further including instructions for:
while displaying the live communication user interface with the first caption in the first area of the live communication user interface, displaying a roster of participants that includes a plurality of representations of different participants that are smaller than other representations of participants in the live communication user interface; and
in response to detecting the input that corresponds to a request to display expanded caption information:
in accordance with a determination that the computer system is displaying shared content:
ceasing to display, via the display generation component, the roster of participants.

9. The computer system of claim 1, wherein:
in accordance with a determination that the second caption is scrollable, text of the second caption is displayed with a first visual property; and
in accordance with a determination that the second caption is not scrollable, text of the second caption is not displayed with the first visual property.

10. The computer system of claim 1, wherein an availability to navigate through captions corresponding to audio data for the live communication session is limited based on a point in time at which the computer system joined the live communication session.

11. The computer system of claim 1, wherein, concurrently, a first participant in the live communication session utters a plurality of words and a second participant in the live communication session utters a plurality of words, the one or more programs further including instructions for:
displaying, via the display generation component, captions for the plurality of words uttered by the first participant grouped together and associated with a representation of the first participant; and
displaying, via the display generation component, captions for the plurality of words uttered by the second participant grouped together and associated with a representation of the second participant.

12. The computer system of claim 1, wherein, concurrently, a first participant of the live communication session utters a plurality of words and a second participant of the live communication session utters a plurality of words, the one or more programs further including instructions for:

displaying, via the display generation component, a caption for a first word of the plurality of words uttered by the first participant;
subsequent to displaying the caption for the first word of the plurality of words of the first participant, displaying, via the display generation component, a caption for a first word of the plurality of words uttered by the second participant; and
subsequent to displaying the caption for the first word of the plurality of words of the second participant, displaying, via the display generation component, a caption for a second word of the plurality of words uttered by the first participant.

13. The computer system of claim 1, the one or more programs further including instructions for:
in accordance with a determination that the live communication session is between no more than two participants, overlaying one or more captions on the one or more representations.

14. The computer system of claim 1, the one or more programs further including instructions for:
in accordance with a determination that the live communication session is between at least three participants, displaying one or more captions adjacent to the one or more representations.

15. The computer system of claim 1, the one or more programs further including instructions for:
while displaying one or more captions, detecting an input corresponding to a request to cease to display the one or more captions; and
in response to detecting the input corresponding to the request to cease to display the one or more captions:
ceasing to display the one or more captions; and
ceasing to display a representation of one or more participants.

16. The computer system of claim 1, the one or more programs further including instructions for:
detecting that the computer system is at a respective position;
in response to detecting that the computer system is at a respective position:
in accordance with a determination that the live communication user interface is in a first spatial orientation relative to a camera of the computer system, displaying one or more captions at a first location in the live communication user interface that is adjacent to a camera of the computer system; and
in accordance with a determination that the live communication user interface is in a second spatial orientation relative to the camera of the computer system different from the first spatial orientation, displaying one or more captions at a second location in the live communication user interface, different from the first location in the live communication user interface, that is adjacent to the camera.

17. The computer system of claim 1, the one or more programs further including instructions for:
while the live communication session includes more than two participants, displaying a representation of a first participant of the live communication session at a first size in the live communication user interface;
detecting that the live communication session includes no more than two participants; and
in response to detecting that the live communication session includes no more than two participants, increasing an amount of caption information displayed in the live communication user interface.

18. The computer system of claim 1, wherein the first caption and the second caption are displayed in a respective user interface region and the one or more programs further including instructions for:
  displaying one or more captions; and
  in accordance with a determination that a predetermined threshold of time has passed since an utterance has occurred, ceasing to display the respective user interface region.

19. A non-transitory computer-readable storage medium storing one or more programs configured to be executed by one or more processors of a computer system that is in communication with a display generation component and one or more input devices, the one or more programs including instructions for:
  displaying, via the display generation component, a live communication user interface, the live communication user interface corresponding to a live communication session, the live communication user interface including:
    one or more representations of one or more participants of the live communication session, wherein a first representation of the one or more representations of the one or more participants is displayed at a location and at a size in the live communication user interface; and
    a first caption in a first area of the live communication user interface, the first caption corresponding to a first portion of audio data of the live communication session, wherein the first caption is displayed without displaying a second caption corresponding to a second portion of audio data of the live communication session that is different from the first portion of audio data of the live communication session;
  while displaying the live communication user interface with the first caption in the first area of the live communication user interface, detecting, from a local user of the computer system via the one or more input devices, an input that corresponds to a request to display expanded caption information; and
  in response to detecting the input that corresponds to a request to display expanded caption information:
    displaying, via the display generation component, the second caption corresponding to the second portion of audio data of the live communication session, wherein the second caption is displayed at a second area of the live communication user interface; and
    modifying, via the display generation component, the location of the first representation and/or the size of the first representation in the live communication user interface.

20. A method, comprising:
at a computer system that is in communication with a display generation component and one or more input devices:
  displaying, via the display generation component, a live communication user interface, the live communication user interface corresponding to a live communication session, the live communication user interface including:
    one or more representations of one or more participants of the live communication session, wherein a first representation of the one or more representations of the one or more participants is displayed at a location and at a size in the live communication user interface; and
    a first caption in a first area of the live communication user interface, the first caption corresponding to a first portion of audio data of the live communication session, wherein the first caption is displayed without displaying a second caption corresponding to a second portion of audio data of the live communication session that is different from the first portion of audio data of the live communication session;
  while displaying the live communication user interface with the first caption in the first area of the live communication user interface, detecting, from a local user of the computer system via the one or more input devices, an input that corresponds to a request to display expanded caption information; and
  in response to detecting the input that corresponds to a request to display expanded caption information:
    displaying, via the display generation component, the second caption corresponding to the second portion of audio data of the live communication session, wherein the second caption is displayed at a second area of the live communication user interface; and
    modifying, via the display generation component, the location of the first representation and/or the size of the first representation in the live communication user interface.

21. The non-transitory computer-readable storage medium of claim 19, wherein modifying the location of the first representation and/or the size of the first representation includes modifying the size of the first representation in the live communication user interface, the one or more programs further including instructions for:
  while displaying the live communication user interface with the first caption in the first area of the live communication user interface, displaying a second representation of the one or more participants, wherein the first representation corresponds to a first participant and the second representation corresponds to a second participant; and
  in response to detecting the input that corresponds to a request to display expanded caption information:
    modifying, via the display generation component, a size of the second representation in the live communication user interface.

22. The non-transitory computer-readable storage medium of claim 19, wherein modifying the location of the first representation and/or the size of the first representation includes moving the first representation from a first location to a second location in the live communication user interface, the one or more programs further including instructions for:
  while displaying the live communication user interface with the first caption in the first area of the live communication user interface, displaying a second representation of the one or more participants, wherein the first representation corresponds to a first participant and the second representation corresponds to a second participant; and
  in response to detecting the input that corresponds to a request to display expanded caption information, moving, via the display generation component, the second representation from a third location to a fourth location in the live communication user interface.

23. The non-transitory computer-readable storage medium of claim 19, the one or more programs further including instructions for:

changing a number of the one or more representations that are displayed in the live communication user interface.

24. The non-transitory computer-readable storage medium of claim 19, wherein detecting the input that corresponds to a request to display expanded caption information includes detecting a drag gesture directed at the first caption.

25. The non-transitory computer-readable storage medium of claim 19, wherein detecting the input that corresponds to a request to display expanded caption information includes detecting a tap gesture directed at the first caption.

26. The non-transitory computer-readable storage medium of claim 19, the one or more programs further including instructions for:
   while displaying the live communication user interface with the first caption in the first area of the live communication user interface, displaying a roster of participants; and
   in response to detecting the input that corresponds to a request to display expanded caption information:
      in accordance with a determination that the computer system is not displaying shared content:
         maintaining display, via the display generation component, of the roster of participants.

27. The non-transitory computer-readable storage medium of claim 19, the one or more programs further including instructions for:
   while displaying the live communication user interface with the first caption in the first area of the live communication user interface, displaying a roster of participants that includes a plurality of representations of different participants that are smaller than other representations of participants in the live communication user interface; and
   in response to detecting the input that corresponds to a request to display expanded caption information:
      in accordance with a determination that the computer system is displaying shared content:
         ceasing to display, via the display generation component, the roster of participants.

28. The non-transitory computer-readable storage medium of claim 19, wherein:
   in accordance with a determination that the second caption is scrollable, text of the second caption is displayed with a first visual property; and
   in accordance with a determination that the second caption is not scrollable, text of the second caption is not displayed with the first visual property.

29. The non-transitory computer-readable storage medium of claim 19, wherein an availability to navigate through captions corresponding to audio data for the live communication session is limited based on a point in time at which the computer system joined the live communication session.

30. The non-transitory computer-readable storage medium of claim 19, wherein, concurrently, a first participant in the live communication session utters a plurality of words and a second participant in the live communication session utters a plurality of words, the one or more programs further including instructions for:
   displaying, via the display generation component, captions for the plurality of words uttered by the first participant grouped together and associated with a representation of the first participant;
   and displaying, via the display generation component, captions for the plurality of words uttered by the second participant grouped together and associated with a representation of the second participant.

31. The non-transitory computer-readable storage medium of claim 19, wherein, concurrently, a first participant of the live communication session utters a plurality of words and a second participant of the live communication session utters a plurality of words, the one or more programs further including instructions for:
   displaying, via the display generation component, a caption for a first word of the plurality of words uttered by the first participant;
   subsequent to displaying the caption for the first word of the plurality of words of the first participant, displaying, via the display generation component, a caption for a first word of the plurality of words uttered by the second participant; and
   subsequent to displaying the caption for the first word of the plurality of words of the second participant, displaying, via the display generation component, a caption for a second word of the plurality of words uttered by the first participant.

32. The non-transitory computer-readable storage medium of claim 19, the one or more programs further including instructions for:
   in accordance with a determination that the live communication session is between no more than two participants, overlaying one or more captions on the one or more representations.

33. The non-transitory computer-readable storage medium of claim 19, the one or more programs further including instructions for:
   in accordance with a determination that the live communication session is between at least three participants, displaying one or more captions adjacent to the one or more representations.

34. The non-transitory computer-readable storage medium of claim 19, the one or more programs further including instructions for:
   while displaying one or more captions, detecting an input corresponding to a request to cease to display the one or more captions; and
   in response to detecting the input corresponding to the request to cease to display the one or more captions:
      ceasing to display the one or more captions; and
      ceasing to display a representation of one or more participants.

35. The non-transitory computer-readable storage medium of claim 19, the one or more programs further including instructions for:
   detecting that the computer system is at a respective position;
   in response to detecting that the computer system is at a respective position:
      in accordance with a determination that the live communication user interface is in a first spatial orientation relative to a camera of the computer system, displaying one or more captions at a first location in the live communication user interface that is adjacent to a camera of the computer system; and
      in accordance with a determination that the live communication user interface is in a second spatial orientation relative to the camera of the computer system different from the first spatial orientation, displaying one or more captions at a second location in the live communication user interface, different from the first location in the live communication user interface, that is adjacent to the camera.

36. The non-transitory computer-readable storage medium of claim 19, the one or more programs further including instructions for:
  while the live communication session includes more than two participants, displaying a representation of a first participant of the live communication session at a first size in the live communication user interface;
  detecting that the live communication session includes no more than two participants; and
  in response to detecting that the live communication session includes no more than two participants, increasing an amount of caption information displayed in the live communication user interface.

37. The non-transitory computer-readable storage medium of claim 19, wherein the first caption and the second caption are displayed in a respective user interface region and the one or more programs further including instructions for:
  displaying one or more captions; and
  in accordance with a determination that a predetermined threshold of time has passed since an utterance has occurred, ceasing to display the respective user interface region.

38. The method of claim 20, wherein modifying the location of the first representation and/or the size of the first representation includes modifying the size of the first representation in the live communication user interface, the method further comprising:
  while displaying the live communication user interface with the first caption in the first area of the live communication user interface, displaying a second representation of the one or more participants, wherein the first representation corresponds to a first participant and the second representation corresponds to a second participant; and
  in response to detecting the input that corresponds to a request to display expanded caption information:
    modifying, via the display generation component, a size of the second representation in the live communication user interface.

39. The method of claim 20, wherein modifying the location of the first representation and/or the size of the first representation includes moving the first representation from a first location to a second location in the live communication user interface, the method further comprising:
  while displaying the live communication user interface with the first caption in the first area of the live communication user interface, displaying a second representation of the one or more participants, wherein the first representation corresponds to a first participant and the second representation corresponds to a second participant; and
  in response to detecting the input that corresponds to a request to display expanded caption information, moving, via the display generation component, the second representation from a third location to a fourth location in the live communication user interface.

40. The method of claim 20, the method further comprising:
  changing a number of the one or more representations that are displayed in the live communication user interface.

41. The method of claim 20, wherein detecting the input that corresponds to a request to display expanded caption information includes detecting a drag gesture directed at the first caption.

42. The method of claim 20, wherein detecting the input that corresponds to a request to display expanded caption information includes detecting a tap gesture directed at the first caption.

43. The method of claim 20, the method further comprising:
  while displaying the live communication user interface with the first caption in the first area of the live communication user interface, displaying a roster of participants; and
  in response to detecting the input that corresponds to a request to display expanded caption information:
    in accordance with a determination that the computer system is not displaying shared content:
      maintaining display, via the display generation component, of the roster of participants.

44. The method of claim 20, the method further comprising:
  while displaying the live communication user interface with the first caption in the first area of the live communication user interface, displaying a roster of participants that includes a plurality of representations of different participants that are smaller than other representations of participants in the live communication user interface; and
  in response to detecting the input that corresponds to a request to display expanded caption information:
    in accordance with a determination that the computer system is displaying shared content:
      ceasing to display, via the display generation component, the roster of participants.

45. The method of claim 20, wherein;
  in accordance with a determination that the second caption is scrollable, text of the second caption is displayed with a first visual property; and
  in accordance with a determination that the second caption is not scrollable, text of the second caption is not displayed with the first visual property.

46. The method of claim 20, wherein an availability to navigate through captions corresponding to audio data for the live communication session is limited based on a point in time at which the computer system joined the live communication session.

47. The method of claim 20, wherein, concurrently, a first participant in the live communication session utters a plurality of words and a second participant in the live communication session utters a plurality of words, the method further comprising:
  displaying, via the display generation component, captions for the plurality of words uttered by the first participant grouped together and associated with a representation of the first participant; and
  displaying, via the display generation component, captions for the plurality of words uttered by the second participant grouped together and associated with a representation of the second participant.

48. The method of claim 20, wherein, concurrently, a first participant of the live communication session utters a plurality of words and a second participant of the live communication session utters a plurality of words, the method further comprising:
  displaying, via the display generation component, a caption for a first word of the plurality of words uttered by the first participant;
  subsequent to displaying the caption for the first word of the plurality of words of the first participant, displaying, via the display generation component, a caption for a first word of the plurality of words uttered by the second participant; and subsequent to displaying the caption for the first word of the plurality of words of the second participant, displaying, via the display generation component, a caption for a second word of the plurality of words uttered by the first participant.

49. The method of claim 20, the method further comprising:
in accordance with a determination that the live communication session is between no more than two participants, overlaying one or more captions on the one or more representations.

50. The method of claim 20, the method further comprising:
in accordance with a determination that the live communication session is between at least three participants, displaying one or more captions adjacent to the one or more representations.

51. The method of claim 20, the method further comprising:
while displaying one or more captions, detecting an input corresponding to a request to cease to display the one or more captions; and
in response to detecting the input corresponding to the request to cease to display the one or more captions:
ceasing to display the one or more captions; and
ceasing to display a representation of one or more participants.

52. The method of claim 20, the method further comprising:
detecting that the computer system is at a respective position;
in response to detecting that the computer system is at a respective position:
in accordance with a determination that the live communication user interface is in a first spatial orientation relative to a camera of the computer system, displaying one or more captions at a first location in the live communication user interface that is adjacent to a camera of the computer system; and
in accordance with a determination that the live communication user interface is in a second spatial orientation relative to the camera of the computer system different from the first spatial orientation, displaying one or more captions at a second location in the live communication user interface, different from the first location in the live communication user interface, that is adjacent to the camera.

53. The method of claim 20, the method further comprising:
while the live communication session includes more than two participants, displaying a representation of a first participant of the live communication session at a first size in the live communication user interface;
detecting that the live communication session includes no more than two participants; and
in response to detecting that the live communication session includes no more than two participants, increasing an amount of caption information displayed in the live communication user interface.

54. The method of claim 20, wherein the first caption and the second caption are displayed in a respective user interface region and the method further comprising:
displaying one or more captions; and
in accordance with a determination that a predetermined threshold of time has passed since an utterance has occurred, ceasing to display the respective user interface region.

* * * * *

UNITED STATES PATENT AND TRADEMARK OFFICE
CERTIFICATE OF CORRECTION

| | | |
|---|---|---|
| PATENT NO. | : 12,342,102 B2 | Page 1 of 1 |
| APPLICATION NO. | : 17/988571 | |
| DATED | : June 24, 2025 | |
| INVENTOR(S) | : Jae Woo Chang et al. | |

It is certified that error appears in the above-identified patent and that said Letters Patent is hereby corrected as shown below:

In the Claims

Column 112, Line 33: In Claim 45, delete "wherein;" and insert -- wherein: --.

Signed and Sealed this
Fifth Day of August, 2025

Coke Morgan Stewart
*Acting Director of the United States Patent and Trademark Office*